(12) United States Patent
Huizen et al.

(10) Patent No.: US 12,128,827 B2
(45) Date of Patent: *Oct. 29, 2024

(54) VEHICULAR INTERIOR REARVIEW MIRROR ASSEMBLY

(71) Applicant: Magna Mirrors of America, Inc., Holland, MI (US)

(72) Inventors: Gregory A. Huizen, Hudsonville, MI (US); Justin E. Sobecki, Rockford, MI (US); Austen C. Peterson, Hudsonville, MI (US); Ian A. McCabe, Holland, MI (US); Rodney K. Blank, Zeeland, MI (US); Niall R. Lynam, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,366

(22) Filed: Feb. 5, 2024

(65) Prior Publication Data
US 2024/0217438 A1    Jul. 4, 2024

Related U.S. Application Data

(63) Continuation of application No. 18/308,775, filed on Apr. 28, 2023, now Pat. No. 11,890,990, which is a (Continued)

(51) Int. Cl.
*B60R 1/12*   (2006.01)
*B60R 1/04*   (2006.01)
(Continued)

(52) U.S. Cl.
CPC ................ *B60R 1/12* (2013.01); *B60R 1/04* (2013.01); *B60R 11/04* (2013.01); *H04N 23/56* (2023.01);
(Continued)

(58) Field of Classification Search
CPC .. B60R 1/12; B60R 1/04; B60R 11/04; B60R 2001/1253; B60R 2011/0033;
(Continued)

(56) References Cited

U.S. PATENT DOCUMENTS

| 4,435,042 A | 3/1984 | Wood et al. |
| 4,436,371 A | 3/1984 | Wood et al. |

(Continued)

FOREIGN PATENT DOCUMENTS

| CN | 205523966 U | 8/2016 |
| CN | 209534893 U | 10/2019 |

(Continued)

OTHER PUBLICATIONS

International Search Report and Written Opinion dated Jul. 1, 2022 for corresponding PCT Application No. PCT/US2022/070882, filed filed Mar. 1, 2022.

(Continued)

*Primary Examiner* — Jeffery A Williams
*Assistant Examiner* — Tyler B Edwards
(74) *Attorney, Agent, or Firm* — HONIGMAN LLP

(57) ABSTRACT

A vehicular interior rearview mirror assembly includes a mirror head accommodating an interior rearview mirror reflective element. The mirror reflective element has a mirror transflector that transmits near infrared light incident thereon, transmits visible light incident thereon and reflects visible light incident thereon. The mirror transflector includes repeating alternating layers of a higher refractive index layer and a lower refractive index layer. A megapixel camera is disposed within the mirror head behind the mirror reflective element and views through the mirror transflector. A near infrared illumination source is disposed within the mirror head and operable to emit near infrared light that passes through the mirror transflector. Responsive at least in (Continued)

part to the data processor processing captured image data, at least one selected from the group consisting of (i) driver attentiveness is monitored, (ii) driver drowsiness is monitored and (iii) driver gaze direction is monitored.

77 Claims, 121 Drawing Sheets

Related U.S. Application Data continuation of application No. 17/905,109, filed as application No. PCT/US2022/070882 on Mar. 1, 2022, now Pat. No. 11,639,134.

(60) Provisional application No. 63/267,316, filed on Jan. 31, 2022, provisional application No. 63/262,642, filed on Oct. 18, 2021, provisional application No. 63/260,359, filed on Aug. 18, 2021, provisional application No. 63/201,757, filed on May 12, 2021, provisional application No. 63/201,371, filed on Apr. 27, 2021, provisional application No. 63/200,451, filed on Mar. 8, 2021, provisional application No. 63/200,315, filed on Mar. 1, 2021.

(51) Int. Cl.
*B60R 11/04* (2006.01)
*H04N 23/56* (2023.01)
*H04N 25/10* (2023.01)
*B60R 11/00* (2006.01)
*G02B 5/20* (2006.01)

(52) U.S. Cl.
CPC ...... *H04N 25/10* (2023.01); *B60R 2001/1253* (2013.01); *B60R 2011/0033* (2013.01); *G02B 5/208* (2013.01)

(58) Field of Classification Search
CPC . B60R 2001/1223; B60R 1/088; B60R 1/089; H04N 23/56; H04N 25/10; G02B 5/208
See application file for complete search history.

(56) References Cited

U.S. PATENT DOCUMENTS

| | | | |
|---|---|---|---|
| 4,712,879 A | 12/1987 | Lynam et al. |
| 4,826,289 A | 5/1989 | Vandenbrink et al. |
| 4,936,533 A | 6/1990 | Adams et al. |
| 4,948,242 A | 8/1990 | Desmond et al. |
| 5,066,112 A | 11/1991 | Lynam et al. |
| 5,073,012 A | 12/1991 | Lynam |
| 5,076,673 A | 12/1991 | Lynam et al. |
| 5,076,674 A | 12/1991 | Lynam |
| 5,100,095 A | 3/1992 | Haan et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,327,288 A | 7/1994 | Wellington et al. |
| 5,406,414 A | 4/1995 | O'Farrell et al. |
| 5,525,264 A | 6/1996 | Cronin et al. |
| 5,550,677 A | 8/1996 | Schofield et al. |
| 5,567,360 A | 10/1996 | Varaprasad et al. |
| 5,570,127 A | 10/1996 | Schmidt |
| 5,594,222 A | 1/1997 | Caldwell |
| 5,610,756 A | 3/1997 | Lynam et al. |
| 5,668,663 A | 9/1997 | Varaprasad et al. |
| 5,670,935 A | 9/1997 | Schofield et al. |
| 5,715,093 A | 2/1998 | Schierbeek et al. |
| 5,724,187 A | 3/1998 | Varaprasad et al. |
| 5,751,489 A | 5/1998 | Caskey et al. |
| 5,760,962 A | 6/1998 | Schofield et al. |
| 5,796,094 A | 8/1998 | Schofield et al. |
| 5,820,097 A | 10/1998 | Spooner |
| 5,877,897 A | 3/1999 | Schofield et al. |
| 5,910,854 A | 6/1999 | Varaprasad et al. |
| 6,001,486 A | 12/1999 | Varaprasad et al. |
| 6,002,511 A | 12/1999 | Varaprasad et al. |
| 6,097,023 A | 8/2000 | Schofield et al. |
| 6,154,306 A | 11/2000 | Varaprasad et al. |
| 6,158,655 A | 12/2000 | DeVries, Jr. et al. |
| 6,178,034 B1 | 1/2001 | Allemand et al. |
| 6,201,642 B1 | 3/2001 | Bos |
| 6,222,447 B1 | 4/2001 | Schofield et al. |
| 6,310,611 B1 | 10/2001 | Caldwell |
| 6,318,870 B1 | 11/2001 | Spooner et al. |
| 6,320,176 B1 | 11/2001 | Schofield et al. |
| 6,320,282 B1 | 11/2001 | Caldwell |
| 6,329,925 B1 | 12/2001 | Skiver et al. |
| 6,369,804 B1 | 4/2002 | Sandbach |
| 6,396,397 B1 | 5/2002 | Bos et al. |
| 6,437,258 B1 | 8/2002 | Sandbach |
| 6,449,082 B1 | 9/2002 | Agrawal et al. |
| 6,452,479 B1 | 9/2002 | Sandbach |
| 6,480,103 B1 | 11/2002 | McCarthy et al. |
| 6,483,438 B2 | 11/2002 | DeLine et al. |
| 6,485,081 B1 | 11/2002 | Bingle et al. |
| 6,492,980 B2 | 12/2002 | Sandbach |
| 6,498,620 B2 | 12/2002 | Schofield et al. |
| 6,501,465 B2 | 12/2002 | Sandbach |
| 6,504,531 B1 | 1/2003 | Sandbach |
| 6,540,193 B1 | 4/2003 | DeLine |
| 6,552,342 B2 | 4/2003 | Holz et al. |
| 6,559,435 B2 | 5/2003 | Schofield et al. |
| 6,590,719 B2 | 7/2003 | Bos |
| 6,593,565 B2 | 7/2003 | Heslin et al. |
| 6,598,980 B2 | 7/2003 | Marusawa et al. |
| 6,621,411 B2 | 9/2003 | McCarthy et al. |
| 6,627,918 B2 | 9/2003 | Getz et al. |
| 6,690,268 B2 | 2/2004 | Schofield et al. |
| 6,698,905 B1 | 3/2004 | Whitehead |
| 6,703,925 B2 | 3/2004 | Steffel |
| 6,717,610 B1 | 4/2004 | Bos et al. |
| 6,757,109 B2 | 6/2004 | Bos |
| 6,768,420 B2 | 7/2004 | McCarthy et al. |
| 6,783,167 B2 | 8/2004 | Bingle et al. |
| 6,806,452 B2 | 10/2004 | Bos et al. |
| 6,822,563 B2 | 11/2004 | Bos et al. |
| 6,824,281 B2 | 11/2004 | Schofield et al. |
| 6,831,261 B2 | 12/2004 | Schofield et al. |
| 6,877,709 B2 | 4/2005 | March et al. |
| 6,922,292 B2 | 7/2005 | Bos |
| 6,946,978 B2 | 9/2005 | Schofield |
| 7,004,606 B2 | 2/2006 | Schofield |
| 7,038,577 B2 | 5/2006 | Pawlicki et al. |
| 7,097,226 B2 | 8/2006 | Bingle et al. |
| 7,184,190 B2 | 2/2007 | McCabe et al. |
| 7,188,963 B2 | 3/2007 | Schofield et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,420,756 B2 | 9/2008 | Lynam |
| 7,446,924 B2 | 11/2008 | Schofield et al. |
| 7,477,758 B2 | 1/2009 | Piirainen et al. |
| 7,480,149 B2 | 1/2009 | DeWard et al. |
| 7,626,749 B2 | 12/2009 | Baur et al. |
| 7,636,188 B2 | 12/2009 | Baur et al. |
| 7,720,580 B2 | 5/2010 | Higgins-Luthman |
| 7,722,199 B2 | 5/2010 | DeWard et al. |
| 7,741,666 B2 | 6/2010 | Nozaki et al. |
| 7,855,755 B2 | 12/2010 | Weller et al. |
| 7,914,187 B2 | 3/2011 | Higgins-Luthman et al. |
| 8,049,640 B2 | 11/2011 | Uken et al. |
| 8,256,821 B2 | 9/2012 | Lawlor et al. |
| 8,258,932 B2 | 9/2012 | Wahlstrom |

(56) References Cited

U.S. PATENT DOCUMENTS

| | | |
|---|---|---|
| 8,277,059 B2 | 10/2012 | McCabe et al. |
| 8,446,470 B2 | 5/2013 | Lu et al. |
| 8,451,107 B2 | 5/2013 | Lu et al. |
| 8,508,831 B2 | 8/2013 | De Wind et al. |
| 8,529,108 B2 | 9/2013 | Uken et al. |
| 8,727,547 B2 | 5/2014 | McCabe et al. |
| 8,730,553 B2 | 5/2014 | De Wind et al. |
| 8,743,203 B2 | 6/2014 | Karner et al. |
| 8,876,342 B2 | 11/2014 | Wimbert et al. |
| 8,922,422 B2 | 12/2014 | Klar et al. |
| 9,090,213 B2 | 7/2015 | Lawlor et al. |
| 9,126,525 B2 | 9/2015 | Lynam et al. |
| 9,174,578 B2 | 11/2015 | Uken et al. |
| 9,346,403 B2 | 5/2016 | Uken et al. |
| 9,405,120 B2 | 8/2016 | Graf et al. |
| 9,487,159 B2 | 11/2016 | Achenbach |
| 9,493,122 B2 | 11/2016 | Krebs |
| 9,598,016 B2 | 3/2017 | Blank et al. |
| 9,609,757 B2 | 3/2017 | Steigerwald |
| 9,616,815 B2 | 4/2017 | Mohan |
| 9,827,913 B2 | 11/2017 | De Wind et al. |
| 9,878,669 B2 | 1/2018 | Kendall |
| 9,900,490 B2 | 2/2018 | Ihlenburg et al. |
| 10,017,114 B2 | 7/2018 | Bongwald |
| 10,029,614 B2 | 7/2018 | Larson |
| 10,046,706 B2 | 8/2018 | Larson et al. |
| 10,065,574 B2 | 9/2018 | Tiryaki |
| 10,166,924 B2 | 1/2019 | Baur |
| 10,166,926 B2 | 1/2019 | Krebs et al. |
| 10,261,648 B2 | 4/2019 | Uken et al. |
| 10,264,219 B2 | 4/2019 | Mleczko et al. |
| 10,315,573 B2 | 6/2019 | Bongwald |
| 10,421,404 B2 | 9/2019 | Larson et al. |
| 10,442,360 B2 | 10/2019 | LaCross et al. |
| 10,466,563 B2 | 11/2019 | Kendall et al. |
| 10,567,633 B2 | 2/2020 | Ihlenburg et al. |
| 10,567,705 B2 | 2/2020 | Ziegenspeck et al. |
| 10,703,204 B2 | 7/2020 | Hassan et al. |
| 10,769,434 B2 | 9/2020 | Weller et al. |
| 10,922,563 B2 | 2/2021 | Nix et al. |
| 10,958,830 B2 | 3/2021 | Koravadi |
| 11,167,771 B2 | 11/2021 | Caron et al. |
| 11,201,994 B2 | 12/2021 | Ihlenburg et al. |
| 11,205,083 B2 | 12/2021 | Lynam |
| 11,214,199 B2 | 1/2022 | LaCross et al. |
| 11,240,427 B2 | 2/2022 | Koravadi |
| 11,242,008 B2 | 2/2022 | Blank et al. |
| 11,252,376 B2 | 2/2022 | Ihlenburg |
| 11,341,671 B2 | 5/2022 | Lu et al. |
| 11,348,374 B2 | 5/2022 | Kramer et al. |
| 11,433,906 B2 | 9/2022 | Lu |
| 11,465,561 B2 | 10/2022 | Peterson et al. |
| 11,488,399 B2 | 11/2022 | Wacquant |
| 11,493,918 B2 | 11/2022 | Singh |
| 11,518,401 B2 | 12/2022 | Kulkarni |
| 11,582,425 B2 | 2/2023 | Liu |
| 11,639,134 B1 * | 5/2023 | Huizen ................ H04N 23/56 348/77 |
| 11,827,153 B2 | 11/2023 | Miller et al. |
| 11,890,990 B2 * | 2/2024 | Huizen ................ H04N 25/10 |
| 2001/0022550 A1 | 9/2001 | Steffel |
| 2002/0005999 A1 | 1/2002 | Hutzel et al. |
| 2002/0024713 A1 | 2/2002 | Roberts et al. |
| 2004/0252993 A1 | 12/2004 | Sato |
| 2006/0050018 A1 | 3/2006 | Hutzel et al. |
| 2006/0171704 A1 | 8/2006 | Bingle et al. |
| 2007/0182528 A1 | 8/2007 | Breed et al. |
| 2009/0024436 A1 | 1/2009 | Ingman et al. |
| 2009/0040778 A1 | 2/2009 | Takayanagi et al. |
| 2010/0085653 A1 | 4/2010 | Uken et al. |
| 2010/0214791 A1 | 8/2010 | Schofield |
| 2011/0080481 A1 | 4/2011 | Bellingham |
| 2011/0084198 A1 | 4/2011 | McCabe et al. |
| 2012/0236136 A1 | 9/2012 | Boddy |
| 2014/0022390 A1 | 1/2014 | Blank et al. |
| 2014/0285666 A1 | 9/2014 | O'Connell et al. |
| 2014/0293169 A1 | 10/2014 | Uken et al. |
| 2014/0313563 A1 | 10/2014 | Uken et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0097955 A1 | 4/2015 | De Wind et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0177935 A1 | 6/2017 | Weller et al. |
| 2017/0217367 A1 | 8/2017 | Pflug et al. |
| 2017/0237946 A1 | 8/2017 | Schofield et al. |
| 2017/0274906 A1 | 9/2017 | Hassan et al. |
| 2017/0355312 A1 | 12/2017 | Habibi et al. |
| 2018/0134217 A1 | 5/2018 | Peterson et al. |
| 2018/0222414 A1 | 8/2018 | Ihlenburg et al. |
| 2018/0231976 A1 | 8/2018 | Singh |
| 2019/0054899 A1 | 2/2019 | Hoyos et al. |
| 2019/0118717 A1 | 4/2019 | Blank et al. |
| 2019/0146297 A1 | 5/2019 | Lynam et al. |
| 2019/0168669 A1 * | 6/2019 | Lintz ................ B60R 1/26 |
| 2019/0258131 A9 | 8/2019 | Lynam et al. |
| 2019/0364199 A1 | 11/2019 | Koravadi |
| 2019/0381938 A1 | 12/2019 | Hopkins |
| 2020/0143560 A1 | 5/2020 | Lu et al. |
| 2020/0148120 A1 | 5/2020 | Englander et al. |
| 2020/0202151 A1 | 6/2020 | Wacquant |
| 2020/0320320 A1 | 10/2020 | Lynam |
| 2020/0327323 A1 | 10/2020 | Noble |
| 2020/0377022 A1 | 12/2020 | LaCross et al. |
| 2021/0056306 A1 | 2/2021 | Hu et al. |
| 2021/0122404 A1 | 4/2021 | Lisseman et al. |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0291739 A1 | 9/2021 | Kasarla et al. |
| 2021/0306538 A1 | 9/2021 | Solar |
| 2021/0323473 A1 | 10/2021 | Peterson et al. |
| 2021/0368082 A1 | 11/2021 | Solar |
| 2022/0111857 A1 | 4/2022 | Kulkarni |
| 2022/0242438 A1 | 8/2022 | Sobecki et al. |
| 2022/0254132 A1 | 8/2022 | Rother |
| 2022/0377219 A1 | 11/2022 | Conger et al. |
| 2023/0131471 A1 | 4/2023 | Sobecki et al. |
| 2023/0137004 A1 | 5/2023 | Huizen et al. |
| 2023/0302994 A1 | 9/2023 | Miller et al. |
| 2024/0017610 A1 | 1/2024 | Ravichandran et al. |

FOREIGN PATENT DOCUMENTS

| | | |
|---|---|---|
| DE | 10325646 A1 | 1/2004 |
| DE | 102005000650 A1 | 7/2006 |
| FR | 3071788 A1 | 4/2019 |
| JP | 2004136760 A | 5/2004 |
| WO | 2022150826 A1 | 7/2022 |

OTHER PUBLICATIONS

Seeing Machines' FOVIO Driver Monitoring (FDM) processor [description of which is available at https://china.xilinx.com/publications/presentations/c_D3_03-Driver-Monitoring-Systems.pdf], Jan. 14, 2021.

\* cited by examiner

- Driver States:
  — Looking ahead + hand(s) on top of the wheel (for example 11-1 or 11-5)
  — Looking ahead + hand(s) on sides of the wheel (for example 9-3 or 9-5)
  — Looking ahead + hand(s) on bottom of the wheel (for example 7-5)
  — Looking ahead + driver wearing a hat and glasses Auto-dimming DMS/OMS ISM BOM

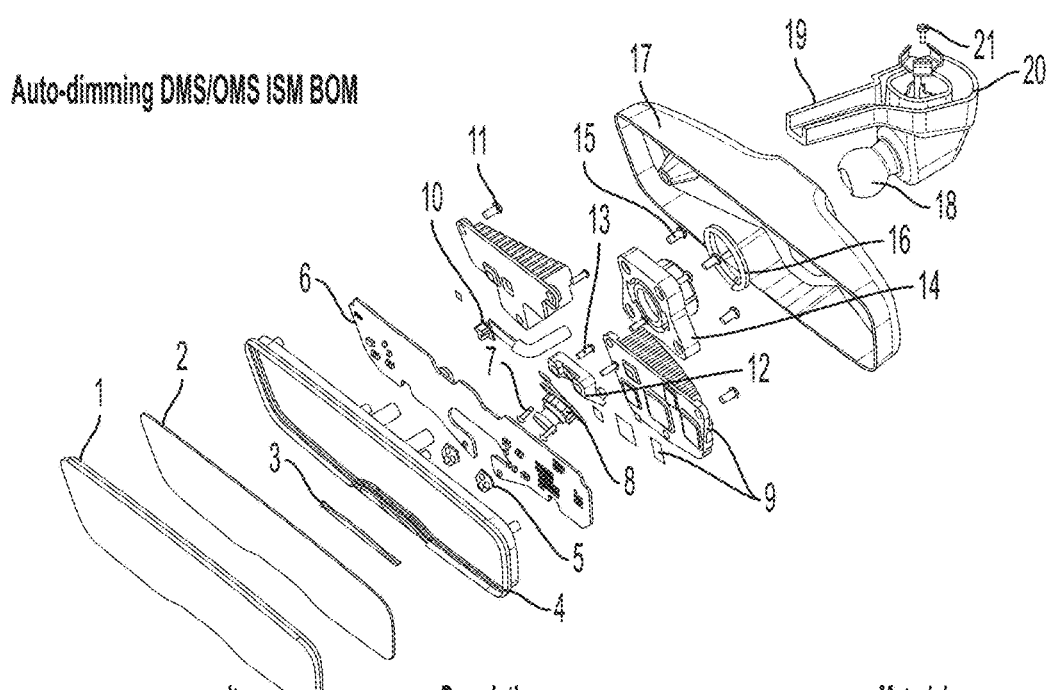

| Item | Description | Material |
|---|---|---|
| 1 | EC Cell | Glass |
| 2 | EC Adhesive (Foam Tape) | Polyethylene Foam |
| 3 | IR Longpass Filter | 2 Shot PC (Epolin - Luminate 7276A) PC + |
| 4 | Attachment Plate | ABS |
| 5 | IR Emitter Optics | PMMA |
| 6 | ECU | Various |
| 7 | Camera Mount Screws (x2) | Steel |
| 8 | Camera Module | PCB, Sensor, Lens, Mount, FPC |
| 9 | Heat Sinks (Passenger + Driver) & Thermal Interface Material (TIM) Pads | Aluminum & Nystein TIM Pads |
| 10 | Vehicle Harness | Various |
| 11 | Heat Sink Screws (x6) | Steel |
| 12 | Camera Module Adapter | PC + ABS |
| 13 | Camera Module Adapter Screws (x2) | Steel |
| 14 | Socket | POM |
| 15 | Socket Screws (x4) | Steel |
| 16 | Wrap Spring | Music Wire Steel |
| 17 | Housing | PC + ABS |
| 18 | Stay | PA-MDX6 |
| 19 | Stay Cover | PC + ABS |
| 20 | Spring Clip | Steel |
| 21 | Spring Clip Screw | Steel |

FIG. 13

Prismatic DMS/OMS ISM

Prismatic DMS/OMS ISM

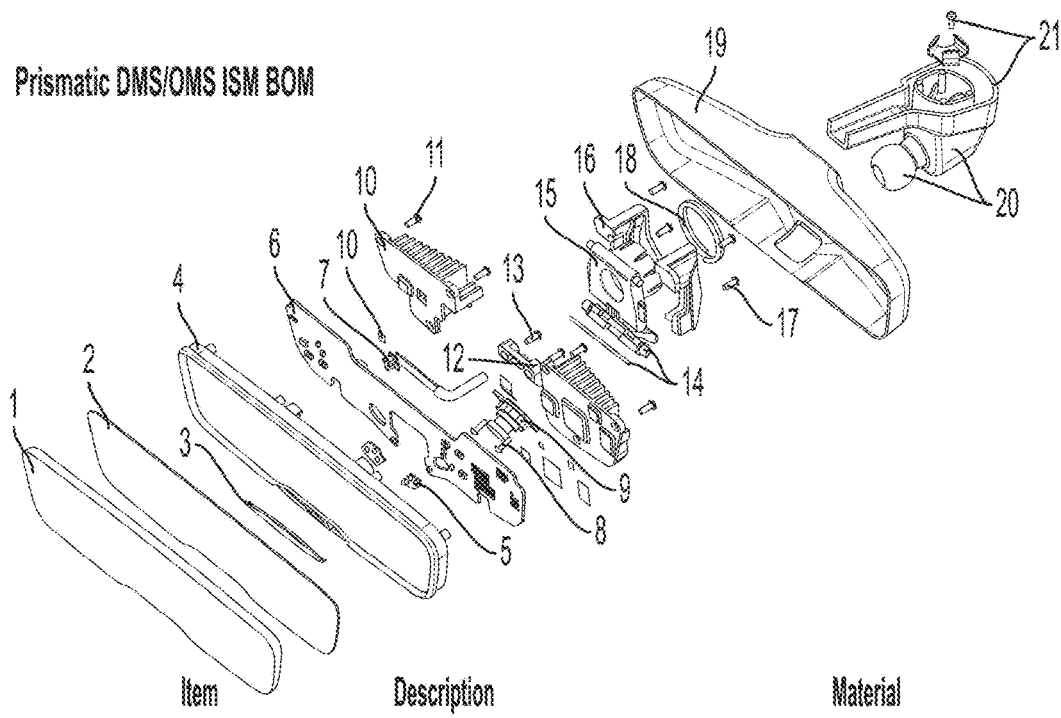

Prismatic DMS/OMS ISM BOM

| Item | Description | Material |
|---|---|---|
| 1 | Prismatic Glass | Glass |
| 2 | Glass Adhesive (Foam Tape) | Polyethylene Foam |
| 3 | IR Longpass Filter | 2 Shot PC (Epolin - Luminate 7276A) PC |
| 4 | Attachment Plate | + ABS |
| 5 | IR Emitter Optics | PMMA |
| 6 | ECU | Various |
| 7 | Vehicle Harness | Various |
| 8 | Camera Mount Screws (x2) | Steel |
| 9 | Camera Module | PCB, Sensor, Lens, Mount, FPC |
| 10 | Heat Sinks (Passenger + Driver) & Thermal Interface Material (TIM) Pads | Aluminum & Nystein TIM Pads |
| 11 | Heat Sink Screws (x6) | Steel |
| 12 | Camera Module Adapter | PC + ABS |
| 13 | Camera Module Adapter Screws (x2) | Steel |
| 14 | Tab & Spring Pin | POM & Spring Steel |
| 15 | Toggle Socket | POM |
| 16 | Toggle Socket Structure | PC + ABS |
| 17 | Toggle Socket Structure Screws (x4) | Steel |
| 18 | Wrap Spring | Music Wire Steel |
| 19 | Housing | PC + ABS |
| 20 | Stay and Stay Cover | PA-MDX6 & PC + ABS |
| 21 | Spring Clip & Screw | Steel |

FIG. 22

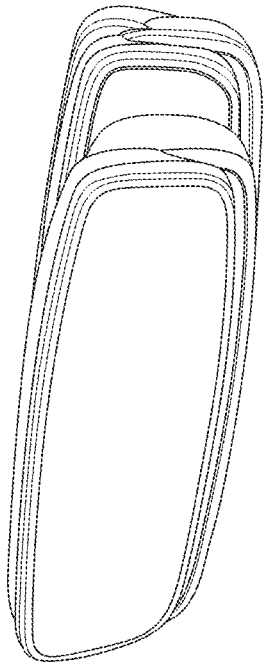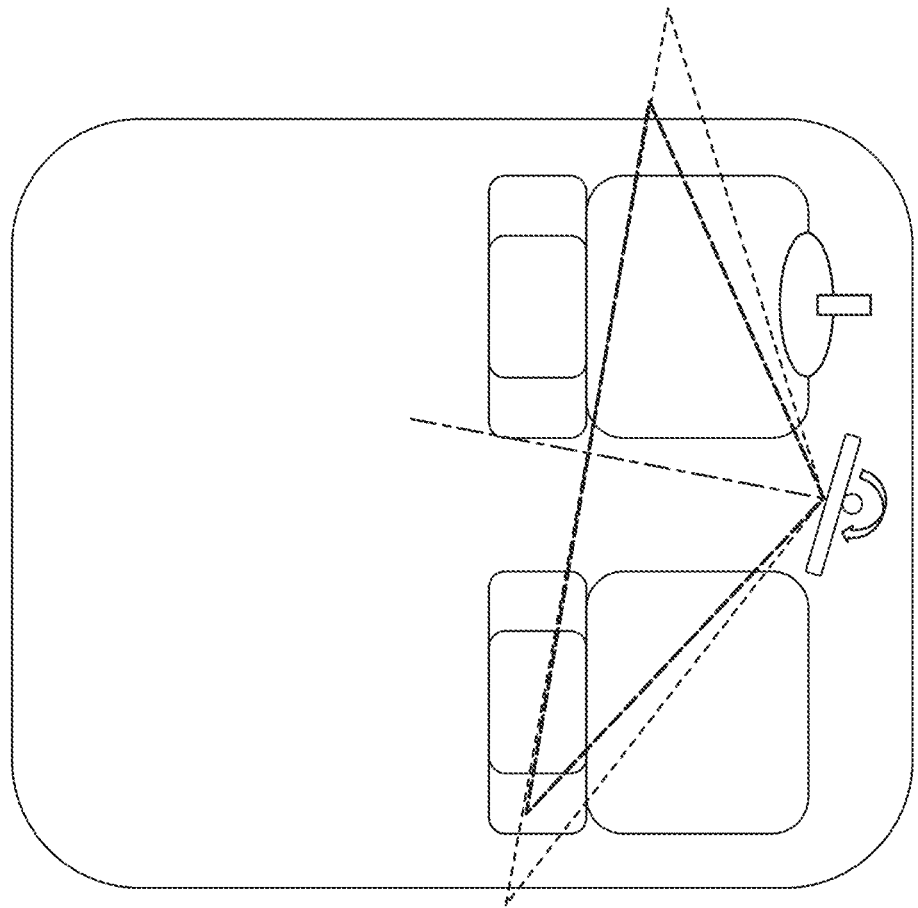
Angular HFOV Target
- Mirror aimed at driver
- Camera perpendicular to mirror glass
- Additional camera field of view needed to compensate for mirror adjustment
Mirror Adjustment = 19.3°
Resulting Camera HFOV = 148.6°
*Resulting HFOV can be minimized by rotating the camera back towards the passenger*
Study conducted on Ford Explorer and may vary vehicle to vehicle
FIG. 31

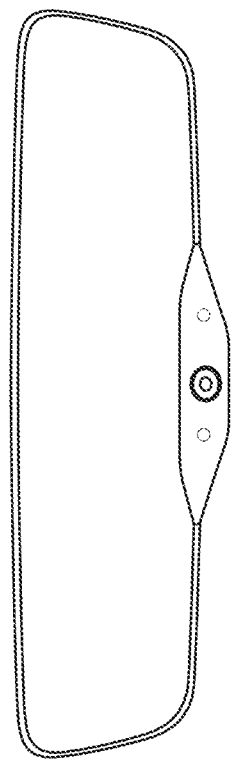
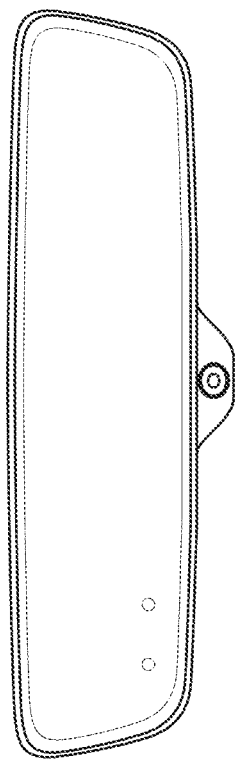
FIG. 32A — Camera & iR below glass
FIG. 32B — Camera below glass; IR behind glass

- Camera behind glass; IR below glass

- Camera behind glass; IR behind glass window

- Camera & IR behind glass

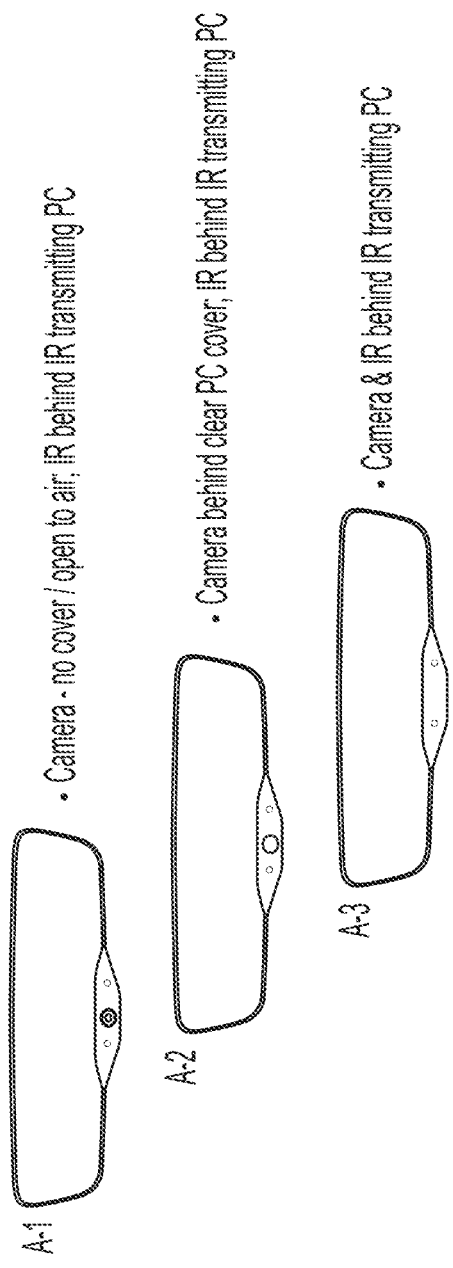
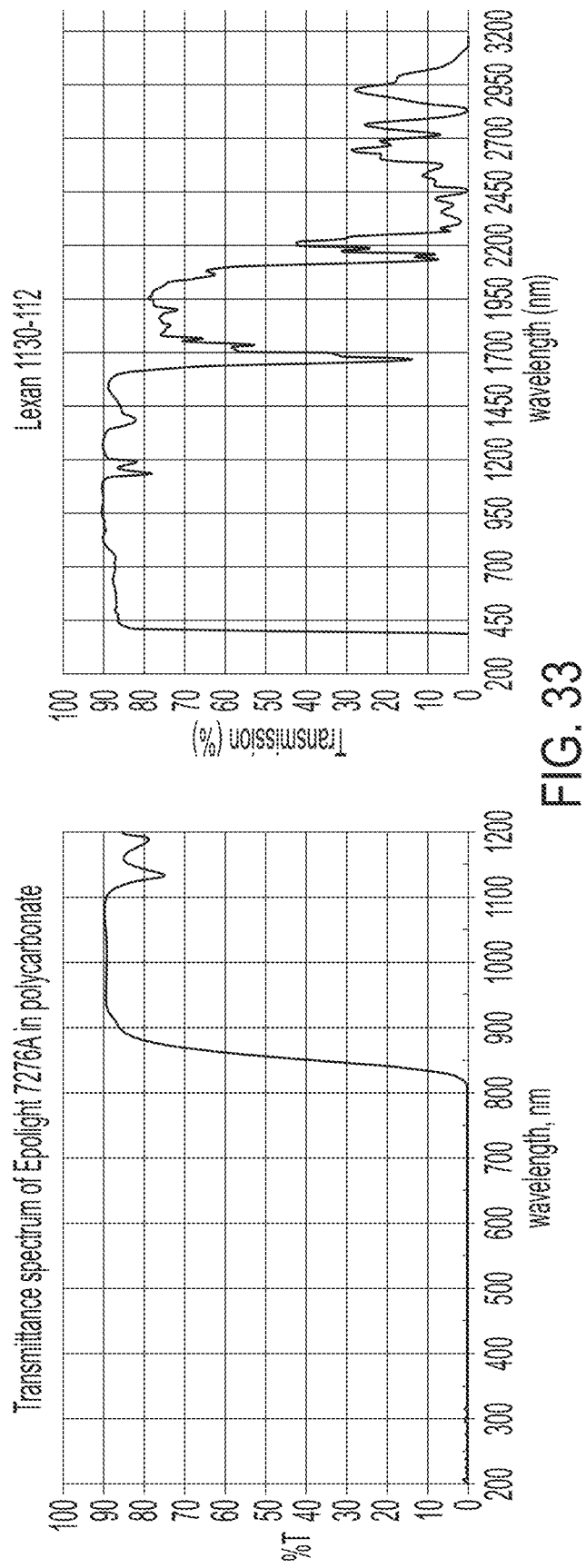
FIG. 33

| | Refractive Index (At Sodium D Line) | Material | Layer Physical Thickness (nm) |
|---|---|---|---|
| | | ITO | 120 |
| Low | 1.455 | SiO2 | 54.65 |
| High | 2.385 | TiO2 | 20.61 |
| Low | 1.455 | SiO2 | 16.95 |
| High | 2.385 | TiO2 | 70.2 |
| Low | 1.455 | SiO2 | 100.02 |
| High | 2.385 | TiO2 | 57.79 |
| Low | 1.455 | SiO2 | 77.69 |
| High | 2.385 | TiO2 | 25.76 |
| Low | 1.455 | SiO2 | 343.04 |
| High | 2.385 | TiO2 | 27.66 |
| Low | 1.455 | SiO2 | 27.9 |
| High | 2.385 | TiO2 | 32.21 |
| Low | 1.455 | SiO2 | 47.23 |
| High | 2.385 | TiO2 | 21.82 |
| | | Rear Glass Substrate (Low Fe Schott B270) | |

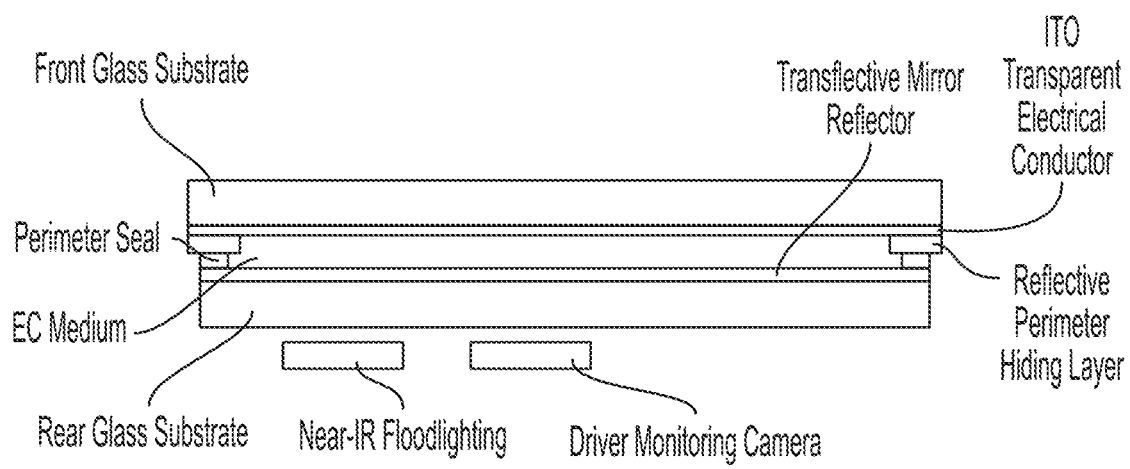
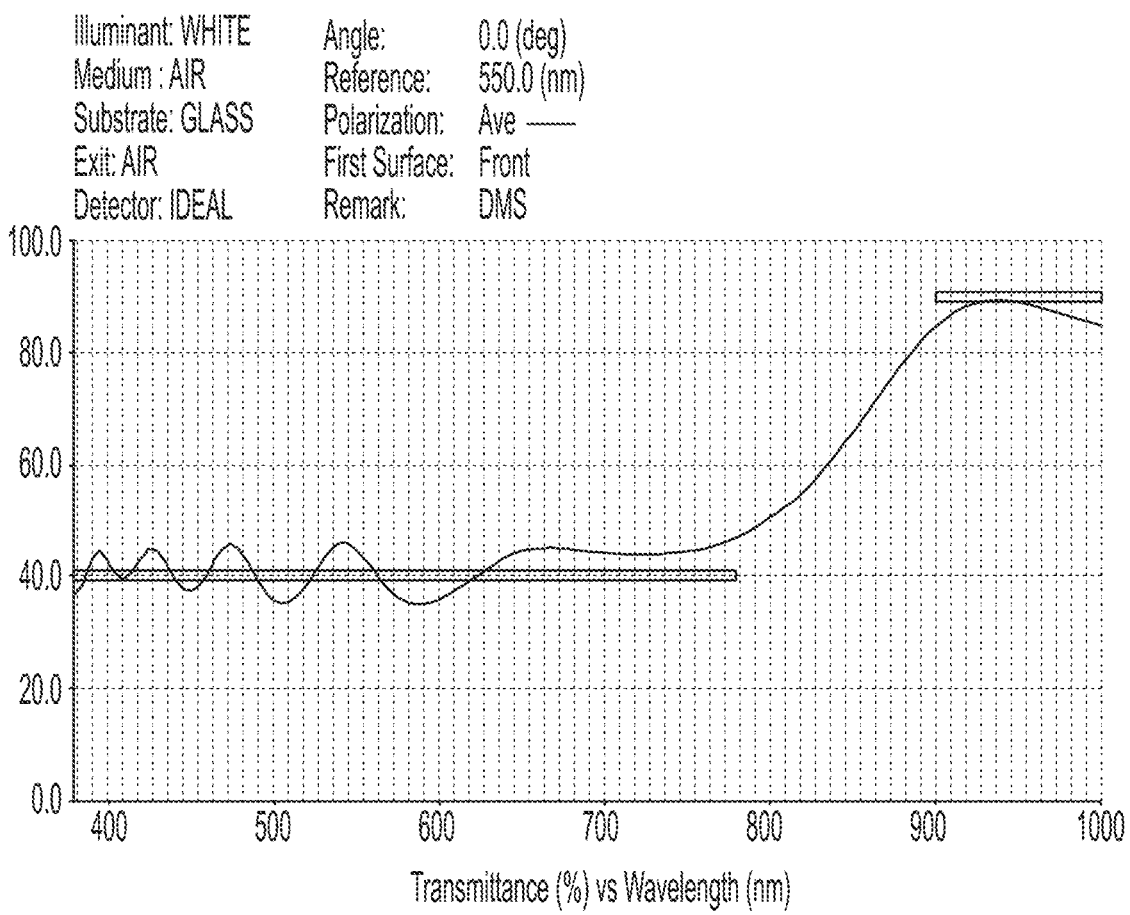
FIG. 48

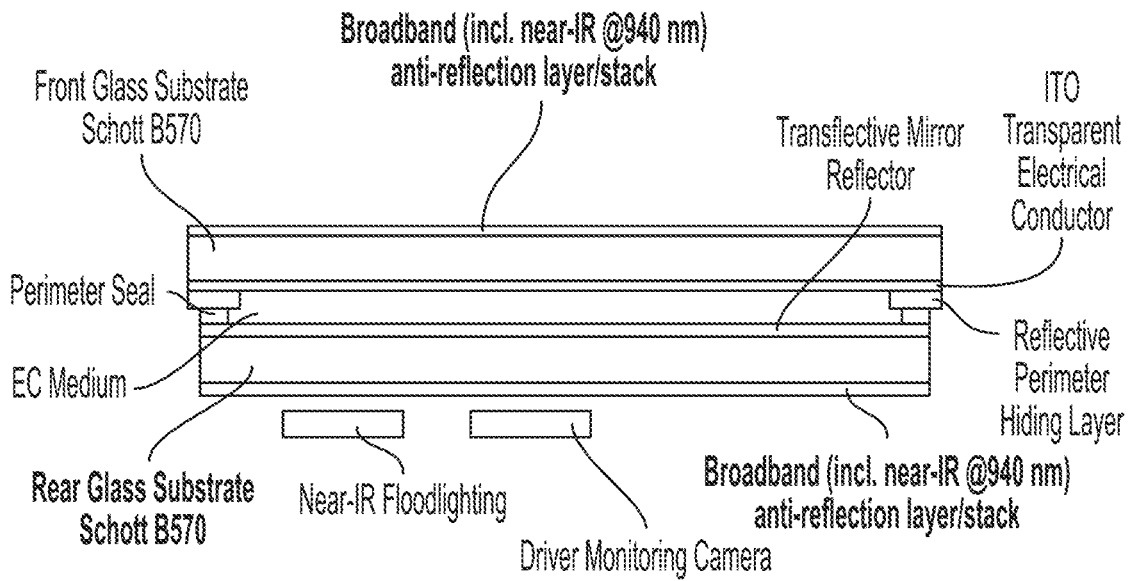
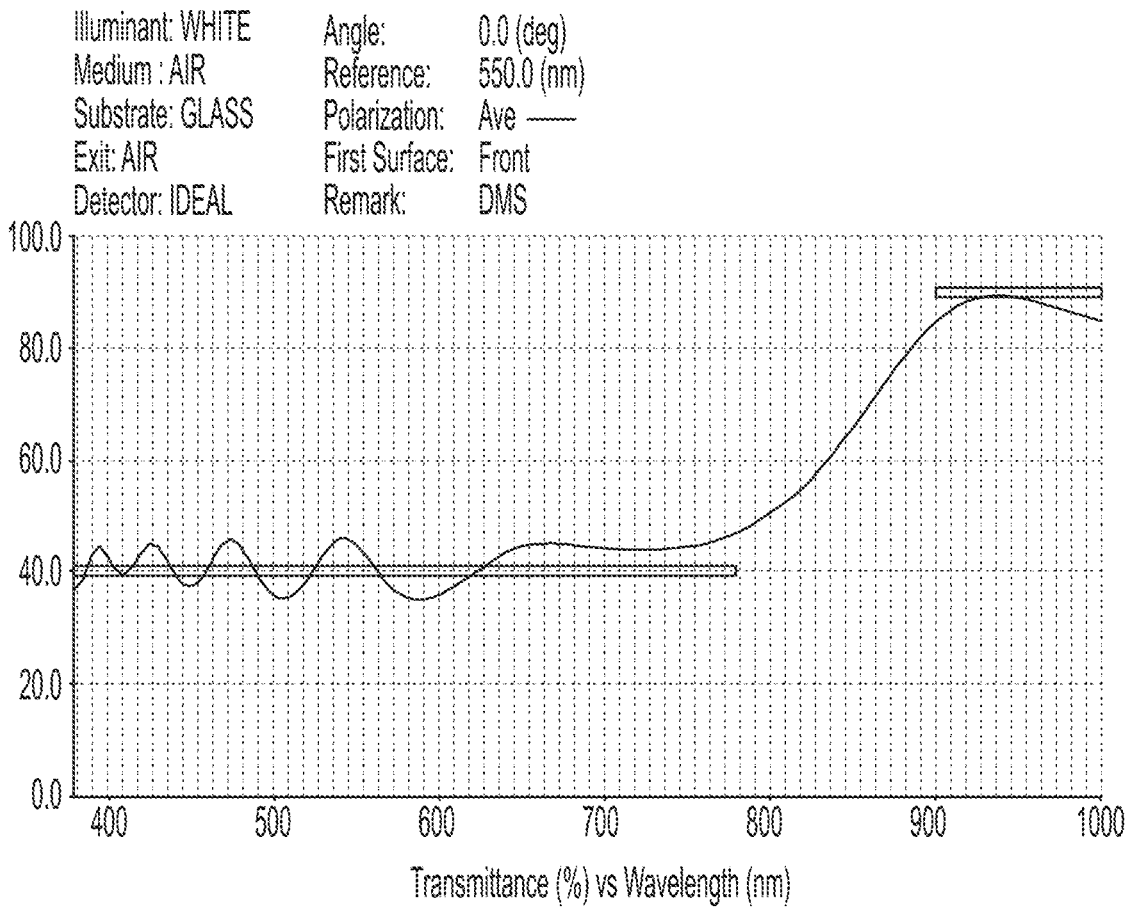
FIG. 50

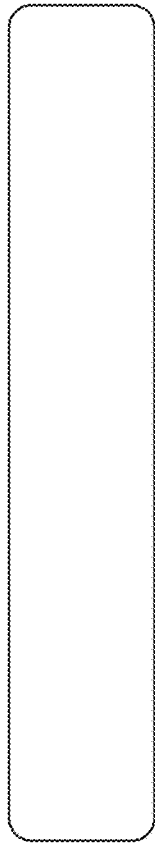
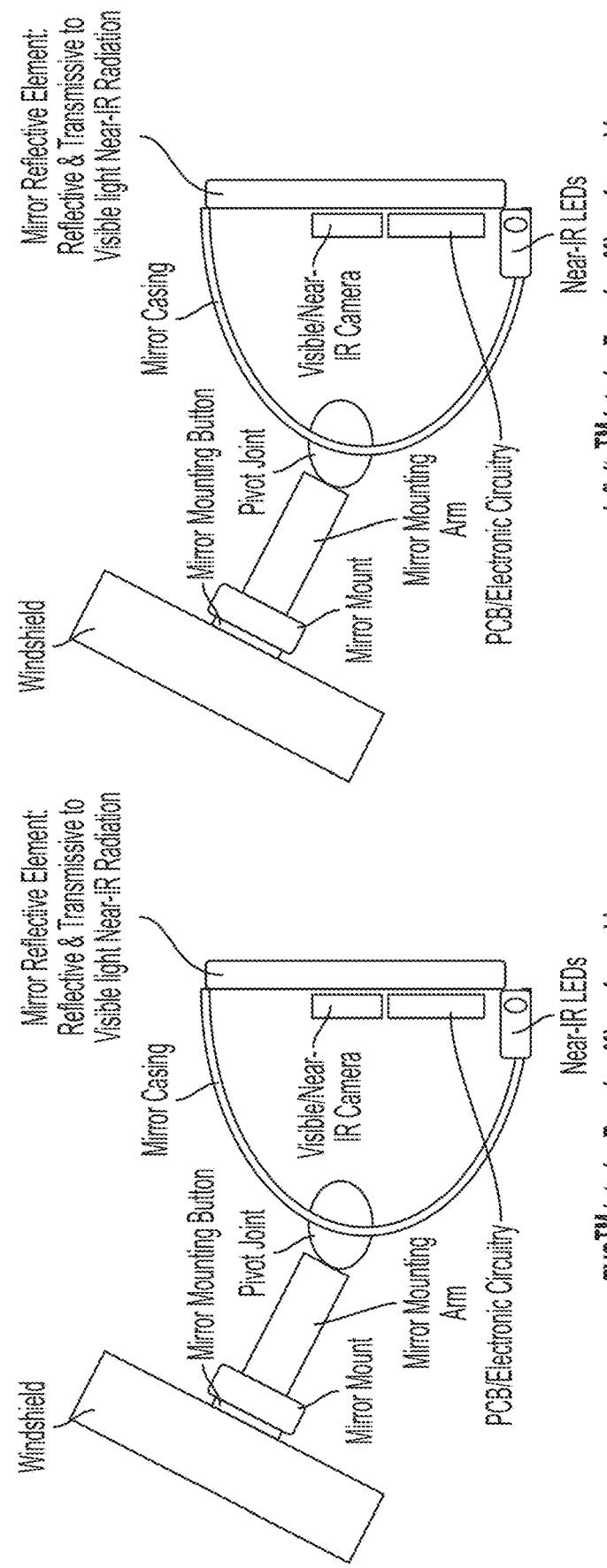
FIG. 53
FIG. 54
FIG. 55

FIG. 57

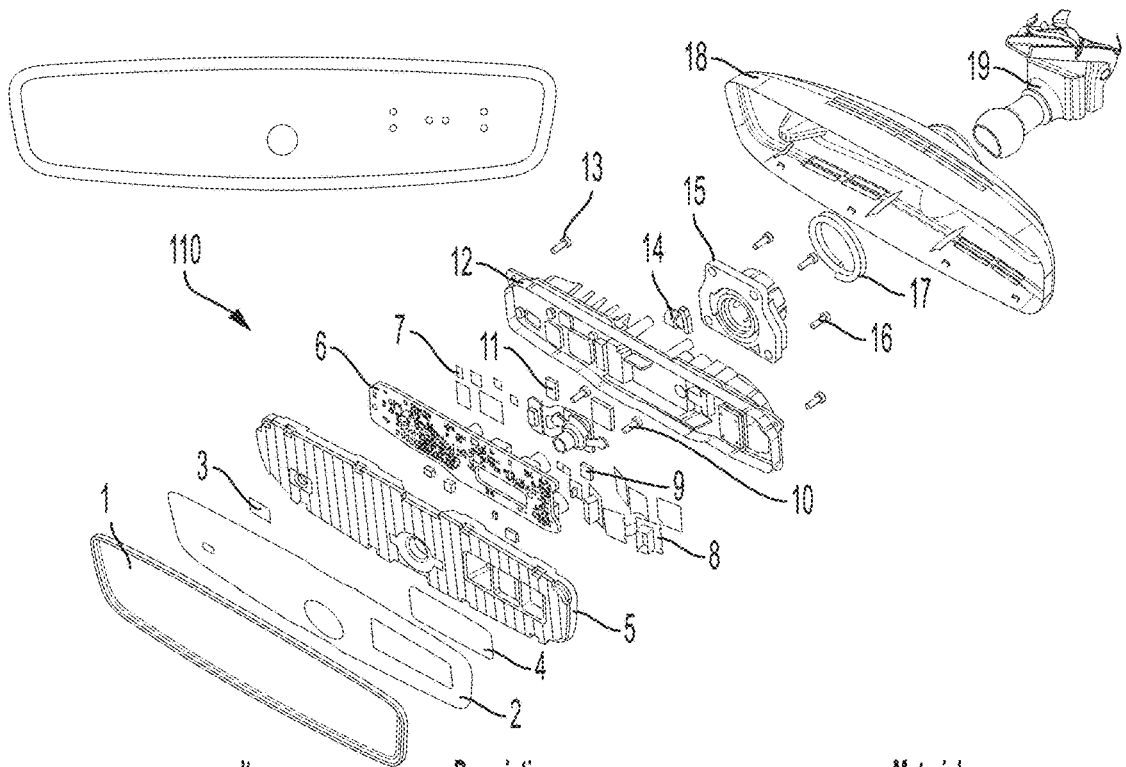

| Item | Description | Material |
|---|---|---|
| 1 | EC Cell & Push In Tabs | Glass & Copper/Beryllium |
| 2 | Adhesive (Foam Tape) | Polyethylene Foam with Adhesive |
| 3 | IR Blocking Filter | PC + Dye / Film |
| 4 | IR Longpass Filter | PC + IR Dye |
| 5 | Attachment Plate | PC + ABS + SS Fiber |
| 6 | ECU | Various |
| 7 | Thermal Interface Material (TIM) [Top & Bottom ECU, IR LED and Camera PCBs] | Thermal Paste |
| 8 | IR Illumination Rigid Flex PCB (w/ reflectors) | Various |
| 9 | IR Illumination PCB Connection Retention Foam | Silicone Foam with Acrylic Adhesive |
| 10 | Camera Module & Camera Screws (x2) | PCB, Sensor, Lens, Rigid Flex, Connector & Steel |
| 11 | Camera Connection Retention Foam | Silicone Foam with Acrylic Adhesive |
| 12 | Heat Sink / Chassis | Anodized Aluminum |
| 13 | Heat Sink Screws (x4) | Steel |
| 14 | Mirror Wire Harness | Various |
| 15 | Socket | POM |
| 16 | Socket Screws (x4) | Steel |
| 17 | Wrap Spring | Music Wire Steel |
| 18 | Housing | PC + ASA |
| 19 | Stay + Spring Clip & Spring Clip Screw | Aluminum + Steel |

FIG. 62

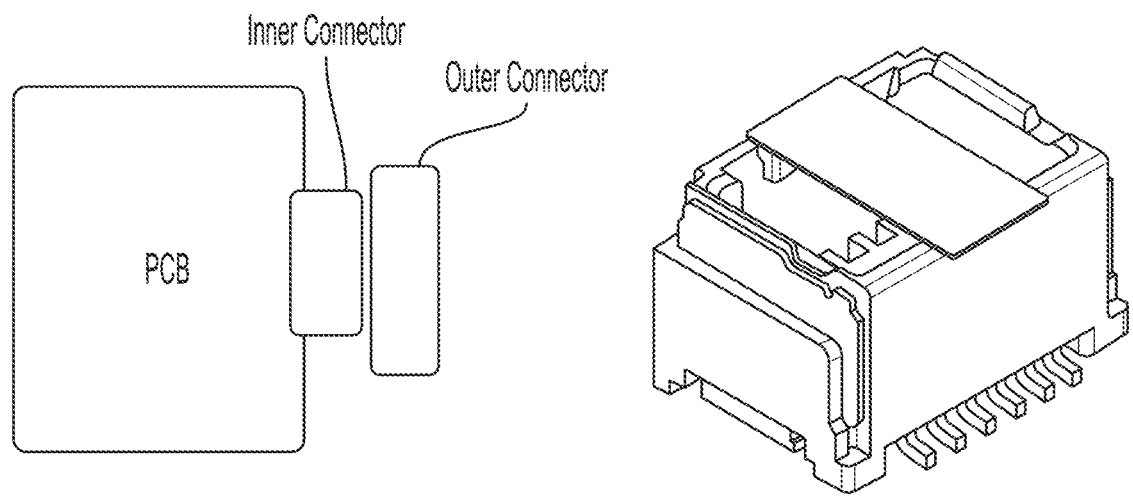
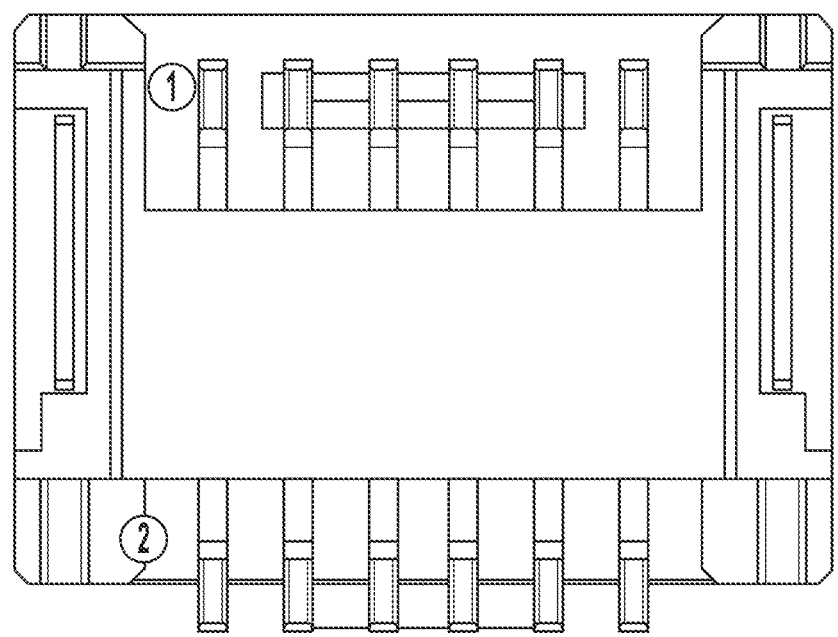
FIG. 62A

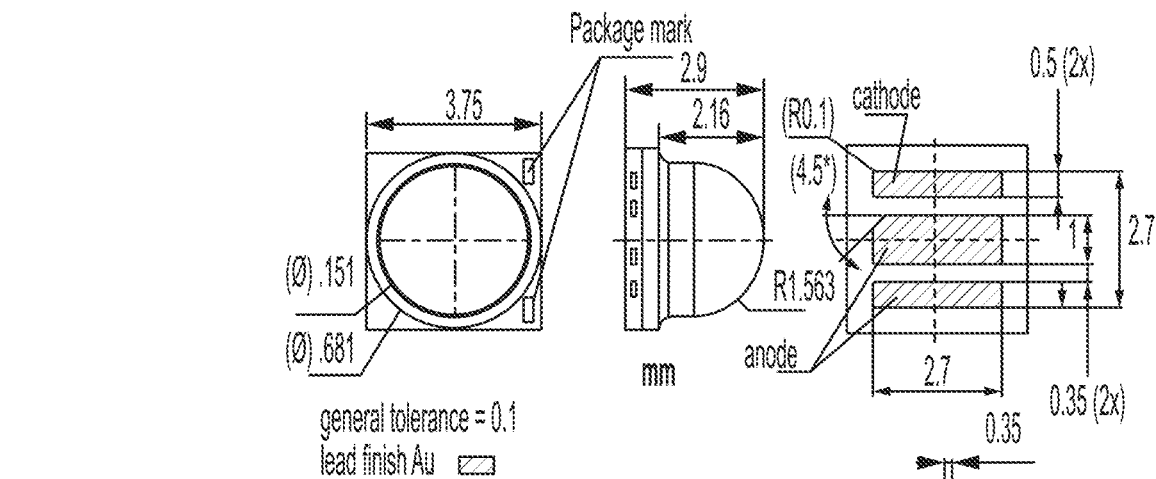

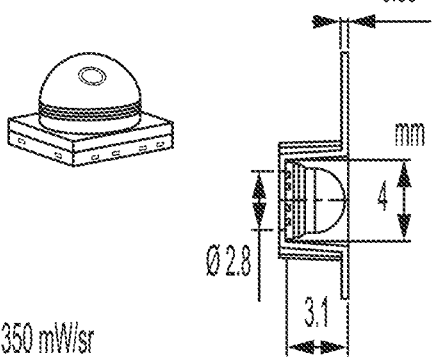

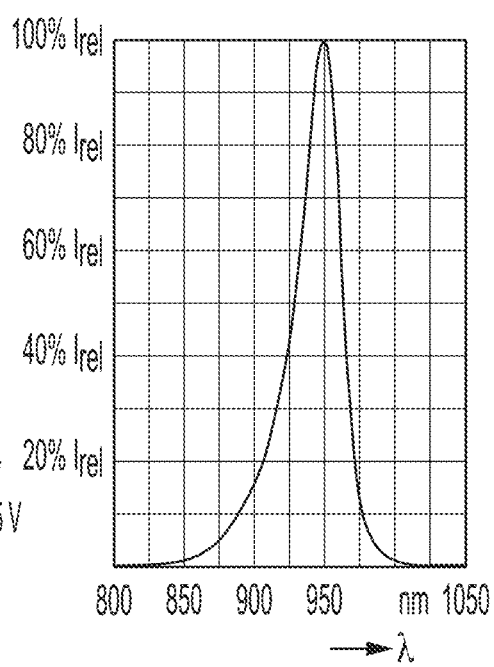

SFH 4728AS A01
OSLON® Black OSLON Black Series (940 nm) - 50°

Double stack emitter
— Low thermal resistance (Max. 9 K/W)
— Centroid wavelength 940 nm
— Optimized for high current pulse operation Radiant intensity $I_e$ typical $I_F = 1$ A; $t_p = 10$ ms $I_F = 1$ A; $t_p = 10$ ms 1,350 mW/sr
Radiant intensity $I_e$ range $I_F = 1$ A; $t_p = 10$ ms $I_F = 1$ A; $t_p = 10$ ms 1,120 to 1,800 mW/sr
Forward Current $I_F$ min: 10 mA; max: 5 A
Surge Current $t_p \leq 500$ μs; D = 0.005 $I_{FSM}$ max. 5 A
Reverse current $I_R$ max. 200 mA
Power consumption $P_{tot}$ max. 5.2 W
Characteristics: $I_F = 1000$ mA; $t_p = 10$ ms; $T_A = 25$°C
  Peak wavelength $\lambda_{peak}$ typ. 950 nm
  Centroid wavelength $\lambda_{centroid}$ typ. 940 nm
  Spectral bandwidth at 50% $I_{rel,max}$ (FWHM) $\Delta\lambda$ typ. 37.0 nm
  Half angle $\phi$ typ. 25°
Dimensions of active chip area L x W typ. 1 x 1 mm x mm
Rise time (10%/90%) $I_F = 5$ A; $R_L = 50$ Ω $t_r$ typ. 10 ns
Fall time (10%/90%) $I_F = 5$ A; $R_L = 50$ Ω $t_f$ typ. 15 ns
Forward voltage $I_F = 1$ A; $t_p = 100$ μs $V_F$ min. 2.2 V; typ. 2.65 V; max. 3.10 V
Forward voltage $I_F = 1.5$ A; $t_p = 100$ μs $V_F$ min. 2.6 V; typ. 2.75 V; max. 3.35 V
Forward voltage $I_F = 5$ A; $t_p = 100$ μs $V_F$ min. 2.8 V; typ. 3.2 V; max. 3.4 V
Reverse voltage $I_R = 20$ mA $V_R$ max. 1.2 V
Radiant intensity $I_F = 1.5$ A; $t_p = 100$ μs $I_e$ typ. 1,980 mW/sr
Radiant intensity $I_F = 5$ A; $t_p = 100$ μs $I_e$ typ. 5,900 mW/sr
Total radiant flux $I_F = 1$ A; $t_p = 100$ μs $\phi_e$ typ. 1,300 mW
Total radiant flux $I_F = 1.5$ A; $t_p = 100$ μs $\phi_e$ typ. 1,910 mW
Total radiant flux $I_F = 5$ A; $t_p = 100$ μs $\phi_e$ typ. 5,600 mW

FIG. 64

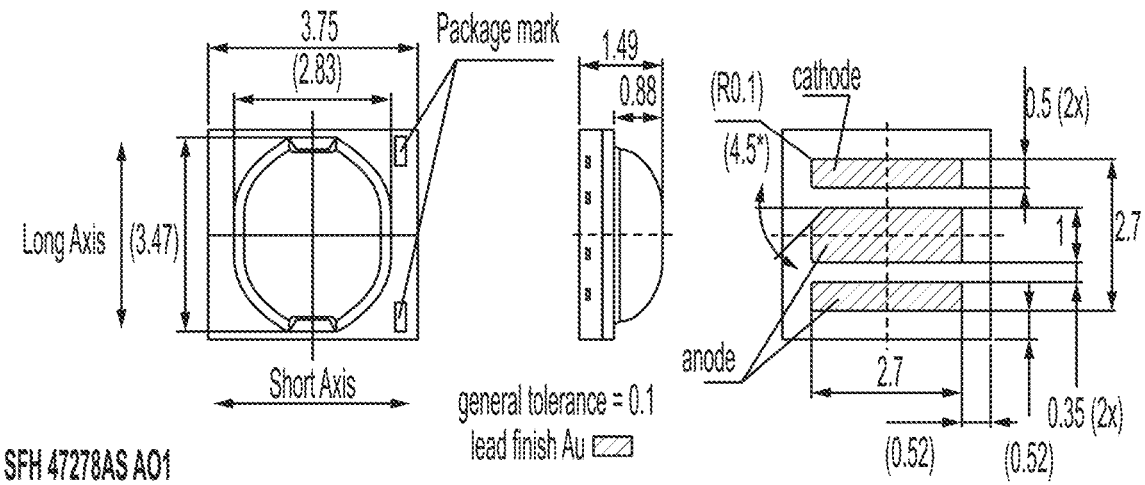

SFH 4727BAS A01
OSLON Black Series (940 nm) - 130° x 155
Double stack emitter

- Low thermal resistance
- Centroid wavelength 940 nm
- Optimized for high current pulse operation Radiant intensity $I_e$ typical $I_F$ = 1 A; $t_p$ = 10 ms 290 mW/sr Radiant intensity $I_e$ range $I_F$ = 1 A; $t_p$ = 10 ms $I_F$ = 1 A; $t_p$ = 10 ms 250 to 355 mW/sr Reverse current $I_R$ max. 200 mA Power consumption $P_{tot}$ max. 5.2 W Characteristics: $I_F$ = 1,000 mA; $t_p$ = 10 ms; $T_A$=25°C Peak wavelength $\lambda_{peak}$ typ. 950 nm
   Centroid wavelength $\lambda_{centroid}$ typ. 940 nm
   Spectral bandwidth at 50% $I_{rel,max}$ (FWHM) $\Delta\lambda$ typ. 37.0 nm
   Half angle $\varphi$ short axis typ. 65°; Half angle $\varphi$ long axis typ. 77.5°

Dimensions of active chip area L x W typ. 1 x 1 mm x mm

Rise time (10%/90%) $I_F$ = 5 A; $R_L$ = 50 Ω $t_r$ typ. 10 ns

Fall time (10%/90%) $I_F$ = 5 A; $R_L$ = 50 Ω $t_f$ typ. 15 ns

Forward voltage $I_F$ = 1 A; $t_p$ = 100 μs $V_F$ min. 2.5 V; typ. 2.65 V; max. 3.10 V Forward voltage $I_F$ = 1.5 A; $t_p$ = 100 μs $V_F$ min. 2.6 V; typ. 2.75 V; max. 3.35 V Forward voltage $I_F$ = 5 A; $t_p$ = 100 μs $V_F$ min. 2.9 V; typ. 3.2 V; max. 4.2 V Reverse voltage $I_R$ = 20 mA $V_R$ max. 1.2 V Forward Current Pulsed $t_p \leq 450$ μs; D $\leq$ 0.005 max 5 A Radiant intensity $I_F$ = 1.5 A; $t_p$ = 100 μs $I_e$ typ. 450 mW/sr Total radiant flux $I_F$ = 1 A; $t_p$ = 100 μs $\phi_e$ typ. 1,340 mW Total radiant flux $I_F$ = 1.5 A; $t_p$ = 100 μs $\phi_e$ typ. 1,970 mW

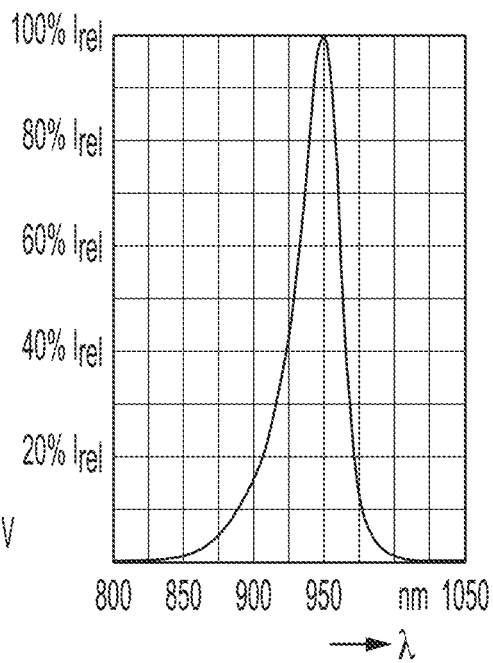

FIG. 65

| | Layer Thickness (nm) | Refractive Index at sodium D line (with a wavelength of 589 nm) and at 25 degrees celsius |
|---|---|---|
| Indium Tin Oxide (ITO) | 120 | 1.81 |
| Silicon Dioxide (SiO2) | 82.5 | 1.46 |
| Niobium Oxide (NbO) | 25.84 | 2.27 |
| Silicon Dioxide (SiO2) | 178.04 | 1.46 |
| Niobium Oxide (NbO) | 53.41 | 2.27 |
| Silicon Dioxide (SiO2) | 110.54 | 1.46 |
| Niobium Oxide (NbO) | 88.61 | 2.27 |
| Silicon Dioxide (SiO2) | 80.22 | 1.46 |
| Niobium Oxide (NbO) | 59.89 | 2.27 |
| Silicon Dioxide (SiO2) | 90.37 | 1.46 |
| Niobium Oxide (NbO) | 36.38 | 2.27 |
| Silicon Dioxide (SiO2) | 57.79 | 1.46 |
| Niobium Oxide (NbO) | 76.76 | 2.27 |
| Silicon Dioxide (SiO2) | 84.9 | 1.46 |
| Niobium Oxide (NbO) | 28.29 | 2.27 |
| Soda-Lime Glass | 2 millimeters thickness | Refractive Index 1.52 |

15-layer transflector stack comprises:
- 14 layers comprising 7 alternating High RI (NbO) /Low RI (SiO2) doublets
- 1 outermost transparent electrically conductive layer (ITO sheet resistance: 20-30 ohms/square)

Total thickness of Multi-Layer Transflector Stack = 1,174 nm

Visible %R: 76% Visible %T: 20% 940 nm %T: 85%

FIG. 66

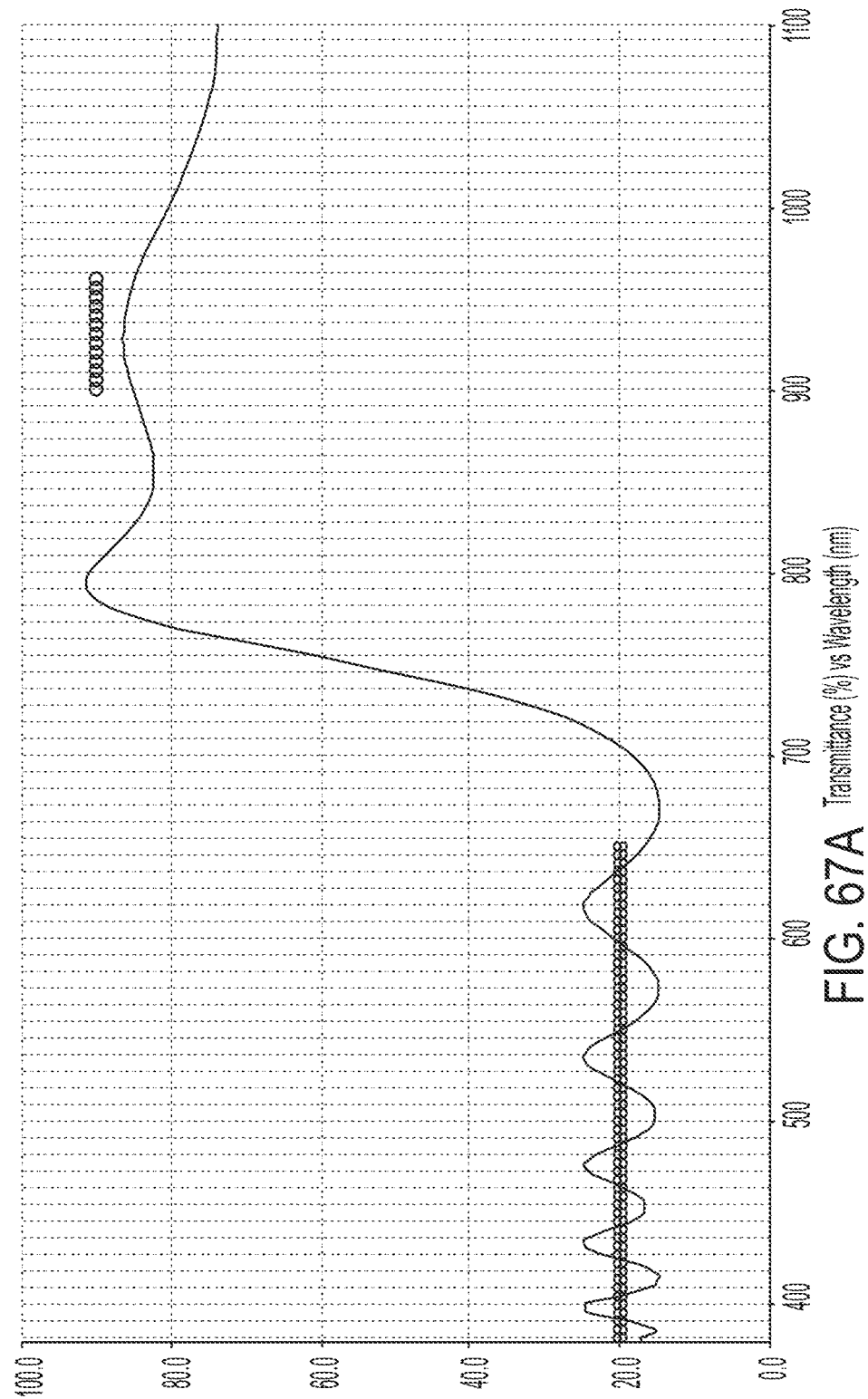

| Visible light | | | | Ultraviolet | Solar Energy | | | | | | Thermal Properties |
|---|---|---|---|---|---|---|---|---|---|---|---|
| Transmittance | Reflectance | | General Color Rendering Index (Ra) | Trans UV (tuv %) | Transmittance | Reflectance | | Absorptance | Solar Factor (g%) | Shading Coefficient (sc) | Secondary Heat Transfer (qi) | U-Value |
| Visible (tv%) | pv % out | pv % in | | | Solar (te %) | pe % out | pe % in | Solar (ae%) | | | | Ug W/m2-K |
| Monolithic 4 Guardian ExtraClear® on Guardian ExtraClear #2 | | | | | | | | | | | | |
| 91 | 8 | 8 | 99 | 74 | 87 | 8 | 8 | 6 | 88 | 1.01 | 1 | 5.8 |

The performance values shown are normal and subject to variations due to manufacturing tolerances. Spectra-photometric values according to EN 410:2011, EN 673:2011 / Metric

FIG. 69

Pilkington Optiwhite™ Single Glass Performance Data

| Nominal Glass Thickness | | Visible Light² | | | Solar Energy² | | | U-Factor⁵ | | | Solar Heat Gain Coefficient⁷ | Shading Coefficient⁸ |
|---|---|---|---|---|---|---|---|---|---|---|---|---|
| in | mm | Transmittance³ % | Reflectance⁴ % Outside | Reflectance⁴ % Inside | Transmittance³ % | Reflectance⁴ % | UV Transmittance² % | U.S. Summer | U.S. Winter | European⁶ | | |
| 1/8 | 3 | 91 | 9 | 9 | 91 | 8 | 88 | 0.94 | 1.04 | 5.8 | 0.91 | 1.04 |
| 5/32 | 4 | 91 | 9 | 9 | 90 | 8 | 87 | 0.94 | 1.04 | 5.8 | 0.91 | 1.04 |
| 3/16 | 5 | 91 | 9 | 9 | 90 | 8 | 86 | 0.93 | 1.03 | 5.7 | 0.91 | 1.04 |
| 1/4 | 6 | 91 | 9 | 9 | 90 | 8 | 85 | 0.93 | 1.02 | 5.7 | 0.90 | 1.04 |
| 5/16 | 8 | 91 | 9 | 9 | 89 | 8 | 84 | 0.92 | 1.01 | 5.6 | 0.90 | 1.03 |
| 3/8 | 10 | 91 | 9 | 9 | 88 | 8 | 83 | 0.91 | 1.00 | 5.6 | 0.89 | 1.03 |
| 1/2 | 12 | 90 | 9 | 9 | 88 | 8 | 81 | 0.89 | 0.99 | 5.5 | 0.89 | 1.02 |
| 5/8 | 15 | 90 | 9 | 9 | 86 | 8 | 77 | 0.88 | 0.97 | 5.4 | 0.88 | 1.01 |
| 3/4 | 19 | 90 | 8 | 8 | 86 | 8 | 78 | 0.86 | 0.95 | 5.3 | 0.88 | 1.01 |

\* U.S. U-Factor (Btu/hr.sq.ft.°F) is based on NFRC/ASTM standards
\*\* European U-Factor (W/sq m K) is based on EN 410/673 (CEN) standard All performance values are center-of-glass values calculated by the LBNL Window 6.3 program
See Pilkington Architectural Product Guide for explanation of superscript references-1, 10

FIG. 71

Interior Rearview Mirror Integrated DMS/OMS Assembly

- DMS (Driver Monitoring System) + OMS (Occupant Monitoring System) in 1-box

Glass Size: 243.5mm x 63mm (141 cm2)

Mirror Foot/Stay: Aluminum painted black

| INPUTS - OUTPUTS | | LH | WIDE | RH | | |
|---|---|---|---|---|---|---|
| | Select Source TYPEs (from drop down) | 50° IR-LED 4728AS w/ Metal SMR | 130-180° P/el IR-LED 47278AS | 50° IR-LED 4728AS w/ Metal SMR | 130-180° P/el IR-LED 47278AS | |
| Source Orientation Relative to ISM | Rotation Around Vertical Axis (- aims towards LH driver) | -20.0 | 0.0 | 10.0 | 10.0 | Deg |
| | Rotation Around Horizontal Axis (+ aims Down) | 0.0 | 0.0 | 0.0 | 0.0 | Deg |
| | Around Axis Normal to PCB | 0.0 | 0.0 | 0.0 | 0.0 | Deg |
| Source Position Relative to ISM Pivot | Fore/Aft Offsets, X-Direction | 32.4 | 38.1 | 32.6 | 38.1 | mm |
| | Cross Car Offsets, Y-Direction | 50.0 | 69.3 | 88.6 | 69.3 | mm |
| | Vertical Offsets, Z-Direction | 5.4 | 5.4 | 5.4 | 5.4 | mm |
| Source INPUTS | Source Optical Power | 1.71 | 1.7 | 1.71 | 1.7 | W |
| | Window Transmission | 42 | 42 | 42 | 42 | % |
| | Number of Sources | 2 | 0 | 0 | 0 | No |
| | Total Optical Power (@Sources) | 3.42 | | W | | Fresnel Loss Applied |

FIG. 86D-2

| INPUTS - OUTPUTS | | LH | WIDE | RH | | |
|---|---|---|---|---|---|---|
| | Select Source TYPEs (from drop down) | 50° IR-LED 4728AS w/ Metal SMR | 130-180° P/el IR-LED 47278AS | 50° IR-LED 4728AS w/ Metal SMR | 130-180° P/el IR-LED 47278AS | |
| Source Orientation Relative to ISM | Rotation Around Vertical Axis (-aims towards LH driver) | -20.0 | 0.0 | 10.0 | 10.0 | Deg |
| | Rotation Around Horizontal Axis (+aims Down) | 0.0 | 0.0 | 0.0 | 0.0 | Deg |
| | Around Axis Normal to PCB | 0.0 | 0.0 | 0.0 | 0.0 | Deg |
| Source Position Relative to ISM Pivot | Fore/Aft Offsets, X-Direction | 32.4 | 38.1 | 32.6 | 38.1 | mm |
| | Cross Car Offsets, Y-Direction | 50.0 | 69.3 | 88.6 | 69.3 | mm |
| | Vertical Offsets, Z-Direction | 5.4 | 5.4 | 5.4 | 5.4 | mm |
| Source INPUTS | Source Optical Power | 2 | 2 | 2 | 2 | W |
| | Window Transmission | 42 | 42 | 42 | 42 | % |
| | Number of Sources | 0 | 0 | 2 | 0 | No |
| Total Optical Power (@Sources) | | 4.00 | | W | | Fresnel Loss Applied |

FIG. 88C-2

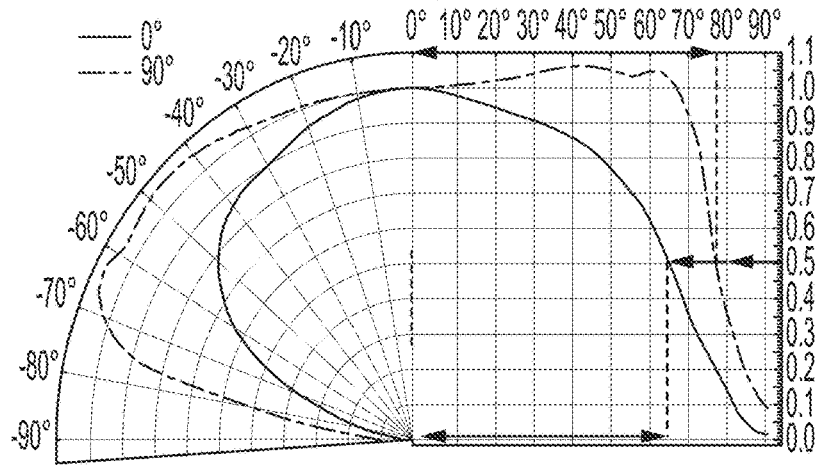
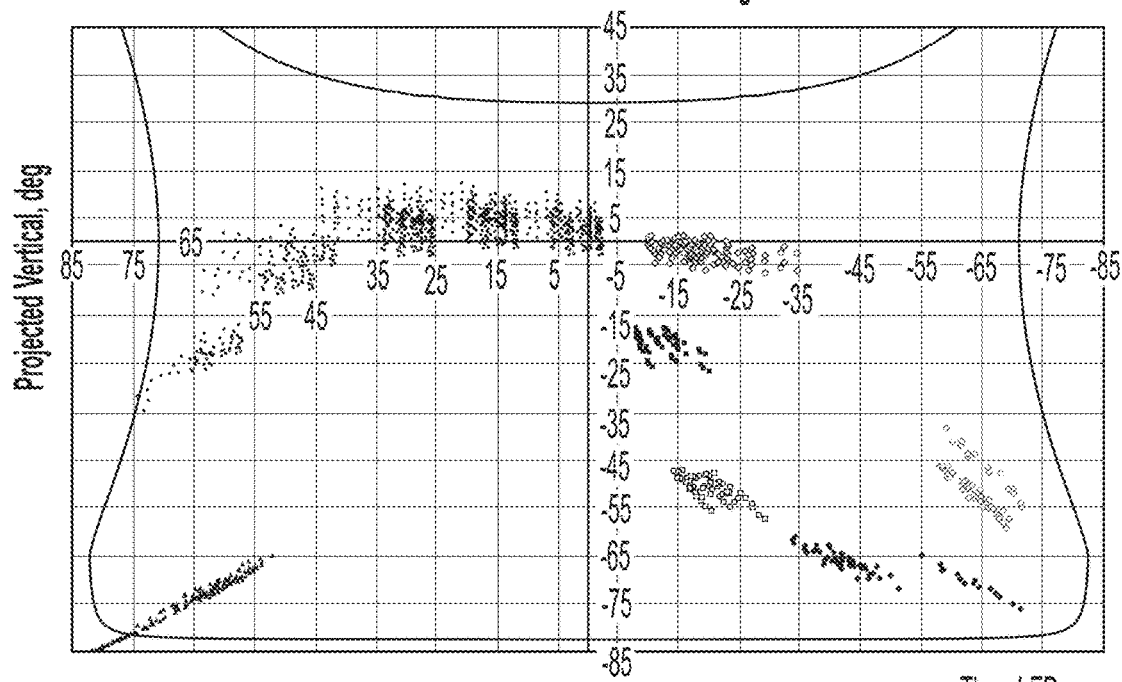
FIG. 89

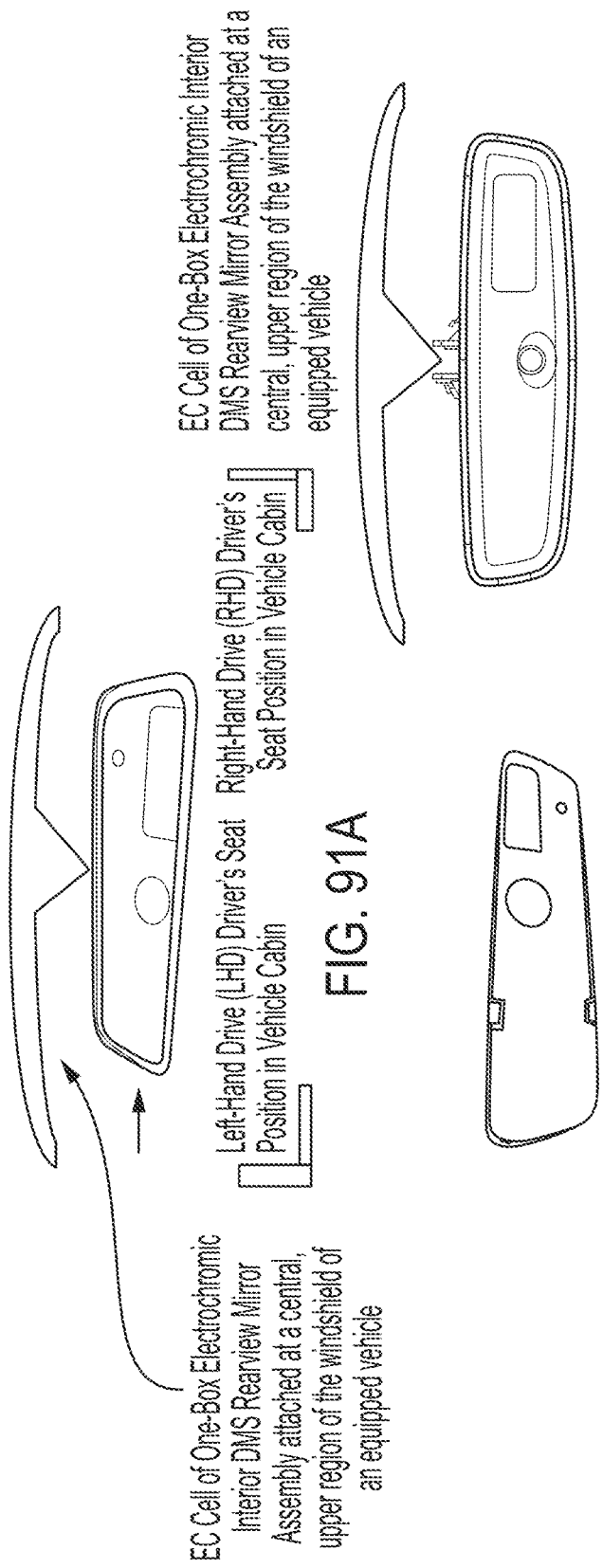

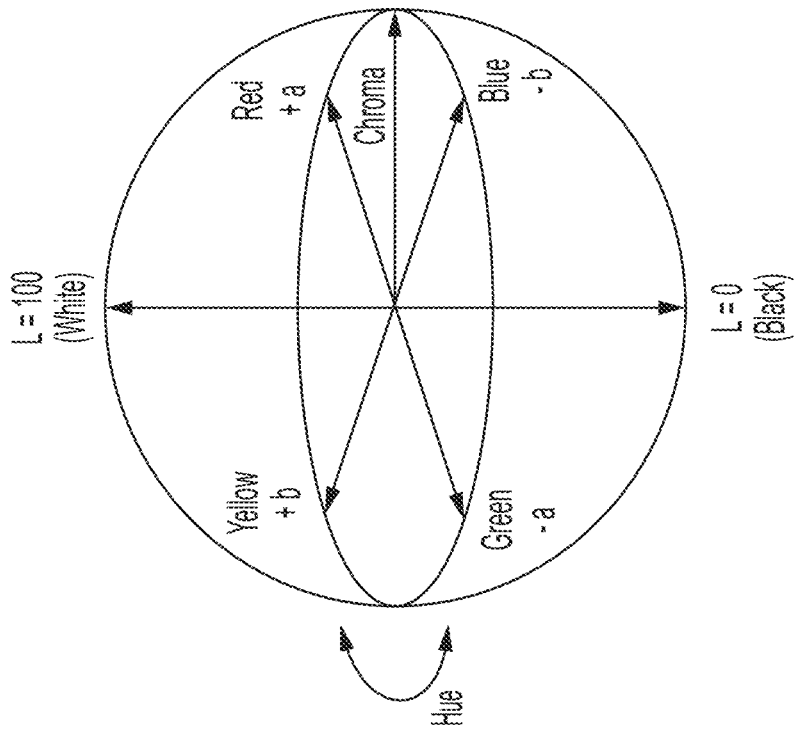

The CIELAB color space diagram

The CIELAB, or CIE L*a*b*, color system represents quantitative relationship of colors on three axes: L* value indicates lightness, and a* and b* are chromaticity coordinates.

On the color space diagram, L* is represented on a vertical axis with values from 0 (black) to 100 (white). The a* value indicates red-green component of a color, where a* (positive) and a* (negative) indicate red and green values, respectively.

The yellow and blue components are represented on the b* axis as b* (positive) and b* (negative) values, respectively. At the center of the plane is neutral or achromatic.

The distance from the central axis represents the chroma (c*), or saturation of the color.

The angle on the chromaticity axes represents the hue (h o ).

FIG. 95

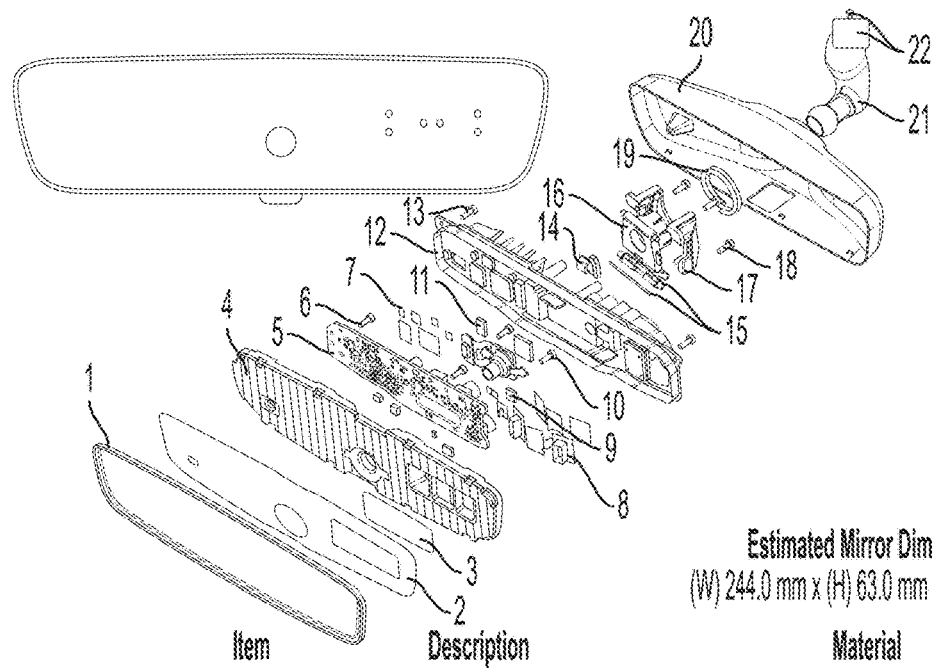

Estimated Mirror Dimensions
(W) 244.0 mm x (H) 63.0 mm x (T) 55.2 mm

| Item | Description | Material | Mass (g) |
|---|---|---|---|
| 1 | Prismatic Glass | Glass | 165.9 |
| 2 | Adhesive (Foam Tape) | Polyethylene Foam with Adhesive | 1.2 |
| 3 | IR Longpass Filter | PC + IR Dye | 2.3 |
| 4 | Attachment Plate | PC + ABS + SS Fiber | 36.6 |
| 5 | ECU | Various | 48.7 |
| 6 | ECU Screws (x2) | Steel | 1.2 |
| 7 | Thermal Interface Material (TIM) [Top & Bottom ECU, IR LED and Cam PCBs] | Thermal Paste | 6.6 |
| 8 | IR Illumination Rigid Flex PCB (w/reflectors) | Various | 7.5 |
| 9 | IR Illumination PCB Connection Retention Foam | Silicone Foam with Acrylic Adhesive | 0.1 |
| 10 | Camera Module & Camera Screws (x2) | PCB, Sensor, Lens, Rigid Flex, Connector & Steel | 14.0 |
| 11 | Camera Connection Retention Foam | Silicone Foam with Acrylic Adhesive | 0.1 |
| 12 | Heat Sink / Chassis | Anodized Aluminum | 150.7 |
| 13 | Heat Sink Screws (x4) | Steel | 2.4 |
| 14 | Mirror Wire Harness | Various | 12.8 |
| 15 | Tab & Spring Pin | POM & Spring Steel | 6.0 |
| 16 | Toggle Socket | POM | 24.0 |
| 17 | Toggle Socket Structure | PC + ABS | 26.0 |
| 18 | Socket Screws (x4) | Steel | 2.4 |
| 19 | Wrap Spring | Music Wire Steel | 10.6 |
| 20 | Housing | PC + ASA | 63.1 |
| 21 + 22 | Stay + Spring Clip & Spring Clip Screw | PA-MDX6 (or diecast) + Steel | 67.0 |
|  | Total |  | 649.2 |

FIG. 102

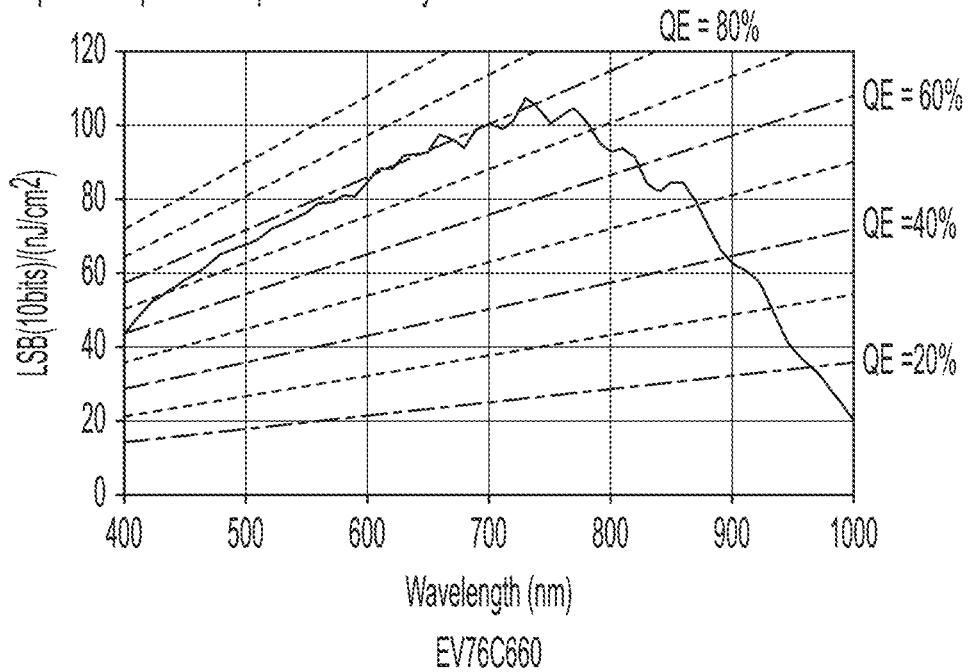
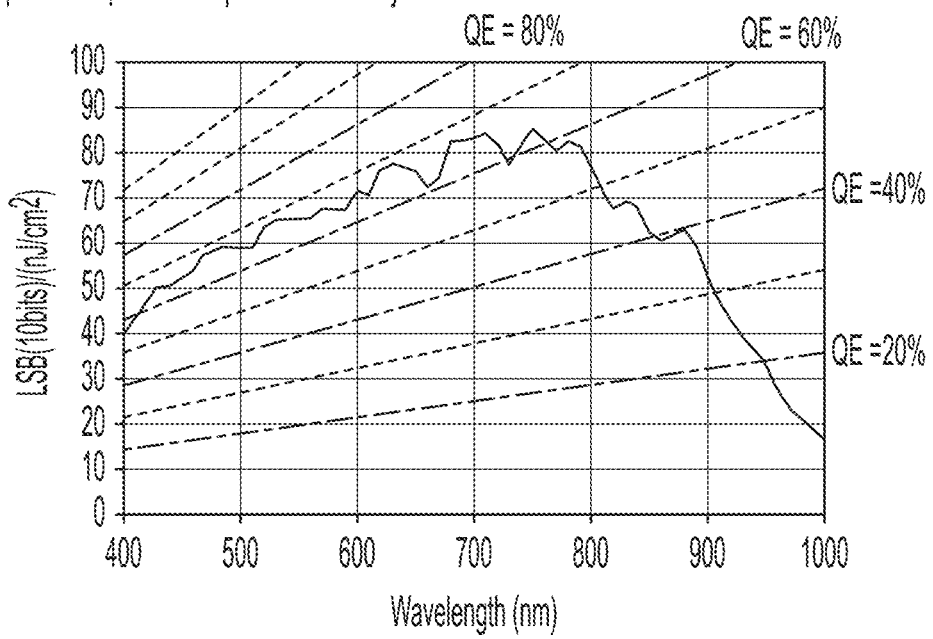
FIG. 111

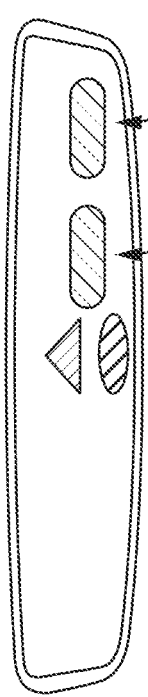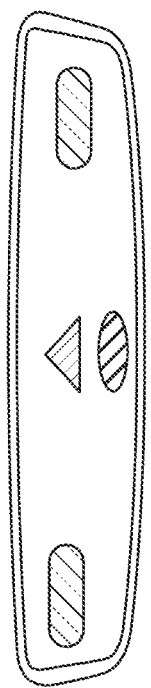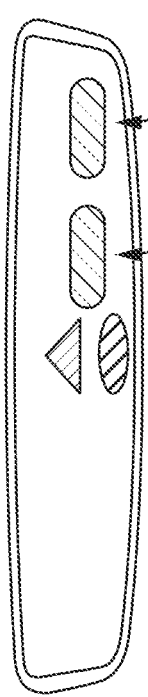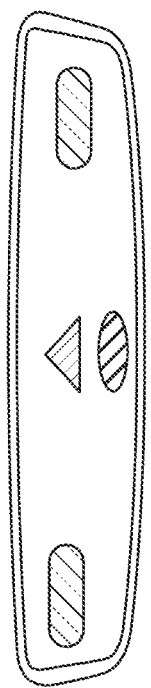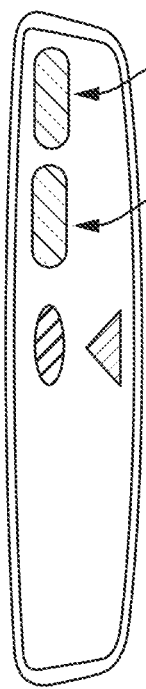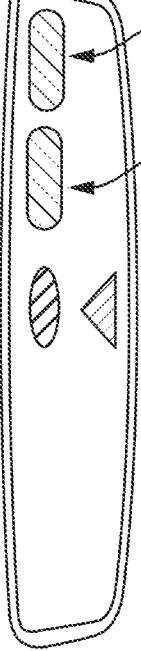

VEHICULAR INTERIOR REARVIEW MIRROR ASSEMBLY

CROSS REFERENCE TO RELATED APPLICATIONS

The present application is a continuation of U.S. patent application Ser. No. 18/308,775, filed Apr. 28, 2023, now U.S. Pat. No. 11,890,990, which is a continuation of U.S. patent application Ser. No. 17/905,109, filed Aug. 26, 2022, now U.S. Pat. No. 11,639,134, which is a 371 national stage patent application of PCT App. No. PCT/US2022/070882, filed Mar. 1, 2022, which claims the filing benefits of U.S. provisional application Ser. No. 63/267,316, filed Jan. 31, 2022, U.S. provisional application Ser. No. 63/262,642, filed Oct. 18, 2021, U.S. provisional application Ser. No. 63/260,359, filed Aug. 18, 2021, U.S. provisional application Ser. No. 63/201,757, filed May 12, 2021, U.S. provisional application Ser. No. 63/201,371, filed Apr. 27, 2021, U.S. provisional application Ser. No. 63/200,451, filed Mar. 8, 2021, and U.S. provisional application Ser. No. 63/200,315, filed Mar. 1, 2021, which are all hereby incorporated herein by reference in their entireties.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a single ball or a double ball pivot or joint mounting configuration where the mirror casing and reflective element are adjusted relative to the interior portion of a vehicle by pivotal movement about the single ball or double ball pivot configuration. The mirror casing and reflective element are pivotable about either or both of the ball pivot joints by a user that is adjusting a rearward field of view of the reflective element.

SUMMARY OF THE INVENTION

An interior rearview mirror assembly has a driver monitoring camera disposed at the mirror head (and preferably is covertly disposed within the mirror head with the camera viewing into the interior cabin of the equipped vehicle through a transflective mirror element of the interior rearview mirror assembly) so as to move in tandem with the mirror head when the mirror head is adjusted relative to an interior portion of the vehicle to adjust the driver's rearward view. A processor is operable to process image data captured by the driver monitoring camera to determine at least one selected from the group consisting of (i) driver attentiveness, (ii) driver drowsiness and (iii) driver gaze direction. The processor is also operable to process image data captured by the driver monitoring camera to determine at least one selected from the group consisting of (i) presence of an occupant/passenger seated in a front passenger-side seat of an equipped vehicle, (ii) presence of an occupant/passenger seated in a rear seat of an equipped vehicle and (iii) presence of a baby/child present in the interior cabin of an equipped vehicle, and especially a baby/child present in a baby/car seat of an equipped vehicle, even if mostly covered by a blanket. The driver monitoring camera and one or more near infrared (near-IR) light-emitting light emitting diodes (LEDs) (and/or one or more near-IR light-emitting laser sources) may be disposed in the mirror head of an interior rearview mirror assembly of an equipped vehicle and receive and emit light (both visible and near-IR light) through the transflective mirror reflector or transflector of the mirror reflective element. The near-IR LEDs may be part of a backlighting LED array of a video display screen disposed in the mirror head and viewable through the transflective mirror reflector of the mirror reflective element. The processor, responsive to processing of image data captured by the driver monitoring camera, may adjust processing of the image data captured by the driver monitoring camera to accommodate adjustment of the mirror head when the driver of an equipped vehicle adjusts the mirror head to adjust his or her rearward view.

Optionally, and preferably, an interior rearview mirror assembly has a driver monitoring camera disposed at a mirror head (and preferably is covertly disposed within the mirror head with the camera viewing into the interior cabin of the equipped vehicle through a transflective mirror element of the interior rearview mirror assembly) that is adjustable relative to a mounting base configured to attach at an interior portion of a vehicle. The mirror head includes a mirror casing and a mirror reflective element. The interior rearview mirror assembly includes a driver monitoring camera disposed in the mirror head that views a driver region of the vehicle and a driver monitoring illumination source disposed in the mirror head operable to illuminate the driver region of the vehicle. The interior rearview mirror assembly also includes an occupant monitoring camera (that may be and preferably is the same camera used for driver monitoring) disposed in the mirror head that views an occupant region of the vehicle and an occupant monitoring illumination source (that may be or at least may partially comprise a driver monitoring illumination source) disposed in the mirror head operable to illuminate the occupant region of the vehicle. The interior rearview mirror assembly preferably includes an electronic control unit (ECU) that comprises electronic circuitry (disposed on an printed circuit board) that includes at least one data processor that is operable to process frames of image data captured by the driver monitoring camera and the occupant monitoring camera. The ECU pulses the driver monitoring and/or occupant monitoring illumination source(s) during only a frame portion of the frames of image data captured by the driver monitoring and/or occupant monitoring camera and pulses the occupant monitoring illumination source during a frame portion of the frames of image data captured by the occupant monitoring camera. The ECU, via processing at the data processor of image data captured by the driver monitoring camera and/or occupant monitoring camera in synchronization with when the driving monitoring and/or occupant monitoring illumination source(s) is/are pulsed, monitors the driver and/or occupant(s) present in an interior cabin of the equipped vehicle.

These and other objects, advantages, purposes and features of the present invention will become apparent upon review of the following specification in conjunction with the drawings.

BRIEF DESCRIPTION OF THE DRAWINGS

FIG. 13 is an exploded perspective view of the auto-dimming interior rearview mirror assembly;

FIG. 22 is an exploded perspective view of the prismatic interior rearview mirror assembly;

FIGS. 23-31 are diagrams showing the areas to be monitored for driver and occupant monitoring systems;

FIGS. 32A-E are plan views of interior rearview mirror assemblies, with different camera and IR LED locations;

FIG. 33 is a diagram showing performance of the driver monitoring system when the camera and IR LED(s) are disposed at a lower region of the mirror head;

FIGS. 47 and 48 are views of an interior rearview mirror assembly, with the camera and IR emitter(s) disposed behind the mirror reflective element and having the near-IR transmitting, visible light reflecting/transmitting coatings of FIG. 46;

FIGS. 49 and 50 are views of another interior rearview mirror assembly, with the camera and IR emitter disposed behind the mirror reflective element and having the near-IR transmitting, visible light reflecting/transmitting coatings of FIG. 46, with a broadband anti-reflection layer at the first and fourth surfaces;

FIGS. 53-55 are views of another interior rearview mirror assembly, with the camera disposed behind the mirror reflective element and with some (or all) of the near-IR LEDs disposed at a lower portion of the mirror head below the mirror reflective element;

FIG. 57 is a diagram showing spectral filtering at the photosensors of the DMS camera;

FIG. 62 is an exploded perspective view of a One-Box Electrochromic Interior DMS Rearview Mirror Assembly;

FIG. 62A shows an electrical connector at the ECU PCB of the One-Box Interior DMS Rearview Mirror Assembly;

FIG. 64 shows the properties of an OSLON® Black OSLON Black Series (940 nm)—50° Double stack emitter;

FIG. 65 shows the properties of an OSLON® Black Series (940 nm)—130°×155 Double stack emitter;

FIG. 66 is a table showing a transflector stack for a visible-light transmitting/visible-light reflecting/near-IR light transmitting transflective substrate suitable for use in the One-Box Electrochromic Interior DMS Mirror Assembly;

FIGS. 67A and 67B show transmittance and color of the visible-light transmitting/visible-light reflecting/near-IR light transmitting transflective substrate;

FIG. 69 is a table showing optical properties of Guardian ExtraClear® low-iron glass;

FIG. 71 is a table showing performance data for Pilkington Optiwhite™;

FIGS. 86D-1 and 86D-2 show data and plots in a horizontal plane and a vertical plane of different driver eye points as illuminated by the LHD nFOV LEDs in a LHD vehicle;

FIGS. 88C-1 and 88C-2 show data and plots in a horizontal plane and a vertical plane of different driver eye points as illuminated by the RHD nFOV LEDs in a RHD vehicle;

FIG. 89 shows the illumination in the cabin of the vehicle when the wFOV LEDs are powered;

FIG. 91A-91C show how the exemplary EC Cell of FIG. 91 is orientated when the One-Box Electrochromic Interior DMS Mirror Assembly is attached at a windshield of an equipped vehicle;

FIG. 95 shows the CIELAB color space diagram;

FIG. 102 shows construction of a One-Box Infinity™ Prismatic Interior DMS Mirror Assembly;

FIG. 111 shows the spectral response and quantum efficiency of an EV76C660 imaging sensor and of an EV76C661 imaging sensor;

FIGS. 113A-E show different locations for the wFOV and nFOV near-IR illuminators at a mirror head for the One-Box Interior DMS Rearview Mirror Assembly.

DESCRIPTION OF THE PREFERRED EMBODIMENTS

Figure 1:
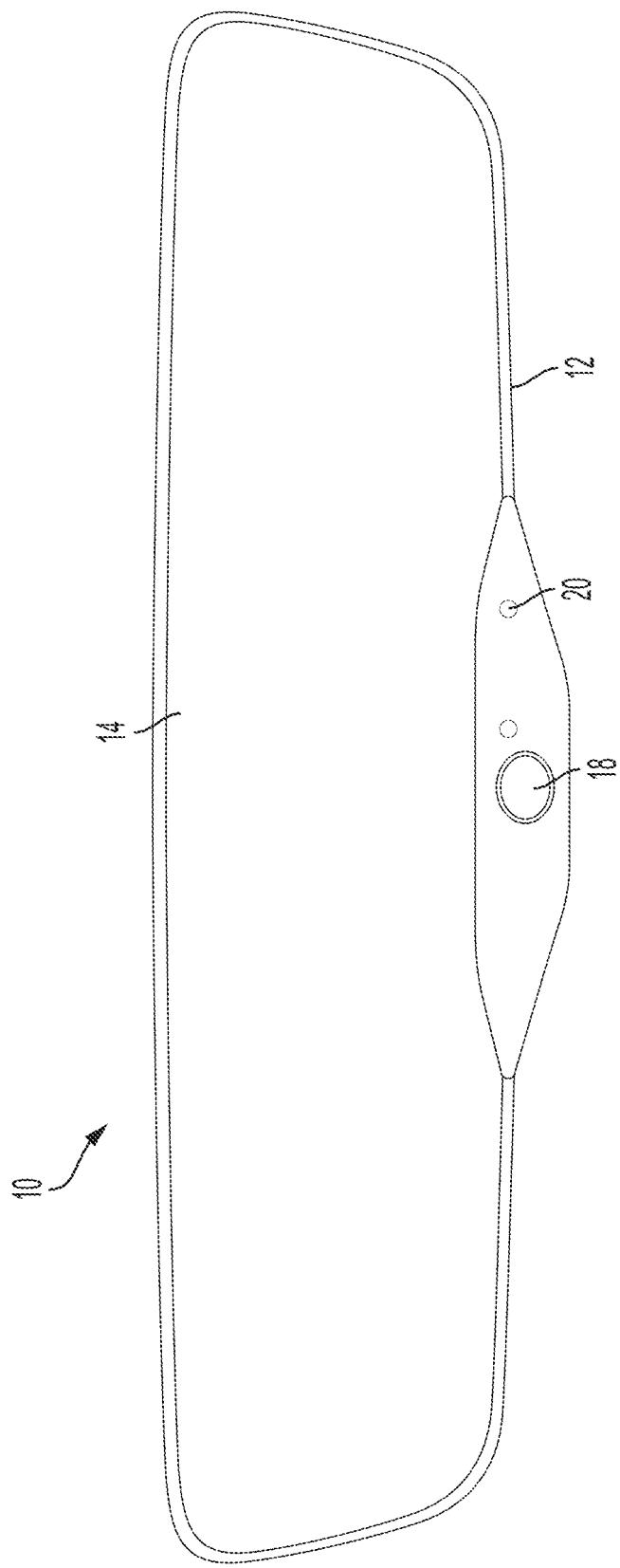
FIG. 1 is a plan view of an interior rearview mirror assembly.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, mirror assembly 10 is configured to be adjustably mounted to an interior portion of a vehicle (such as to a mirror mounting button/element attached at an interior or in-cabin surface of a vehicle windshield or such as to a headliner of a vehicle or the like) via a mounting structure or mounting configuration or assembly. The mirror reflective element preferably comprises a variable reflectance mirror reflective element that varies its reflectance responsive to electrical current applied to conductive coatings or layers of the reflective element.

The mirror assembly includes a driver monitoring system (DMS) comprising a driver monitoring camera 18 disposed at a lower region of the mirror head and viewing at least toward a head region of the driver of the vehicle. The mirror assembly includes a near infrared (near-IR) or infrared (IR) light emitting diode (LED) 20 disposed at the lower region of the mirror head and operable to emit near infrared light to illuminate the interior cabin of the vehicle in low light conditions. The driver monitoring camera and near-IR LED(s) may utilize aspects of the driver monitoring systems described in U.S. Publication Nos. US-2021-0323473 and/or US-2021-0291739, and/or U.S. patent application Ser. No. 17/650,255, filed Feb. 8, 2022, which published on Aug. 11, 2022 as U.S. Publication No. US-2022/0254132, and/or Ser. No. 17/649,723, filed Feb. 2, 2022, which published on Aug. 4, 2022 as U.S. Publication No. US-2022/0242438, and/or U.S. provisional applications, Ser. No. 63/267,316, filed Jan. 31, 2022, Ser. No. 63/262,642, filed Oct. 18, 2021, and Ser. No. 63/201,757, filed May 12, 2021, which are all hereby incorporated herein by reference in their entireties.

With the DMS camera disposed in the mirror head, the camera moves with the mirror head (including the mirror casing and mirror reflective element that pivot at a pivot joint that pivotally connects the mirror head to the mounting structure of the interior rearview mirror assembly that in turn mounts at a windshield or at a headliner of the equipped vehicle), such that, when the driver aligns the mirror to view rearward, the camera is aligned with the line of sight of the driver. The location of the DMS camera and IR LED(s) at the mirror head provide an unobstructed view to the driver. The DMS preferably is self-contained in the interior rearview mirror assembly and thus may be readily implemented in a variety of vehicles, including existing vehicles and different models of the same vehicle brand (for example, in a BMW 3-series model and in a BMW X3 model and in a BMW 5-series model and in a BMW X5 model and in an BMW 7-series model, etc.). The driver monitoring camera may also provide captured image data for an occupancy monitoring system (OMS) or another separate camera may be disposed at the mirror assembly for the OMS function.

The mirror assembly may comprise an auto-dimming mirror reflective element (e.g., an electrochromic mirror reflective element) or a prismatic mirror reflective element. For a prismatic mirror, when the head or housing is set to a particular orientation by the driver of an equipped vehicle, a toggle operable by the driver moves the housing and reflective element to flip upward/downward, typically by about 4 degrees, to switch between a daytime or non-glare reducing position (where the driver views reflections at the mirror reflector of the mirror reflective element) and a nighttime or glare reducing position (where the driver views reflections at the surface of the glass substrate of the mirror reflective element). With the auto-dimming mirror, there is typically no movement once the mirror head is set for the particular driver.

Both types of mirrors may be provided with a video display screen that is disposed behind and is viewable through the mirror reflective element. Such video mirrors include a backlit LCD display screen, and a particular form of video mirror is a full display mirror (such a ClearView™ Interior Rearview Mirror Assembly available from Magna Mirrors of America, Inc. of Holland, MI USA, or an FDM™ Interior Rearview Mirror Assembly available from Gentex Corporation of Zeeland, MI USA), where the video display screen fills the reflective region, such as is by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2019-0258131; US-2019-0146297; US-2019-0118717 and/or US-2017-0355312, which are all hereby incorporated herein by reference in their entireties. In that type of a dual-mode interior rearview mirror, the EC mirror head moves when switching from a traditional reflection mode or mirror mode to a live-video display mode.

For prismatic mirrors and full mirror display mirrors, the driver initially lines up the mirror by looking at the mirror reflector to see rearward of the vehicle. When the mirror is flipped up (such as to switch to the glare-reducing position of the prismatic mirror or to switch to the video display mode of the video mirror), the DMS may be flipped downward by a similar degree to maintain its principal viewing axis toward the driver. Optionally, the DMS camera may have a large enough field of view so the desired regions are not outside of the camera's view when the mirror is flipped. The DMS data processor disposed at the ECU of the system may adjust or shift processing of image data captured by the camera based on the orientation of the mirror head (i.e., when it is flipped up or down), so that the portion of the image data that is being processed for the driver monitoring system is representative of the desired monitored region in the vehicle cabin.

For different camera locations and driver states, a percent obstruction of the driver's face and body can be calculated. This may not provide 'perfect' results, as with every change in camera location the camera gets closer or further from the driver. Therefore, the constant areas for percent obstruction calculations vary in relevance. For example, if the camera is very close to the driver, then these constant areas might not catch all the area of interest and if the camera is too far from the driver then the constant area catches some background.

Figure 4:
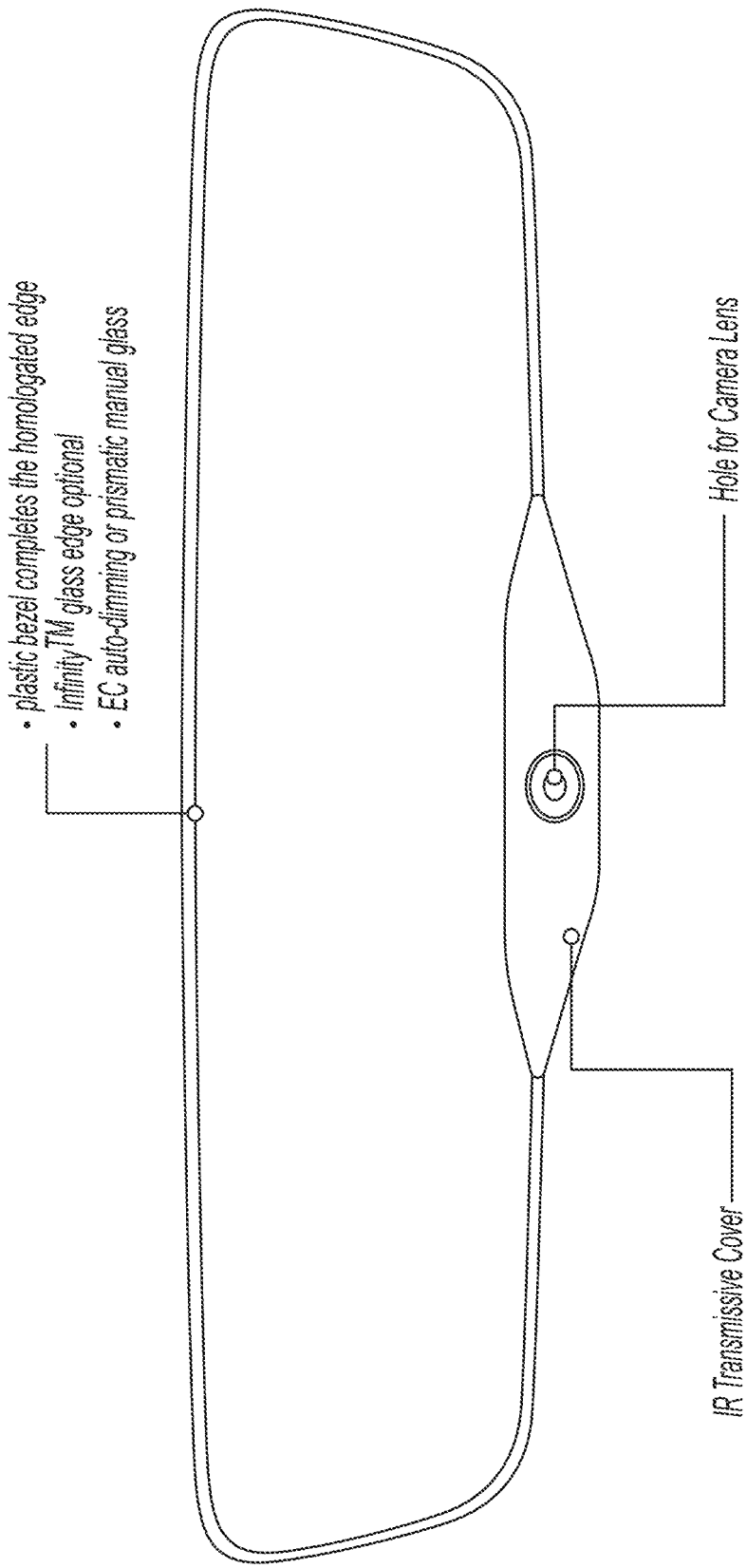
FIGS. 4-6 show plan views of the mirror assemblies, with different camera and IR LED locations.
Figure 5:
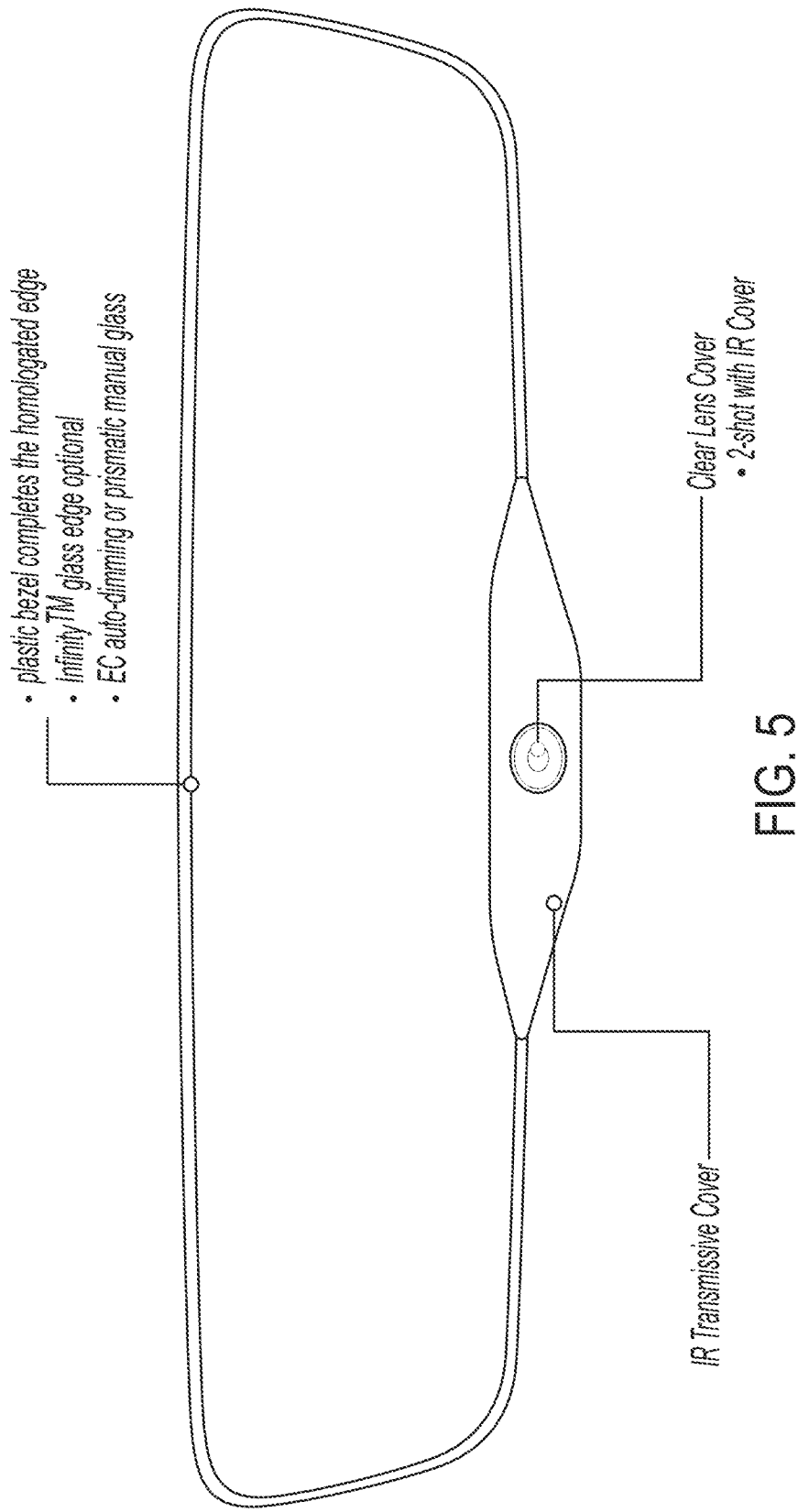
Figure 6:
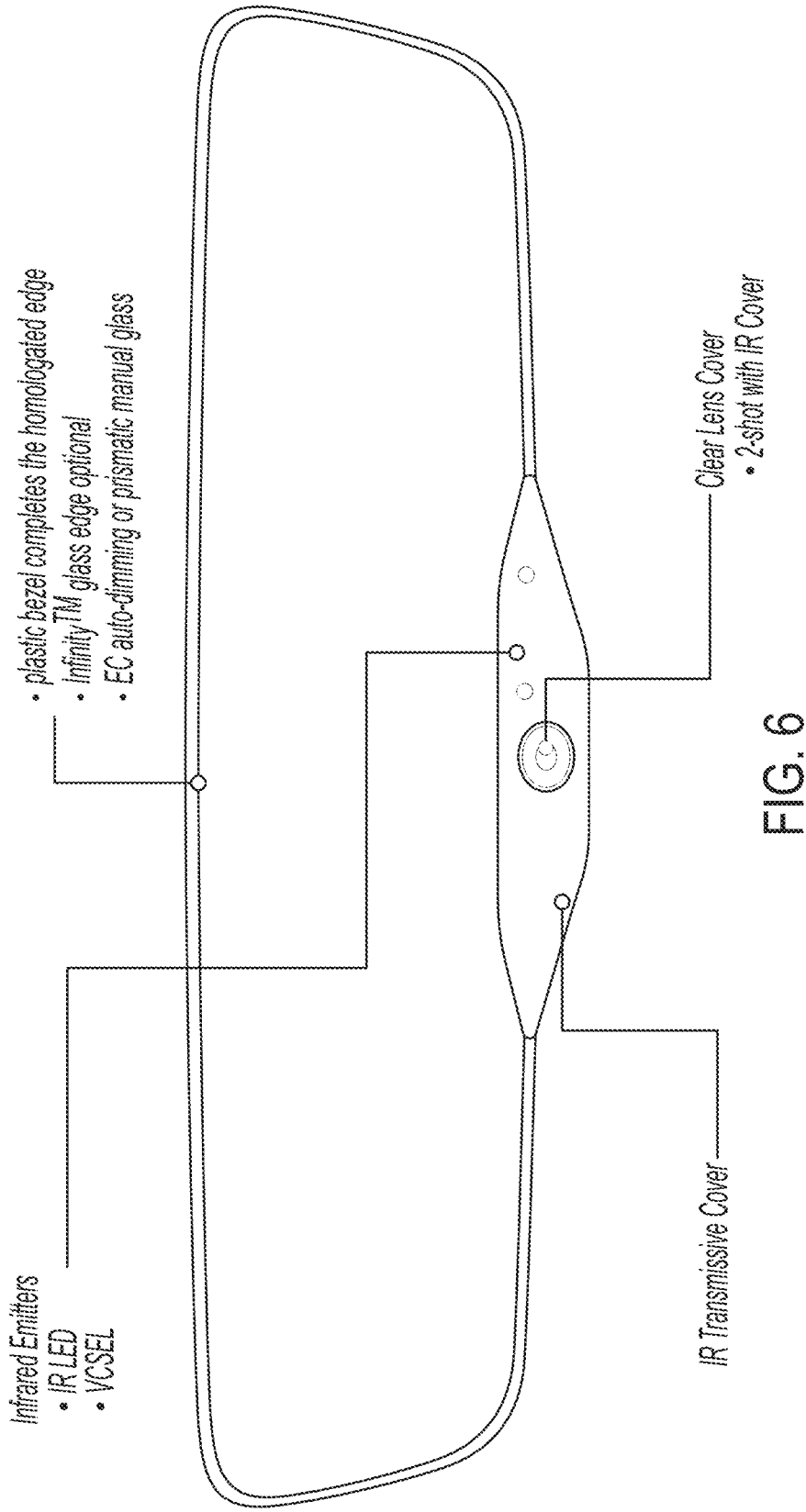
Figure 7:
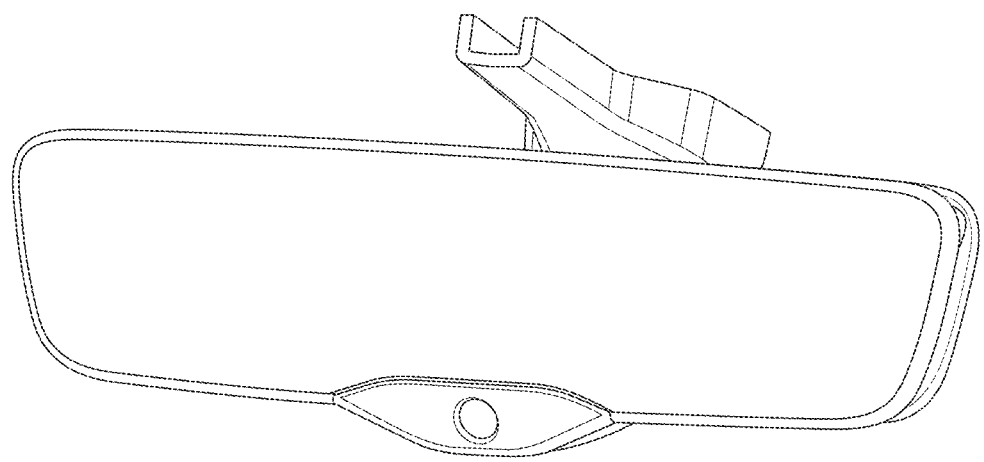
FIGS. 7-11 show views of the auto-dimming interior rearview mirror assembly.
Figure 8:
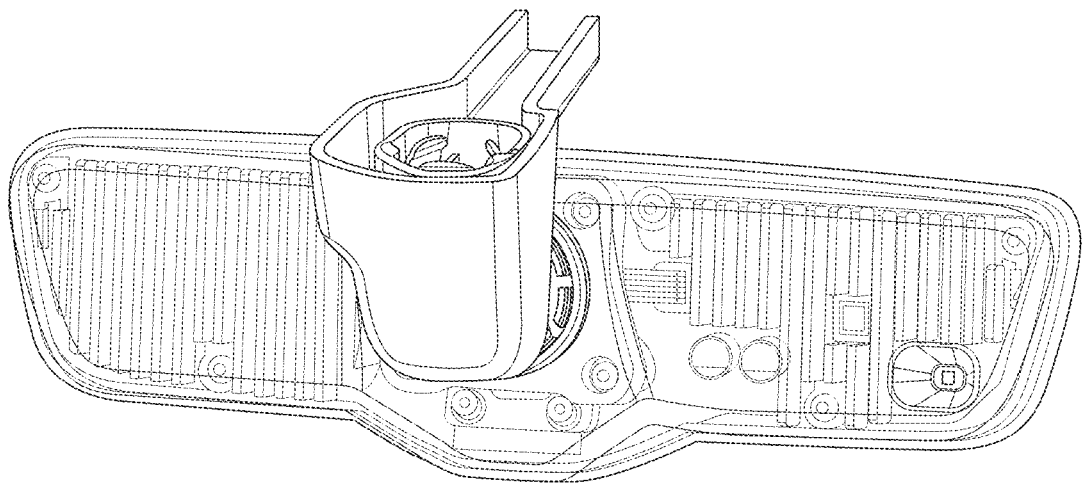
Figure 9:
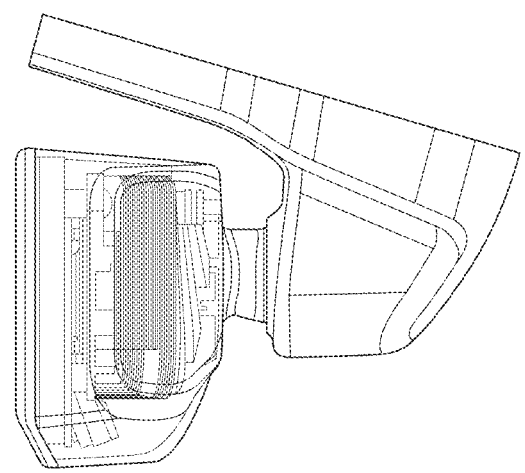
Figure 10:
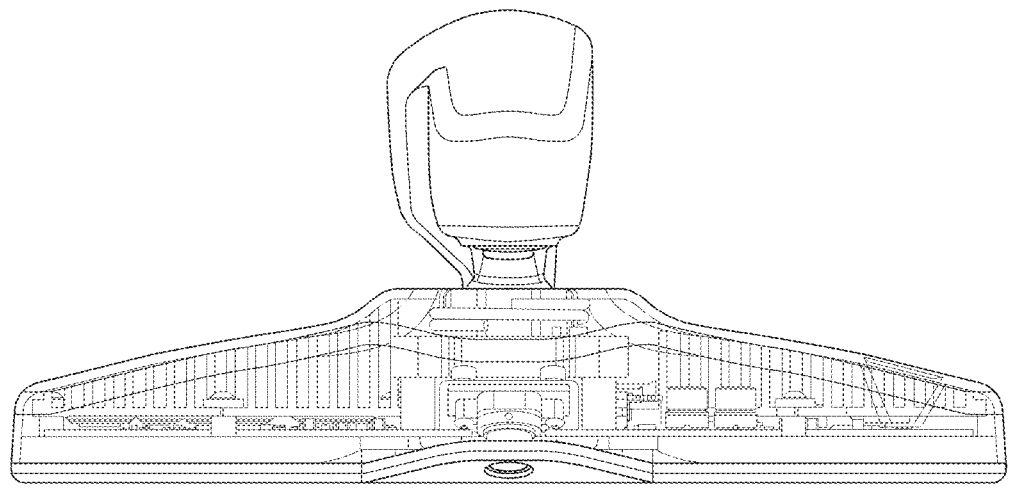
Figure 11:
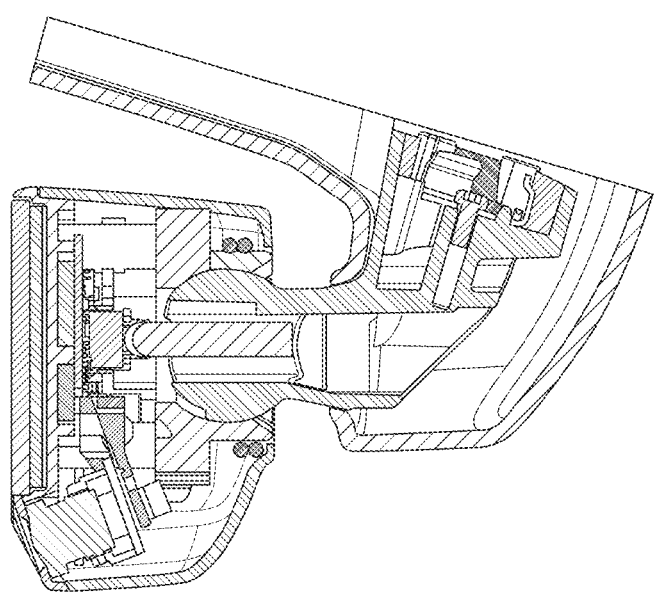
Figure 12:
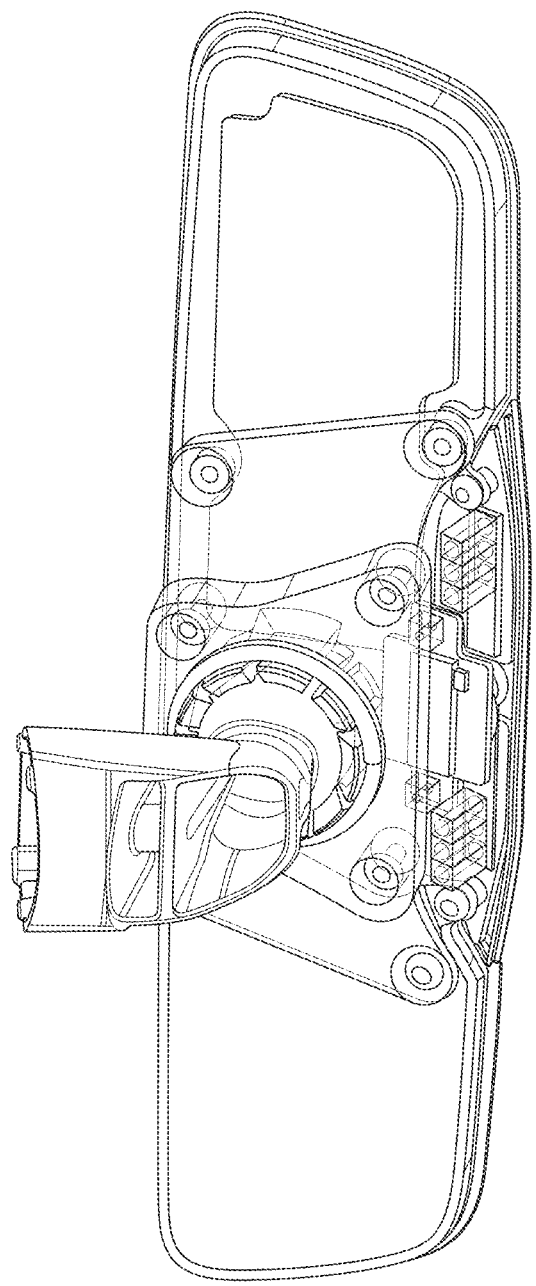
FIG. 12 is a perspective view of the auto-dimming interior rearview mirror assembly, with the rear casing and heat sink removed to show additional details, with the PCB including electrochromic drivers and/or the near-IR LED drivers, and with the data processor for image/data processing of image data captured by the DMS camera optionally being disposed outside of the mirror head.
Figure 14:
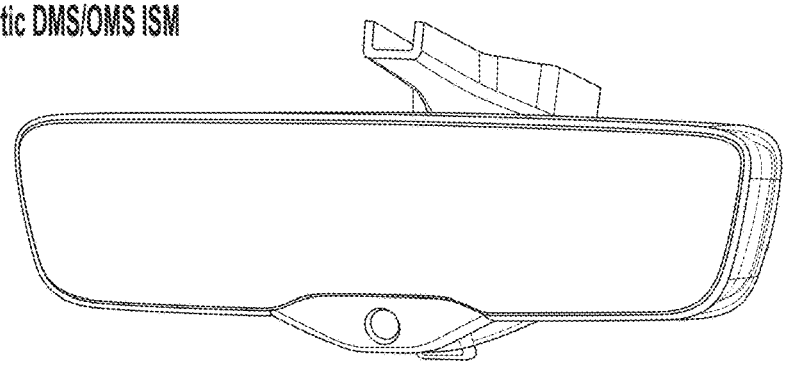
FIGS. 14-21 show views of a prismatic interior rearview mirror assembly.
Figure 15:
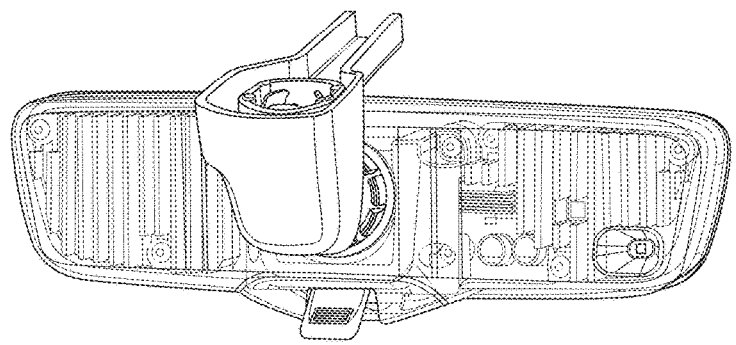
Figure 16:
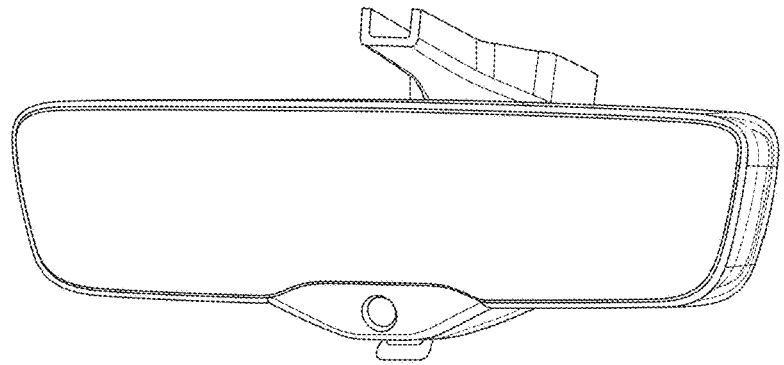
Figure 17:
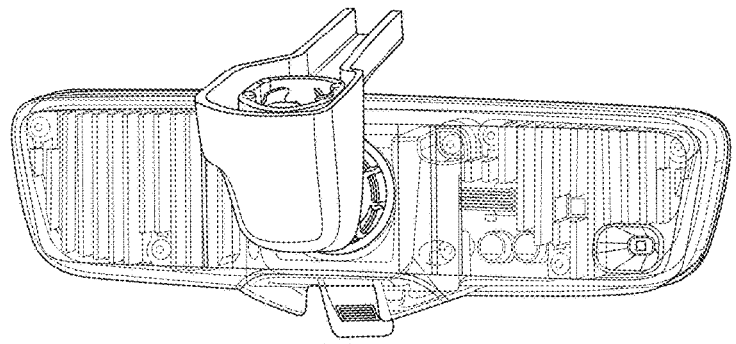
Figure 18:
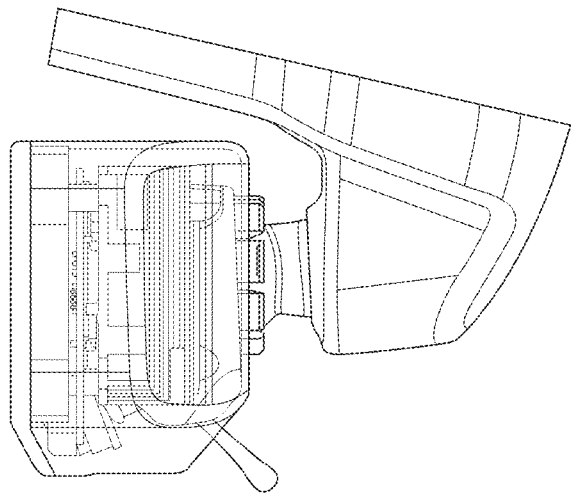
Figure 19:
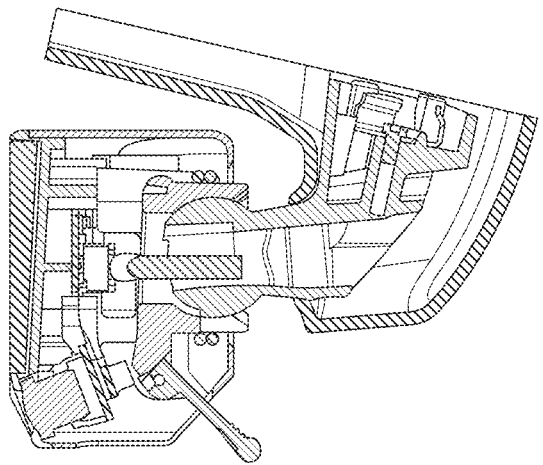
Figure 20:
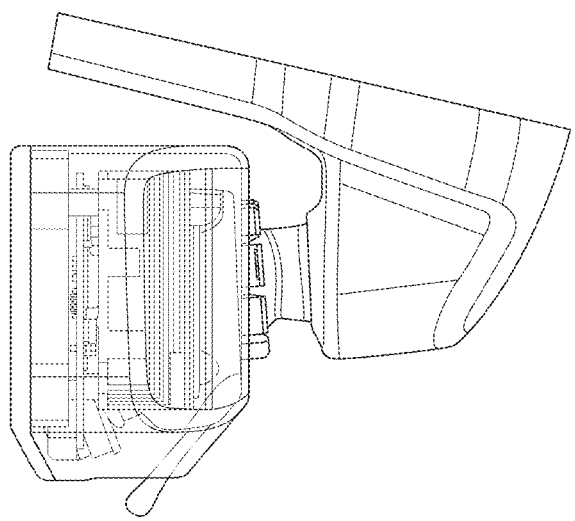
Figure 21:
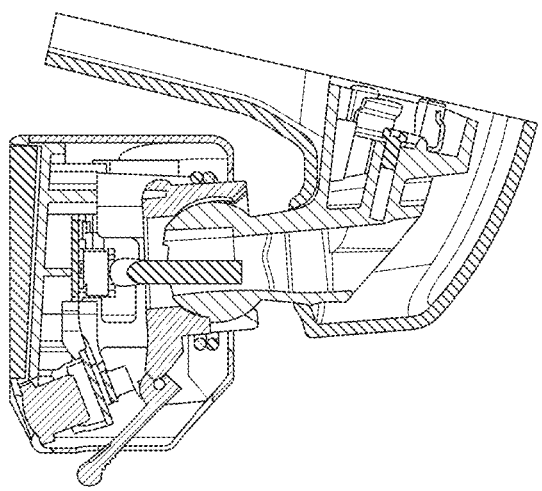
Figure 23:
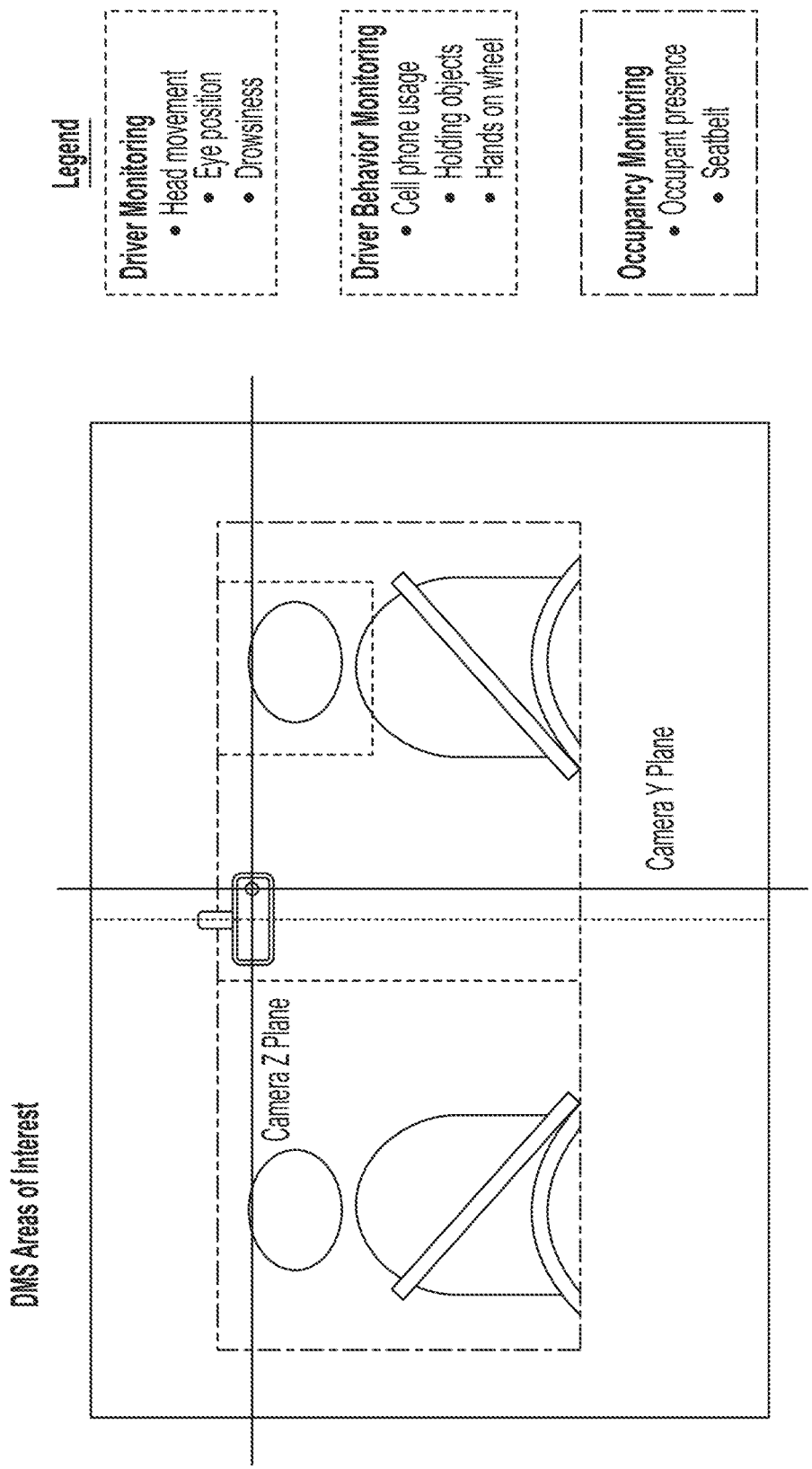
Figure 24:
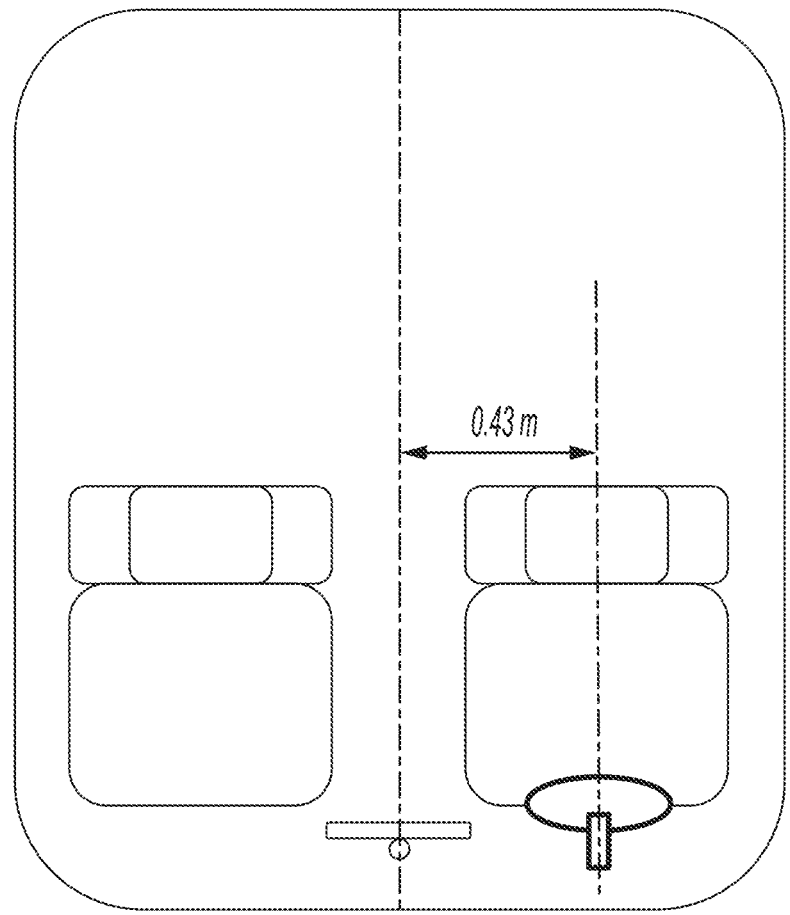
Figure 25:
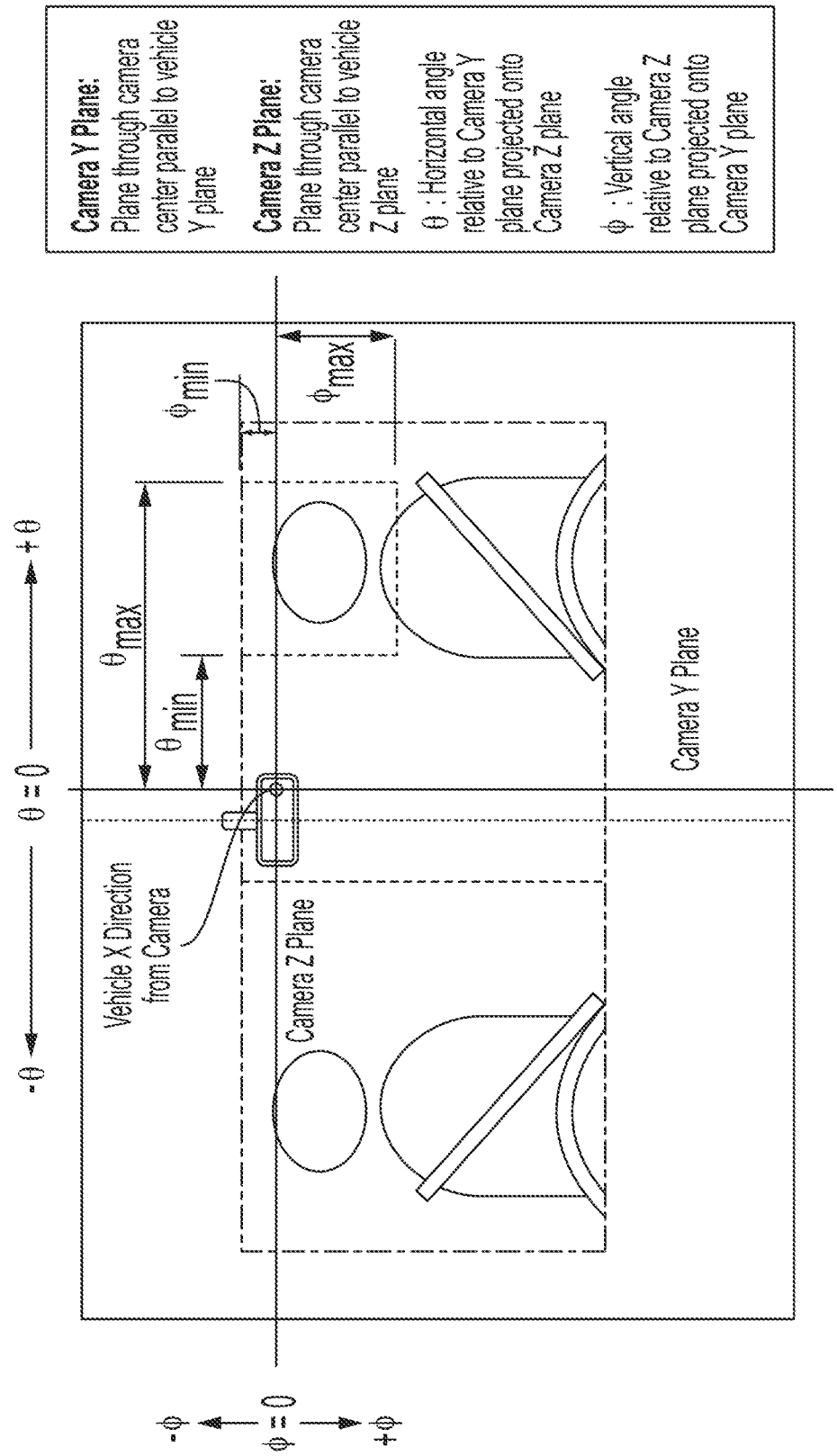
Figure 26:
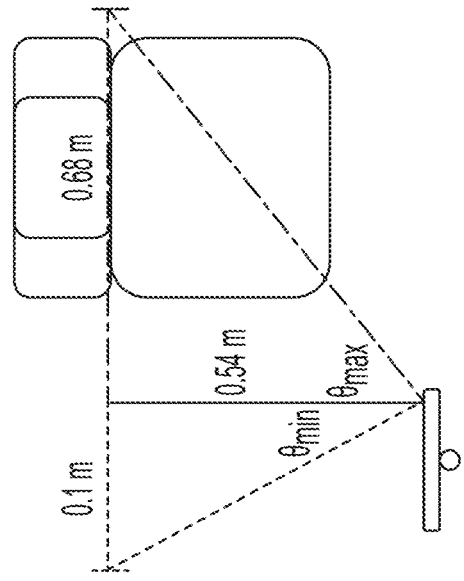
Figure 27:
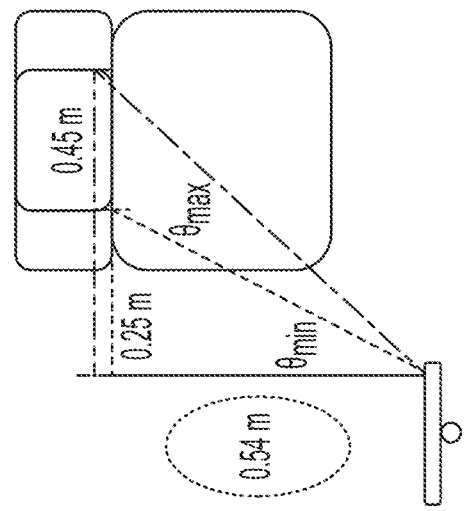
Figure 28:
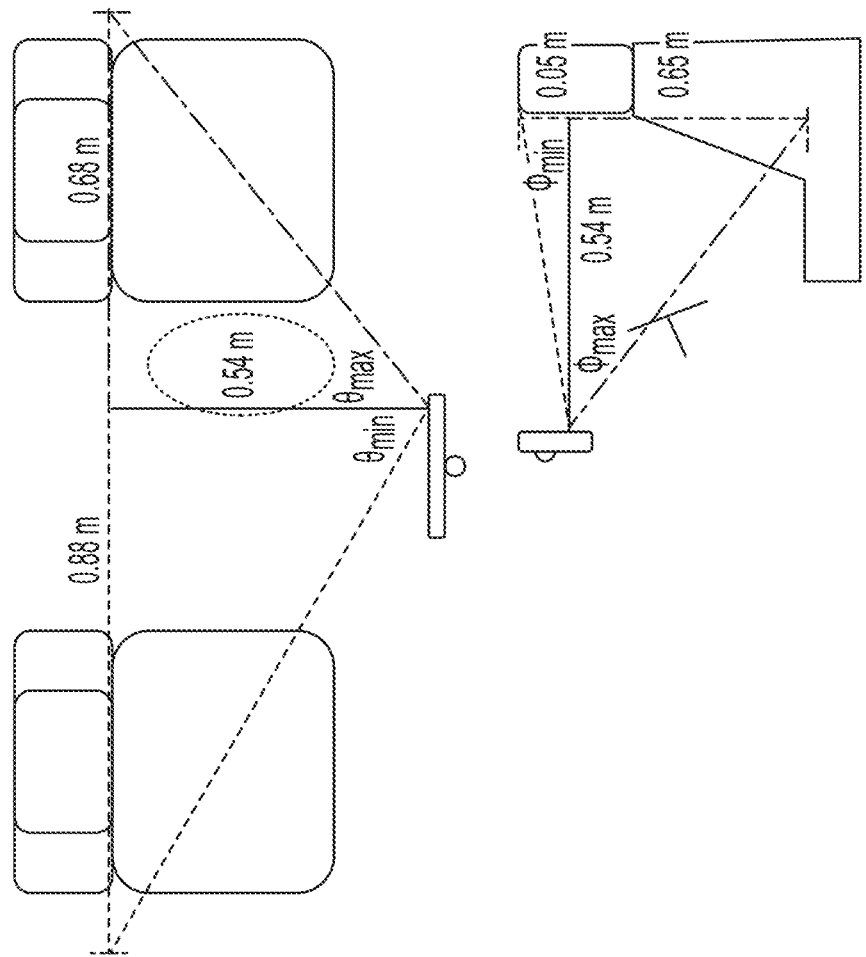
Figure 29:
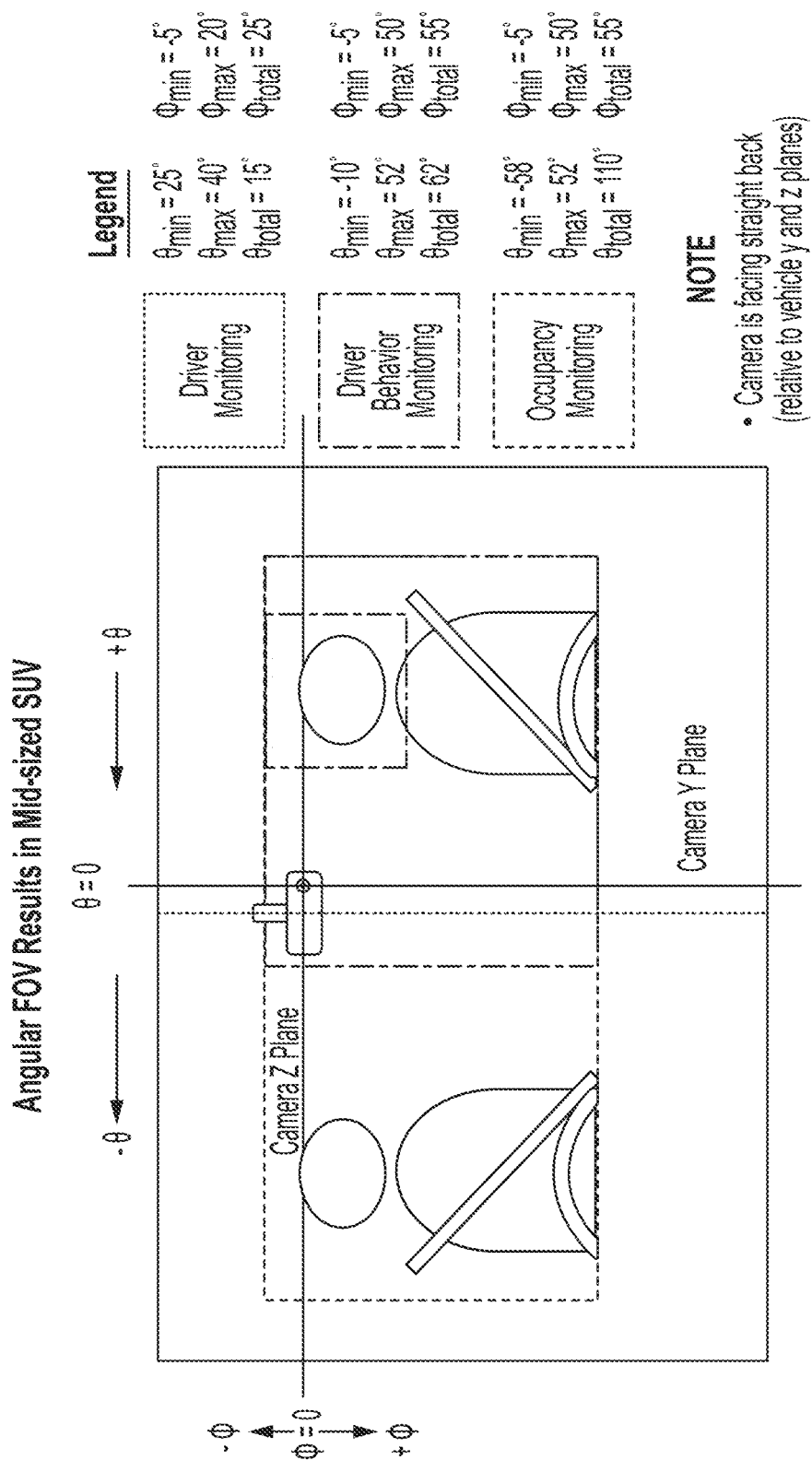
Figure 30:
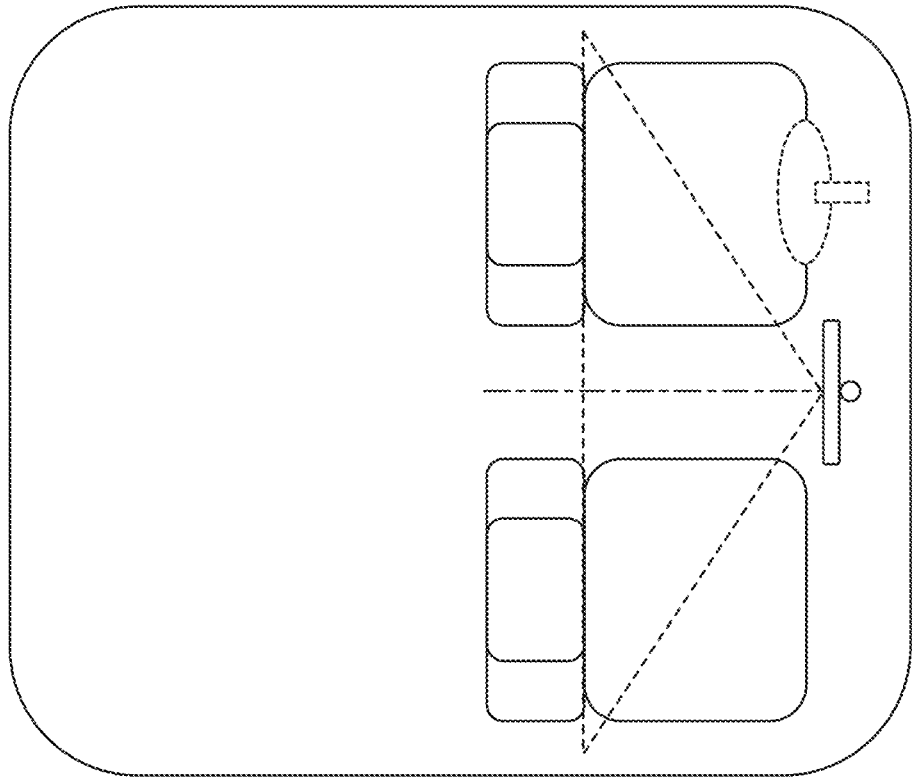

As shown in FIG. 4, the camera may be disposed below the mirror reflective element, and such as at and behind and viewing through a hole through an IR transmissive cover. Optionally, and such as shown in FIG. 5, the camera may be disposed behind a clear lens cover. Optionally, and such as shown in FIG. 6, one or more infrared emitters (e.g., IR or near-IR emitting LEDs or IR or near-IR emitting vertical-cavity surface-emitting lasers (VCSEL)) may be disposed at and behind the IR transmissive cover.

In the illustrated embodiment of FIGS. 4-13, the mirror assembly comprises an auto-dimming or electro-optic, such as an electrochromic mirror reflective element. Optionally, and such as shown in FIGS. 14-22, the mirror assembly (having the DMS camera and IR light emitter(s)) may comprise a prismatic mirror reflective element and may be adjustable between a daytime or normal viewing position and an anti-glare position via actuation of a toggle of the mirror assembly.

As shown in FIGS. 23-31, the DMS camera views the driver head region to monitor head movement, eye position, gaze direction and drowsiness/attentiveness of the driver. The DMS camera may also view other in-cabin regions and/or driver body parts (such as the driver's hands), so as to monitor driver behavior, such as cell phone usage, hands on wheel, etc. Optionally, the DMS camera may provide occupancy monitoring to determine presence of an occupant and seatbelt usage by the occupant. FIGS. 24-31 show exemplary dimensions and angles for viewing by the DMS camera for driver monitoring, driver behavior monitoring and occupancy monitoring.

Conventional driver monitoring systems (DMS) in likes of BMW, Ford, GM, Tesla, and Subaru vehicles (for example, for GM SuperCruise™ or for Ford's BlueCruise™ as described in https://www.consumerreports.org/car-safety/driver-monitoring-systems-ford-gm-earn-points-in-cr-tests-a6530426322) are "Two-Box" DMS in that (i) the camera used to monitor the driver's head/eyes and the near-IR emitting light sources that illuminate the driver's head/eyes are accommodated in a first box or module (that is usually located at the steering column of an equipped vehicle or in an overhead region of the equipped vehicle) and (ii) the electronics/software used to analyze captured image data to determine the driver's gaze direction or head position or eye movement or alertness or drowsiness is accommodated in a separate second box or module that is located remote from and at a distance from the first box and that connects to the first box typically via a wired connection (the second box typically comprises an ECU that can be part of a head unit of the equipped vehicle and that besides DMS, optionally can provide other features).

Referring now to FIG. 62, a "One-Box" DMS electrochromic interior rearview mirror assembly 110 has both the camera 10 used to monitor the driver's head/eyes and the near-IR emitting light sources 8 that illuminate the driver's head/eyes accommodated by an interior rearview mirror assembly (and preferably, are both accommodated within the mirror head of the interior rearview mirror assembly). Thus, the One-Box Electrochromic Interior DMS Rearview Mirror Assembly allows an original equipment manufacturer (OEM) of vehicles (such as for example VW or Toyota or Honda or GM or Ford) to equip vehicles with the likes of a DMS interior rearview electrochromic mirror assembly that includes the camera/illumination sources/driver monitoring software/associated driver monitoring electronic circuitry such as data processing chip(s), memory, electronic components, printed circuit board(s) that includes automatic dimming circuitry, data processing chip(s), memory, electronic components, light sensors for detecting glare and ambient lighting, and that includes power supplies, electrical connector(s), heat sink(s), mechanical parts, etc. The One-Box Interior DMS Rearview Mirror Assembly thus can be purchased by an OEM from an interior rearview mirror assembly manufacturer and can be installed by that OEM into a being-assembled vehicle (typically mounting to a mirror mounting button or similar element that is adhered to the in-cabin side of the windshield of the vehicle). To operate in the equipped vehicle, the One-Box Interior DMS Rearview Mirror Assembly connects to a vehicle wiring harness of the vehicle and is supplied via this vehicle wiring harness with ignition voltage (nominal 12V DC but can vary from 9V (6V for automatic stop/start) to 16V or so depending on the vehicle type and the operating condition of the vehicle). The One-Box Interior DMS Rearview Mirror Assembly via this wiring harness is supplied with vehicle data, such data including vehicle and other data supplied via a CAN bus or link (that can carry to the mirror vehicle information and that can carry from the mirror distraction alerts, etc.) or supplied via a Local Area Network (LIN) bus or line. The wire harness can comprise a reverse inhibit signal/line that communicates to the interior electrochromic mirror assembly that the driver has selected reverse gear/reverse propulsion, an Ethernet link, a video in/out line, electrical power, a ground line, and/or a GMSL/FPD link (video in/out). Video out may be provided, such as for video conferencing and/or "selfies" applications. Optionally, for privacy protection, the images of occupants may be blurred if displayed (during the likes of in-vehicle video conferencing) on an in-cabin display or if wirelessly transmitted to viewers remote from the equipped vehicle. The system may blur the complete image, leaving only the driver/co-driver or all passenger faces clear. Optionally, black bars may be overlaid over the persons' faces. Image stabilization may be provided to compensate potential movements of the image, and/or dynamic cropping of the images may be performed.

The vehicle wire harness also receives outputs/data from the One-Box Interior Rearview Mirror DMS, such outputs used for various features, systems and functions of the equipped vehicle. The outputs/data from the One-Box Interior DMS Rearview Mirror Assembly include data related to head position of a driver of the equipped vehicle, eye gaze direction of the driver of the equipped vehicle, hand position of the driver of the equipped vehicle, drowsiness of the driver of the equipped vehicle, attentiveness of the driver of the equipped vehicle etc., along with other outputs/data relating to some (and preferably all) of the following:
- Emotional state
- Cognitive distraction
  - Disengagement
  - Visual distraction
- Level of drowsiness
  - Microsleeping
  - Sleeping
- Visual State
  - Gesture
    - Head nodding/shaking
  - Activity
    - Abnormal head posture
    - Hand position classification
    - Held object classification
    - Speaking
    - Laughing
    - Coughing
    - Sneezing
    - Yawning
    - Smoking
  - Phone handling
  - Video conferencing
  - Viewing target classification
    - Child seat detection
    - Seat belt status
    - Occupant size
    - Occupant age
    - Gender
    - Presence detection
    - Convenience recognition
    - Security recognition
    - Occupant change
    - Spoofing
    - Facial Expression
- Body Pose Tracking
  - Eye tracking
  - Head tracking
  - Eyelid dynamics
  - Brightness control
  - Face searching
  - Mouth Shape
- Camera pose estimation
  - Frozen image detection
  - Face occlusion
  - Lens blockage
  - Low image quality
  - IR light blockage
  - Camera misalignment The Interior DMS Rearview Mirror Assembly provides a stand-alone One-Box DMS solution that has the camera/illumination near-IR sources/DMS software and its associated data processing chip(s)/automatic dimming circuitry/circuitry used to control an exterior electrochromic mirror reflective element that is part of an exterior sideview mirror of the equipped vehicle/data processing circuitry/communication circuitry/memory/power supplies/associated electronics and hardware/heat sinks, etc. packaged into, integrated into and accommodated by a vehicular interior rearview mirror assembly, and preferably covertly integrated within the mirror head of the vehicular interior rearview mirror assembly behind (and rendered covert to a driver's view by) a transflective mirror reflective element of the vehicular interior rearview mirror assembly.

The One-Box Interior DMS Rearview Mirror Assembly overcomes and solves numerous problems associated with such integration of full DMS capability covertly in the mirror head of an interior mirror assembly. One problem overcome is heat/thermal management. The DMS data processor of the One-Box Interior DMS Rearview Mirror Assembly can comprise a Seeing Machines' FOVIO Driver Monitoring (FDM) processor [description of which is available at c_D3_03-Driver-Monitoring-Systems.pdf (xilinx.com), such description is hereby incorporated herein by reference in its entirety] that employs computer vision algorithms that can robustly, accurately and in real-time measure a driver's visual attention to their environment, assess their degree of drowsiness, and ultimately detect if the driver has passed a threshold of risk. For example, the DMS solutions that build on Seeing Machines' FDM technology are automatic, unobtrusive, accurate, reliable and intelligently aware. There is no need for the driver to wear anything or modify his or her behavior. Such DMS data processing is complex and extensive, and such data processing of DMS data generates heat. For example, full DMS processing on an FPGA or similar data processing chip can generate at least 2 watts of heat and the multiple near-IR emitting sources can generate a further at least 2 watts of heat and the various other auto-dimming and other circuitry housed within the mirror head in a DMS one-box mirror solution can generate at least 1 watt of heat. The electronic system housed within the mirror head of the One-Box Interior DMS Rearview Mirror Assembly as a whole when powered can consume at least 5 watts to 15 watts of power (for example, around 10 watts), such power consumption generating heat within the mirror head of the interior rearview mirror assembly. For example, the ECU may consume around 8.5 W (e.g. 7.386 W), the LEDs may consume around 2.1 W (e.g., 2.078 W) and the camera/imager board may consume around 0.3 to 0.4 W (e.g., 0.345 W).

The DMS data processor of the One-Box Interior DMS Rearview Mirror Assembly can comprise a data processing chip running DMS/OSD software/algorithms available from Smart Eye AB of Gothenburg, Sweden that is Artificial Intelligence-based. By studying a person's eye, face, head and body movements, and the objects they use, Smart Eye's interior vehicle algorithms can draw conclusions about a person's alertness, attention, focus and much more.

An interior rearview mirror assembly used in a vehicle must be useable and operable in all climates/geographic regions (by day and by night) wherever such vehicle is driven. On a hot summer day in likes of Arizona or Florida, the housing (typically plastic) of the mirror head of an interior rearview mirror assembly attached to a windshield of a car parked out in the sun can reach a temperature of 85 Celsius or higher. Should a driver on entering that car grasp the mirror head to adjust his or her rearward field of view to his or her desired setting, the driver's fingers grasping the mirror head will be touching a hot surface. Of course once the driver starts the ignition/engine/propulsion system of that car and especially when the car's air conditioning comes on, the temperature of the outer surface of the mirror head falls, though this may take several minutes. Accommodating DMS into the mirror head can exacerbate this problem (unless ameliorated as described herein) at least because (i) once the driver starts the vehicle, the in-mirror DMS is activated and its extensive data processing generates further heat within the mirror head and (ii) such further heat generated within the mirror head can impact and even impair/deteriorate/damage performance of electronics packaged within the mirror head. Even during normal driving when the heat soak during parking in a sunny hot climate is not an issue, heat generated by DMS's extensive data processing can (at least locally) raise the temperature of the outer surface of the mirror head to a temperature level that may be uncomfortable for or disagreeable to a driver who grasps the mirror head. And even during such normal driving, heat generated by DMS's extensive data processing can impact and even impair/deteriorate/damage performance of electronics packaged within the mirror head.

To overcome such heat/thermal management problems, and as shown in FIG. 62, the One-Box Electrochromic Interior DMS Rearview Mirror Assembly 110 comprises heat-sink/chassis 12. The heat-sink/chassis 12 is formed of metal, such as anodized aluminum or magnesium (preferable when light-weight is desired) or zinc or copper or brass or any alloy of the aforementioned. For example, the heat sink may comprise a diecast black anodized aluminum alloy having conductivity of at least 170 W/m-K. The ECU 6 of the One-Box Electrochromic Interior DMS Rearview Mirror Assembly 110 comprises a rigid multilayer (for example, at least 3 layers or at least 5 layers or at least 7 layers, such as 8-10 layers) printed circuit board (PCB) having a front side (that faces towards the EC mirror reflective element 1) and a rear side (that faces towards metal heat-sink/chassis 12) and where the rear side is separated from the front side by a thickness dimension of the PCB (preferably an FR4 PCB). The ECU 6 comprises electronic circuitry disposed on both sides of the PCB. Electrically conductive traces and vias of the PCB interconnect circuitry disposed on the front and rear sides of the PCB. The heat-sink/chassis 12 functions to absorb and spread heat generated by the DMS electronics. Without the heat-sink/chassis 12, localized portions of the mirror housing/casing grasped by the driver may be hotter that other portions due to the proximity of heat-generators within the mirror head to such localized portions of the mirror housing/casing grasped by the driver. The heat-sink/chassis 12 mitigates/ameliorates/avoids such local hot spots by absorbing and spreading heat that is locally generated within the mirror head generated by the DMS electronics (including the DMS camera and the near-IR light sources and also any auto-dimming circuitry present).

The ECU 6 includes an electrical connector (such as a pigtail harness that extends out from the mirror head and that terminates in a multi-pin connector or a multi-pin connector or the like that is part of the mirror head and that is configured to connect to a vehicle wire harness) for making electrical connection to a wire harness of the vehicle when the One-Box Interior DMS Rearview Mirror Assembly is mounted at the vehicle. For example, and such as shown in FIG. 62A, the PCB may have an inner connector that electrically connects to an outer connector, which is electrically connected to the vehicle wire harness. The wire harness is electrically connected to the vehicle power source or battery (which provides around 12V), and has a ground line, and may have a reverse inhibit line. A CAN communication line (2 wires), or a LIN communication line (one wire) may connect to the ECU 6 to provide communication/control to other vehicle components. Optionally, the ECU may have an Ethernet interface/connector (such as a single twisted wire pair that is shielded), and may provide a 100 Mbps Ethernet interface for video transmission using H.264.

The electronic circuitry disposed on the rear side of the PCB may comprise a Xilinx XC7Z020 FPGA available from Xilinx, Inc. of San Jose, CA USA, loaded with DMS software running algorithms supplied by Seeingmachines of Fyshwick, Australian Capital Territory, Australia (website: http://www.seeingmachines.com).

Heat generated by the circuitry disposed at the PCB, and particularly at the rear side of the PCB (the rear side being the side of the PCB where data processing such as for DMS with concomitant heat generation occurs), is heat sunk and dissipated by heat-sink/chassis 12. The ECU 6 nests into the heat-sink/chassis 12, and heat conductance from electrical components of ECU 6 to heat-sink/chassis 12 is enhanced by various thermally conductive interface material/elements.

Figure 75A:
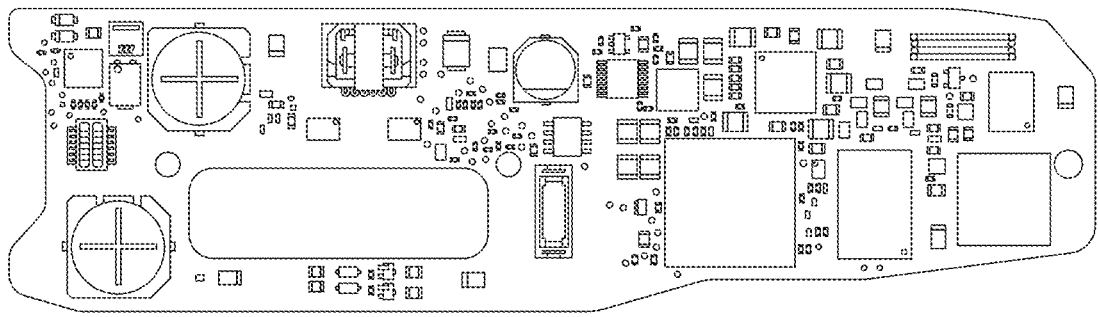
FIGS. 75A-75B are views of the ECU PCB.
Figure 75B:
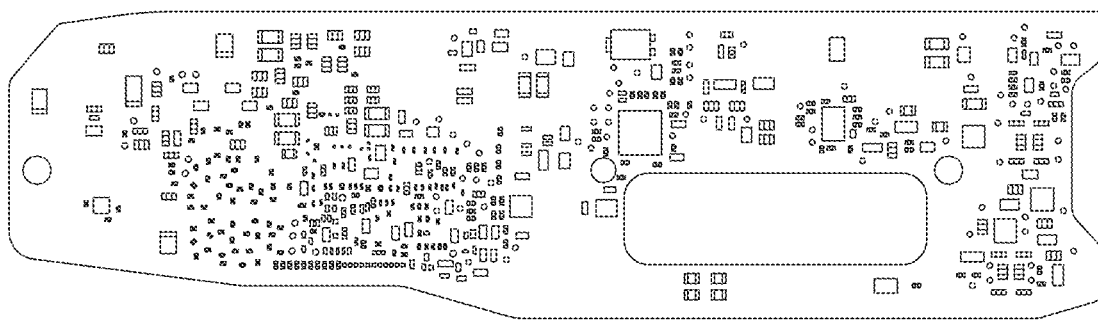
Figure 75C:
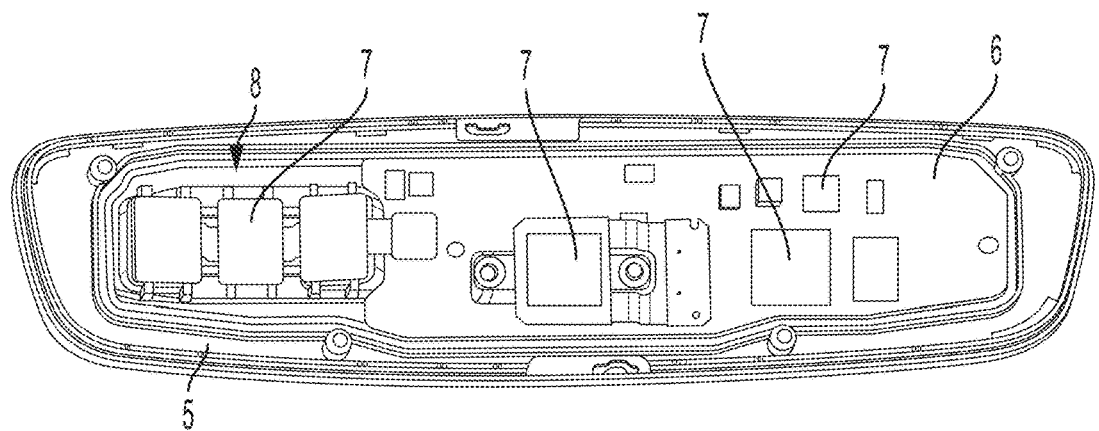
FIGS. 75C-75E are views of the thermal interface material applications at the PCBs and attachment plate.
Figure 75D:
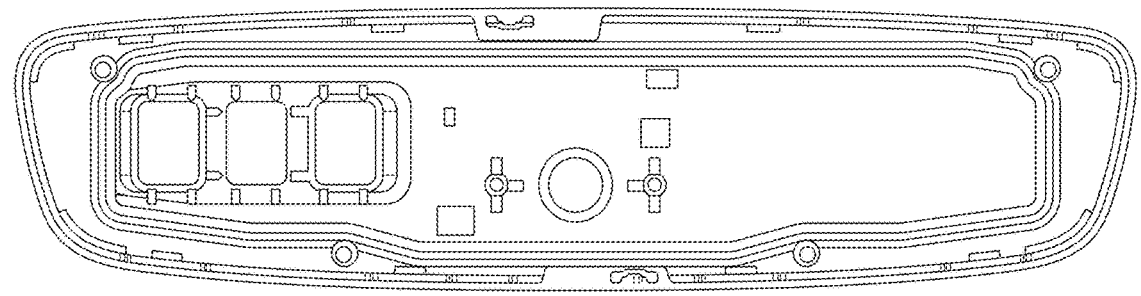
Figure 75E:
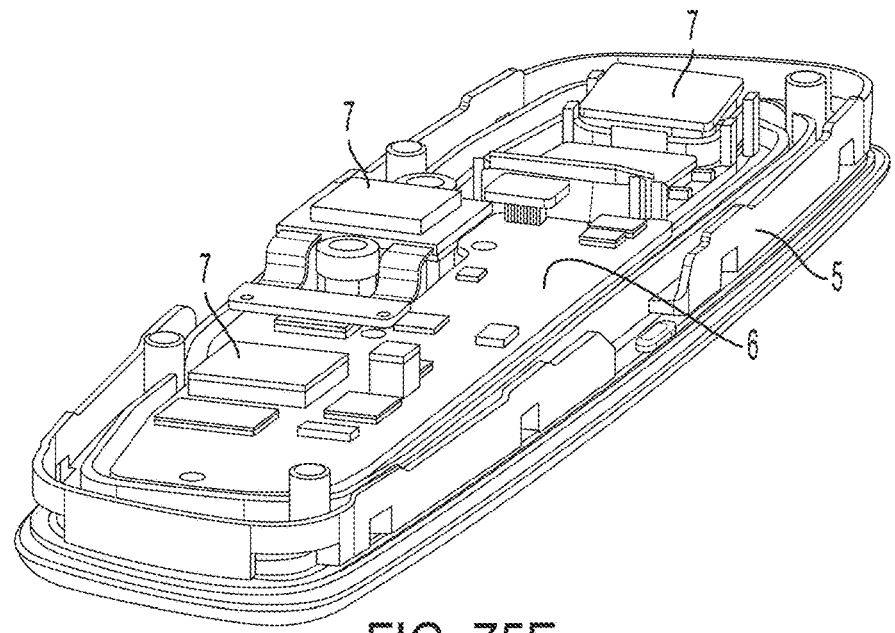

As shown in FIG. 62, a plurality of thermal interface material (TIM) elements 7 are disposed at the rear side of the PCBs such as the rear side of the ECU PCB, such as at heat generating components (e.g., the DMS SoC chip, the imager PCB, the LED PCBs, etc.), and contact corresponding pads or portions of the heat-sink/chassis 12 to dissipate heat generated by the heat generating components during operation of the One-Box Interior DMS Rearview Mirror Assembly. For example (and such as shown in FIGS. 75C-75E), the TIM elements 7 may be disposed at components at the rear or heatsink side of the PCBs (so as to be disposed between and contact the components and the heatsink), such as the SoC, the LED PCBs (at the opposite side of the LED PCBs from the LEDs), the imager PCB (at the opposite side of the imager PCB from the imager), memory, the power-management integrated circuit (PMIC) chip, the power supply chip, the Schottky diode, the inductor chip, etc. TIM elements may also be disposed at components at the attachment plate side of the PCB (so as to be disposed between and contact the components and the attachment plate), such as an Ethernet Phy, a Schottky diode, flash memory, a reverse diode, an LED driver FETS, an LED driver IC, etc.

The TIM elements may be disposed as thermally conductive paste or pads, and the dispensing equipment may meter out the material to a respective specific volume or weight at each location. Given the vertical orientation of the surfaces at which the TIM will be interfacing, the material should have sufficient vertical stability properties (i.e., the material will not slide due to gravity and/or extreme temperatures, vibration, etc.). The interfacing surface of the heatsink or attachment plate may be designed/molded with additional geometries (such as features such as grooves, scoring and the like) to mechanically "lock" the TIM element from sliding. If such additional structure is provided, it may be done in a manner that minimizes or avoids air gaps between the TIM element and the interfacing surface/material. The TIM elements may comprise non-silicone based material to avoid paint contamination/adhesion. The heatsink bottoms out or datums off the four screw bosses as well as the ECU being sandwiched between pins or bosses on both the heatsink and the attachment plate on their respective sides, which controls the thickness of the TIM elements and prevents them from being further compressed.

The PCB assembly of the ECU (see FIGS. 75A and 75B) includes a system on chip (SoC), such as a TI Sitara SoC, a video processing chip (ISP), detection processing chip and associated software, a multipoint control unit (MCU), such as an ARM R5F, and four ARM A53 Cores (or other suitable components) for processing. The DMS hardware includes the camera (that captures image data at 60 frames per second) and three sets or banks of light sources (e.g., LEDs). The light sources may be powered by a constant current driver, with the entire string (e.g., the 6 near-IR LEDs in a three set/2-LED per set configuration) powered in series. An FET is included to short out the RHD LEDs or the LHD LEDs to turn them off. The drive current may be around 2.3 Amps. Preferably, current passing through the near-IR LEDs is less than 3.5 amps. The ECU operates with a 4 ms pulse time (12 percent duty cycle), though depending on the choices made for LED type and other considerations, preferably can be between a 5 percent duty cycle and a 35 percent duty cycle. The exposure time (according to IEC 62174 standard) is greater than 1000 seconds during normal operation (at a distance of at least 34 cm) and about 20 seconds in a misuse condition (at a distance of 10 cm or less). The SMR (surface mounted reflector) multiplier for the reflectors of the nFOV LEDs is about 1.78×. The system adjusts the PWM on/off time of the LEDs to reduce the operating temperature and thermal issues. The system may also or otherwise adjust the constant current through the near-IR LEDs. The system may include on-board thermistors, an LED driver internal temperature sensor, an SoC internal temperature sensor or other temperature sensing device that determines the temperature at or within the mirror head. When the temperatures is determined to be above a threshold temperature, a remote start function of the vehicle can be used to cool inside of the vehicle in summer or to warm up the vehicle in winter. The system may monitor sun loading and communicate to the vehicle over CAN/LIN bus to increase A/C to the windshield. The system may monitor sun loading and weather and slightly lower windows to reduce internal heat.

The in-mirror head DMS chip running the DMS software/algorithms (such from likes of Seeingmachines or from Smart Eye) may comprise a Sitara SoC available from Texas Instruments Incorporated of Dallas, TX. The Sitara Arm Processor family, developed by Texas Instruments, features ARM9, ARM Cortex-A8 (that comprises a 32-bit RISC ARM processor core), ARM Cortex-A9, ARM Cortex-A15, and ARM Cortex-A53 (that comprises a 64-bit RISC ARM processor core) application cores. The Sitara SoC (see FIG. 63A) has a compute processing power of 2-4× Cortex-A53 up to 1.4 GHZ (at 0.85 V 18.5K DMIPS), total 512 Kb L2. The compute processing power provides 2770 KB of SRAM, ECC on all critical memories (64 KB in main domain, 432 KB dedicated in HSM module, 1.25 MB dedicated in C7×256V, 512 KB L2 for A53 cores, and 512 KB dedicated to MCU subsystem). The SoC provides a CSI-2 RX (4L) at 2.5 Gbps camera interface, and a DPI 24-bit RGB parallel interface (up to 2048×1080 at 60 fps) display interface. The processor may encode/decode up to 3840×2160 at 30 fps, 4K30. The capture, viewing, analytics of the processor may include JPEG capture (1920×1080 at 60 fps, 2K60), vision HWA (VPAC3-Lite at 360 MHZ) and 12-bit RGB-IR, 300MP/s ISP, and C7×256v (C7×+MMA) at 1 GHz with 1.25 MB shared SRAM (40 GFLOPS/0-2TOPS). The memory IO of the processor includes one 16-bit LP/DDR4 with inline ECC (LPDDR4: 3733MT/s, DDR4: 3200MT/s), and one Octal-SPI (MCU SS) with execution-in-place support, and 3 MMC/SD. The Automotive IO of the SoC includes three CAN-FD (full duplex) (2 in the MCU subsystem), and an Ethernet switch (2 external ports): RMII (10/100) or RGMII (10/100/100), AVB and TSN. The SoC has high speed IO, with two USB 2.0 ports. The safety and security of the SoC includes (i) a Cortex-R5F (800 MHZ) MCUSS with FFI including 32 KB I$, 32 KB D$, 64 KB TCM, dedicated peripherals and 512 KB SRAM, (ii) ASIL-B/SIL-capable, (iii) diagnostic toolkit (enter SoC), voltage, temp, clock, ECC monitors and error signaling, and (iv) SHE 1.1/EVITA-Full HSM, Secure boot, Crypto, with the HSM having dedicated dual-M4F running at 400 MHz with total of 432 KB of SRAM. The power consumption of the SoC is typically less than 3 W at 125 dC Tj. The SoC includes advanced low power stand-by and suspend states (dedicated R5F running at 400-800 MHZ), and CAN standby power 600 uW (50 uA @ 12V). The SoC may be packaged as a 17×17 mm, 0.8 mm ball pitch. For example, an AM437x Sitara™ Processor comprises an ARM Cortex-A9 32-Bit RISC Microprocessor with a Processing Speed up to 1000 MHZ.

Floating-point (a.k.a. "real") numbers are a set of all numbers, including integers, numbers with decimal points, irrational numbers like pi, and the like. Data processing for DMS is intensive and requires a huge number of floating-point calculations. A floating-point calculation is any finite calculation that uses floating-point numbers, particularly decimals, from a computational standpoint. FLOPS (floating point operations per second) measure how many equations involving floating-point numbers a processor can solve in one second. Computing power/capacity/capability/prowess can be expressed as megaflops (a million floating-point calculations/second), gigaflops (a billion floating-point calculations/second), and teraflops (a trillion floating-point calculations/second). Data processing chips may include FLOPS as a specification to indicate how fast they are across the board. Specifically, a teraflop refers to a data processor's capability to calculate one trillion floating-point operations per second. Saying something has "6 TFLOPS," for example, means that its processor setup can handle 6 trillion floating-point calculations every second, on average.

For a data processing chip suitable to use in a One-Box DMS Interior Rearview mirror assembly, computational capacity must be sufficient to handle the intense computation needed to run the DMS software loaded onto and running on that chip. Thus for the data processing chip running the DMS software/algorithms/object code that is disposed within the mirror head of a One-Box DMS Interior Rearview mirror assembly, a computing speed of at least 0.1 teraflops is preferred; a computing speed of at least 0.3 teraflops is more preferred; and a computing speed of at least 0.6 teraflops is most preferred. If other features or algorithms are required to be run by the chip in addition to running the DMS software, then a computing speed of at least 0.5 teraflops is preferred; a computing speed of at least 1 teraflops is more preferred; and a computing speed of at least 1.5 teraflops is more preferred.

The bigger the computational speed, the bigger the power consumption of the data processing chip. For a data processing chip suitable to use for DMS in a One-Box DMS Interior Rearview Mirror Assembly, a power consumption (when running the DMS software/algorithms) of less than 5 watts is preferred, with less than 4 watts more preferred and less than 3 watts most preferred. For example, a suitable DMS data processing chip running DMS software/algorithms at an around 0.25 teraflop computational speed consumes around 2.5 watts of power.

Optionally, the DMS SoC in the mirror head may comprise a Xilinx 7020 FPGA available from Xilinx, Inc. of San Jose, CA USA. Alternatively, other digital signal processing chips such as a Snapdragon data processor (such as can run on the Snapdragon ADP, as well as on the Snapdragon Ride Platform) available from Qualcomm Technologies Inc. of San Diego, CA USA can be used as the in-mirror head data processing chip running the DMS software. A Snapdragon data processor comprises a data processing system on a chip (SoC). A Snapdragon's central processing unit (CPU) uses the ARM architecture and a single Snapdragon SoC may include multiple CPU cores, an Adreno graphics processing unit (GPU), a wireless modem, a Hexagon digital signal processor (DSP), a Qualcomm Spectra image signal processor (ISP) and other software and hardware.

Figure 73:
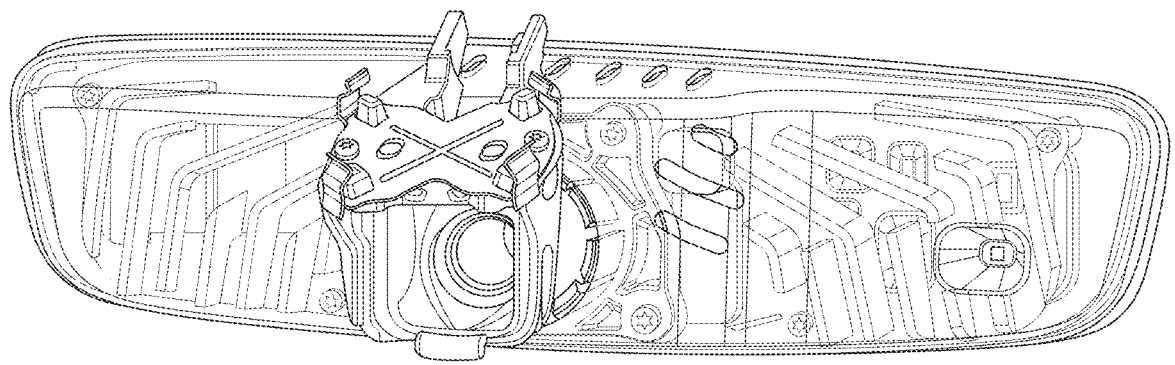
FIGS. 73 and 74 are views of the One-Box Electrochromic Interior DMS Rearview Mirror Assembly, showing the mirror mounting base/stay.
Figure 74:
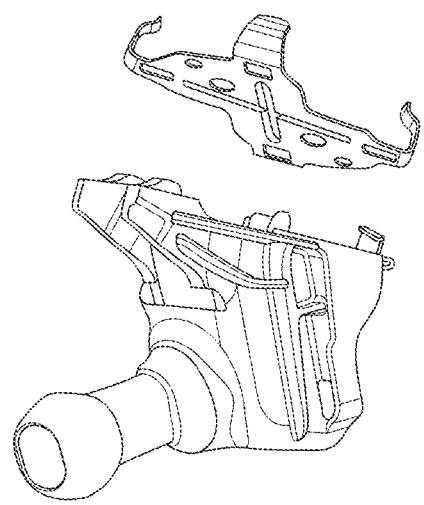
Figure 76A:
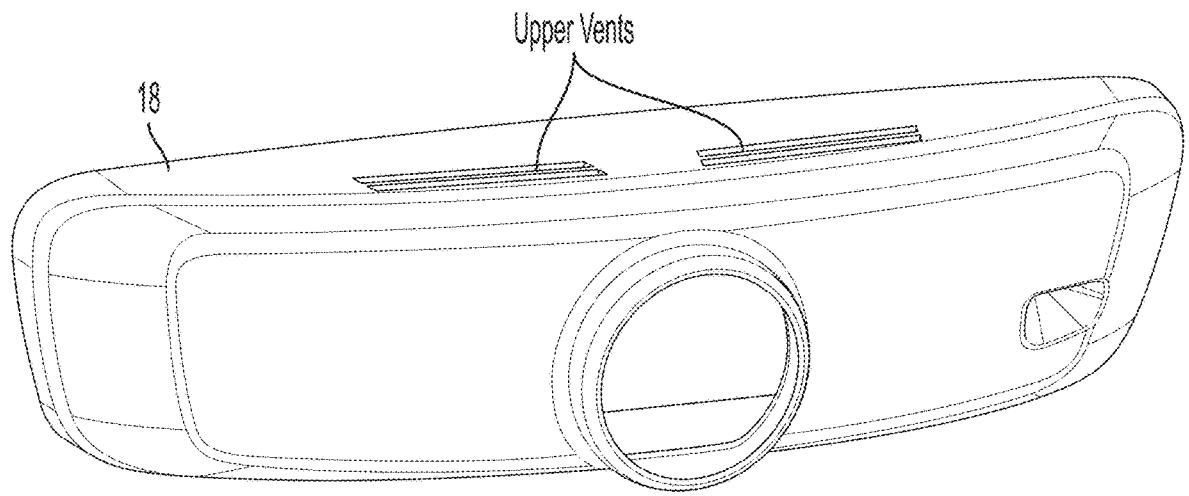
FIGS. 76A and 76B are views of the housing of the One-Box Interior DMS Rearview Mirror Assembly.
Figure 76B:
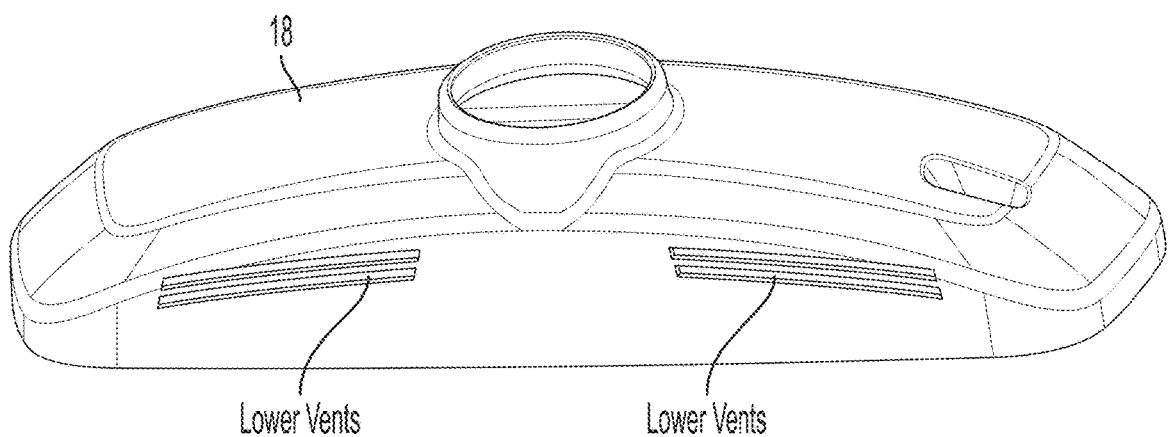

The attachment plate may comprise a plastic material (preferably a thermally conductive plastic material), or may comprise aluminum or magnesium or other metal material to enhance heat spreading and heat dissipation. Optionally, the attachment plate may comprise a Stainless Steel fiber-reinforced polycarbonate (PC) Acrylonitrile butadiene styrene (ABS) material (such as a 15% SS fiber fill available from Sabic of Riyadh, Saudi Arabia) for EMI shielding. The heatsink surrounds the ECU and is grounded by spring fingers at the ECU and is attached (such as via screws) to the attachment plate, with a tongue-and-groove interface at the attachment plate to create a Faraday cage (such as by utilizing aspects of the mirror assemblies described in U.S. provisional applications, Ser. No. 63/267,316, filed Jan. 31, 2022, Ser. No. 63/262,642, filed Oct. 18, 2021, and Ser. No. 63/201,757, filed May 12, 2021, which are all hereby incorporated herein by reference in their entireties). For a One-Box Infinity™ Interior DMS Rearview Mirror Assembly, the attachment plate may use PC-ABS material, while for a One-Box EVO™ Interior DMS Rearview Mirror Assembly, the attachment plate may comprise a PC-ASA material, which may be required or desired for the Class-A surface of the attachment plate that circumscribes the perimeter edge of the mirror reflective element. Optionally, the attachment plate may comprise a stamped aluminum heat spreader/shield that spreads the heat generated by some components (when operated) and creates the other half of the Faraday cage with the heatsink. Optionally, and such as shown in FIGS. 62, 76A and 76B, the housing may comprise one or more passageways or vents (such as upper and lower vents and/or vents through the back or sides of the mirror housing/casing that the driver of an equipped vehicle grasps to adjust the mirror head) to increase air flow through the mirror head to reduce the internal cavity temperature and to reduce the touch surface temperature of the mirror head (with the touch surface temperature of the mirror head preferably at a temperature below about 60 degrees C., more preferably below about 50 degrees C.). The vents help to lower the thermal junction temperature of the heat generating components, such as the SoC and the PMIC, and help to lower the overall/average touch temperature. There is no thermal material/interface between the heatsink and the housing. The housing includes an ambient light sensor cone that compresses a foam ring or donut at the sensor. The housing may comprise a one piece housing or a 2 or three piece housing. The electrical connector of the ECU may be fed through the housing and the through the mirror mounting base or stay (see, for example, FIGS. 73 and 74) for electrical connection to the wire harness of the vehicle. The mirror base or stay may comprise aluminum and may be painted black. The mirror glass size may be around 243.5 mm×63 mm (141 cm$^2$).

Air at room temperature has a thermal conductivity of around 0.025 W/meter-kelvin (W·m$^{-1}$·K$^{-1}$). THERM-A-GAP™ GEL25NS (a non-silicone fully cured dispensable GEL available from Chomerics of Woburn, MA USA) has a thermal conductivity of 2.1 W/m-K (per ASTM D5470) and thus is an order superior than air in terms of thermal conductivity. During assembly of One-Box Electrochromic Interior DMS Rearview Mirror Assembly 110 at an interior mirror manufacturer, THERM-A-GAP™ GEL25NS can be dispensed in a desired amount onto components of One-Box Electrochromic Interior DMS Rearview Mirror Assembly 110 to enhance thermal conductance and thermal flow from heat-generating components to heat-sink/chassis 12 and/or to housing 18. TIM-PUTTY 45 (available from TIMTRONICS of Yaphank, NY USA) is a low viscosity and highly conformable one part, paste-type, non-cure gel type dispensable gap filler with a tacky consistency that assures stress-free efficient heat transfer between delicate parts where minimum pressure can be tolerated. TIM-PUTTY 45 has a thermal conductivity of 4.5 W/m-K (per ASTM D5470). FLEXTEIN® TG845NS (available from Nystein Inc. of New York, NY USA) is a non-silicone, thermally conductive dispensable gel having a thermal conductivity 4.5 W/m-K (per ASTM D5470), low thermal resistance, low compression force and RoHS compliance. BERGQUIST LIQUI FORM TLF 4500CGEL-SF (available from Henkel Corporation, Stamford, CT USA) has a thermal conductivity 4.5 W/m-K (per ASTM D5470), has a silicone-free formulation, has optimized shear thinning rheology for enhanced 1K dispense rate, is ultra-conforming with excellent wet-out and low assembly stress and is suitable for low stress interface application. Such high thermal conductivity material [with thermal conductivity of greater than 2 W/m-K (per ASTM D5470) preferred, greater than 3 W/m-K (per ASTM D5470) more preferred and greater than 4 W/m-K (per ASTM D5470) most preferred] can be dispensed in a desired amount onto components of One-Box Electrochromic Interior DMS Rearview Mirror Assembly 110 (or otherwise used) to enhance thermal conductance and thermal flow from heat-generating components to heat-sink/chassis 12 and/or to housing 18.

Thermal performance of the One-Box Electrochromic Interior DMS Rearview Mirror Assembly 110 is such that it is suitable and safe to use in a vehicle.

Optionally, the One-Box Interior DMS Rearview Mirror Assembly may include a thermally conductive element located at and in intimate contact with a portion of the circuit board, so as to conduct and/or dissipate heat generated by the circuitry of the ECU or circuit board, such as by utilizing aspects of the mirror assemblies described in U.S. Pat. No. 7,855,755, which is hereby incorporated herein by reference in its entirety. The thermally conductive element may comprise any suitable thermally conductive material, such as a metallic material or thermally conductive plastics or the like. Optionally, the thermally conductive material comprises a thermally conductive polyphenylene sulfide (PPS), such as a COOLPOLY® E5101 Thermally Conductive Polyphenylene Sulfide commercially available from Cool Polymers, Inc. of Warwick, R.I. The thermally conductive element is formed, such as via molding or the like, and positioned at the rear of the mirror casing, such as at or within apertures or openings formed or established at the rear of the mirror casing.

Optionally, the thermally conductive element may be molded, such as via injection molding or the like, to the desired form so that a rear or exterior surface of the thermally conductive elements match or substantially match the exterior surface of the mirror casing at the area where the thermally conductive element is located. The thermally conductive element thus may be injection molded, and may be molded with selected or different pigments and/or materials to provide different colors and/or textures to substantially match the exterior surface of the mirror casing so as to be substantially not visible or discernible to the consumer. Preferably, the thermally conductive material is loaded with the likes of graphite or other suitable conductive materials for enhanced conductivity. U.S. Pat. No. 7,855,755 (which is hereby incorporated herein by reference in its entirety) discloses thermally conductive elements and materials suitable for thermal management of heat generated within the mirror head of a One-Box Electrochromic Interior DMS Rearview Mirror Assembly. Furthermore, should thermal management of heat generated within the mirror head of a One-Box Electrochromic Interior DMS Rearview Mirror Assembly require active cooling, a cooling fan attached at a lower housing portion of the mirror housing that directs airflow between heat dissipating fins of an outer side of the housing (and preferably with the heat dissipating fins being in thermal conductive connection via a thermal element with a heat generator(s) disposed in the mirror head)), such as are disclosed in U.S. Patent Publication Nos. US-2021/0368082 and/or US-2021/0306538 (which are hereby incorporated herein by reference in their entireties), can be used.

Optionally, the thermally conductive element or elements may comprise a metallic material, such as a magnesium material or other suitable heat sink material. For example, a magnesium alloy material such as Magnesium AM40A-F or other suitable metallic material or metal alloy material may be implemented to achieve the desired heat transfer and dissipation. The metallic thermally conductive element or elements may be die cast (or otherwise formed) to the desired form and may be formed and contoured to substantially match the exterior surface of the mirror casing so as to reduce the discernibility of the thermally conductive element at the mirror casing. Optionally, and desirably, the metallic thermally conductive element may be painted or coated at its outside surface to color match the plastic of the mirror casing and thus at least partially or substantially covertly camouflage the presence of the thermally conductive element at the exterior mirror casing. Optionally, the metallic thermally conductive element may be powder coated for durability. Any exterior coating or paint layer or skin layer at the outer surface of the thermally conductive element preferably comprises a thermally conductive material or paint as well so as to enhance the heat transfer and dissipation of the heat through the thermally conductive element and to the exterior of the mirror casing. Optionally, and desirably, a plastic grating or vent-like structure or grill may at least partially cover the outer surface of the heat sink or thermally conductive element so that it is difficult for a person's hand to come in contact with the actual surface of the thermally conductive element in order to reduce the possibility of a person experiencing discomfort if the person touches the thermally conductive element after the display has been activated and in use for a prolonged period of time. Such a grating or vent or grill allows for air flow and heat dissipation at the heat sink and also may shield or shadow the heat sink at or near the windshield to reduce solar loading at the heat sink, such as may otherwise occur on a sunny day.

During operation of the DMS/OMS functions, up to 10 Watts or more of heat may be generated. For example, the ECU may generate 7.5 Watts, the pulsing of the LEDs may generate 2 Watts, and operation of the camera may generate 0.5 Watts. The LEDs are pulsed on and off so power dissipation is less than if they are continuously powered [the LEDs may be PWM controlled at a pulse rate of, for example, 4 ms (a 12% duty cycle when the DMS camera captures image data at 30 frames per second)]. The heat generated by the various electronic components within the mirror head (such as the DMS SoC chip running the DMS software/algorithms or such as the near-IR light sources) is dissipated by the heatsink/chassis to cool the electrical components in the mirror head and to spread heat and dissipate heat at the housing (to reduce touch temps). The touch or surface temperature at the housing is preferably less than or equal to 50 degrees C. Including vents at the housing helps to reduce the touch temperatures. The mirror head thus includes heat spreading and heat exchanging (of heat to exterior the mirror head) functions.

Figure 63A:
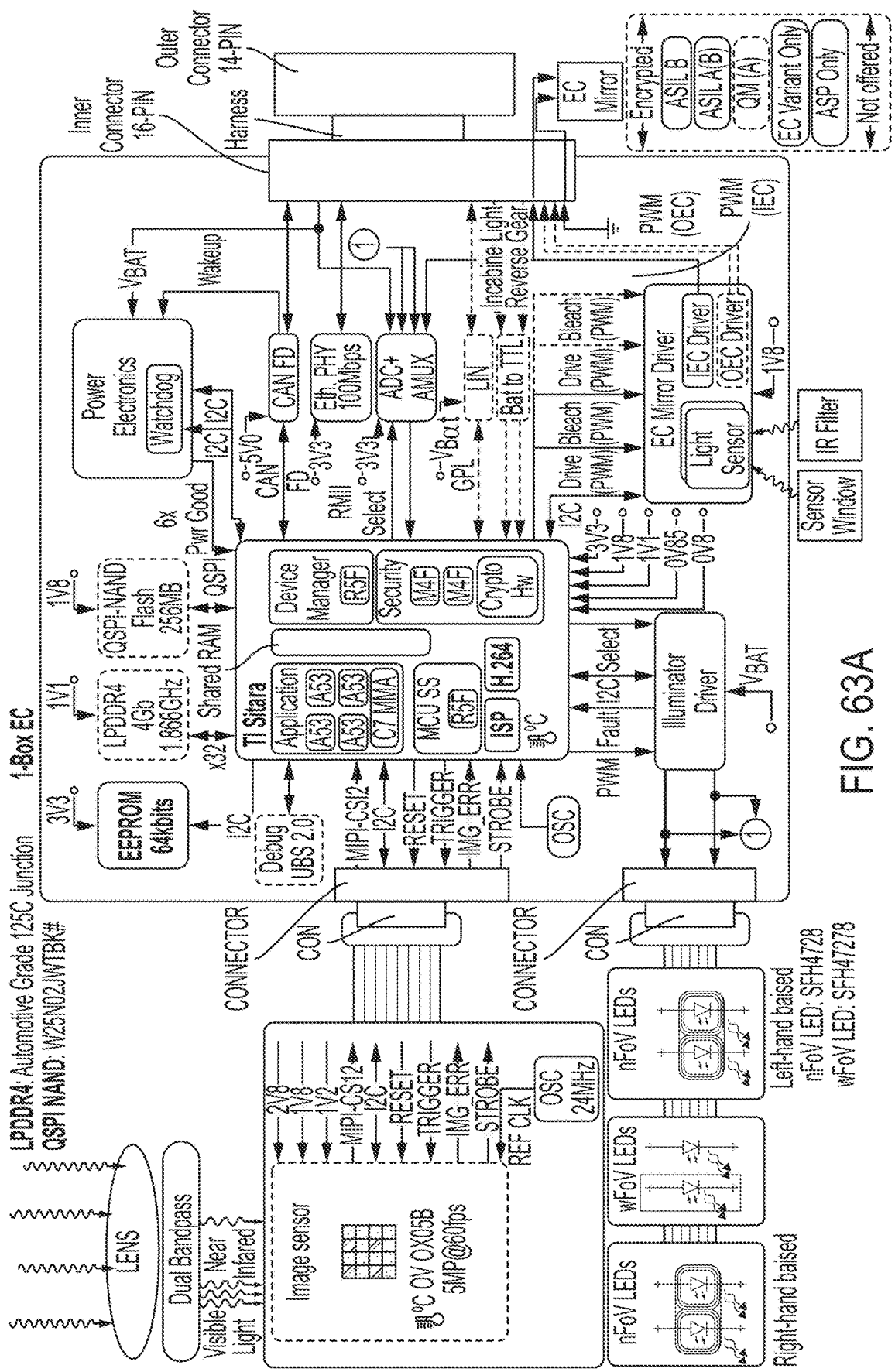
FIG. 63A is a schematic of the combined electrochromic (EC) dimming circuitry and DMS system of the One-Box Electrochromic Interior DMS Rearview Mirror Assembly.

FIG. 63A is a schematic of the combined electrochromic (EC) dimming circuitry and DMS system of One-Box Electrochromic Interior DMS Rearview Mirror Assembly 110. Note that in place of an electrically dimmable EC mirror reflective element, another type of electro-optic mirror reflective element can be used (for example, a liquid crystal mirror reflective element such as is disclosed in U.S. Pat. Nos. 10,166,926 and 9,493,122, which are both hereby incorporated herein by reference in their entireties). Also, for a One-Box DMS Prismatic Interior Rearview Mirror Assembly, the socket 15 of the One-Box Electrochromic Interior DMS Rearview Mirror Assembly 110 would be replaced with a toggle mechanism and mount; EC mirror reflective element 1 of the One-Box Electrochromic Interior DMS Rearview Mirror Assembly 110 would be replaced with a prismatic glass substrate coated on its second surface with a transflector that reflects and transmits visible light and that transmits near-IR radiation; and housing 18 of the One-Box Electrochromic Interior DMS Rearview Mirror Assembly 110 would be replaced with one having a hole for a toggle/tab.

The One-Box DMS Interior Rearview Mirror Assembly 110 comprises a plurality of near-IR light emitting sources. The near-IR light sources may comprise a plurality of near-IR light emitting diodes (LEDs) or near-IR emitting vertical-cavity surface-emitting lasers (VCSEL), such as a bank or cluster or set of light sources such as LEDs or VCSEL lasers. The near-IR light sources include a first wide field of view (wFOV) light source, a second narrow field of view (nFOV) light source to one side of the wFOV light source, and a third nFOV light source to the other side of the wFOV light source. The terms "nFOV" and "wFOV" as used herein refer to the field of illumination, or field of view or directivity or full width at half maximum (FWHM) or beam angle at 50% intensity of the respective nFOV light sources and wFOV light source.

Figure 63B:
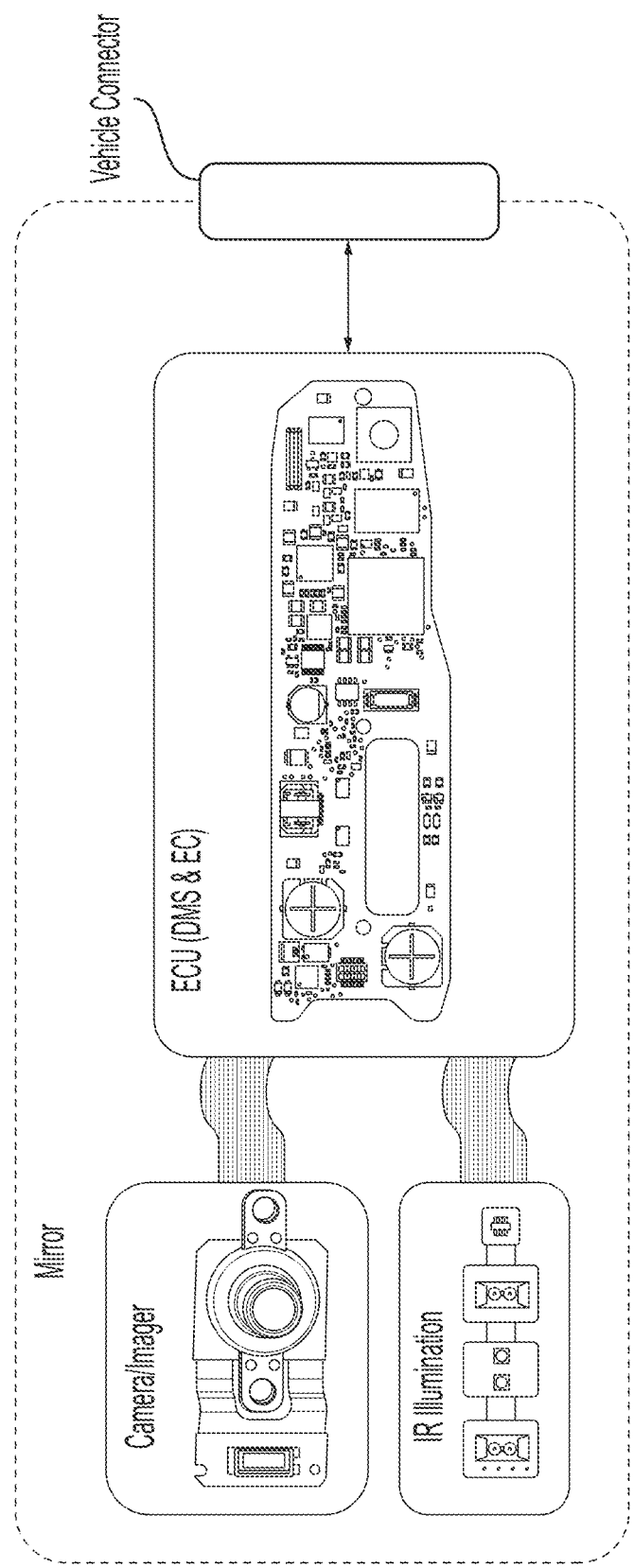
FIG. 63B is a schematic showing the electrical connection of the camera and IR light emitters with the ECU.
Figure 63C:
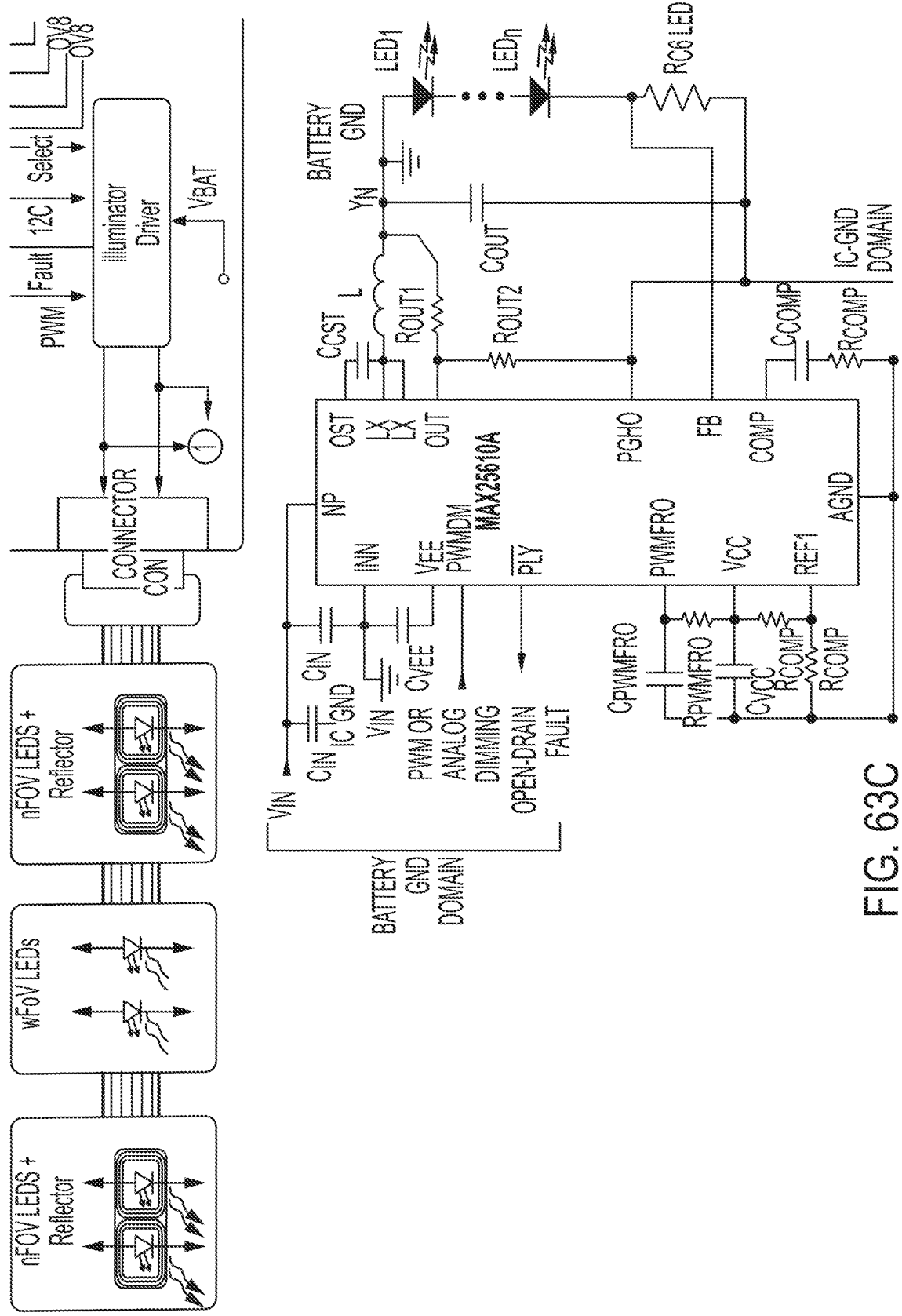
FIG. 63C is a schematic showing the electrical connection of the IR light emitters with the ECU.
Figure 63D:
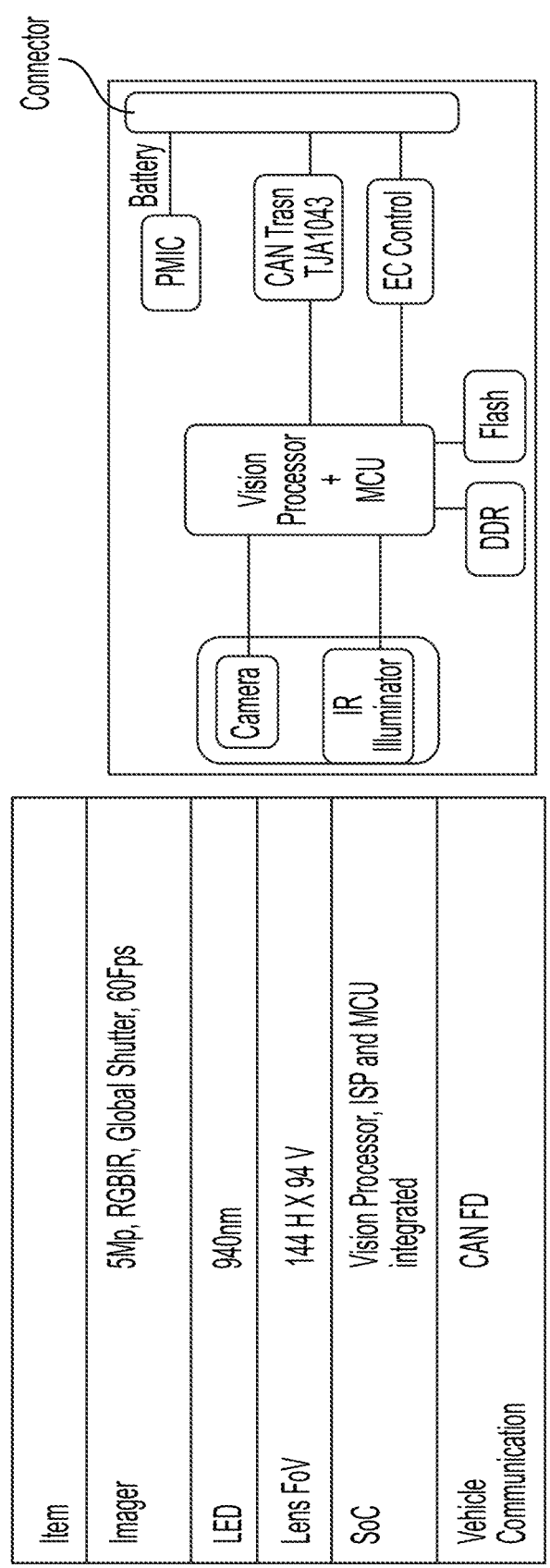
FIG. 63D is a schematic showing the combined electrochromic (EC) dimming circuitry and DMS system of the One-Box Electrochromic Interior DMS Rearview Mirror Assembly.
Figure 63E:
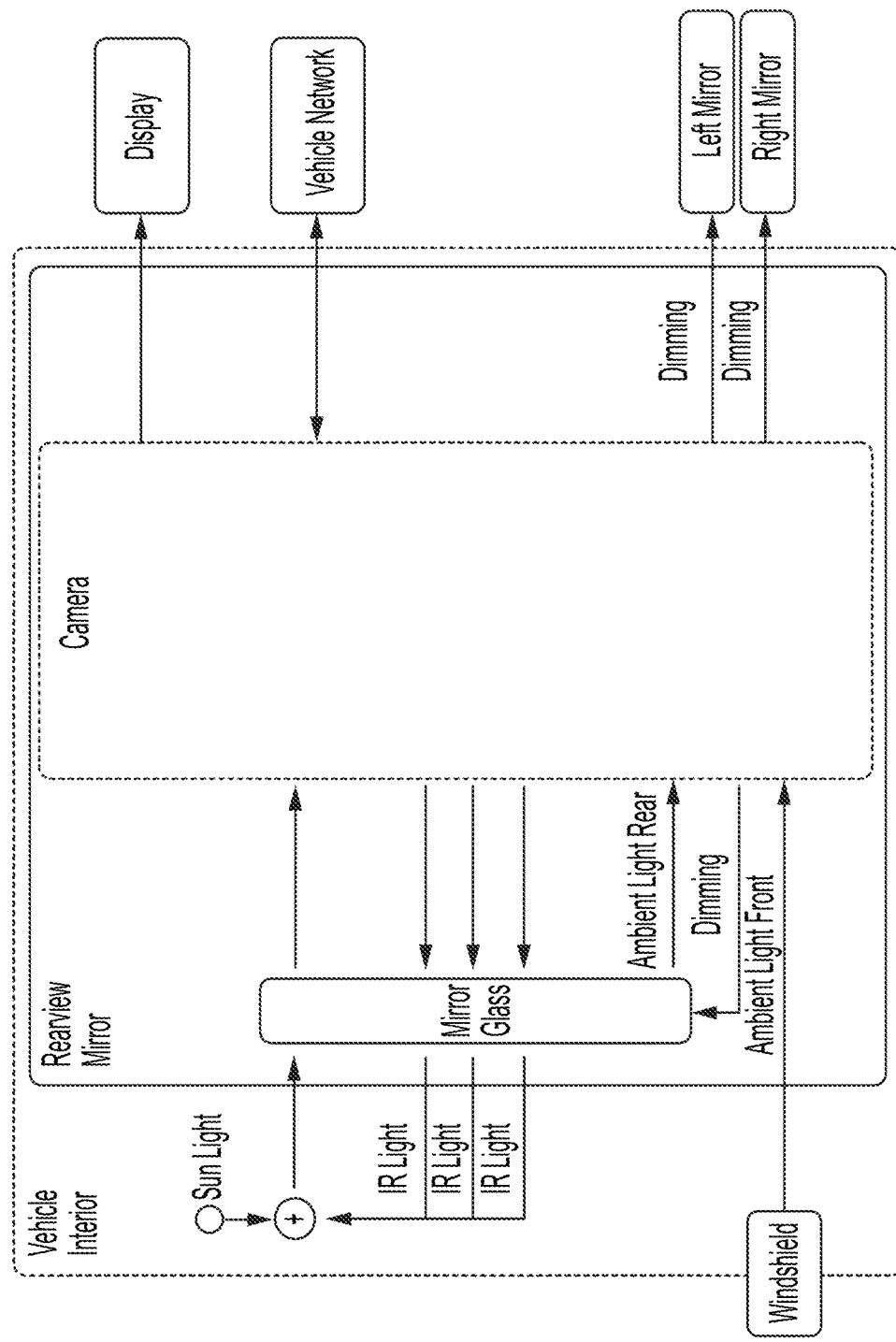
FIG. 63E is a schematic showing the cameras and sensors of the DMS system of the One-Box Electrochromic Interior DMS Rearview Mirror Assembly.
Figure 63F:
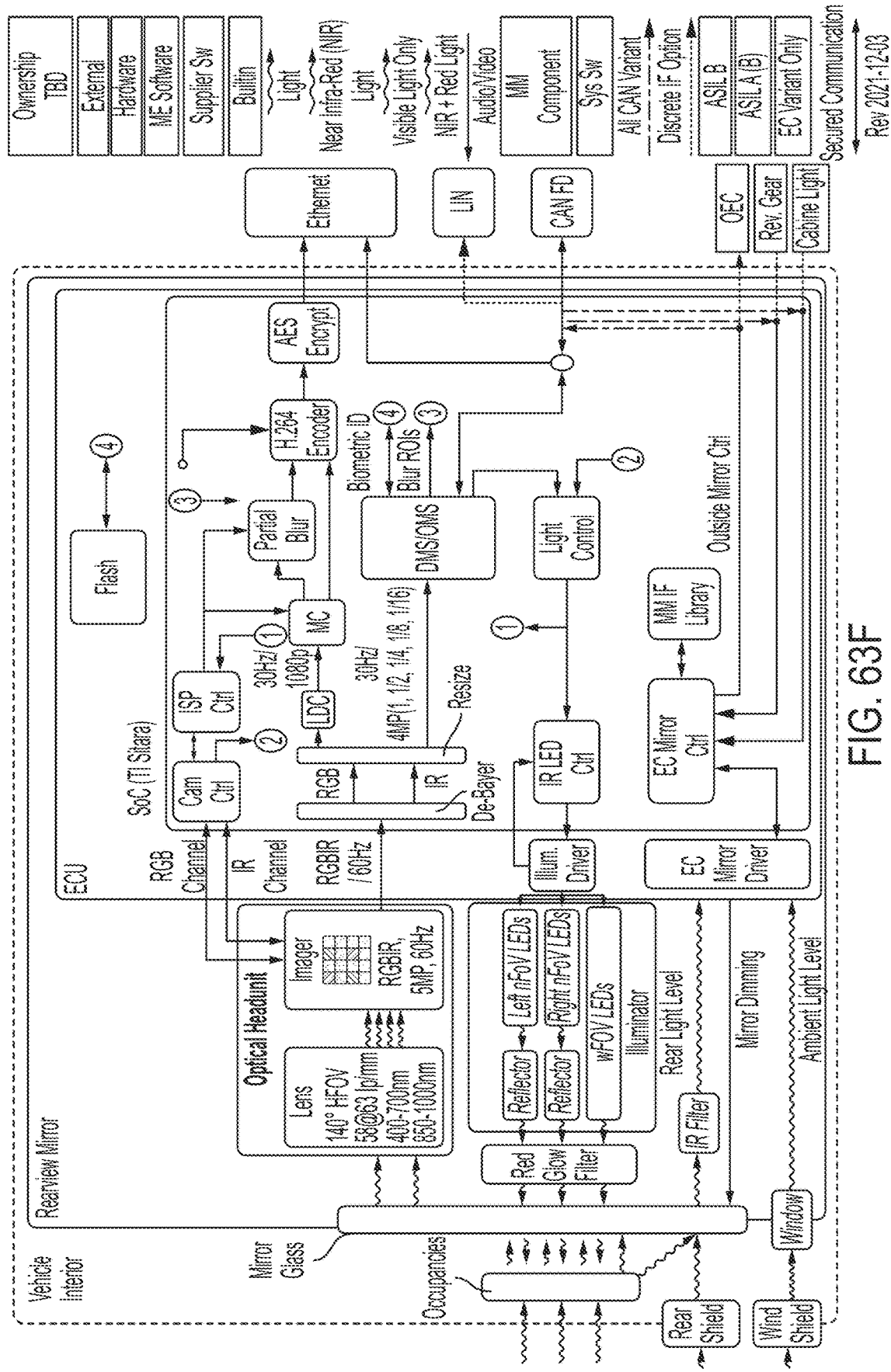
FIG. 63F is a schematic showing the combined electrochromic (EC) dimming circuitry and DMS system of the One-Box Electrochromic Interior DMS Rearview Mirror Assembly.
Figure 63G:
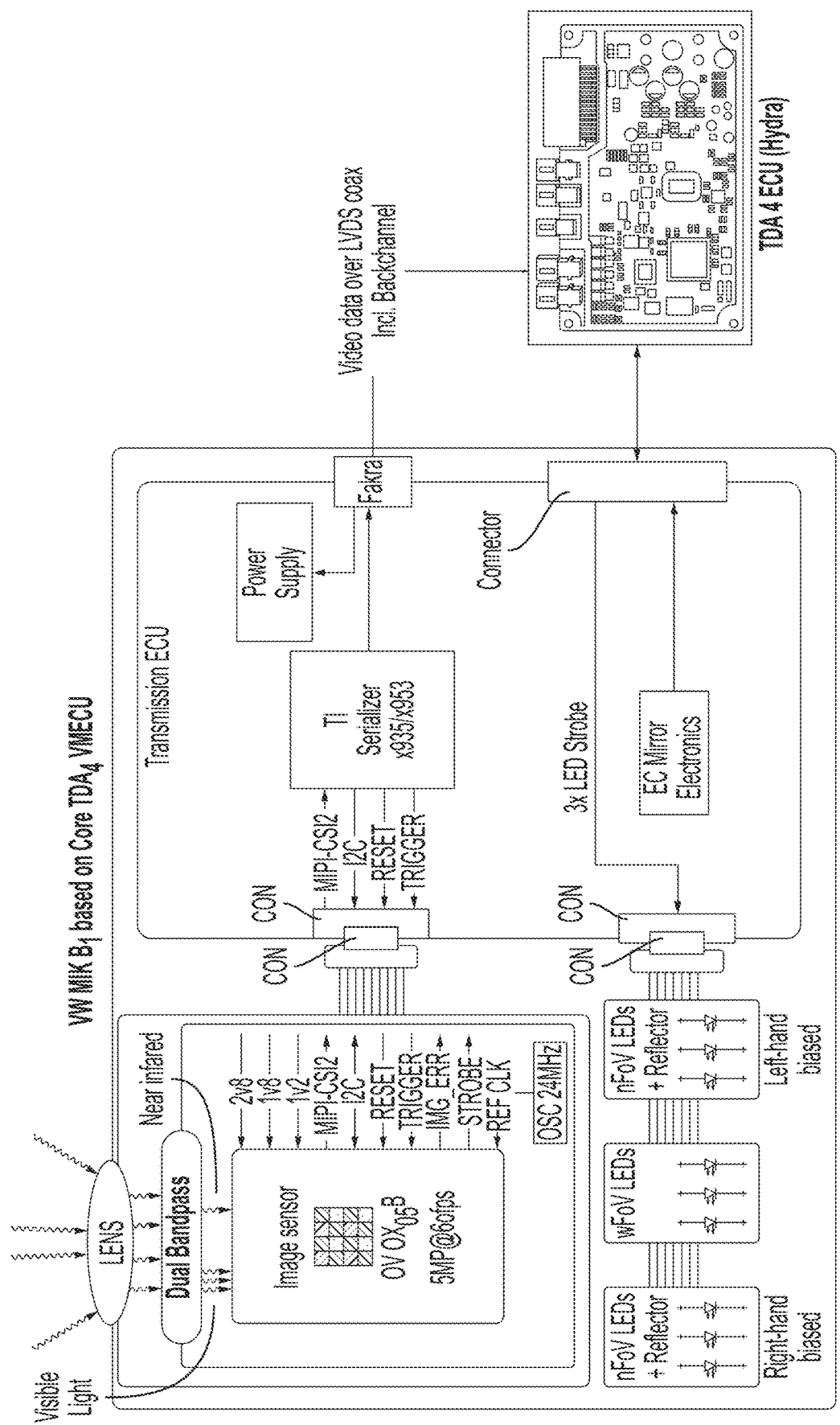
FIG. 63G is a schematic showing circuitry of the One-Box Electrochromic Interior DMS Rearview Mirror Assembly.

As can be seen in FIGS. 63A-63C, a bank or cluster or set of two (or more) narrow field of view (nFOV) near-IR emitting LEDs (which may be horizontally or vertically arranged, or that can be arranged in a matrix of rows and columns or otherwise arranged) is disposed within (or at least partially surrounded by) a near-IR light reflector (e.g., a 14.1 mm×6.92 mm×6.5 mm reflector, such as available from CoreLED Systems, LLC, of Livonia, MI) on a first rigid PCB that board-to-board connects via a flexible multiwire planar ribbon cable (comprising a plurality of individual conducting wires, such as, for example, four wires, lying flat and parallel to one another) connection to a second rigid PCB. A bank or cluster or set of two (or more) wide field of view (wFOV) near-IR emitting LEDs (which may be horizontally or vertically arranged, or that can be arranged in a matrix of rows and columns or otherwise arranged) is disposed on the second rigid PCB. The second rigid PCB connects via a flexible multiwire planar ribbon cable (comprising a plurality of individual conducting wires lying flat and parallel to one another) connection to a third rigid PCB. A bank or cluster or set of two (or more) narrow field of view (nFOV) near-IR emitting LEDs (which may be horizontally or vertically arranged, or that can be arranged in a matrix of rows and columns or otherwise arranged) is disposed within a reflector on the third rigid PCB. The third rigid PCB comprises a flexible multiwire planar ribbon cable that terminates in an electrical connector that connects with a corresponding electrical connector of the PCB of ECU 6. Although shown in some Figures as a set of three near-IR light emitting light sources (an LHD nFOV light source, a wFOV light source, and a RHD nFOV light source) on individual rigid PCBs interconnected via flexible ribbon connection, other disposition of the respective illumination sources in the mirror head is contemplated. For example, all the light sources could be on one PCB, or two banks of light sources may be on one PCB and one bank of light sources may be on another PCB, etc. The reflectors may comprise stamped polished about 0.01 inch thick 260½ hard temper brass that may be post tin plated (e.g., at 5 microns Sn over Cu flash), or other suitable near-IR light reflecting material (such as aluminum) that may be surface mounted/soldered at the respective LED PCBs to guide or direct or concentrate or collimate the near-IR light emitted by the respective LEDs toward the appropriate driver or passenger region or cabin region in the vehicle.

Figure 110:
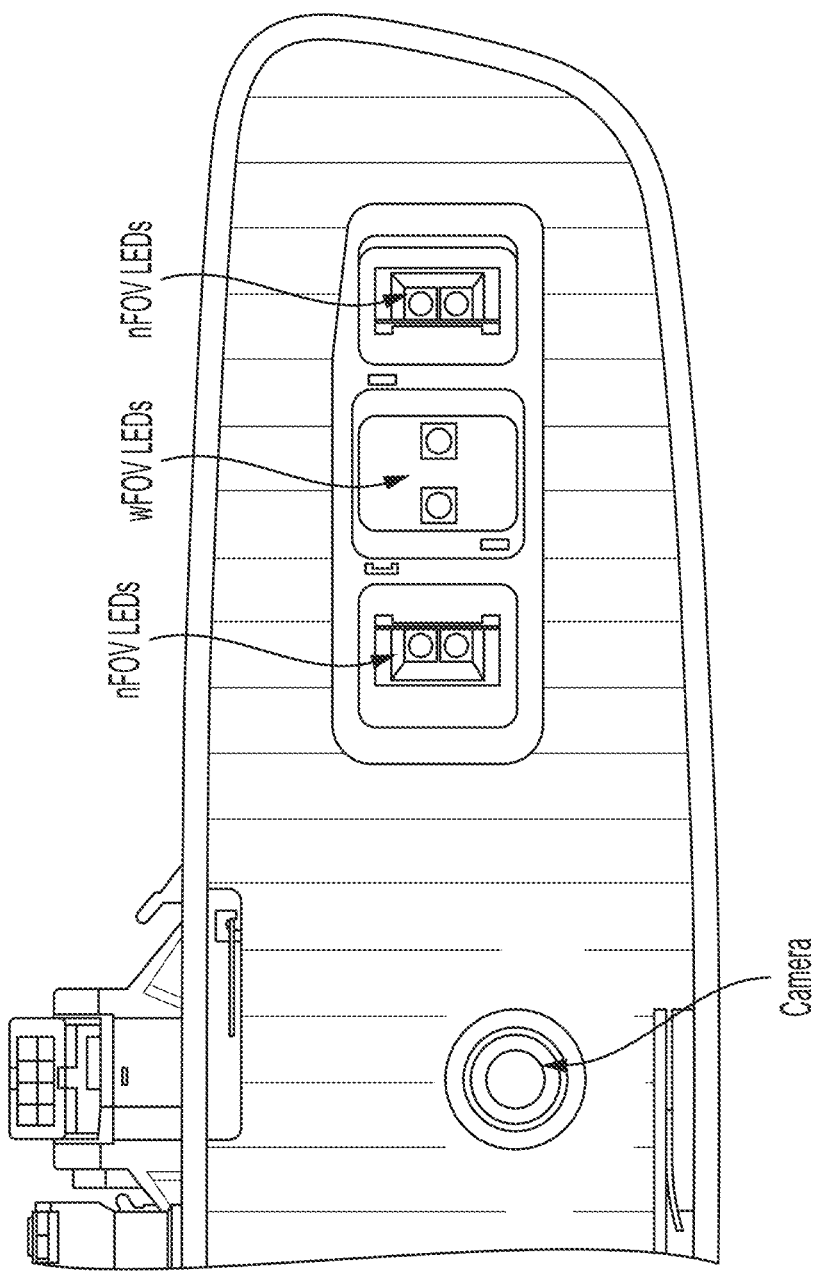
FIG. 110 shows the arrangement of the first, second and third near-IR illumination sources at the right side of the mirror head (to the right of the camera) as viewed by a driver of the equipped vehicle.

As shown in FIG. 110, the wFOV LEDs are horizontally arranged one beside the other and spaced apart, and the nFOV LEDs are vertically arranged one above the other and spaced closer together (and circumscribed or surrounded by the respective reflector). In the illustrated embodiment of FIG. 110, the LHD and RHD sets of nFOV LEDs each comprise two LEDs that are stacked vertically with each set having a respective reflector. As can be seen in FIG. 110, the horizontally arranged wFOV LEDs are spaced further apart than the vertically arranged nFOV LEDs. The LEDs of each set are stacked vertically to reduce the overall distance to the red glow filter/mirror reflective element so that the aperture (the hole through the attachment plate and the hole through the tape that attaches the mirror reflective element to the attachment plate) is as small as possible. The arrangement of the wFOV LEDs and the nFOV LEDs can reduce cost and packaging space.

The illuminator electrical driver (see FIG. 63C) drives the LEDs and functions to prevent a surge (e.g., 2.3 A surge) on the power supply from the vehicle by storing energy in a capacitor (see the exemplary schematic of the illuminator driver of FIG. 63C). The illuminator electrical driver boosts the voltage (24V+) of a storage capacitor during the "off time" of the LEDs, and releases that stored energy into the LEDs during the "on time." This allows for a lower average current draw from the vehicle.

Figure 112:
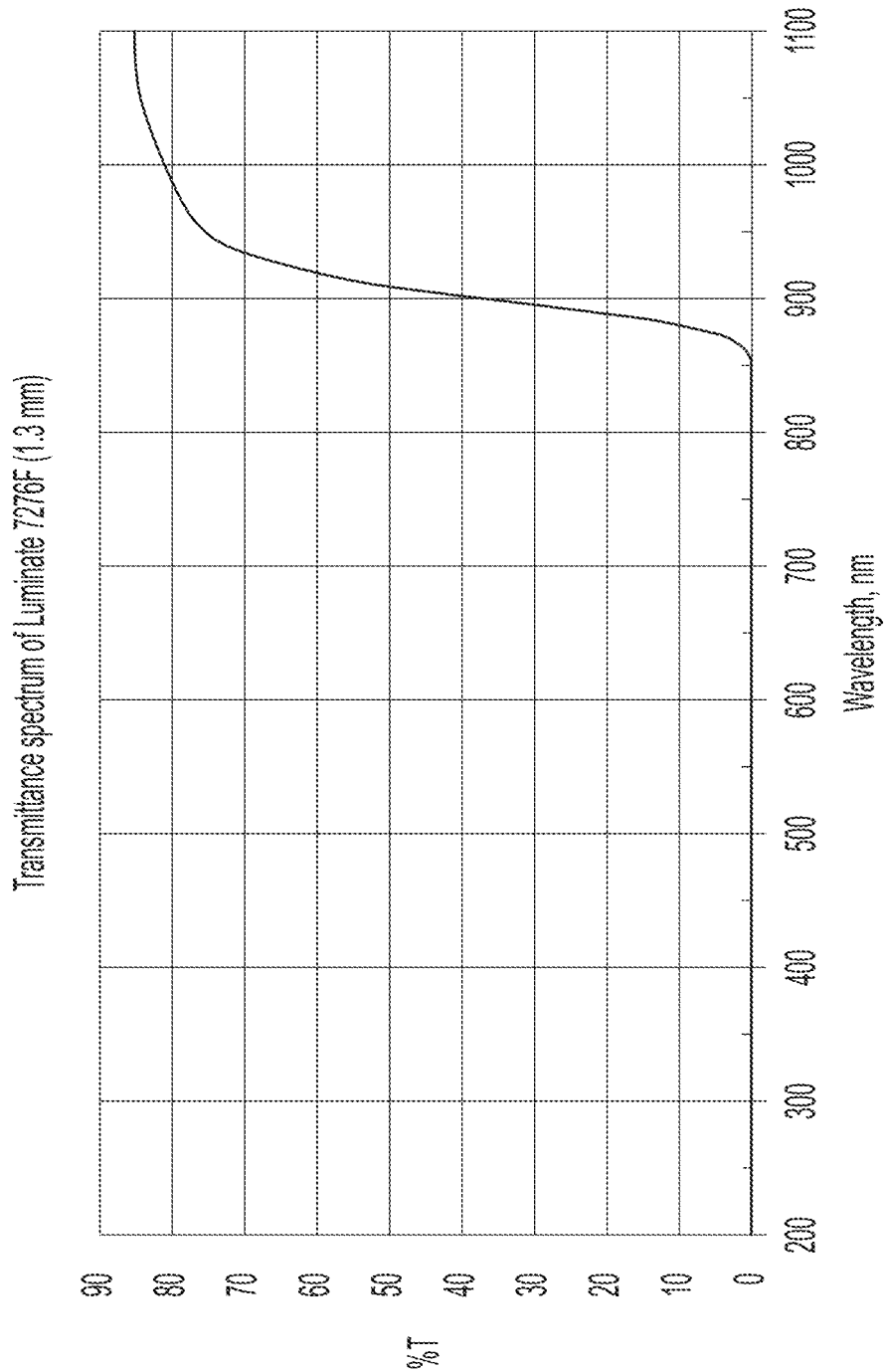
FIG. 112 shows the transmittance spectrum of Luminate 7276F.

The One-Box DMS Interior Rearview Mirror Assembly includes filters at the LEDs to attenuate or block visible light. For example, the LED filters may comprise a Luminate™ 7276F visible opaque compound that is black and that blocks or filters light from 200-860 nm, and allows transmittance of light greater than 990 nm (see FIG. 112). The filters comprise a ready-to-mold thermoplastic that has an appearance of black polycarbonate pellets. The target transmittance values are 5% at 875 nm, 50% at 910 nm, 80% at 986 nm, and 85% at 1000 nm. The filters are molded into a rectangular plate or, as desired, into another shape. The plate thickness that transmits the near-IR at 940 nm is at least 0.5 mm thick in its thickness dimension, more preferable is at least 1 mm thick and most preferable is at least 1.25 mm thick, but is preferably less than 6 mm thick, more preferable is less than 4 mm thick and most preferable is less than 2.5 mm thick. For example, the filter may be 63.02 mm wide× 23.6 mm tall×1.3 mm thick. The LED filters enhance covertness of the system by limiting visible light to avoid any visible light that may be emitted by the near-IR emitting LEDs from being visible through the mirror reflective element (and thus reduces or avoids LED red glow being visible at the mirror reflective element when the LEDs are powered). The LED filters also block or limit incursion of ambient cabin light into the mirror head at the locations where the LEDs view through the EC Cell to see into the vehicle cabin.

The One-Box DMS Interior Rearview Mirror Assembly also includes an IR blocking filter in front of the EC glare sensor. The IR blocking filter at the EC glare sensor blocks a percentage of IR light from reaching the EC glare sensor. The EC glare sensor IR blocking filter may be 17.28 mm wide×11.85 mm tall×1.02 mm thick.

Figure 104A:
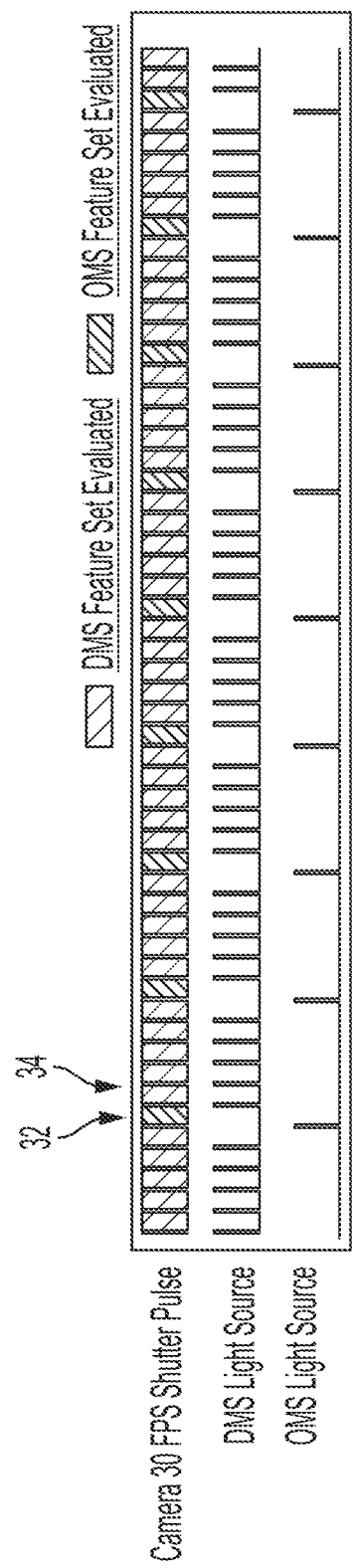
FIGS. 104A and 104B are schematic views of exemplary sequences of frames of image data for a driver monitoring system and an occupant monitoring system.
Figure 104B:
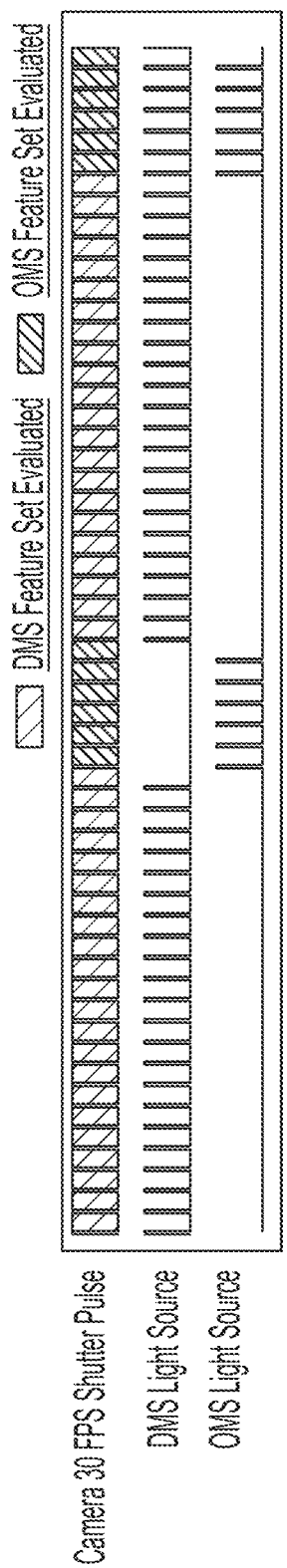
Figure 105:
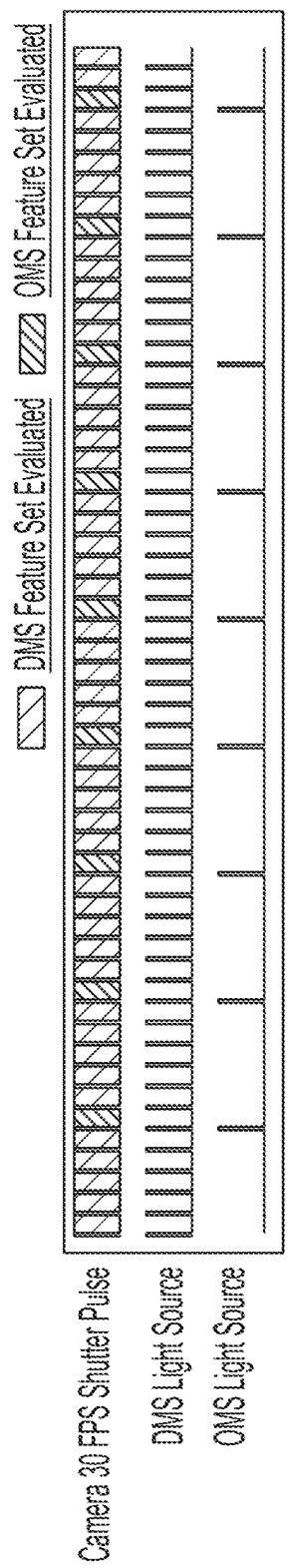
FIG. 105 is a schematic views of exemplary sequences of frames of image data for a driver monitoring system and an occupant monitoring system.

During operation of the One-Box DMS Interior Rearview Mirror Assembly, the circuitry ECU 6 controls the LEDs and camera. For example, the camera may capture image data at a frame capture rate of 60 frames per second (fps), and the LHD n-FOV LEDs, the w-FOV LEDs and the RHD n-FOV LEDs are pulse width modulated so that some frames of the captured image data are captured when some or all of the LEDs are powered. During DMS operation (and, for example, every other frame of image data), the LHD n-FOV LEDs and the w-FOV LEDs are pulsed on, and during OMS operation (and, for example, every tenth frame of image data), all of the LHD n-FOV LEDs, the w-FOV LEDs and the RHD n-FOV LEDs are pulsed on. Exemplary pulse patterns and image data frame capture rates are shown in FIGS. 104A, 104B and 105 and discussed below.

Cameras for likes of security applications typically concomitantly use near-IR floodlighting at around 850 nm IR. However, sensitivity of such conventional cameras decreases at longer wavelengths in the near-IR spectral region. Thus such conventional security cameras are not as sensitive to 940 nm light as they are to 850 nm light; such conventional security cameras can have 50% less range using 940 nm near-IR illuminators compared to when 850 nm near-IR illuminators are used. Moreover, although 850 nm IR is largely not visible to the human eye as "light", a slight red glow at the LED light source can be perceived. For the in-cabin DMS and ODS of the present invention, used of 940 nm near-IR illumination is preferred, and especially when the in-mirror camera has a Quantum Efficiency at 940 nm of at least 15%. Compared to illumination at 850 nm, any "red glow" perceivable by the human eye using 940 nm illumination is less, and thus covertness of the near-IR emitting light sources within the mirror head emitting through the mirror transflector is enhanced. Furthermore, water absorbs 940 nm near-IR light, and thus solar radiation exhibits a dip at 940 nm in its irradiation spectrum due to moisture in the atmosphere. Therefore, ambient solar lighting present in the cabin (and especially when driving on a sunny day in a convertible car with the top down) has a dip or valley at 940 nm which reduces any propensity of ambient solar lighting present in the cabin of the vehicle to interfere with DMS/ODS functionality.

Preferably, the nFOV LEDs comprise SFH 4728AS A01 OSLON® Black near-IR emitting (centroid wavelength of 940 nm)—50° LEDs available from OSRAM Opto Semiconductors GmbH, Leibnizstraße 4, D-93055 Regensburg Germany (see FIG. 64). With the One-Box DMS Interior Rearview Mirror Assembly 110 installed at a windshield portion or header portion of an equipped vehicle, the FOV for an OSLON Black Series (940 nm) LEDs is 50 degrees horizontal and 50 degrees vertical (without the reflector). With the reflector, the FOV or directivity or full width at half maximum (FWHM) or beam angle at 50% intensity of the nFOV LEDs is about 41 degrees vertical and 41 degrees horizontal. As operated in the One-Box DMS Interior Rearview Mirror Assembly 110, the forward current through each OSLON Black Series (940 nm) LED is at least 500 milliamps, more preferably at least 750 milliamps and most preferably is about 1,000 milliamps. FIG. 64 shows the Relative Spectral Emission and other characteristics of an SFH 4728AS A01 OSLON® Black near-IR emitting (centroid wavelength of 940 nm)—50° LED. Total radiant flux (measured with an integrating sphere) at a forward current of around 1 amp exceeds 1,000 mW/sr. Total radiant flux (with a forward current of around 5 amps and a pulse duration of around 100 us can exceed 5,000 mW. Forward current IF is a minimum of 10 mA and a maximum of max: 5 A. Power consumption $P_{tot}$ max. is around 5 W. With a forward current $I_F$ of 1 A and a pulse duration $t_p$ of 10 ms and at an ambient temperature $T_A$ of 25° C., (i) Peak wavelength $\lambda_{peak\ typ.}$ is 950 nm and (ii) Centroid wavelength $\lambda_{centroid\ typ.}$ is 940 nm. Spectral bandwidth at 50% $I_{rel,\ max}$ (FWHM) $\Delta\lambda$ typically is 37 nm. Half angle φ typically is 25°. Radiant intensity $I_e$ with a forward current through the LED of $I_F$=1.5 A and pulse $t_p$=100 μs typically is 1,980 mW/sr. Radiant intensity $I_e$ with a forward current through the LED of $I_F$=5 A and pulse $t_p$=100 us typically is 5,900 mW/sr. Radiant intensity $I_e$ with $I_F$=1 A and $T_p$=10 ms is 1,350 mW/sr. Radiant intensity $I_e$ with $I_F$=1 A and $T_p$=10 ms ranges from 1,120 to 1,800 mW/sr. Dimensions (L×W) of the active chip area typically is 1 mm×1 mm.

Preferably, the wFOV LEDs comprise SFH 47278AS A01 OSLON Black Series (940 nm)—130°×155° near-IR emitting (centroid wavelength of 940 nm) LEDs available from OSRAM Opto Semiconductors GmbH, Leibnizstraße 4, D-93055 Regensburg Germany (see FIG. 65). With One-Box DMS Interior Rearview Mirror Assembly 110 installed at a windshield portion or header portion of an equipped vehicle, the FOV or directivity or full width at half maximum (FWHM) or beam angle at 50% intensity of the wFOV LEDs (for the OSLON Black Series (940 nm) LEDs) is 155 degrees horizontal and 130 degrees vertical. FIG. 65 shows the Relative Spectral Emission and other characteristics of an SFH 47278AS A01 OSLON Black Series (940 nm)—130°×155° LED. Total radiant flux (measured with an integrating sphere) at a forward current of around 1 amp exceeds 1,000 mW/sr. Total radiant flux (with a forward current of around 5 amps and a pulse duration of around 100 us can exceed 1,500 mW. Forward current $I_F$ is a maximum of 1.5 A. Forward Current Pulsed at $t_p$≤450 μs; D≤0.005 is a maximum of 5 A. Power consumption $P_{tot}$ max. is around 5 W. With a forward current $I_F$ of 1 A and a pulse duration $t_p$ of 10 ms and at an ambient temperature $T_A$ of 25 degrees C., (i) Peak wavelength $\lambda_{peak\ typ.}$ is 950 nm and (ii) Centroid wavelength $\lambda_{centroid\ typ.}$ is 940 nm. Spectral bandwidth at 50% $I_{rel,\ max}$ (FWHM) $\Delta\lambda$ typically is 37 nm. Half angle φ (short axis) typically is 65 degrees; half angle φ (long axis) typically is 77.5 degrees. Radiant intensity $I_e$ with a forward current through the LED of $I_F$=1.5 A and pulse $t_p$=100 μs typically is 450 mW/sr. Total radiant flux $\varphi_e$ with $I_F$=1 A and with $t_p$=100 us typically is 1,340 mW. Total radiant flux $\varphi_e$ with $I_F$=1.5 A and with $t_p$=100 μs typically is 1,970 mW. Dimensions (L×W) of the active chip area typically is 1 mm×1 mm.

As operated in the One-Box DMS Interior Rearview Mirror Assembly 110, the forward current through each OSLON Black Series (940 nm) LED is at least 500 milliamps, more preferably at least 750 milliamps and most preferably is at least 1,000 milliamps.

The combination of nFOV and wFOV light sources allows the system to meet the illumination requirements for LHD & RHD by utilizing the different groups. For a LHD vehicle, the LHD nFOV and wFOV LEDs are the primary sources for Driver Monitoring, while the LHD nFOV, the wFOV, and the RHD nFOV LEDs are all used for Occupancy Monitoring to detect front and rear seat passengers, children in child seats, etc.

Irradiance (the radiant flux received by a surface per unit area) at the driver's head (and especially at the driver's eyes for drowsiness detection) is important, and especially during nighttime driving when the interior cabin is dark and where the DMS camera in the mirror head principally relies on near-IR illumination emitted by the near-IR light sources in the mirror head. A near-IR irradiance at the likes of the driver's eyes of at least 1 W/m² is preferred, with at least 1.8 W/m² more preferred and at least 2.5 W/m² most preferred (especially within the 99% eyellipse per SAE J194 for the particular driver seated in the driver's seat of a particular vehicle equipped with a One-Box DMS Interior Rearview Mirror Assembly), while a near-IR irradiance for occupancy detection at the likes of the front passenger-seat seating location of a front passenger of at least 0.15 W/m² is preferred, with at least 0.25 W/m² more preferred, and at least 0.4 W/m² most preferred, and a near-IR irradiance for occupancy detection at the likes of the rear seats of at least 0.1 W/m² is preferred, with at least 0.15 W/m² more preferred, and at least 0.2 W/m² most preferred.

Figure 107:
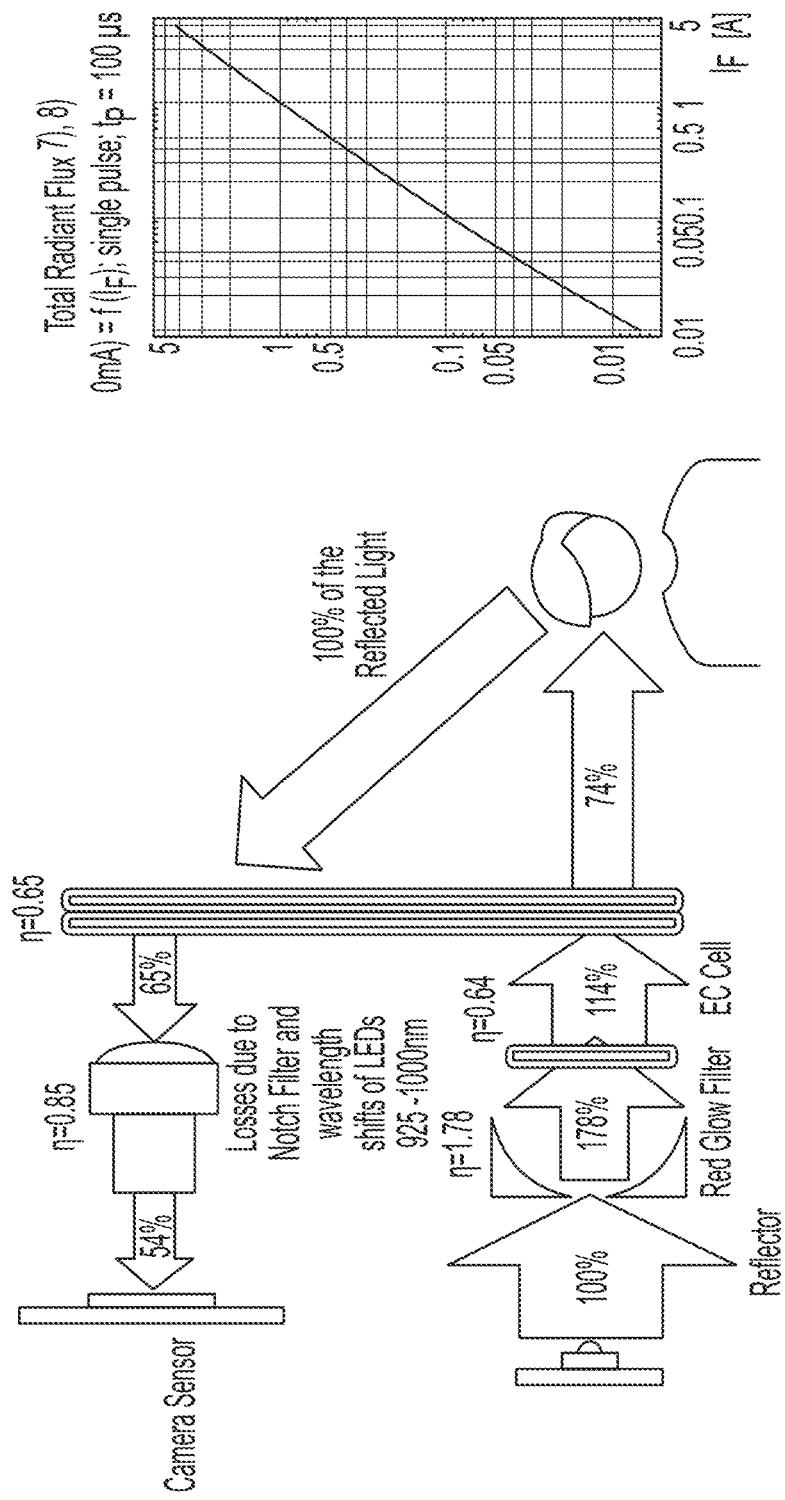
FIG. 107 shows the optical path of light emitted by the LEDs to the imager of the camera for the One-Box Interior DMS Mirror Assembly.

As shown in FIG. 107, the optical path of the light emitted by the LEDs and reflected by the reflector passes through the red glow filter and through the mirror reflective element to illuminate the driver head region, and reflects toward the camera, passing back through the mirror reflective element and the lens of the camera. The optical path (irradiance) of the narrow FOV (nFOV) LED at 100% LED power, is reduced so that only 74% is reaching the driver. However, as a worst-case scenario, the peak power has to be used. Thus, 178% LED Irradiance power needs to be used for the exposure limit. The irradiance is mostly proportional to the current running through the LED.

Figure 2:
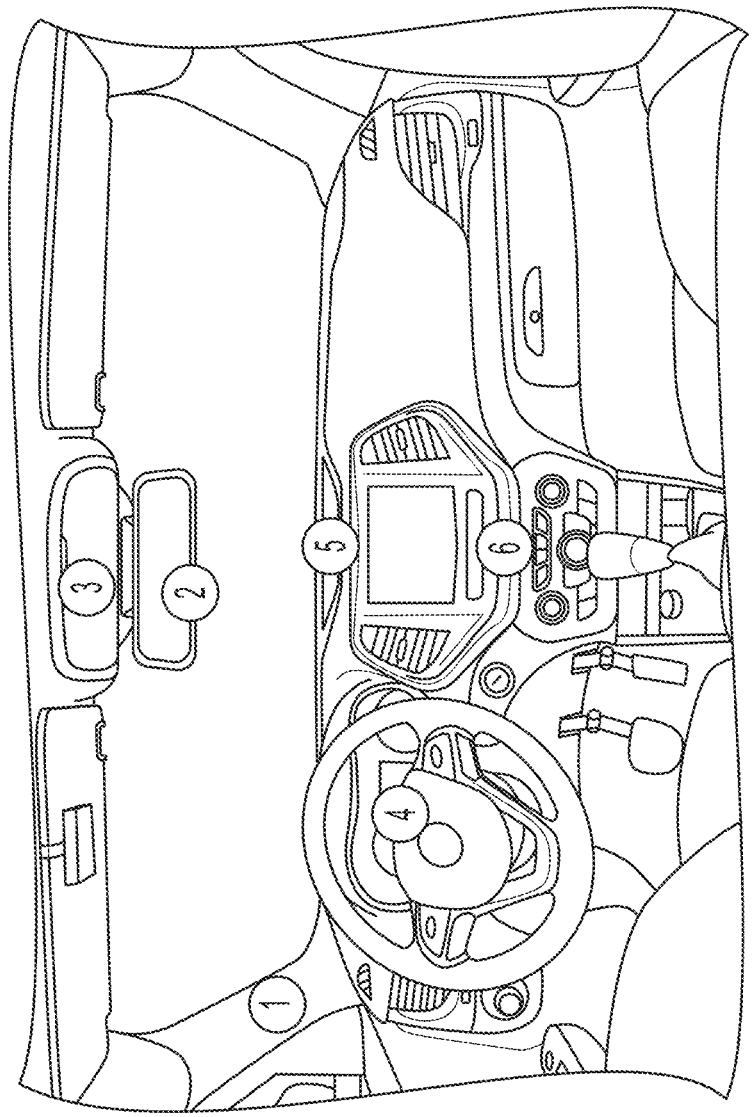
FIG. 2 is a perspective view of the interior cabin of the vehicle.
Figure 3:
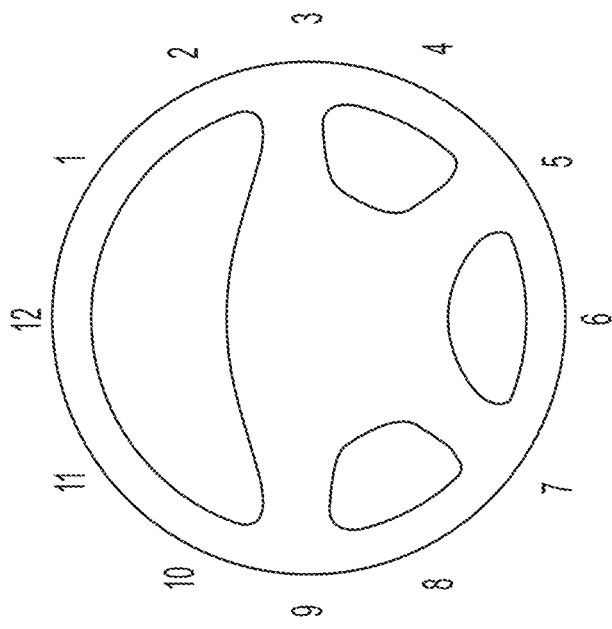
FIG. 3 is a plan view of a steering wheel, showing possible hand positions for the driver's hands.
Figure 86A:
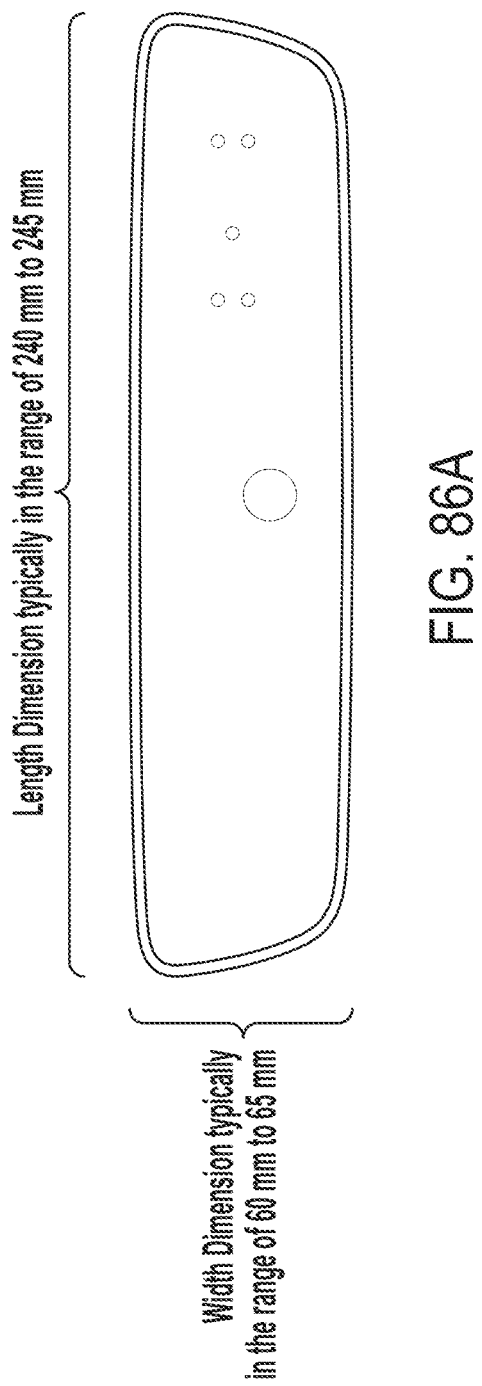
FIG. 86A-86C are schematics showing exemplary angles and dimensions of the One-Box Interior DMS Mirror Assembly in the LHD vehicle.
Figure 86B:
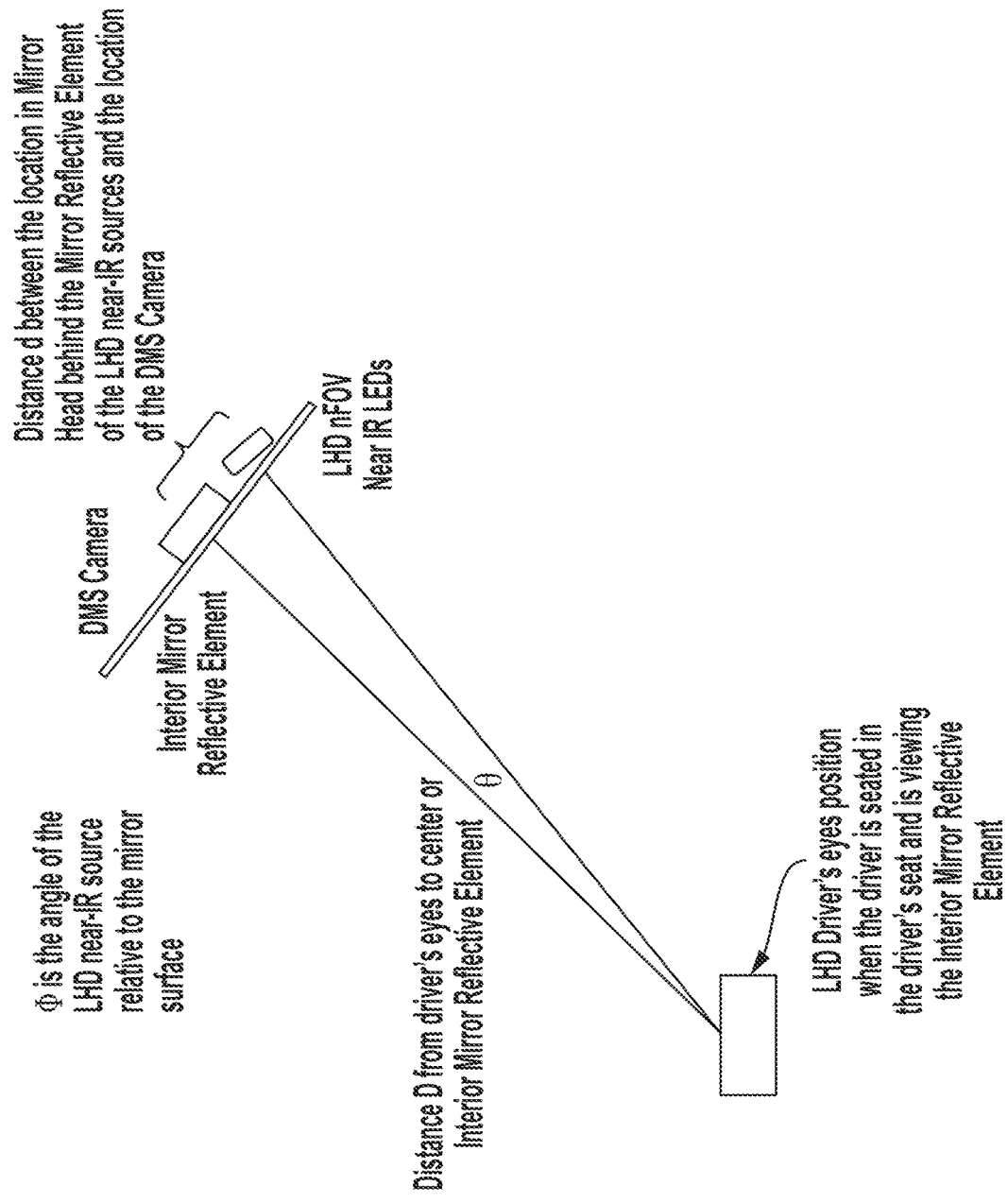
Figure 86C:
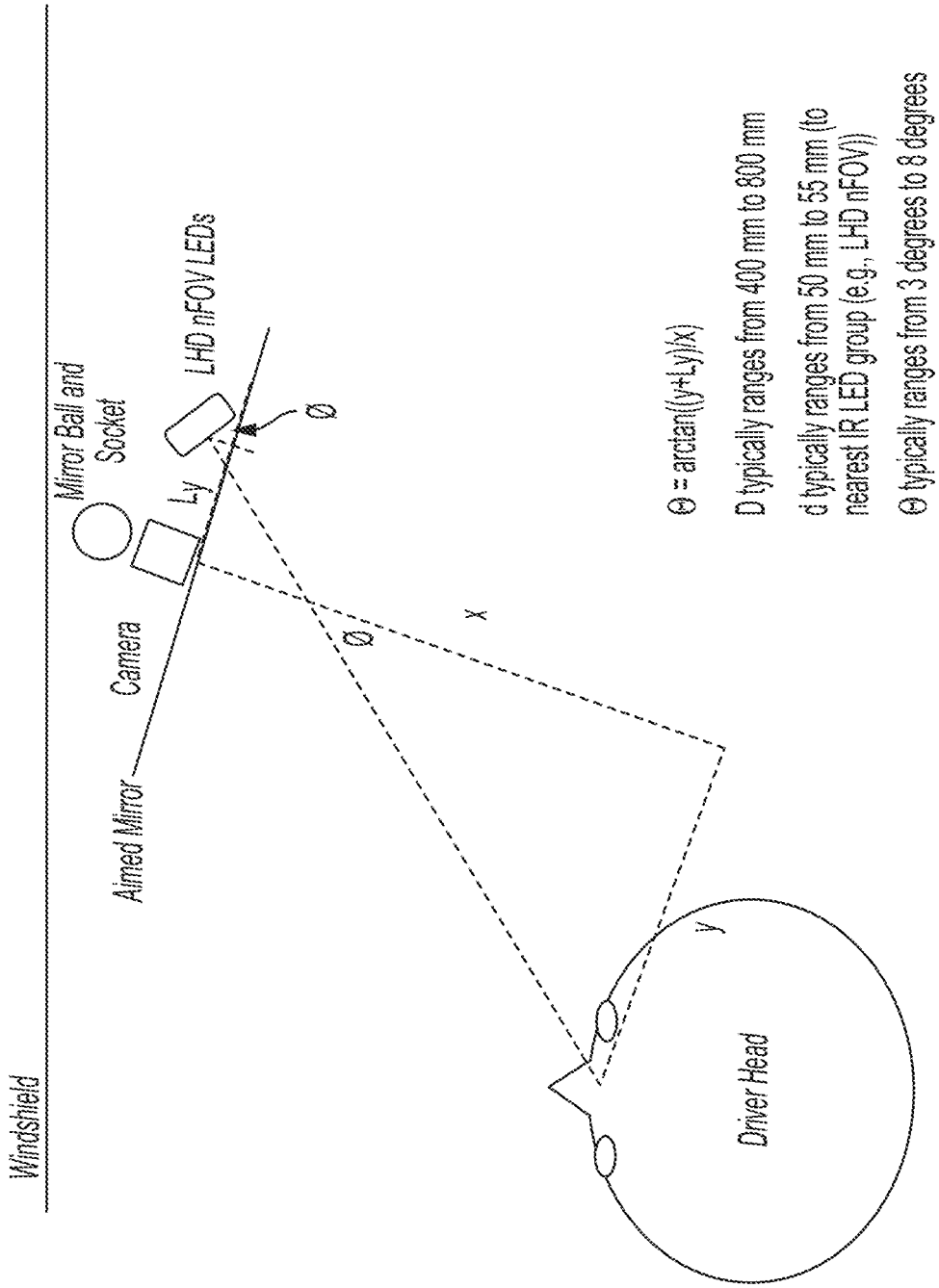
Figure 86D:
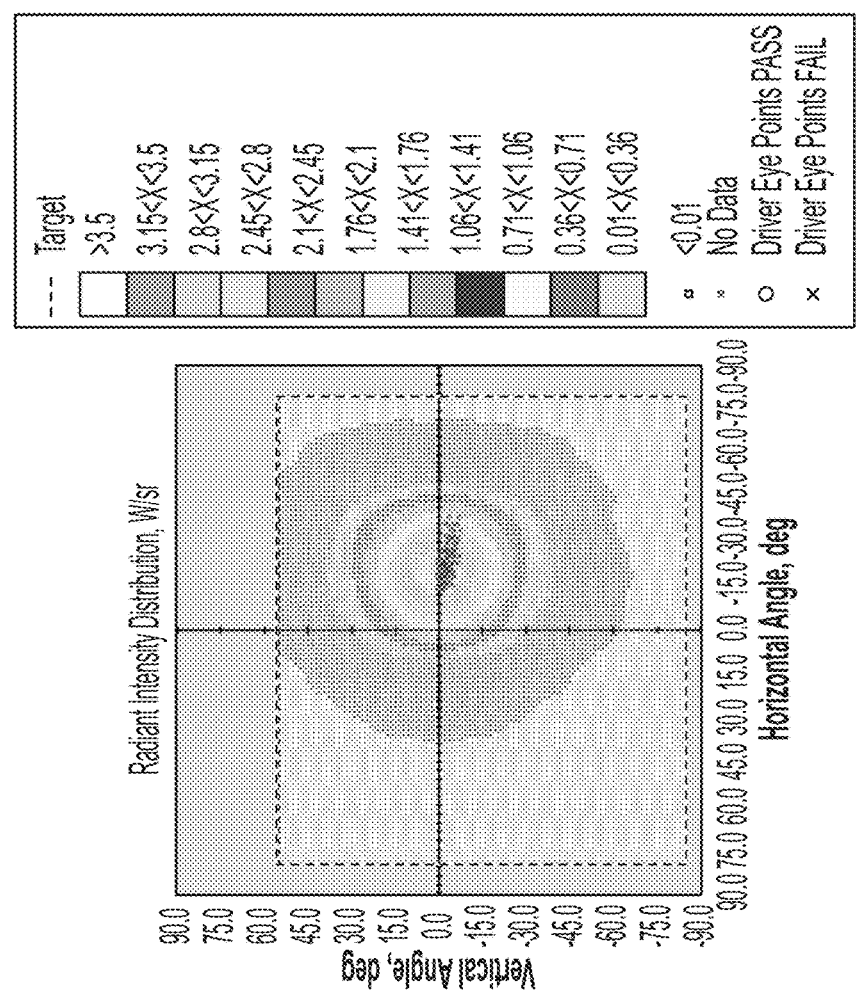
Figure 1:
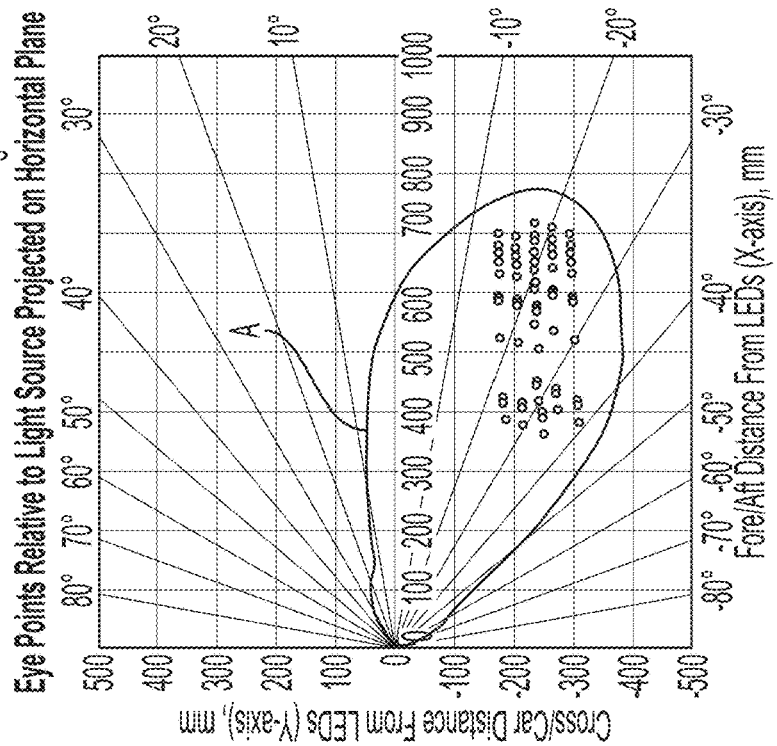
Figure 88A:
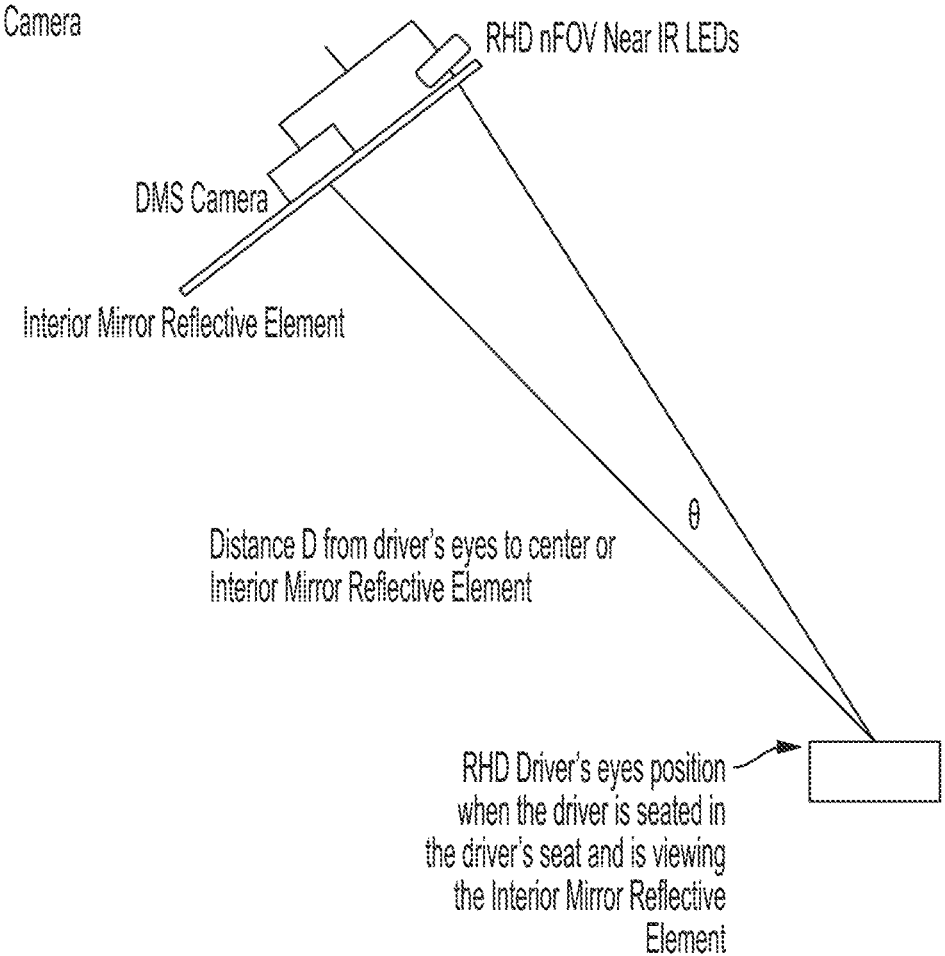
FIGS. 88A and 88B are schematics showing exemplary angles and dimensions of the One-Box Interior DMS Mirror Assembly in the RHD vehicle.
Figure 88B:
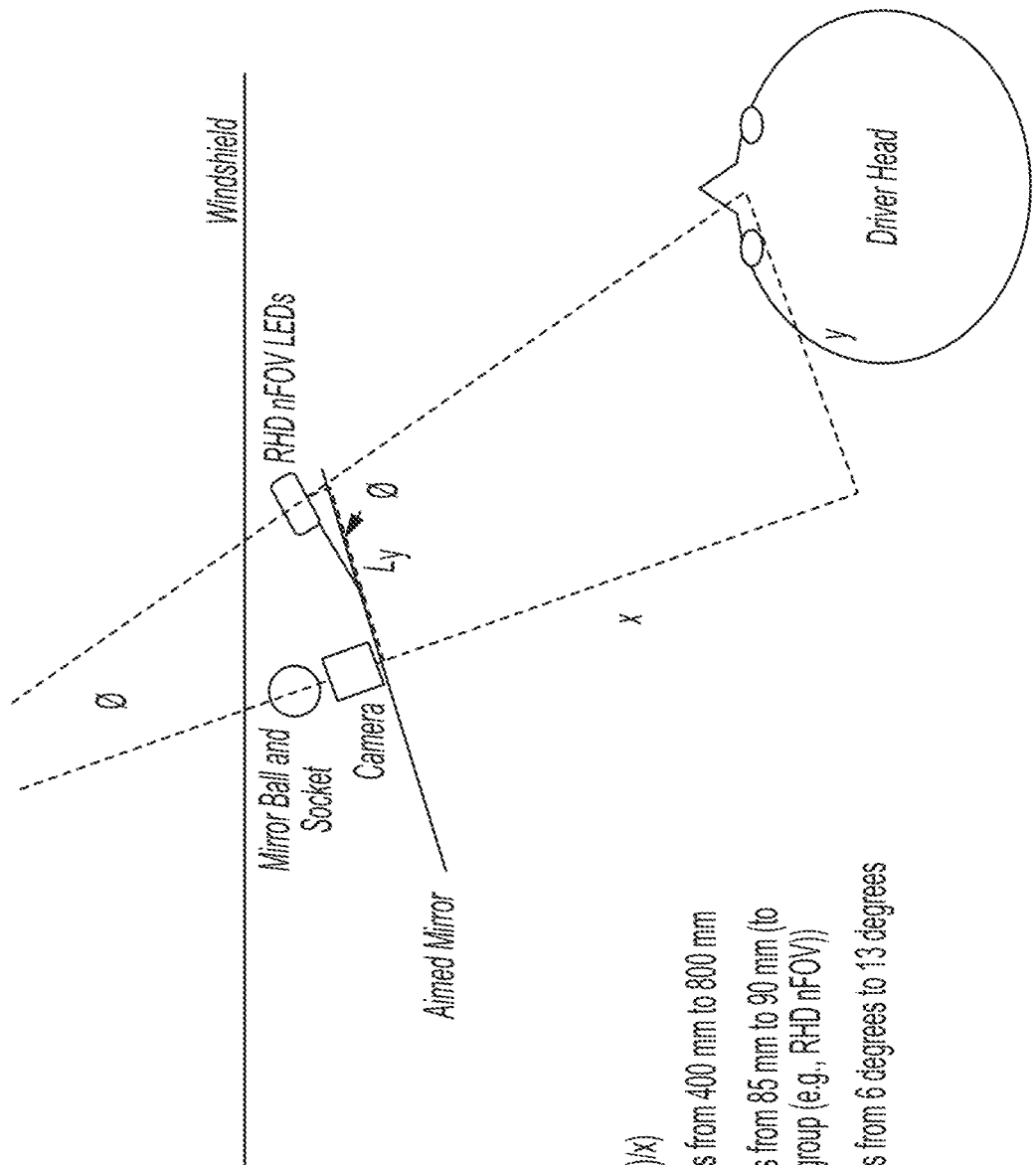
Figures 1, 88C:
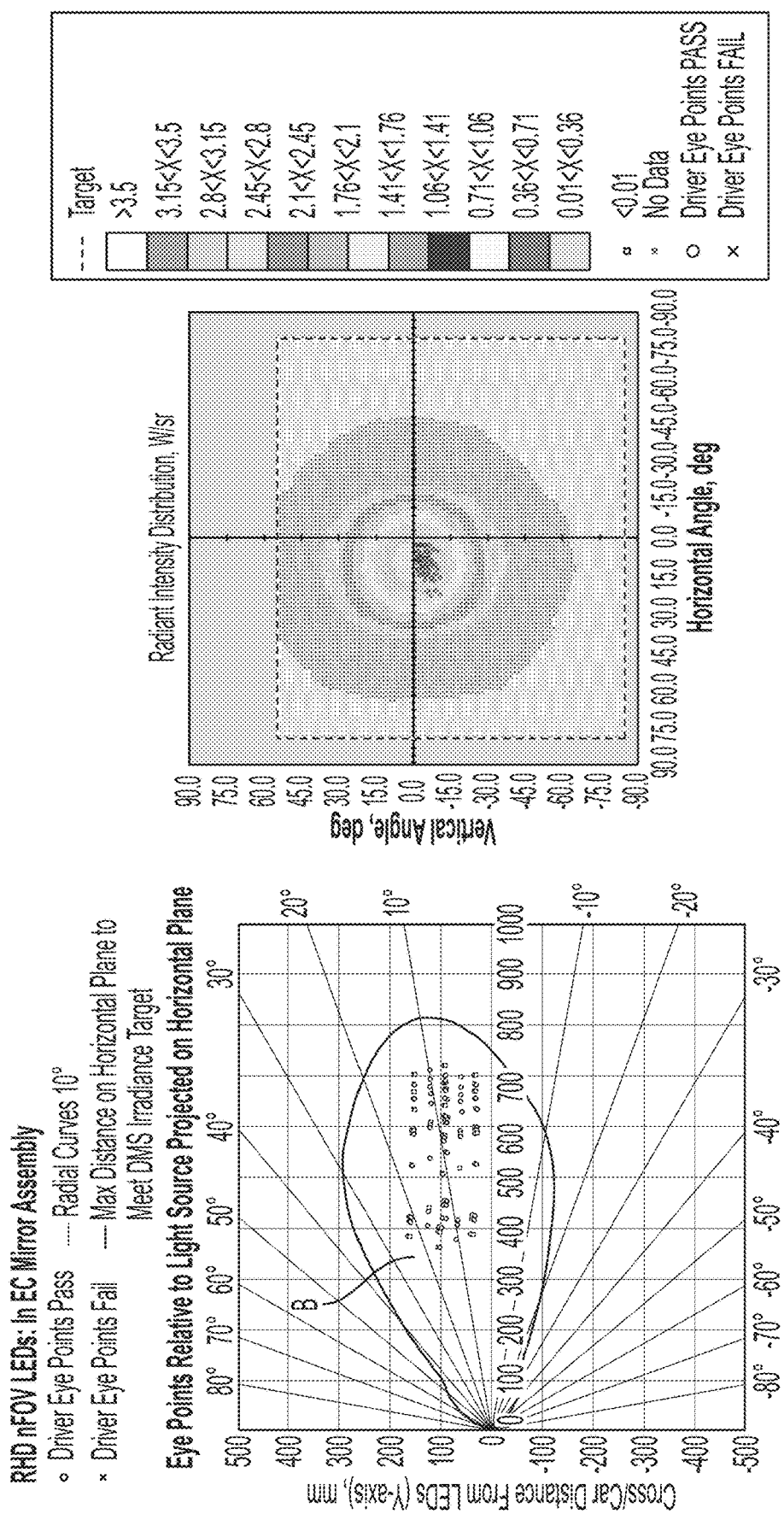
Figure 108:
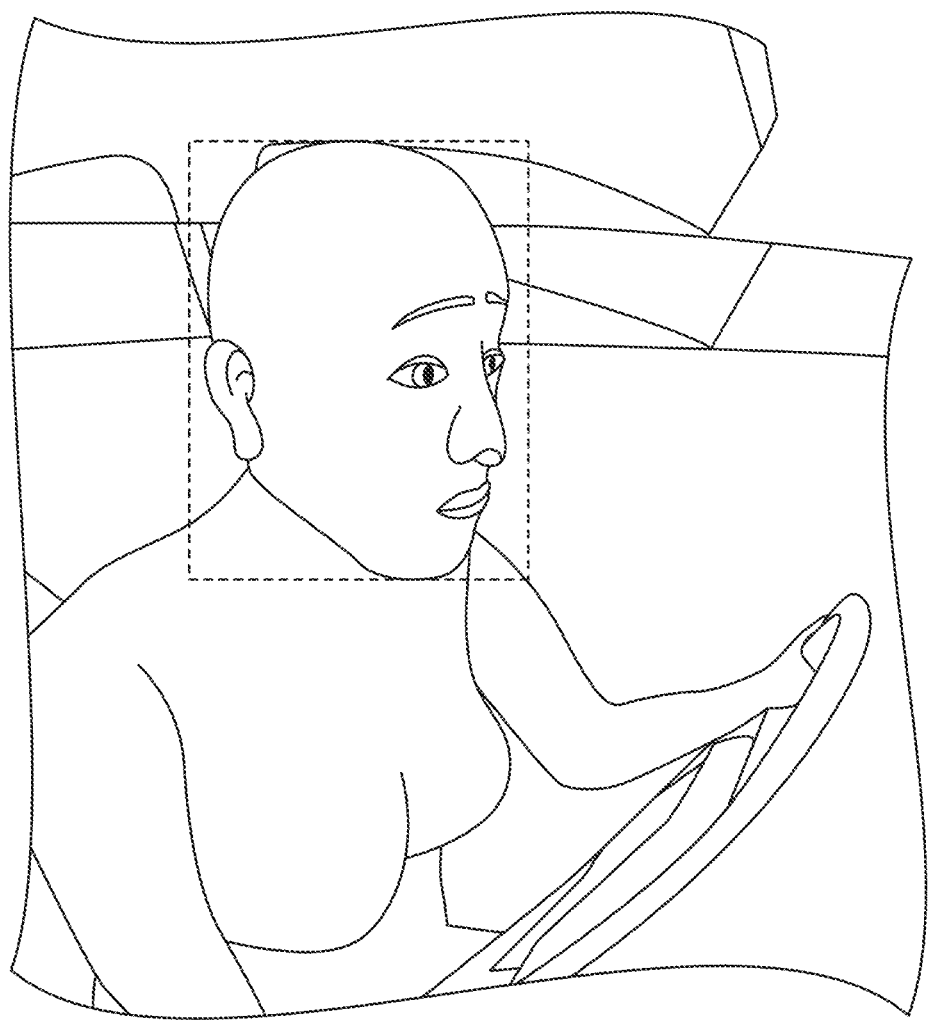
FIG. 108 shows the driver head box or region that the camera of the One-Box Interior DMS Mirror Assembly views (and that the LEDs illuminate)
Figure 109B:
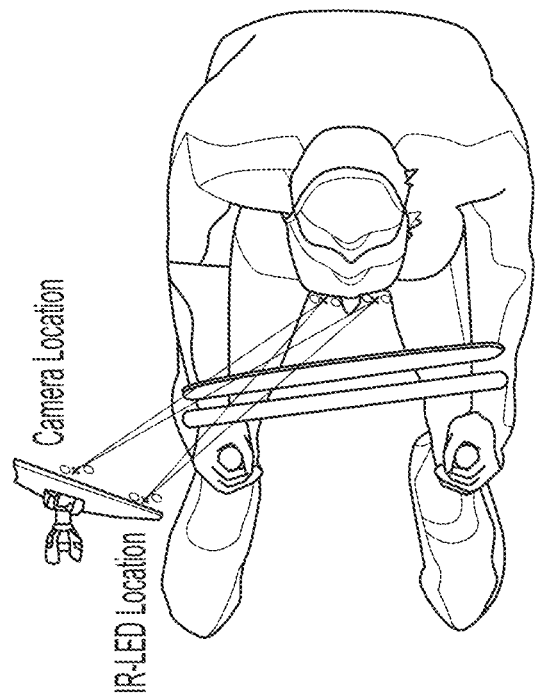
FIGS. 109A and 109B show how the forward vision, near-IR illumination and camera-to-eye visibility may be impacted with some visor positions.
Figure 109A:
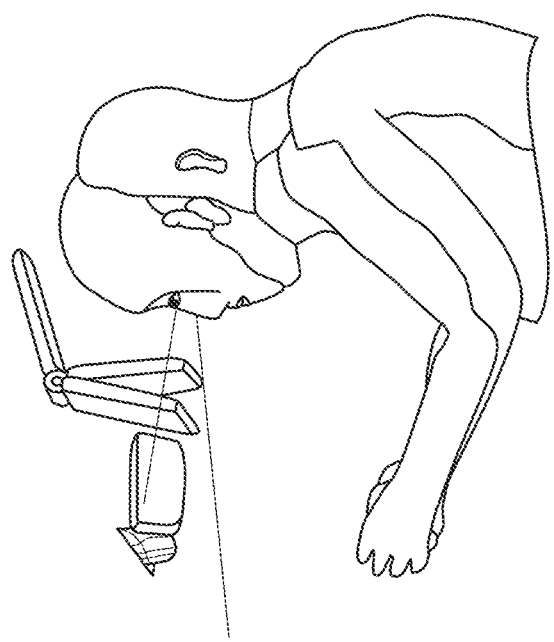

As shown in FIG. 108, the camera views (and the LEDs illuminate) a driver head box or region. FIGS. 109A and 109B show how the forward vision, near-IR illumination and camera-to-eye visibility may be impacted with some visor positions (showing different sized drivers at different seating positions relative to the One-Box DMS Interior Rearview Mirror Assembly). FIGS. 86D-1 and 86D-2 the different eye points relative to the light source as projected on a horizontal plane for a left hand drive (LHD) vehicle and DMS (with the LEDs disposed at the right side of the mirror head), while FIGS. 88C-1 and 88C-2 shown the different eye points relative to the light source as projected on a horizontal plane for a right hand drive (RHD) vehicle and DMS (with the LEDs disposed at the right side of the mirror head). All the closest Driver Eye points will be bright enough to meet the irradiance requirements—with a nominal aim of 15° vertical/20° horizontal.

The DMS SoC disposed in the mirror head can sense its silicon die temperature and enter "throttle modes" if needed to reduce power output (and thus to reduce operating temperature). "Throttle modes" can include a reduction in algorithm feature sets computed, and/or a reduction in SoC clock frequency, and a reduction in frame rate (60 fps to 30 fps for example). The EC PWM duty cycle and drive voltage can be changed to reduce power dissipation in the mirror. Cell gap can be reduced to allow for a lower drive current. IR power can be reduced as well. Use of an LC optical switch for a DMS/OMS single box version can reduce thermal issues. This reduces the required IR LED drive power. Fans, heat pipes, conductive thermal interface materials (TIMs) and alternative heatsink materials, such as copper, can be used to improve cooling. Heatsink fin design also plays a role in cooling ability.

For example, if the temperature is determined to be above a threshold level, the system may provide thermal management and can pull back or reduce processing operations occurring within the mirror head. The system may determine the temperature within the mirror head via an on board thermistor or external thermistor or via the LED drivers having a thermistor or via a processor within the mirror head having a thermistor. To protect the in-mirror head electronics and/or to avoid exacerbating the outer skin temperature of the mirror housing of the mirror head of a One-Box DMS Interior Rearview Mirror Assembly that has been parked in a high temp/sun loading situation causing the housing of the mirror head to be at 85 degrees Celsius or above, a variety of counter measures can be used. Based on the likes of the on-board thermistor temperature sensing capabilities of chips on the board and/or external thermistors, either for a temporary period (up to 1 minute, up to 5 minutes, up to 10 minutes, up to 15 minutes, etc.) and/or until the thermistor-detected temperature is reduced to below a threshold temperature, DMS operation may be temporarily reduced during that period of time. For example, the system may pulse the LEDs at a slower rate and/or may capture image data at a reduced frame rate, or may power the LEDs at a reduced power level (i.e., the system may de-rate the maximum intensity of the LEDs and/or de-rate the pulsing on and off of the LEDs and/or de-rate the image capture rates). Optionally, the system may output (such as via a CAN communication) a signal to turn on the vehicle's air conditioning. Optionally, if the temperature is above the threshold temperature, the system may provide an alert to the driver that the DMS/OMS functions are temporarily not operable.

During operation, frames of image data are captured by the DMS camera (e.g., at a frame capture rate of 30 fps or 60 fps), and the appropriate LEDs are pulsed on and off for respective frames of captured image data. The LEDs pulse rate is synchronized with the camera frame capture rate; i.e., the LEDs are only powered on (and emitting near-IR illumination) when the imager is exposed and is gathering energy. For example, if the camera captures frames of image data at 30 fps, each frame is about 33 ms in duration, but the imager is only exposed (and gathering light energy that photoelectrically converts incoming photons into electrons) for a portion of such time; for example, 4 ms of that time. The LEDs are electrically repetitively pulsed so that they are powered only during that 4 ms time period that coincides with when the imager is gathering energy (although the LEDs may be powered on for a slightly longer time period to ensure that the LEDs are powered throughout the time period at which the imager is exposed). This is a pulse duty cycle of around 12%. The LEDs are synchronized so that they are not powered on for the entire frame time (33 ms) to reduce their heat generation and enhance thermal management, and to avoid continually directing near-IR illumination into the driver's eyes or passenger's eyes for an extended period of time. For DMS and so as to facilitate videoconferencing and taking of selfies by the driver, the system uses the full color capability (RGB) of the DMS camera, so the system combines three (R, G, B) signals into a single signal or frame. For OMS, the system does not need color and can use the DMS camera as a monochromatic camera, with a concomitant enhancement of sensitivity to incident light by the camera. In terms of duty cycle pulsing of the near-IR sources (such as nFOV LEDs or wFOV LEDs) disposed within the mirror head, a duty cycle of at least 8% is preferred; a duty cycle of at least 10% is more preferred and a duty cycle of at least 12% is most preferred, However, for eye safety and to mitigate thermal load, a duty cycle of less than 40% is preferred; a duty cycle of less than 30% is more preferred and a duty cycle of less than 20% is most preferred.

Optionally, the system may reduce the powering of (current applied to) the LEDs during daytime operation and/or may vary or adjust the pulse duty cycle dynamically in accordance with the prevailing in-cabin conditions (such as time of day or night, or whether by day being driven on a sunny or a cloudy day or whether the equipped vehicle has just recently been started after heat soak on a summers day outdoor in the hot sunshine so that the interior mirror has reached a temperature of 60-80 degrees Celsius or higher). Optionally, the system may increase the powering (current applied) and/or vary or adjust the pulse duty cycle of the LEDs to view through a driver's spectacles and especially a driver's sunglasses.

Furthermore, and in accordance with the disclosure of U.S. Pat. No. 11,205,083 (which is hereby incorporated herein by reference in its entirety), the DMS camera can capture frames of image data at a first rate, and the near-IR light emitters can be electrically pulsed at a second rate. The plurality of near-IR light emitters is operable in (i) a first mode, where the near-IR light emitters of the plurality of near-IR light emitters disposed in the mirror head are operated to emit near-IR light to illuminate a region within a field of view of the DMS camera (such as a driver's head region or a front or rear seating region), and (ii) a second mode, where a reduced number of near-IR light emitters of the plurality of infrared light emitters are operated to emit near-IR light to illuminate the region.

Furthermore, and in accordance with the disclosure of U.S. Pat. No. 11,240,427 (which is hereby incorporated herein by reference in its entirety), a near-IR illumination source disposed in the mirror head (that, when powered, emits light that illuminates at least a portion of a driver of the vehicle) is controlled to modulate intensity of light emitted by the modulated illumination source. The image data captured by the DMS camera of that portion of the driver being illuminated with the intensity-modulated near-IR light is processed by the in-mirror head DMS SoC chip to distinguish (i) the component of the captured image data that arises from the illumination source illuminating with intensity modulated near-IR light that portion of the driver from (ii) a component of the captured image data that arises from ambient cabin light illuminating that portion of the driver. The control filters the captured image data to reduce the distinguished component that arises from ambient cabin light.

The near-IR signal emitted by the LEDs is preferably at 940 nm wavelength so that it is more readily recognized by the DMS processor (there is a decrease in ambient solar light at that wavelength due to absorption of 940 nm light by water in the atmosphere). The DMS camera includes a filter that allows/passes that wavelength and attenuates other light. The camera will thus operate with an enhanced 940 nm signal, which enhances driver monitoring in situations where the driver is wearing sunglasses. The rest of the in-cabin light (i.e., the ambient light) is filtered so the camera focuses on the 940 nm wavelength and then avoids "seeing" reflection at sunglasses. The DMS function may provide dynamic camera control (increase or decrease exposure time or frame capture rate) and LED control (increase or decrease power to LEDs and/or increase or decrease on time) to accommodate changes in lighting and/or to accommodate driver sunglasses or the like.

Figure 67B:
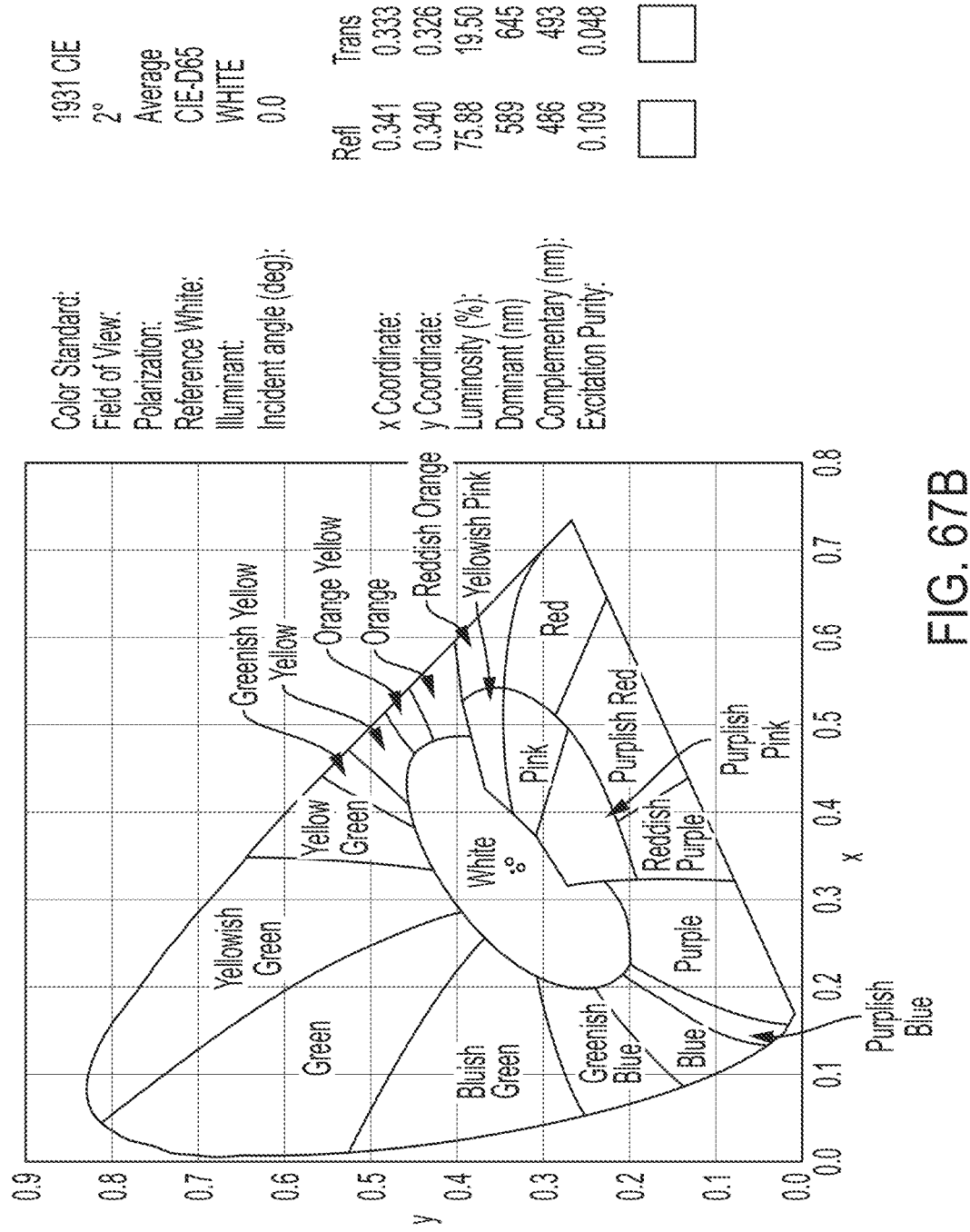
Figure 70:
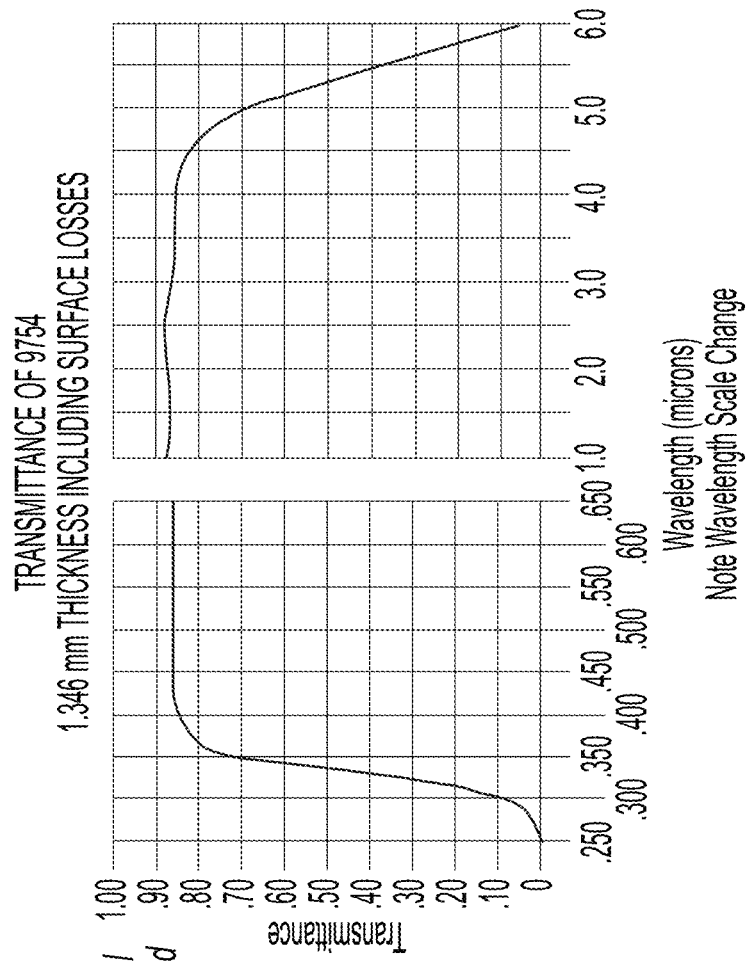
FIG. 70 shows properties and transmittance of Corning Infra Red Transmitting Glass 9754.
Figure 72A:
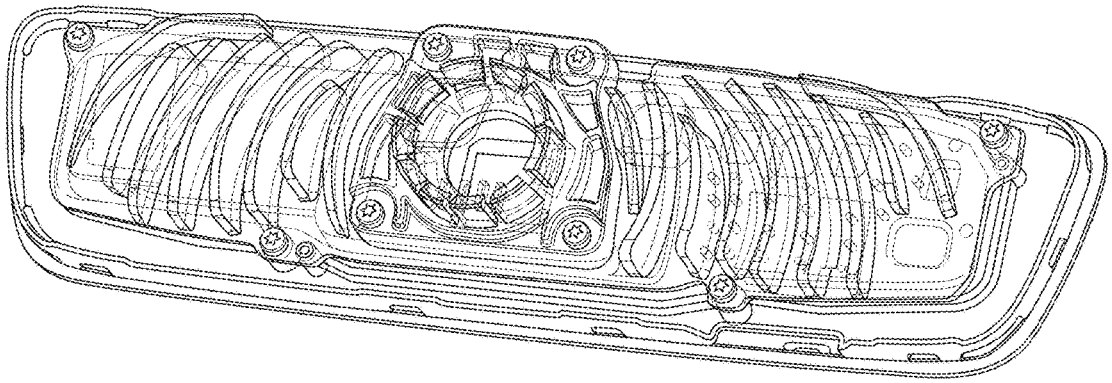
FIGS. 72A-72C are views of the One-Box Electrochromic Interior DMS Rearview Mirror Assembly of FIG. 62, shown without the housing and mounting structure.
Figure 72B:
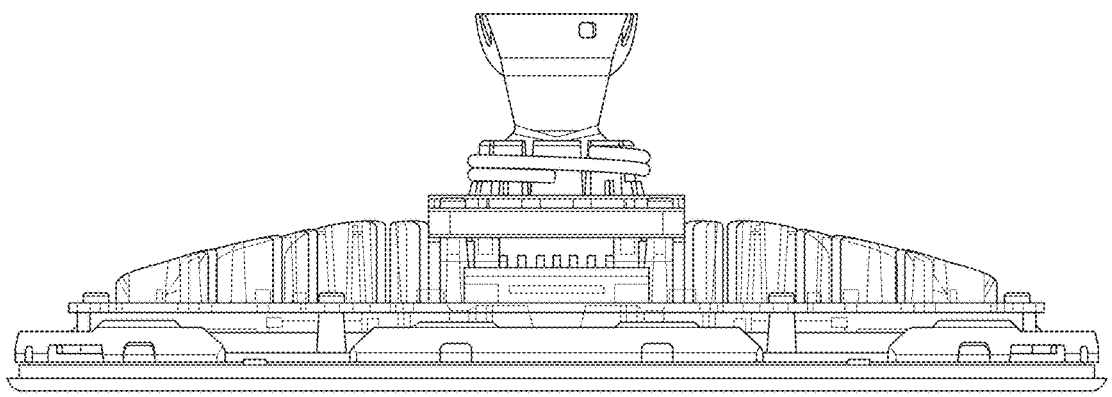
Figure 72C:
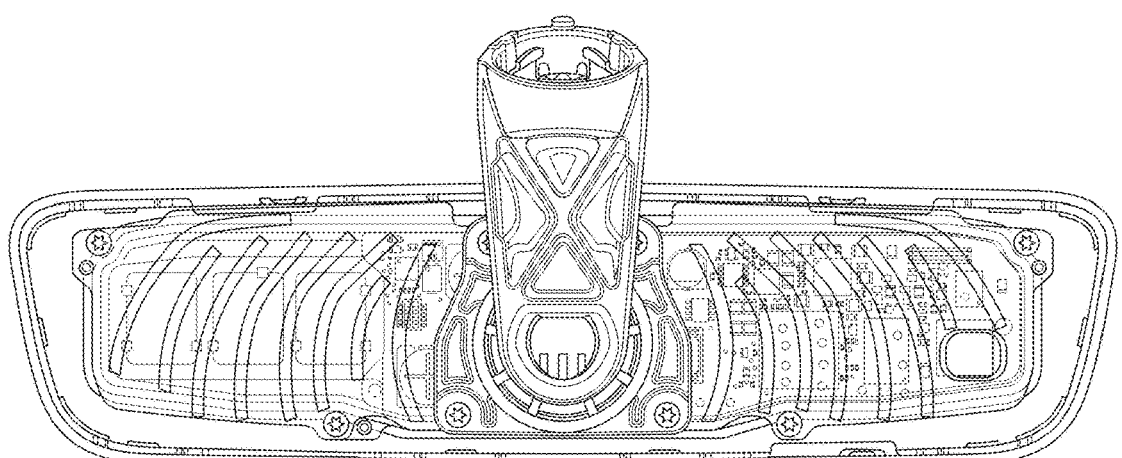

A visible-light transmitting/visible-light reflecting/near-IR light transmitting transflective substrate suitable for use in One-Box Electrochromic Interior DMS Mirror Assembly 110 is shown in FIG. 66 (the transmittance properties and color plot are shown in FIGS. 67A and 67B, respectively). The substrate upon which the transflector stack is coated is a vehicular interior mirror-shaped planar soda-lime glass substrate of 2 millimeters plate thickness. For use as the rear substrate in a laminate-type EC cell (such as is disclosed in U.S. Pat. Nos. 7,274,501; 7,184,190 and/or 7,255,451, which are hereby incorporated herein by reference in their entireties), and to reduce overall assembly weight, a thinner glass substrate is preferred. For example, a glass substrate of plate thickness 1.6 mm or less is more preferred and a glass substrate of plate thickness 1.1 mm or less is most preferred. Also, use of low-iron glass (as discussed herein) is preferred in order to increase both overall visible light transmission and near-IR (such as at 940 nm) light transmission. For example, Guardian UltraClear® Low-Iron Glass (available from Guardian Glass Company, 2300 Harmon Rd, Auburn Hills, MI, USA) is clearer and is more color neutral than standard soda-lime float glass, and is available in plate thicknesses from 2 mm to 12 mm. Also, Guardian Extra-Clear® low-iron glass (available from Guardian Glass 19, rue du Puits Romain L-8070 Bertrange Grande-Duchy de Luxembourg) can be used. Guardian ExtraClear® low-iron glass has the optical properties shown in FIG. 69. Also, Corning Infra Red Transmitting Glass 9754 (see FIG. 70) can be used, preferably in conjunction with use of an IR cut-off filter that cuts off transmission through the glass substrate of IR radiation above 1 micron wavelength.

Photopic visible light reflectivity (measured first-surface in accordance with SAE J964a which is the SAE Recommended Practice for determining total and specular reflectance for vehicular mirrors with flat and curved surfaces and for determining diffuse reflectance and haze for mirrors with a flat surface) for a transflector-coated glass substrate (such as the embodiment that is shown in FIG. 66) preferably is at least 45% R, more preferably is at least 55% R and most preferably is at least 65% R. Visible light transmission for a transflector-coated glass substrate (such as the embodiment that is shown in FIG. 66) preferably is at least 15% T, more preferably is at least 20% T and most preferably is at least 25% T, and preferably is less than 35% T, more preferably less than 30% T [measured using CIE Standard Illuminant D65 and a photopic detector having a spectral response that follows the CIE photopic luminous efficiency function (which mimics the human eye's response in the visible region)]. Near-IR transmission at the near-IR emission peak wavelength (such as 940 nm) of a near-IR emitting light source for a transflector-coated glass substrate (such as the embodiment that is shown in FIG. 66) preferably is at least 60% T, more preferably is at least 70% T and most preferably is at least 80% T.

One-Box Electrochromic Interior DMS Mirror Assembly 110 preferably comprises a two-substrate laminate-type EC mirror reflective element that has (i) a front glass planar substrate (with a first surface and a second surface that is separated from the first surface by a thickness dimension of the front glass substrate) and (ii) a rear glass planar substrate (with a third surface and a fourth surface that is separated from the third surface by a thickness dimension of the rear glass substrate). In One-Box Electrochromic Interior DMS Mirror Assembly 110, the rear substrate comprises the transflective mirror substrate of FIG. 66, and the multi-layer stack of coatings comprises the third surface of the rear substrate of the two-substrate laminate-type EC mirror reflective element (a.k.a. an "EC Cell"). The front and rear substrates are juxtaposed in the EC Cell, and an electrochromic medium is sandwiched between (a) the second surface (that comprises a transparent electrically conductive coating, preferably of ITO, with a sheet resistance less than 30 ohms/square preferably, more preferably than 25 ohms/square and most preferably less than 20 ohms/square) of the front glass substrate and (b) the multi-layer stack transflector-coated surface of the rear glass substrate. The electrochromic medium (i) contacts the transparent electrically conductive coating at the second surface of the front substrate and (ii) contacts the outermost layer of the multi-layer stack transflector-coated third surface of the rear glass substrate. So that electrically conductive contact to the EC medium can be made, the outermost layer of the multi-layer stack transflector-coated third surface of the rear glass substrate comprises a transparent electrically conductive coating (preferably a layer of indium tin oxide; i.e., ITO) with a sheet resistance less than 30 ohms/square preferably, more preferably less than 25 ohms/square and most preferably less than 20 ohms/square.

Figure 68A:
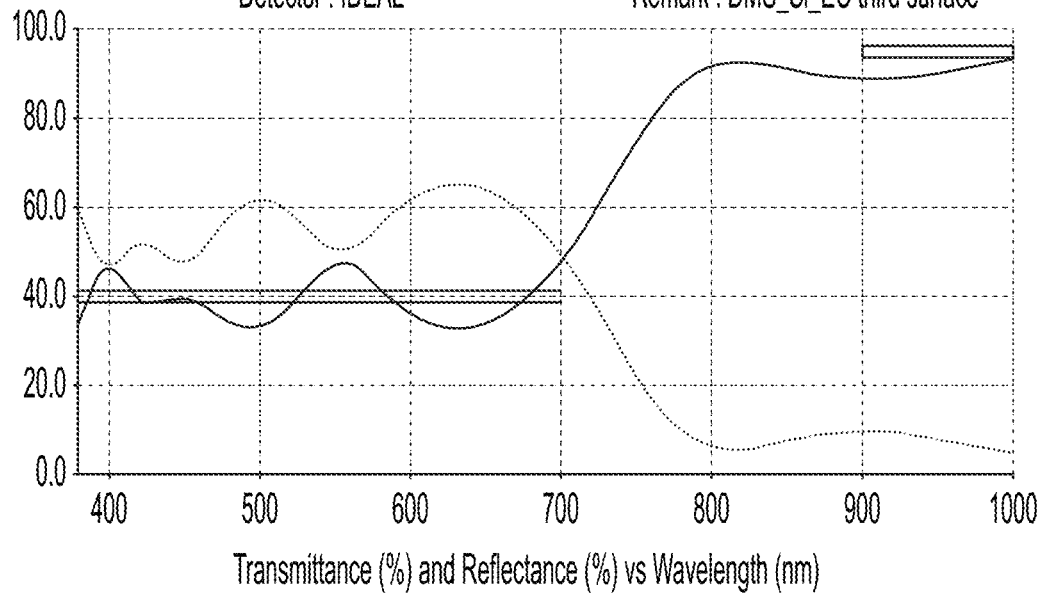
FIGS. 68A and 68B show transmittance and color of the visible-light transmitting/visible-light reflecting/near-IR light transmitting transflective substrate.
Figure 68B:
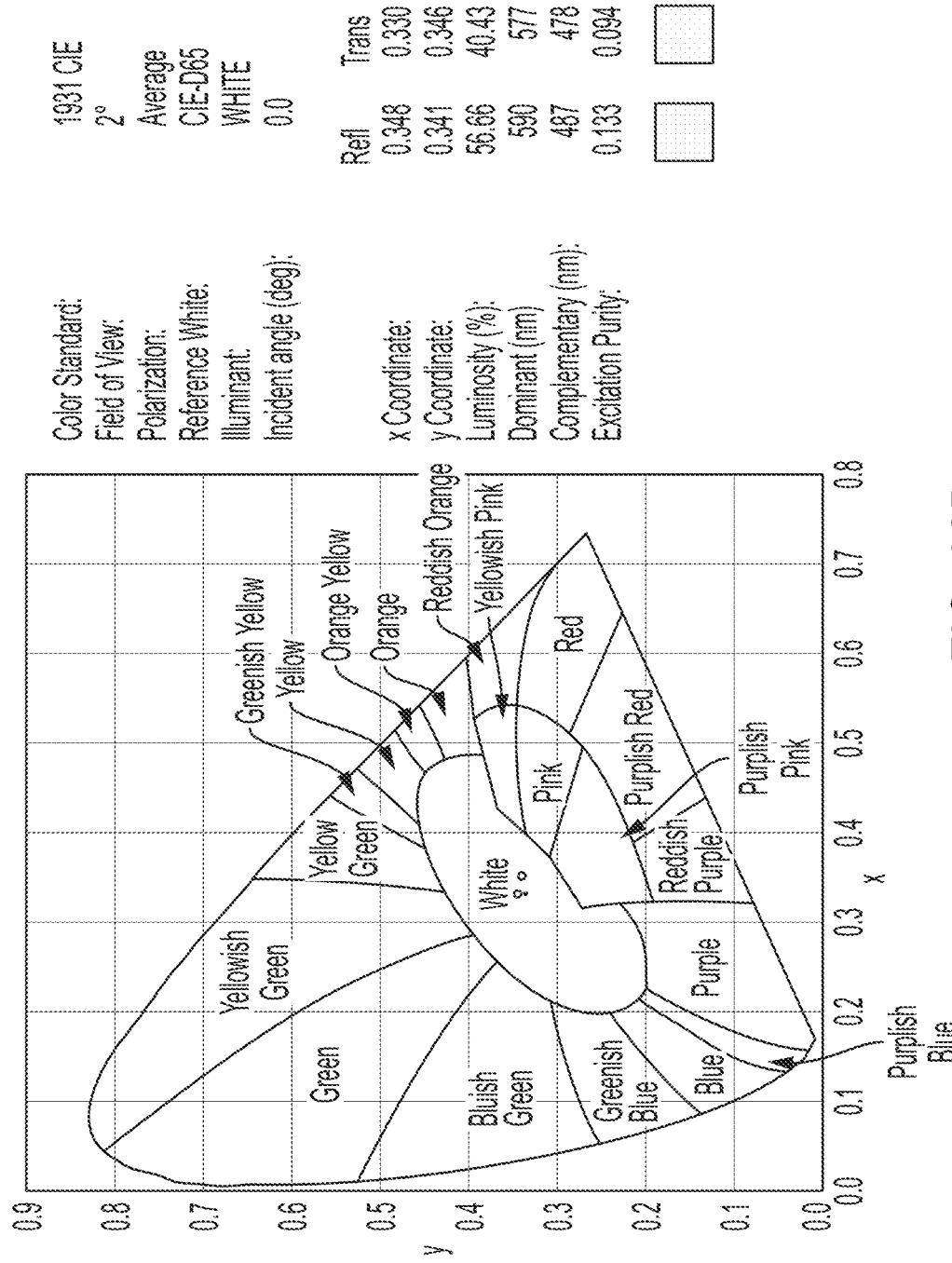

Note that in the likes of the alternating multi-layer stack of FIG. 66, and depending on other factors in the overall construction, fewer, more or different layers can be used. For example, and such as shown in FIGS. 68A and 68B, a third surface conductive transflector of the One-Box Electrochromic Interior DMS Mirror Assembly is shown. This approach incorporates a single semimetal/semiconducting layer of Silicon (Si) at layer 5 of the 7 layer stack and has a high T % (around 90%) at 940 nm and around 40% in the visible region. In addition, the visual appearance is neutral. The advantage of this design is that is reduces the number of layers and reduces total stack thickness. For the multi-layer stack of thin film coatings that forms the mirror transflector of an interior mirror reflective element suitable for use for a One-Box DMS Interior Rearview Mirror Assembly of the present invention, total physical stack thickness (i.e., the sum of the physical thickness of all of the individual thin film coating layers of the multi-layer stack) preferably is less than 1,500 nm; more preferably is less than 1,000 nm; and most preferably is less than 750 nm. This makes the DMS stack easier and less expensive to manufacture. The overall thickness is less than 600 nm. Of course, use of a Si semiconductor layer can be contemplated for more than one layer in the multi-layer stack.

The mirror transflector may include a silicon layer due to the high index of refraction (3.5 to 4) of Silicon (but its extinction coefficient is higher than for dielectrics such as NbO or $TiO_2$ or $SiO_2$). Optionally, the mirror transflector could use a layer of Germanium. The layers alternate a high index of refraction layer with a lower index of refraction layer to achieve the best match of transmittance and reflectance. The number of layers is reduced by using a layer of high index silicon or germanium. The layers have different refractive indices, and the amount of such difference relates to how many layers may be required to achieve the desired effect. Larger index differences between layers can lead to requiring less layers. The mirror transflector may use Niobium oxide instead of Titanium oxide because the sputter deposition rate for $NbO/Nb_2O_5$ is faster than the sputter deposition rate for $TiO_2$.

The layers are sputter deposited onto the substrate used in the mirror reflective element using pressed oxide ceramic targets. The targets preferably are rotary targets (magnetron). In the vacuum chamber where the layers are deposited, the chamber may include a mixture of Oxygen and Argon. The layers preferably are sputtered via medium frequency (about 40 KHz) sputtering (MF sputtering). Twin rotary magnetrons preferably are used, with two targets side-by-side. A 40 KHz sine wave alternating voltage (positive and negative) is applied. The process may use two (or more) twin-targets per chamber. Silicon may be sputter deposited using a pure Silicon target.

The target optical design for the multi-layer stack is to have transmissivity of at least 20% T for visible light and at least 60% T for near-IR light, and to achieve this in the most economical and effective way. The number of layers and refractivity of layers and sputter rate of layers are balanced to economically achieve the desired effect. The process may utilize aspects of the processes described in U.S. Pat. No. 5,751,489, which is hereby incorporated herein by reference in its entirety.

Mid-frequency AC Sputtering (such as at 40 KHz) in a multi-station/multi-target in-line conveyorized-tray/pallet vacuum deposition process is a preferred deposition technology for the dielectric High Index/Low Index film alternating coating layers that make up the multi-layer stack forming the mirror transflector of the mirror reflective element of the One-Box DMS Interior Rearview Mirror Assembly. Mid-frequency AC Sputtering (a.k.a. Medium AC Sputtering) is preferred over RF Sputtering for coating dielectrics because it operates in the kHz rather than MHz range and thus requires less sophisticated and less expensive power sources and is a process that is adaptable to large scale applications. MF or Mid-frequency AC power supplies cover a wide range of voltage outputs between 300 V to 1200 V—generally in the 25 to 300 KW range—at frequencies between 20 to 70 kHz with 40 kHz used most commonly. For forming likes of the Niobium Oxide or Silicon Dioxide layers of the multi-layer transflector, reactive sputtering preferably is used where a reactive gas (oxygen) is introduced into the plasma to form an oxide layer deposited onto the substrate being coated. In Mid-frequency AC Sputtering, two cathodes are used with an AC current switched back and forth between them which cleans the target surface with each reversal to reduce the charge build up on dielectrics that leads to arcing which can spew droplets into the plasma and prevent uniform thin film growth.

As the substrates are moved past the targets, the targets sputter deposit the materials onto the moving substrates. A carrier moving continuously at 1 meter/min under a sputtering target would deposit a film thickness of 25 nm. For ITO: NDDR is (10 nm·m/min)/(KW/m) with ~10 KW/m of target length maximum power density. Generally, for a constant deposition power level and dimensions, the rate of deposition of NbO is around 2.5 times greater than for likes of $SiO_2$ or $TiO_2$. Generally, for a constant deposition power level and dimensions, the rate of deposition of ITO is around 2 times greater than for $NbO/Nb_2O_5$ and is around 5 times greater than for likes of $SiO_2$ or $TiO_2$.

Combined with arc detection and suppression circuitry, MF or Mid-frequency AC Sputtering offers the advantages of improving process stability and increasing deposition rates as well as overcoming a problem faced when trying to reactively sputter a dielectric coating with DC sputtering in that the anode can become coated with an insulating coating. In the case of AC sputtering, the cathodes act as an anode every half cycle and provide a "clean" anode surface. Mid-frequency AC Sputtering for the multi-layer HI/LO index coatings for the mirror transflector of the mirror reflective element of the One-Box DMS Interior Rearview Mirror Assembly preferably employs dual magnetrons to confine the electrons above the target and reduce arcing for process control. Optionally, either "Balanced" or "Unbalanced" magnetrons can be arranged side by side, tilted towards each other, or face to face.

As an alternative to in-line vacuum deposition, deposition of the various thin film dielectric coatings to form the multi-layer HL-stack mirror transflector can be deposited onto glass substrates in a batch vacuum deposition chamber. For example, a plurality of individual cut mirror-shaped glass substrates can be loaded into a planetary fixture in a vacuum deposition chamber. For deposition of, for example, Niobium Oxide and Silicon Oxide layers, a cylindrical vacuum chamber can be equipped with two (one for NbO and one for $SiO_2$) twin Mid-Frequency AC Sputtering deposition targets that sputter the respective layers onto the glass substrates as the glass substrates are rotated past the sputtering targets in the vacuum chamber, such rotation enhancing uniformity of coating onto the plurality of substrates being coated. Alternatively, electron beam evaporation can be used with an electron beam evaporating the likes of Niobium Oxide and Silicon Oxide/Dioxide from individual crucibles in a multiple-crucible turret.

The One-Box Electrochromic Interior DMS Mirror Assembly 110 preferably comprises a One-Box Infinity Electrochromic Interior DMS Mirror Assembly or a One-Box EVO Electrochromic Interior DMS Mirror Assembly. For a One-Box Infinity Electrochromic Interior DMS Mirror Assembly (such as by utilizing aspects of the mirror assemblies described in U.S. Pat. Nos. 9,827,913; 9,174,578; 8,508,831; 8,730,553; 9,598,016 and/or 9,346,403, which are hereby incorporated herein by reference in their entireties), the outer peripheral edge of the first or front glass substrate provides a curved continuous transition between the planar front surface of the front glass substrate and the outer surface of the side wall of the mirror casing, with the rear glass substrate nested within the mirror casing. For a One-Box EVO Electrochromic Interior DMS Mirror Assembly (such as by utilizing aspects of the mirror assemblies described in U.S. Pat. Nos. 10,261,648; 7,360,932; 7,289,037 and/or 7,255,451, which are hereby incorporated herein by reference in their entireties), the mirror reflective element is attached at an attachment plate and wall structure of the mirror casing or attachment plate extends from a front side of the mirror casing or attachment plate circumscribes and spans the perimeter circumferential edge of the front glass substrate and does not encroach onto and does not overlap the front surface of the glass substrate of the mirror reflective element.

In an EVO constriction, the plate thickness of the front and rear glass substrates can be less than 2 mm (for example, each can be 1.6 mm or the front can be 1.6 mm and the rear can be 1.1 mm). However, a One-Box Infinity Electrochromic Interior DMS Mirror Assembly utilizes a front glass substrate with its outermost circumferential edge rounded/curved (contactable by a driver when used in an equipped vehicle) that has at least a 2.5 mm radius that is formed by grinding/polishing the outermost circumferential edge of an interior mirror-shaped cut glass substrate that, in order to achieve the desired 2.5 mm rounded/curved circumferential edge radius, need has a plate thickness greater than 2 mm—with 3 mm being typical. Thus, the front glass substrate used in the EC Cell of a One-Box Infinity Electrochromic Interior DMS Mirror Assembly may comprise a plate thickness of 3 mm. Given such thickness, use of low-Fe glass for the front substrate in the EC Cell of a One-Box Infinity Electrochromic Interior DMS Mirror Assembly is particularly beneficial towards enhancing both visible light transmission and near-IR light transmission through the EC Cell. In this regard, Pilkington Optiwhite™ Low-Iron Clear Float Glass (available from Pilkington North America, Toledo, OH USA), being available in plate thickness of 3 mm and thicker, is particularly advantageous for use in a One-Box Infinity Electrochromic Interior DMS Mirror Assembly. Pilkington Optiwhite™ is an extra clear, low-iron float glass; it is practically colorless, and the green cast inherent to other clear glasses is not present. Pilkington Optiwhite™ is available in thicknesses between 3 mm and 19 mm. As can be seen in FIG. 71, visible light transmission is at least 90% T, which is of particular advantage in likes of a One-Box Infinity Electrochromic Interior DMS Mirror Assembly.

Pilkington Optiwhite™ available in 6 mm thickness is also beneficial for a One-Box Prismatic Interior DMS Mirror Assembly. A conventional interior prismatic rearview mirror (sometimes called a "day/night mirror" or "flip mirror") can be manually tilted or flipped by a driver of an equipped vehicle during nighttime driving to reduce the brightness and glare of lights, mostly for high-beam headlights of vehicles approaching from behind which would otherwise be reflected directly into the driver's eyes at night. A conventional prismatic mirror is made of a piece of glass that is wedge-shaped in cross-section (its front and rear surfaces are not parallel—the planar front surface is typically at the likes of a 4 degree angle to the plane of the rear surface) and that is silver-coated on its rear surface (the second surface) to form a prismatic mirror element. The wedge-shaped prismatic glass substrate starts with a 6 mm thickness interior mirror-shaped glass substrate that has parallel front and rear surfaces. Via grinding and polishing, the wedge shape is formed. A One-Box Infinity Prismatic Interior DMS Mirror Assembly preferably is made starting with a 6 mm thick Pilkington Optiwhite™ low-Fe float glass that is polished/ground to the desired form and that is coated on its rear (second) surface with a visible light transmitting/visible-light reflecting/near-IR light transmitting multi-layer stack.

Figure 77A:
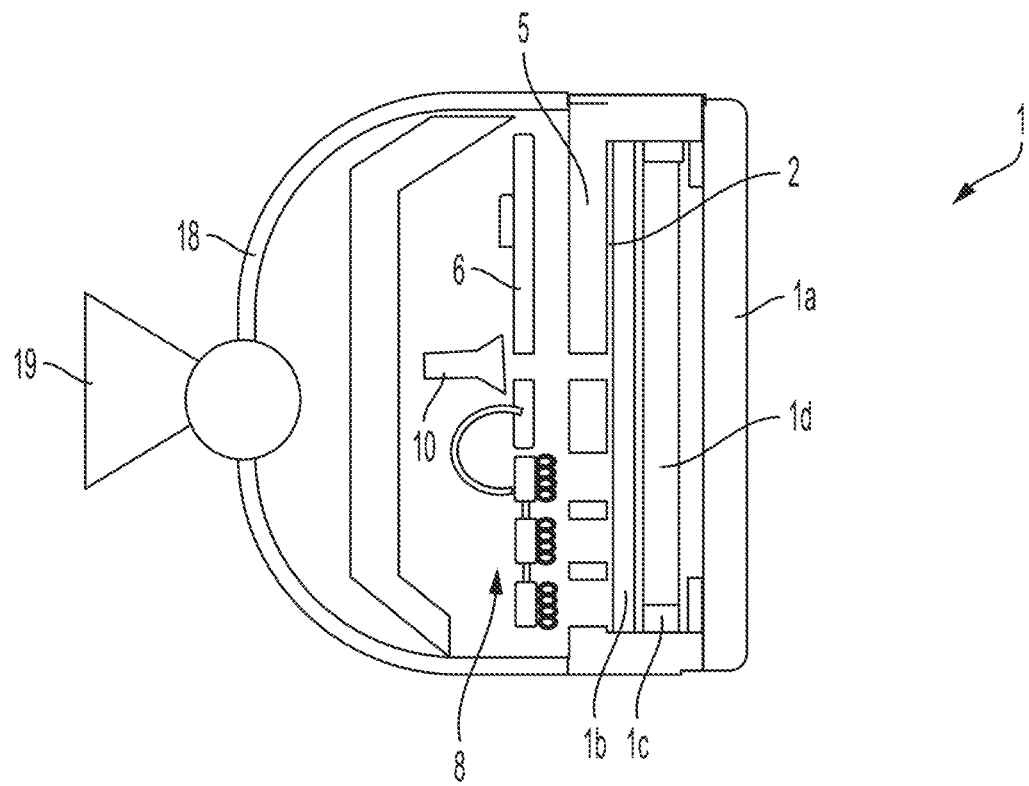
FIG. 77A is a schematic of a One-Box DMS Interior Infinity™ Electrochromic Rearview Mirror Assembly.

A One-Box DMS Interior Infinity™ Electrochromic Rearview Mirror Assembly (such as is schematically shown in FIG. 77A) includes a plastic mirror casing or housing 18 formed via a plastic injection molding process [preferably via injection molding of PC/ASA that is an amorphous thermoplastic alloy of polycarbonate (PC) and ASA (acrylic-styrene-acrylate terpolymer) that provides enhanced heat resistance and enhanced mechanical properties]. The electrochromic/electro-optic mirror reflective element 1 comprises a front glass substrate 1a and a rear glass substrate 1b spaced apart from the front glass substrate by a perimeter seal 1c, with an electrochromic medium 1d (that is electrically dimmable) sandwiched between the front glass substrate and the rear glass substrate and bounded by a perimeter seal. The front glass substrate has a planar first glass surface (which is the planar front surface of the interior mirror reflective element) and a planar second glass surface separated from the planar first glass surface by a thickness dimension of the front glass substrate. The front glass substrate comprises a peripheral surface extending between the planar first glass surface and the planar second glass surface and spanning the thickness dimension of the front glass substrate. When the One-Box DMS Interior Infinity™ Electrochromic Rearview Mirror Assembly is mounted at a windshield portion or at a header portion of an equipped vehicle (such as via a mounting structure 19), the planar first surface faces a driver of the vehicle. A transparent electrically conductive coating is disposed at the planar second glass surface and is in contact with the electro-optic (i.e. the electrochromic) medium. The front glass substrate has a specularly reflective and electrically conductive perimeter band established along a perimeter border region of the planar second surface of the front glass substrate that circumscribes the peripheral border region of the second glass surface of the front glass substrate to render covert the perimeter seal to a driver operating an equipped vehicle who is viewing the interior rearview mirror assembly when the interior rearview mirror assembly is mounted in the equipped vehicle. The rear glass substrate has a planar third glass surface and a planar fourth glass surface (which is the planar rear surface of the interior mirror reflective element), and the planar third glass surface of the rear glass substrate is coated with a visible light-transmitting/visible light reflecting/near-IR light-transmitting (preferably with its principal wavelength centered at 940 nm) multi-layer transflector. The outermost layer of the stack of layers that make up the transflector comprises a transparent electrically conductive coating (preferably comprising indium tin oxide and preferably having a sheet resistance less than 30 ohms per square, with less than 25 ohms/square more preferred and less the 20 ohms/square most preferred) is in contact with the electro-optic (typically electrochromic) medium.

The circumferential outer perimeter of the front glass substrate of the interior rearview mirror assembly comprises a rounded, curved outer glass surface that provides a rounded transition between the planar first glass surface of the front glass substrate 1a and a less curved outer surface of a side wall of the mirror casing 18 or attachment plate 5. The circumferential curved outer/rounded glass surface of the front glass substrate has a radius of curvature of at least 2.5 mm and is exposed to, is contactable by and is viewable by the driver of the equipped vehicle when the interior rearview mirror assembly is mounted in the equipped vehicle. No part of the mirror casing (or of the front plastic bracket/attachment element that the electrochromic/electro-optic mirror reflective element is mounted at) encroaches over/onto the planar first glass surface of the front glass substrate (i.e., the planar front surface of the interior mirror reflective element). The cross dimensions of the front glass substrate are larger than the cross dimensions of the rear glass substrate so that the front glass substrate extends beyond corresponding edges of the rear glass substrate. The rear glass substrate is received at and is circumscribed by the side wall of the front plastic bracket/attachment element that the electrochromic/electro-optic mirror reflective element is mounted at. The rear glass substrate 1b preferably is attached via double-sided adhesive tape 2 (disposed between the fourth glass surface of the rear glass substrate; i.e., the planar rear surface of the interior mirror reflective element) to the front plastic bracket/attachment element 5 that the electrochromic/electro-optic mirror reflective element is mounted at.

Thus, in an Infinity™ Interior Rearview Mirror Assembly (Infinity™ is a trademark of Magna Mirrors of America, Inc. of Holland, MI USA), the mirror reflective element disposed at the mirror casing (and pivotable with the mirror casing relative to a mounting portion of the assembly) comprises an outermost glass substrate (that is contactable by a driver of a vehicle equipped with an Infinity™ Interior Rearview Mirror Assembly) having a planar front glass surface, a planar rear glass surface and a circumferential perimeter edge around a periphery of the glass substrate that extends across a thickness dimension separating the planar front glass surface from the planar rear glass surface. A front perimeter edge portion of the circumferential perimeter edge comprises a rounded glass surface circumferentially around and circumscribing the periphery of the glass substrate, and the rounded glass surface at least partially spans the thickness dimension of the glass substrate. The rounded glass surface has a radius of curvature of at least 2.5 mm. No portion of the mirror casing overlaps over or onto or encroaches onto the rounded glass surface of the glass substrate. With the mounting portion mounted at the in-cabin side of the windshield of the equipped vehicle, the rounded glass surface of the glass substrate is exposed to and is contactable by the driver of the equipped vehicle. Preferably, the radius of curvature of the rounded glass surface is uniform around the periphery of the glass substrate. The mirror assembly comprises an attachment surface, and preferably, the mirror reflective element is adhered to the attachment surface to secure the mirror reflective element in the mirror assembly.

Figure 77B:
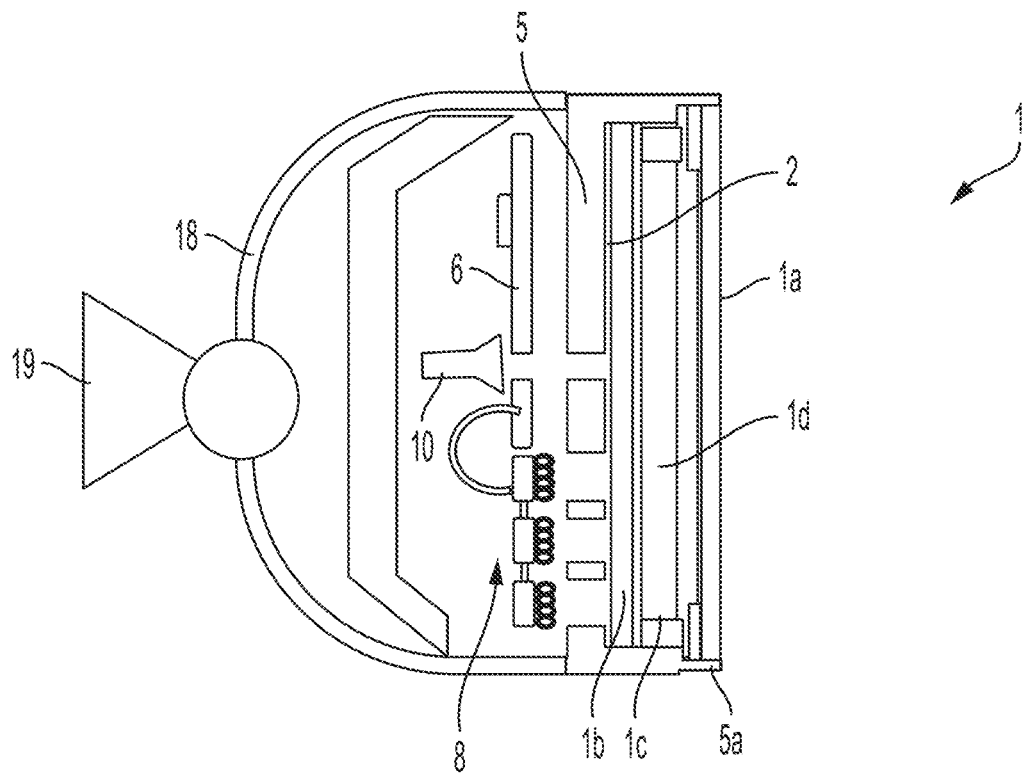
FIG. 77B is schematic of a One-Box DMS Interior EVO™ Electrochromic Rearview Mirror Assembly.

In a One-Box DMS Interior EVO™ Electrochromic Rearview Mirror Assembly (such as is schematically shown in FIG. 77B), the electrochromic/electro-optic mirror reflective element 1 comprises a front glass substrate 1a and a rear glass substrate 1b spaced apart from the front glass substrate by a perimeter seal 1c, with an electrochromic medium 1d (that is electrically dimmable) sandwiched between the front glass substrate and the rear glass substrate and bounded by a perimeter seal. The front glass substrate has a planar first glass surface (which is the planar front surface of the interior mirror reflective element) and a planar second glass surface separated from the planar first glass surface by a thickness dimension of the front glass substrate. The front glass substrate comprises a peripheral surface extending between the planar first glass surface and the planar second glass surface and spanning the thickness dimension of the front glass substrate. When the One-Box DMS Interior EVO™ Electrochromic Rearview Mirror Assembly is mounted at a windshield portion or at a header portion of an equipped vehicle (such as via a mounting structure 19), the planar first glass surface faces a driver of the vehicle. A transparent electrically conductive coating is disposed at the planar second glass surface and is in contact with the electro-optic (i.e. the electrochromic) medium. The front glass substrate has a specularly reflective and electrically conductive perimeter band established along a perimeter border region of the planar second glass surface of the front glass substrate that circumscribes the peripheral border region of the second surface of the front glass substrate to render covert the perimeter seal to a person viewing the interior rearview mirror assembly when the interior rearview mirror assembly is mounted in the equipped vehicle. The rear glass substrate has a planar third glass surface and a planar fourth glass surface (which is the planar rear surface of the interior mirror reflective element), and the planar third glass surface of the rear glass substrate is coated with a visible light-transmitting/visible light reflecting/near-IR light-transmitting (preferably with its principal wavelength centered at 940 nm) multi-layer transflector. The outermost layer of the stack of layers that make up the transflector comprises a transparent electrically conductive coating (preferably comprising indium tin oxide and preferably having a sheet resistance less than 30 ohms per square, with less than 25 ohms/square more preferred and less the 20 ohms/square most preferred) is in contact with the electro-optic medium.

Thus, in an EVO™ Interior Rearview Mirror Assembly (EVO™ is a trademark of Magna Mirrors of America, Inc. of Holland, MI USA), the mirror reflective element nests into an attachment element or plastic molding or bracket 5 that the electrochromic/electro-optic mirror reflective element nest into/is support by. The rear glass substrate 1b preferably is attached via double-sided adhesive tape 2 (disposed between the fourth glass surface of the rear glass substrate; i.e., the planar rear surface of the interior mirror reflective element) to the front plastic bracket/attachment element 5 that the electrochromic/electro-optic mirror reflective element is mounted at. A circumferential wall structure 5a extends from the mirror-element attachment side of the attachment element or plastic molding or bracket. The circumferential wall structure spans the rear glass substrate, spans the electrochromic medium and spans the thickness dimension of the front glass substrate. However, the circumferential wall structure does not overlap and does not encroach over/onto the planar first (front) glass surface of the front glass substrate (i.e., the planar front surface of the interior mirror reflective element). The circumferential wall structure prevents, with the mirror assembly in use in an equipped vehicle, contact by the driver with any of the cut edges of the front and rear glass substrates and especially protects against contact with the circumferential outer cut edge of the front glass substrate.

In an EVO™ Interior Rearview Mirror Assembly, a mirror reflective element comprises an outermost glass substrate having a planar first glass surface and a planar second glass surface with a circumferential edge along the periphery of the frontmost/outermost glass substrate. The circumferential edge spans a thickness dimension of the glass substrate between the first and second glass surfaces. The first glass surface of the glass substrate comprises the front or outermost surface of the interior mirror reflective element that is closest to a driver of a vehicle equipped with the interior rearview mirror assembly when the interior rearview mirror assembly is normally mounted in the equipped vehicle. The mirror reflective element comprises a mirror transflector established at a surface of the mirror reflective element other than the first glass surface of the glass substrate. A plastic molding is circumferentially disposed about and circumscribes the circumferential edge of the glass substrate without overlapping onto or encroaching over/onto the first glass surface of the glass substrate. The plastic molding comprises a portion that (a) abuts the circumferential edge of the frontmost/outermost glass substrate and (b) has an outer curved surface that extends from generally adjacent to the first glass surface of the frontmost/outermost glass substrate and that lacks a sharp edge. The plane of the first glass surface of the frontmost/outermost glass substrate is generally flush with the outermost part of the plastic molding. The outer curved surface of the plastic molding provides a curved transition between the plane of the first glass surface of the glass substrate and a plane of a generally less-curved portion of the plastic molding. The generally less-curved portion is rearward of, adjacent to and contiguous with the outer curved surface of the plastic molding. The plastic molding comprises at least a portion of a mirror housing of the interior rearview mirror assembly. When the mirror reflective element is moved to set a field of view to a desired setting of a driver of the equipped vehicle, the mirror housing moves in tandem with the mirror reflective element. The plastic molding comprises a pocket and the mirror reflective element is received in the pocket, and at least a portion of the plastic molding is rearward of the glass substrate when the mirror reflective element is received in the pocket. The plastic molding comprises structure for attaching a rear mirror casing cap portion thereat. The rear mirror casing cap portion is configured for attachment at the structure of the plastic molding.

A conventional interior rearview mirror assembly uses a plastic bezel that overlaps and encroaches over/onto the planar outermost surface of the frontmost/outermost glass substrate used in the conventional interior rearview assembly, framing that frontmost/outermost glass substrate in plastic to protect a driver from contact with the sharp outer cut edge of the frontmost/outermost glass substrate. While such a conventional framed mirror can be used in a One-Box DMS Interior Rearview Mirror Assembly, it is not preferred.

An Infinity™ interior rearview mirror assembly uses no such bezel or frame. An EVO™ interior rearview mirror assembly uses no such bezel or frame. Infinity™ and EVO™ Interior Rearview Mirror Assemblies are Frameless (a.k.a. Bezel-Less) Interior Rearview Mirror Assemblies.

Figure 78:
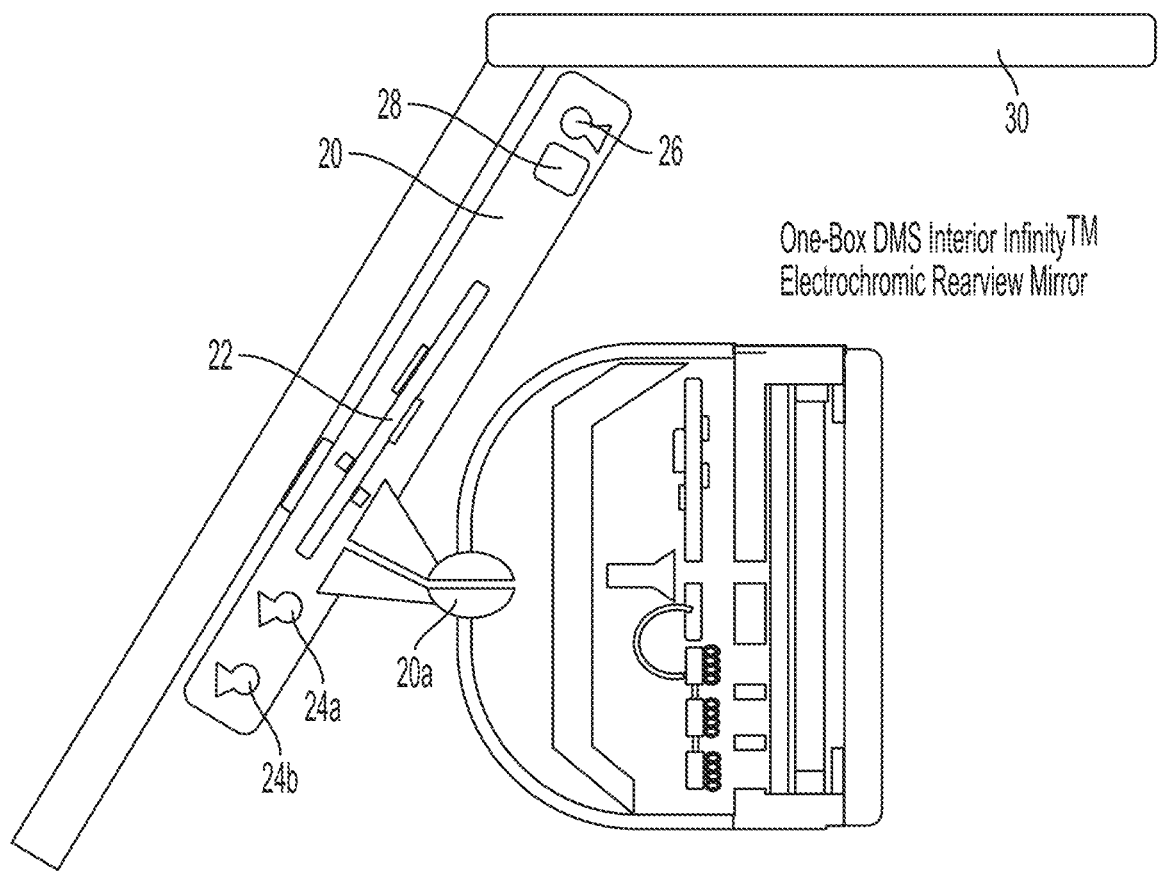
FIG. 78 is a schematic of a One-Box DMS Interior Infinity™ Electrochromic Rearview Mirror Assembly adjustably mounted at a windshield electronics module (WEM)

Optionally, and such as shown in FIG. 78, the One-Box Interior DMS Mirror Assembly (shown in FIG. 78 as a One-Box DMS Interior Infinity™ Electrochromic Rearview Mirror Assembly) may be adjustably mounted at a pivot joint 20a of a mirror mounting base or foot or stay 20 that includes circuitry and cameras and/or sensors that can operate separate from the DMS or in conjunction with the DMS of the One-Box Interior DMS Mirror Assembly. For example, the foot or stay includes a PCB 22 having circuitry at either or both sides. The mirror mounting base or foot includes two forward viewing cameras, with one of the forward viewing cameras comprising a forward camera module 24a for use by a driving assistance system of the vehicle (and such as capturing image data for lane detection, pedestrian detection, vehicle detection, collision avoidance, ACC, traffic sign recognition, traffic light detection, automatic headlamp control, etc.), and the other of the forward viewing cameras comprising an event recording camera 24b that captures video images for recording events. One of the forward viewing cameras may capture color video image data for use in an augmented reality display, where video images are displayed on an in-cabin video screen for viewing by the driver of the vehicle, and navigation information or indicia or instructions are overlayed on the displayed video images to assist the driver in seeing and understanding the navigation instructions and how they relate to the real-time video of what lies ahead of the vehicle being displayed on the video screen.

The mirror mounting base or stay 20 also includes a rearward viewing camera 26 that is disposed at an upper region of the stay housing (near the headliner 30 of the vehicle) and that is angled downward so as to view the rear seats of the vehicle. By locating the fixed camera 26 higher up in the vehicle cabin and above the mirror head, the camera 26 provides an enhanced view of the rear seats of the vehicle. Optionally, the mirror mounting base or stay may also or otherwise include another non-camera or non-imaging sensor 28 (such as a radar sensor or a lidar sensor or an ultrasonic sensor) that may sense forward of the vehicle or rearward of the vehicle or interior into the cabin of the vehicle (for the likes of occupancy detection, and having a field of view/sensing unobstructed by the mirror head of the interior rearview mirror assembly, and with an advantage of not being adjusted, i.e., remaining fixed/being immovable, when the mirror head is moved/adjusted by the driver to set his or her desired rearward view using the interior mirror reflective element). The mirror mounting base or stay 20 may include a heatsink and/or another printed circuit board populated with electronic components, and may comprise a one-box type construction, where the PCB receives power from the vehicle and provides communication to the One-Box Interior DMS Mirror Assembly and/or to other vehicle systems. The PCB of the stay may include a data processor (such as an EYEQ4 or EYEQ5 image processing chip available from MOBILEYE VISION TECHNOLOGIES LTD of Jerusalem, Israel) for processing image data captured by the cameras, or the outputs of the cameras may be fed to the electronics housed within the mirror head of the One-Box Interior DMS Mirror Assembly or they may be fed to other vehicle systems of the equipped vehicle. The electronics and/or sensors accommodated in the mirror mounting base or stay share common electronic components/circuitry with (and are in communication with) the electronics and/or the sensors accommodated in the mirror head. For example, image data captured by a forward viewing camera located in the stay may be provided (via wiring that passes through a wiring conduit established through the ball and socket pivot joint that allows the mirror head to be adjusted relative to the stay) to electronics housed within the mirror head. A power supply housed within the mirror head can power electronic components housed within the mirror mounting base or stay. Memory disposed in the mirror head may pass data to and/or receive data from electronics disposed in the mirror mounting base or stay.

The above construction allows a manufacturer of interior rearview assemblies to supply to an OEM automaker (such as the likes of Ford or VW or Honda or Toyota, etc.) a multifunctional unitary part/assembly/module where the mounting base comprises a windshield electronics module (WEM) that includes the electronics (along with associated software), connectors, internal wiring/connections, PCBs and other hardware used for interior mirror functionality, for DMS/OCS functionality and for ADAS functionality. For example, and with the WEM-interior mirror unitary module mounted by the OEM automaker in a vehicle assembled by that OEM automaker, the WEM-interior mirror unitary module includes at least some selected from the group consisting of (i) an auto-dimming electro-optic (such as electrochromic) interior mirror transflective element, (ii) a DMS/OCS camera and associated near-IR light emitters and DMS data processor, (iii) a camera viewing forward through the windshield of the equipped vehicle that captures image data for data processing to detect objects present exterior of the equipped vehicle, (iv) a color camera viewing forward through the windshield of the equipped vehicle that captures color image data used by likes of an event recorder or an augmented reality display system of the equipped vehicle, and (v) a radar or lidar or other sensor with a field of sensing into the interior cabin of the vehicle for occupancy detection. In this regard, the WEM-interior mirror unitary module may utilize constructions and accessory incorporations such are disclosed in U.S. Pat. No. 9,090,213 (which is hereby incorporated herein by reference in its entirety and which discloses an accessory mounting system for a vehicle which includes spaced apart fixing elements adhesively attached at a surface of a vehicle windshield and a frame having receiving portions that are spaced apart from one another in a manner that corresponds with the spacing apart of the fixing elements, and each of the receiving portions being configured to receive a respective and corresponding one of the fixing elements). Furthermore, the WEM-interior mirror unitary module may utilize constructions and accessory inclusion constructions such are disclosed in U.S. Pat. Nos. 7,188,963; 6,690,268 and/or 7,480,149 (which are hereby incorporated herein by reference in their entireties).

Figure 79:
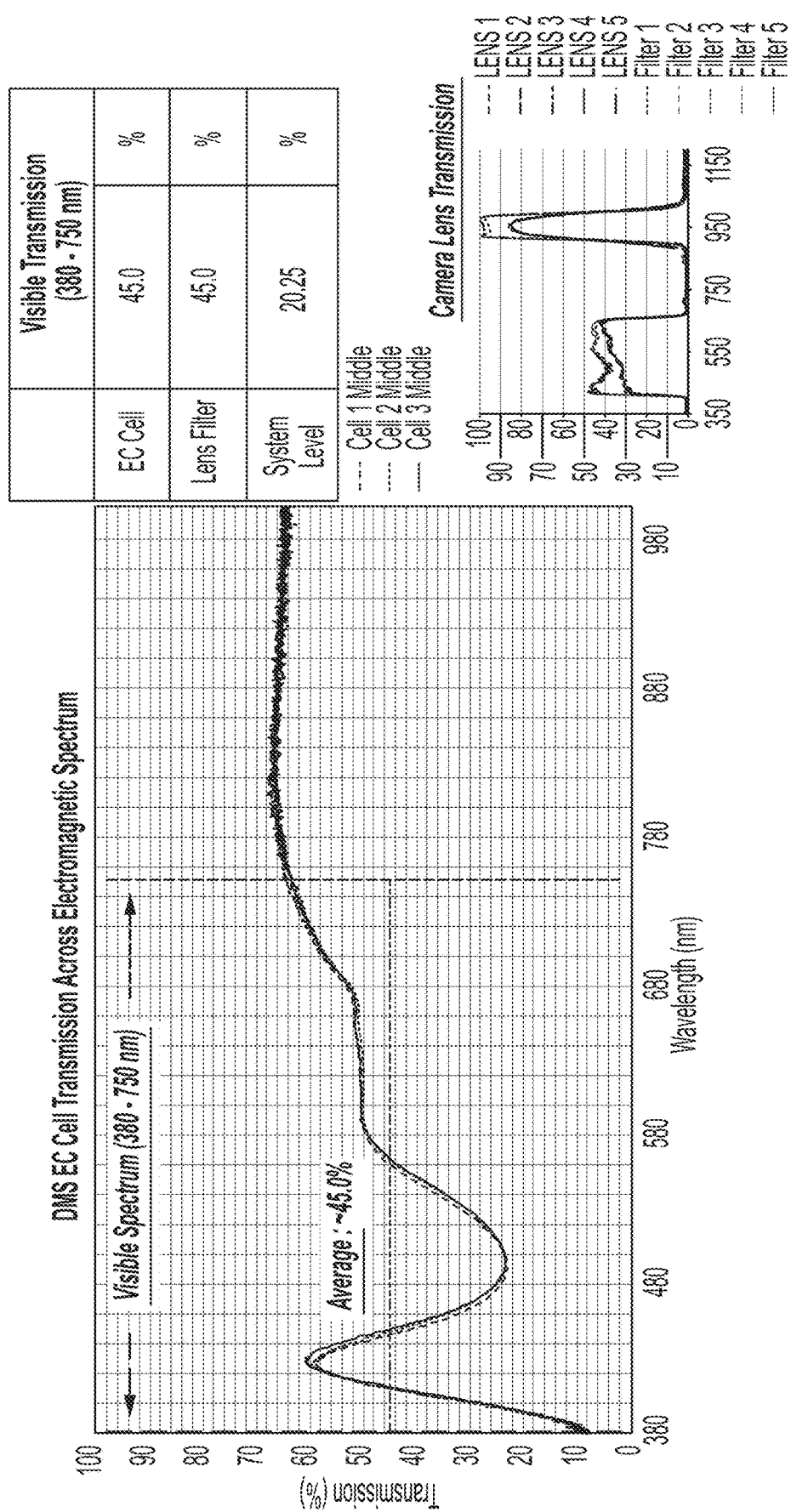
FIG. 79 shows an exemplary visible light transmission curve for a two-substrate laminate-type electrochromic transflective mirror reflective element (an "EC Cell") suitable for use in a One-Box Electrochromic Interior DMS Mirror Assembly.

FIG. 79 shows an exemplary visible light transmission curve for a two-substrate laminate-type electrochromic transflective mirror reflective element (an "EC Cell") suitable for use in a One-Box Electrochromic Interior DMS Mirror Assembly. Visible light transmission in the 380-750 nm region is around 45% T. The camera that views from within the mirror head to the interior of the cabin via the multilayer stack of oxide coatings that make up the visible light-transmitting/visible-light reflecting/near-IR transmitting mirror transflector coated onto the third surface (i.e., the side of the rear substrate contacted by the electrochromic medium sandwiched between the front and rear substrates) of the EC Cell itself views through a camera lens filter (shown in FIG. AA) that is around 45% transmitting to visible light in the 380-750 nm region. Thus the overall system is around 20% transmitting to visible light in the 380-750 nm region.

Figure 80:
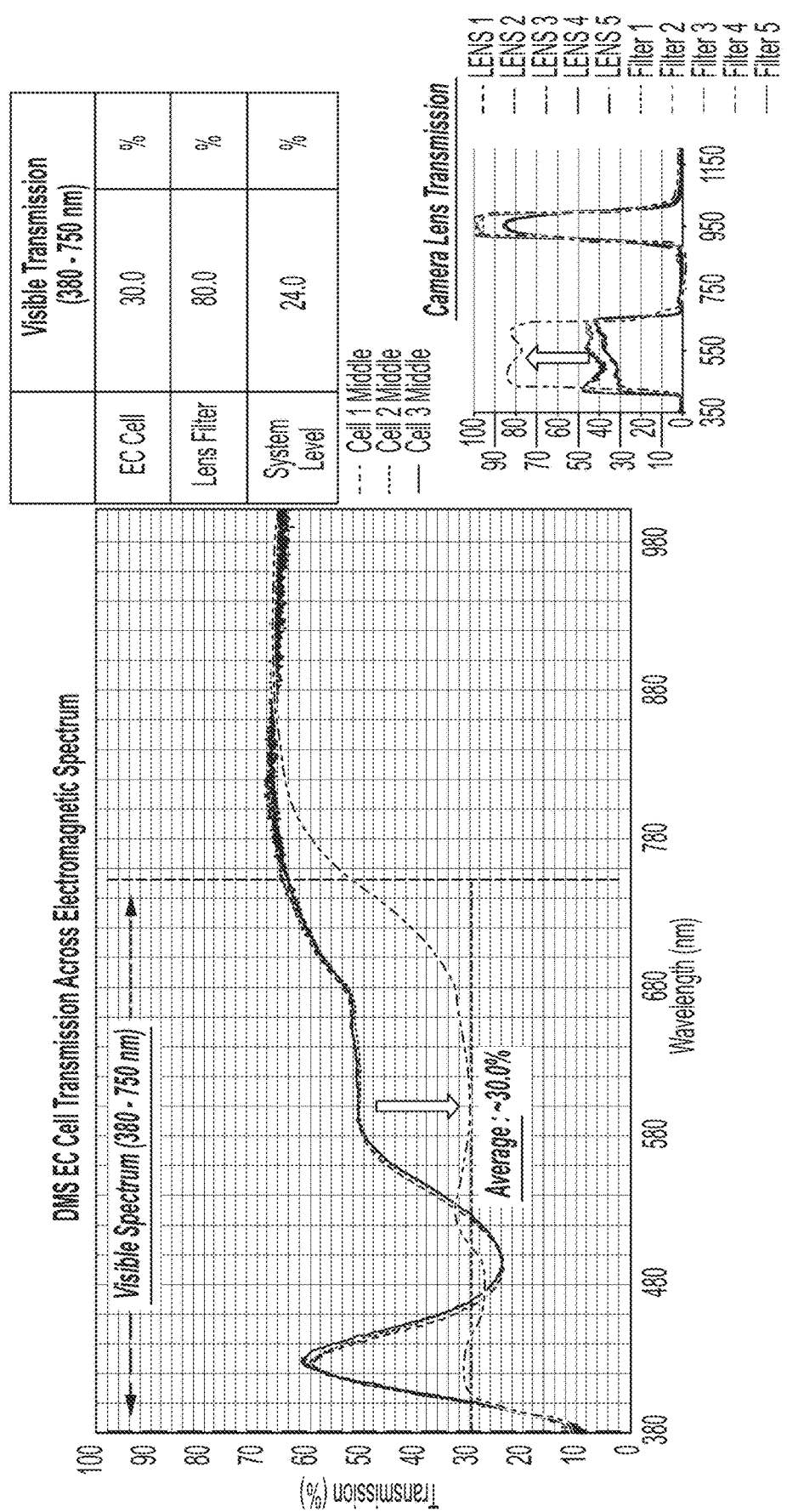
FIG. 80 shows another exemplary visible light transmission curve for an EC Cell suitable for use in a One-Box Electrochromic Interior DMS Mirror Assembly.

FIG. 80 shows another exemplary visible light transmission curve for an EC Cell suitable for use in a One-Box Electrochromic Interior DMS Mirror Assembly. Visible light transmission in the 380-750 nm region is around 30% T. The camera that views from within the mirror head to the interior of the cabin via the multilayer stack of oxide coatings that make up the visible light-transmitting/visible-light reflecting/near-IR transmitting mirror transflector coated onto the third surface (i.e., the side of the rear substrate contacted by the electrochromic medium sandwiched between the front and rear substrates) of the EC Cell itself views through a camera lens filter (shown in FIG. 80) that is around 80% transmitting to visible light in the 380-750 nm region. Thus the overall system is around 24% transmitting to visible light in the 380-750 nm region.

Figure 81:
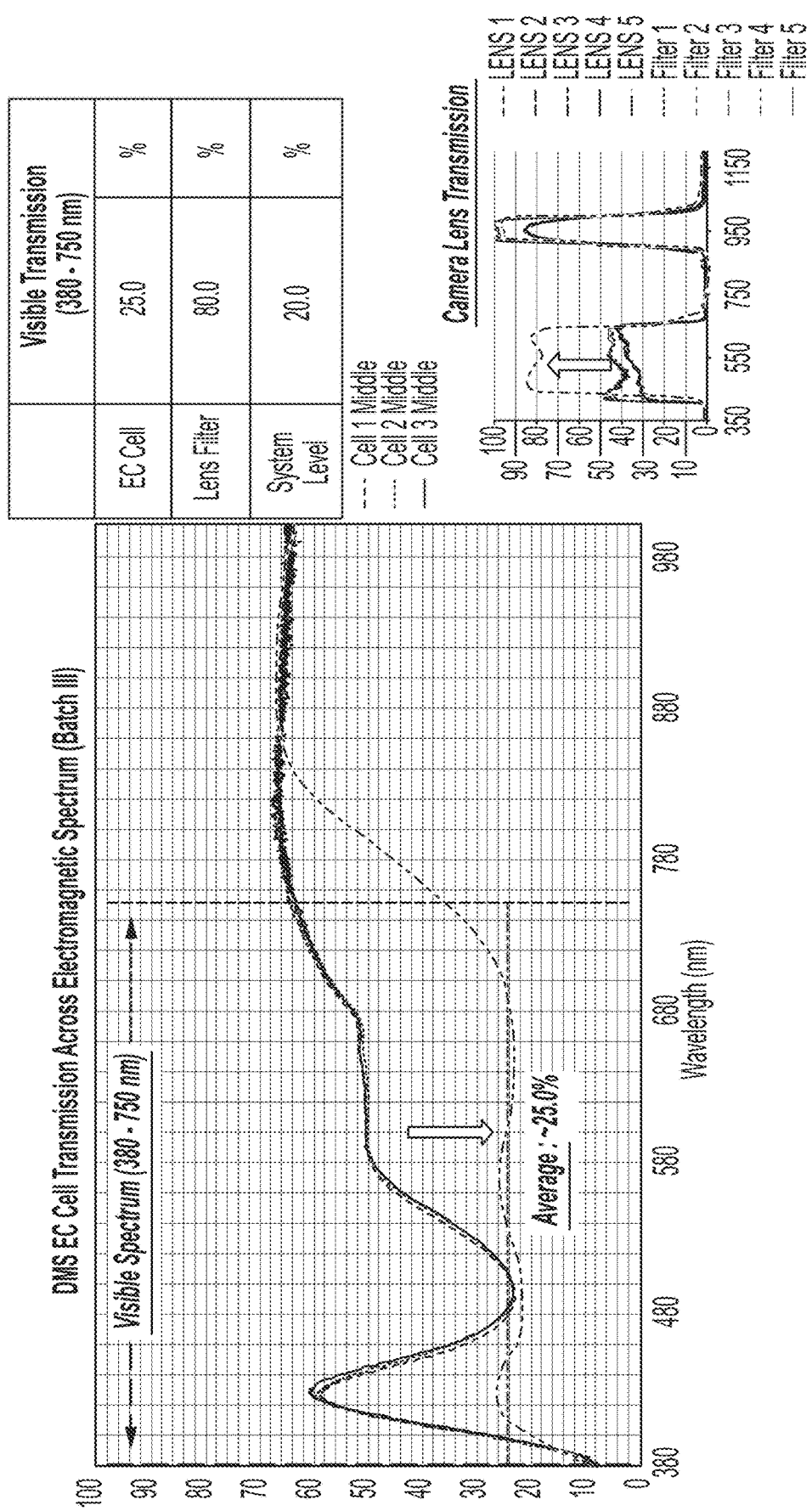
FIG. 81 shows another exemplary visible light transmission curve for an EC Cell suitable for use in a One-Box Electrochromic Interior DMS Mirror Assembly.

FIG. 81 shows another exemplary visible light transmission curve for an EC Cell suitable for use in a One-Box Electrochromic Interior DMS Mirror Assembly. Visible light transmission in the 380-750 nm region is around 25% T. The camera that views from within the mirror head to the interior of the cabin via the multilayer stack of oxide coatings that make up the visible light-transmitting/visible-light reflecting/near-IR transmitting mirror transflector coated onto the third surface (i.e., the side of the rear substrate contacted by the electrochromic medium sandwiched between the front and rear substrates) of the EC Cell itself views through a camera lens filter (shown in FIG. 81) that is around 80% transmitting to visible light in the 380-750 nm region. Thus the overall system is around 20% transmitting to visible light in the 380-750 nm region.

With the One-Box Electrochromic Interior DMS Mirror Assembly mounted in an equipped vehicle (typically mounted to a mirror mounting button or similar mirror-mounting element that is adhered at the in-cabin side of the windshield of the equipped vehicle), the visible light-transmitting/visible-light reflecting/near-IR transmitting mirror transflector coated onto the third surface of the EC Cell renders the presence especially of the driver-viewing camera (but also of the IR emitting sources and the rest of the electronics) not be readily seen by a driver sitting in the front drivers' seat and normally viewing the interior rearview mirror during normal driving (by day or by night). This is at least because some drivers may be disconcerted (for likes of privacy reasons and notwithstanding the safety function/purpose of the DMS) by being viewed/recorded by a camera while driving. Other than where the camera views through (and where the IR emitting sources emit through) the mirror transflector coated onto the third surface of the EC Cell, light entering via the EC Cell into the interior cavity of the mirror head can be blocked by the likes of a light absorbing (for example, black) paint or lacquer or coating or tape or a plate or an adhesive tape or an attachment member or a bracket), leaving the local regions of the transflector that the camera views through (and where the IR emitting sources emit through) the sole avenues for light to enter the cavity of the mirror head via passage through the EC Cell.

Figure 82:
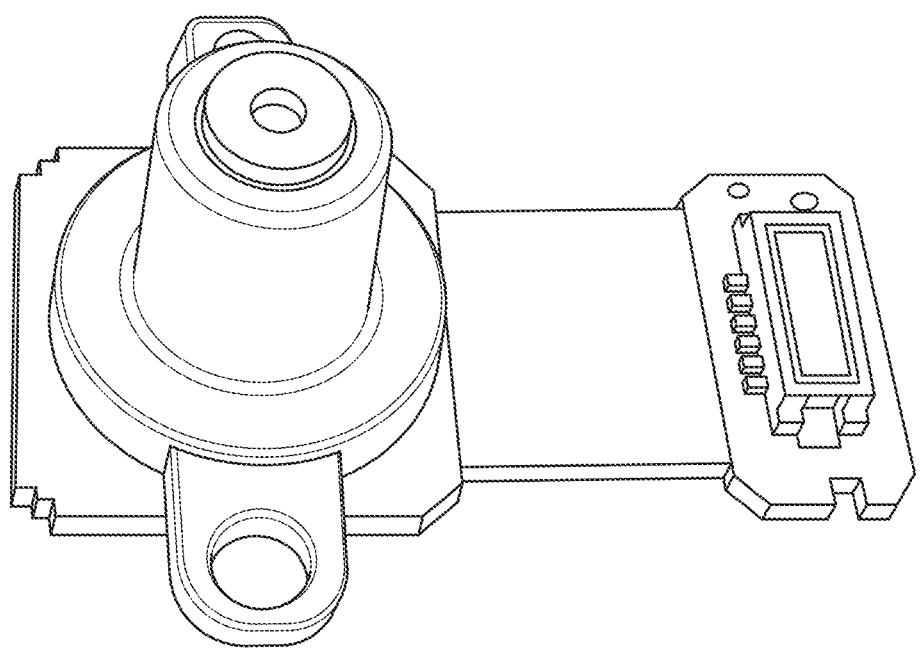
FIG. 82 is a perspective view of an imager assembly with the outer surfaces of the driver-monitoring camera coated with a dark/light-absorbing/black coating.

The One-Box Electrochromic Interior DMS Mirror Assembly employs various covertness-enhancing measures to render the innards of the mirror head (and especially the presence within the cavity of the mirror head of the driver-monitoring camera and driver-illuminating near-IR light sources) covert to a driver normally operating the equipped vehicle. Such covertness-enhancing measures include preferably having visible light transmission in the 380-750 nm region through the mirror transflector (coated onto the 3rd surface of the EC Cell) be in the 20% T to 35% T range (and more preferably in the 15% T to 35% T range, and most preferably in the 20% T to 30% T range). Such covertness-enhancing measures include rendering/coating/painting the outer surfaces of the driver-monitoring camera to be dark/light-absorbing/black, such as is shown in FIG. 82. Such covertness-enhancing measures include use of the dual-bandpass restricted visible and restricted near-IR lens filter (see FIGS. 79-81) placed behind the mirror transflector of the EC Cell so that the driver-monitoring camera views though this optical filter and such that the optical filter reduces awareness by the driver of the equipped vehicle of the presence of the camera within the mirror head of the interior rearview mirror assembly.

Vehicular Advanced Driver-Assistance Systems (ADAS) increase driving/traffic safety via likes of automatic emergency braking (AEB), lane departure warnings, blind-spot detection and other types of crash-prevention/collision-mitigation technologies. A One-Box DMS Interior Mirror Assembly of the present invention economically enhances safety of an ADAS-equipped vehicle.

For example, the One-Box DMS Interior Mirror Assembly in an equipped vehicle determines whether the driver is distracted. If the driver is determined by the in-mirror DMS to be distracted, the distance before an AEB system of the vehicle starts to stop the car can be increased or a lane-keeping assistance system of the equipped vehicle can become more sensitive and take over more vehicle control when a distracted or drowsy driver is detected. The camera (that is covertly within the mirror head) of a preferred One-Box DMS Interior DMS Mirror Assembly of the present invention monitors the driver using advanced algorithms and technology to detect data points on the eyes and the face of the driver. Combined with near-IR illumination of the driver's eyes/face/head provided by the nFOV near-IR LEDs located with the mirror head, the driver's attention level is tracked via like of detecting eye movement, monitoring head position, monitoring eyelid activity and determining the driver's gaze direction. If the DMS electronics housed in the mirror head of the One-Box Interior DMS Mirror Assembly determines that the driver is not paying enough attention to the road, or is getting sleepy, a warnings or alert (that can be visual, audible and/or tactile or haptic) is generated within the cabin of the equipped vehicle to remind the driver to pay better attention to driving. The DMS system within the mirror head of the One-Box DMS Interior Mirror Assembly generates outputs such warnings are alerts as signals or messages on a vehicle communication network/vehicle communication network bus of the equipped vehicle [for example, on a controller area network (CAN) communication bus or on an ETHERNET communication bus]. In response to such outputs/signals generated by in-mirror DMS, the driver is alerted and/or other action is taken by the equipped vehicle. Data communication is bidirectional with vehicle data (including data generated by or relevant to ADAS systems of the equipped vehicle) being transmitted/carried/conveyed to the One-Box DMS Interior Mirror Assembly via likes of a CAN communication bus or an ETHERNET communication bus.

In addition to the driver monitoring camera monitoring the alertness and condition of the driver and detecting distraction, drowsiness and microsleeps so as to alert the driver in time, the One-Box DMS Interior Mirror Assembly can process data captured by the driver-monitoring camera using facial recognition technology and/or other biometric detection algorithms. Upon recognizing the particular driver who is driving the equipped vehicle (preferably based on driver profiles stored within the One-Box DMS Interior Mirror Assembly or accessed via a wireless Cloud-based communication from the equipped vehicle to a remote data base/service provider), the One-Box DMS Interior Mirror Assembly can output a signal/message via a CAN or ETHERNET communication bus of the vehicle to adjust personal comfort and convenience settings to what that recognized driver normally prefers (such as optimal seat position, desired exterior mirror positions, a favorite radio station and/or a preferred interior temperature).

The average male head measurement is between around 57 cm (22.5 inches) and 61 cm (24.2 inches) in circumference. The mean value of face length is around 117 mm male/110 mm female. The mean value of face width is around 148 mm male/140 mm female. The camera in the One-Box DMS Interior Mirror Assembly captures frames of image data (typically at least 15 frames/sec or at least 30 frames per second, and optionally 60 frames per second). When driving, the driver faces forward and views straight out the front windshield of the equipped vehicle. The driver is typically seated at an eye-to-center-of-mirror distance of around 400 mm (16 inches) to around 800 mm (31 inches).

The International Organization for Standardization's ISO 4513:2010 (*Road vehicles—Visibility—Method for establishment of eyellipses for driver's eye location*) describes the eyellipse, a statistical representation of driver eye locations for a driver using and viewing an interior rearview mirror in vehicle motor vehicles. Elliptical (eyellipse) models in three dimensions are used to represent tangent cut-off percentiles of driver eye locations. Procedures are provided to construct 95th and 99th percentile tangent cut-off eyellipses for a 50/50 gender mix, adult user population. Interior rearview mirror location, size and shape is defined in RREG 79/795 and E/ECE/324/Rev.1/Add.45/Rev.5-E/ECE/TRANS/505/Rev.1/Add.45/Rev.5, which relate back to the driver's eyes position—called 'eye ellipse' in the Society of Automotive Engineers Recommended Practice SAE J941 and 'eye points'/'ocular points' in accordance with RREG 77/649. RREG's are Directives of the Council of the European Union and E/ECE's that for the United Nations. Federal Motor Vehicle Safety Standard FMVSS 111, which defines minimum requirements in the USA for field of view of rearview mirrors, bases calculations of field of view on the eyellipse, which is defined in SAE Recommended Practice J941. The eyellipse is a tangent ellipse that defines where a drivers' eyes are located in a given vehicle. For a 95% eyellipse, any plane tangent to the eyellipse separates the space into two regions, one of which contains 95% of predicted eye locations and one which contains the other 5%. For a 99% eyellipse any tangent plane separates the space into regions containing 99% and 1% of eye locations. In theory, an eyellipse could be generated to separate the space into regions containing any percentage of eye locations. However, SAE J941 gives definitions for only 95% and 99% ellipses.

Irradiance (the radiant flux received by a surface per unit area) at the driver's head (and especially at the driver's eyes for drowsiness detection) is important, and especially during nighttime driving when the interior cabin is dark and where the DMS camera in the mirror head principally relies on near-IR illumination emitted by the near-IR light sources in the mirror head. A near-IR irradiance of at likes of the driver's eyes of at least 1 W/m$^2$ is preferred, at least 2 W/m$^2$ is more preferred, and at least 2.5 W/m$^2$ is more preferred, and especially within the 99% eyellipse per SAE J194 for the particular driver seated in the driver's seat of a particular vehicle equipped with a One-Box DMS Interior Rearview Mirror Assembly vehicle of the present invention. To assure the desired irradiance is delivered to the various drivers who might drive a vehicle equipped with a One-Box DMS Interior Mirror Assembly and for their head movements, suitably high irradiance by the mirror's near-IR emitting light sources of an area at where a driver's head can be expected to be found is provided, such area being of dimension at least 80 mm×80 mm; more preferably at least 100 mm×100 mm; more preferably at least 150 mm×150 mm.

When adjusting the interior mirror assembly so that the driver, using the interior mirror, can see out the rear window of the vehicle, the driver may turn his or her head towards the mirror head that is being grasped to adjust the field or rearward view of the interior rearview mirror to that particular driver's desired setting/orientation. The near-IR radiation reflector used in conjunction with the nFOV near-IR emitting LEDs within the mirror head concentrates and focuses illumination of the driver's head and especially of the driver's face and more especially the driver's eyes and most especially the driver's eyelid/pupils (which are indicators of drowsiness and also are indicators as to where the driver is looking).

Figure 83:
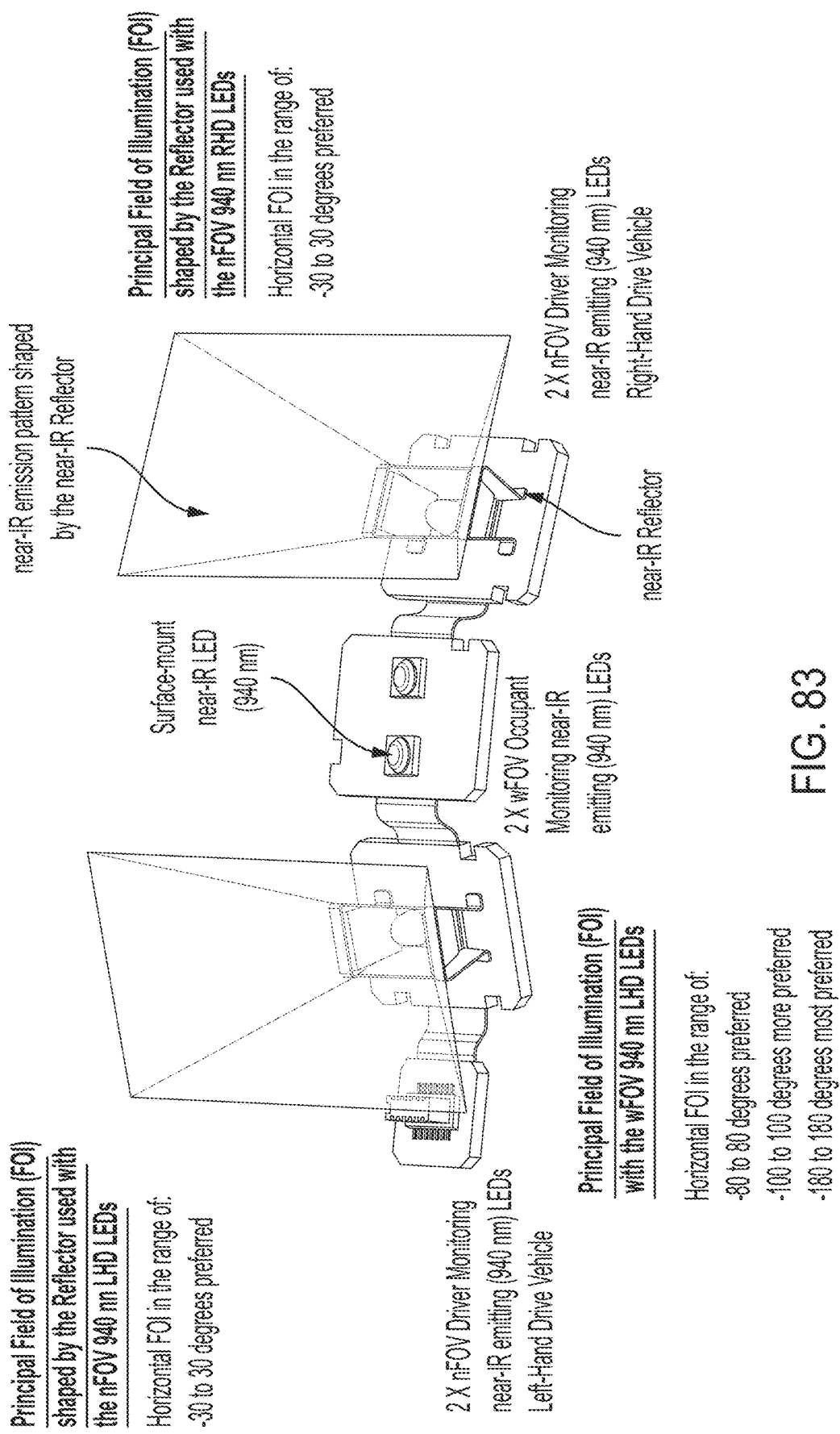
FIG. 83 shows the near-IR emission pattern shaped by the near-IR Reflector for the two narrow field of view LEDs for use in a left-hand drive vehicle and the near-IR emission pattern shaped by the near-IR Reflector for the two narrow field of view LEDs for use in a right-hand drive vehicle.
Figure 84A:
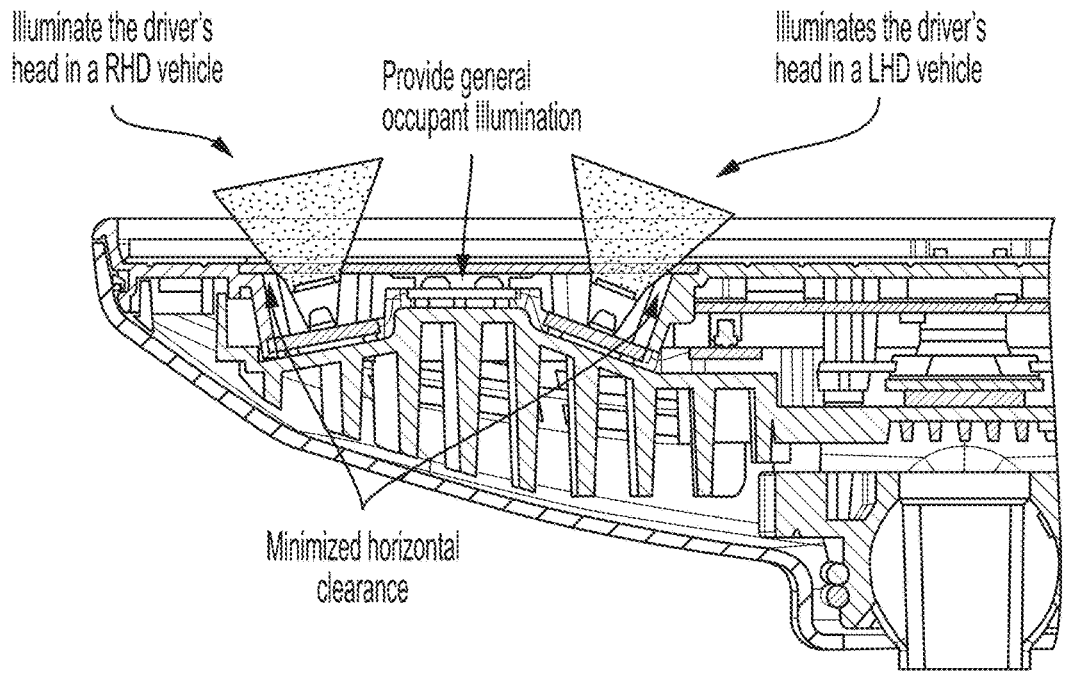
FIG. 84A-84C show near-IR light-emitting sources disposed in and supported by structure of the mirror head of the One-Box Electrochromic Interior DMS Mirror Assembly.
Figure 84B:
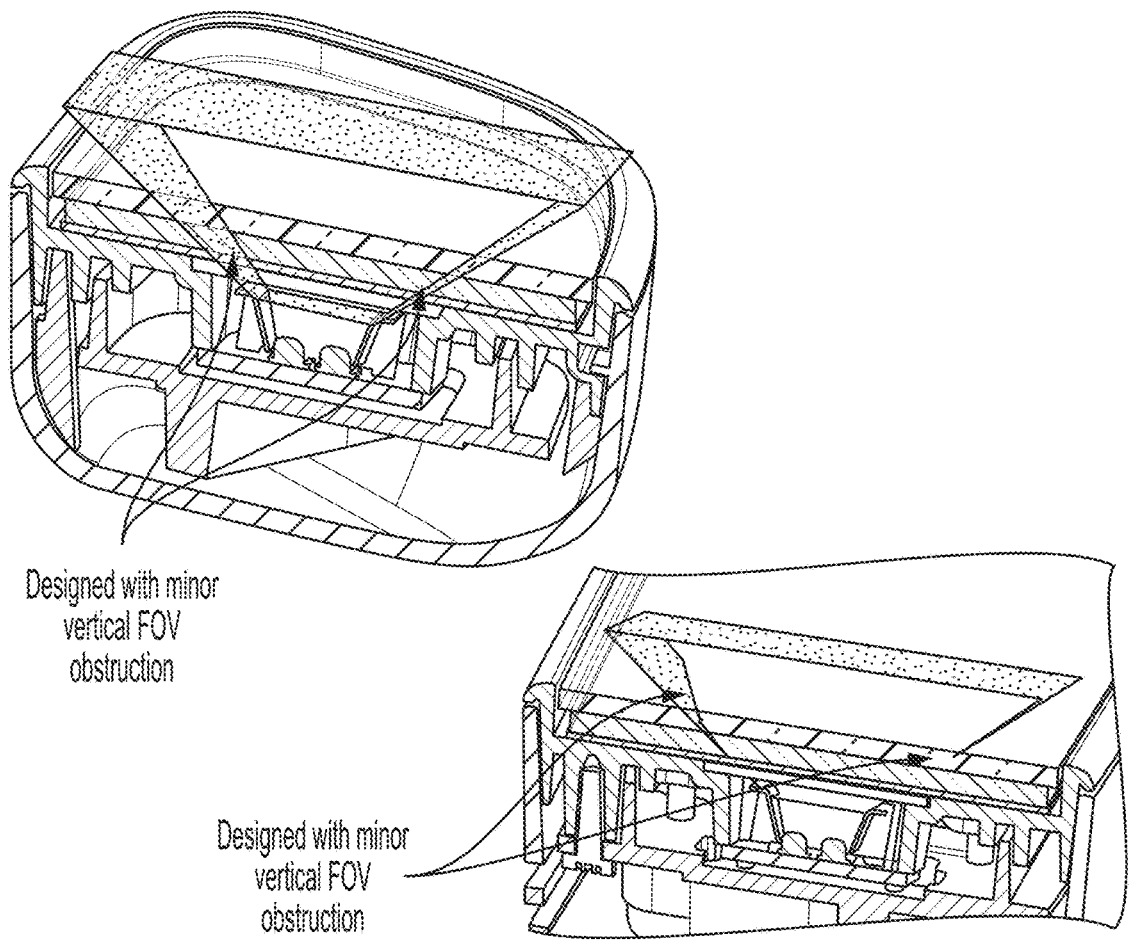
Figure 84C:
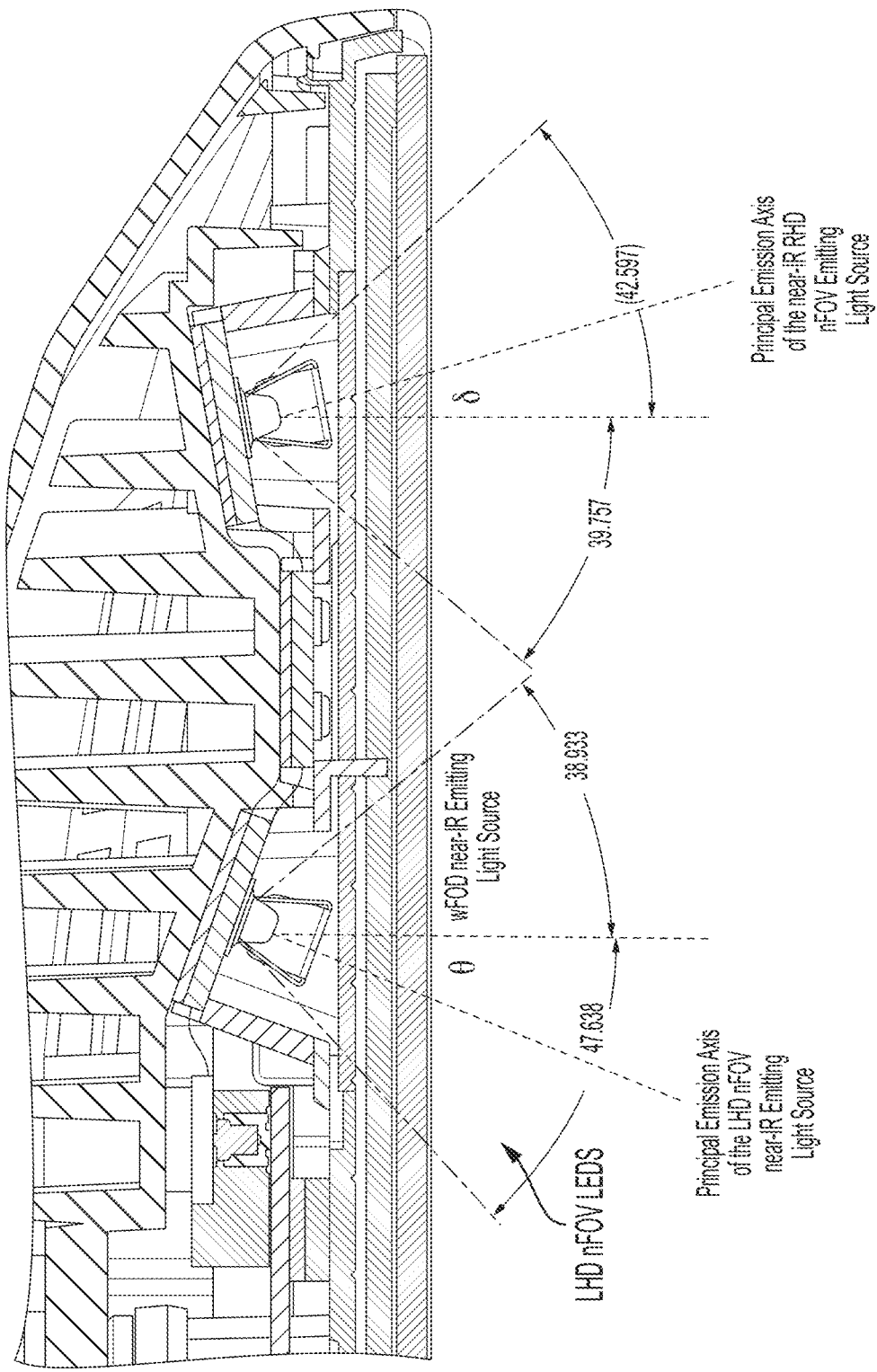

Regarding the near-IR light sources housed within the interior cavity of the mirror head, FIG. 83 shows the near-IR emission pattern shaped by the near-IR Reflector for the two narrow field of view (nFOV) 940 nm LEDs for use in a left-hand drive vehicle and the near-IR emission pattern shaped by the near-IR Reflector for the two narrow field of view (nFOV) 940 nm LEDs for use in a right-hand drive vehicle. A surface mount LED emits in all directions—the reflector thus forms a directed cone or pattern of near-IR illumination. FIGS. 84A-C show how these near-IR light-emitting sources are disposed in and are supported by/angled by [relative to the plane of the rear side of the rear glass surface of the EC Cell (its fourth surface)] structure of the mirror head of the One-Box Electrochromic Interior DMS Mirror Assembly. As shown in FIG. 84C, the LHD nFOV LEDs are at an angle of about 20 degrees relative to the front surface of the mirror reflective element, the wFOV LEDs are at an angle of zero degrees relative to the front surface of the mirror reflective element, and the RHD nFOV LEDs are at an angle of about 10 degrees relative to the front surface of the mirror reflective element. As also shown in FIG. 84C, the wFOV LEDs are preferably physically close to the mirror reflective element (though may be slightly to-off for to enhance covertness) so most or all of the near-IR light emitted by the wFOV LEDs goes into the vehicle cabin, while the nFOV LEDs are spaced from the mirror reflective element (by the surface mounted reflectors) and angled so the near-IR light emitted by the nFOV LEDs is guided or concentrated by the reflectors toward the driver region in the vehicle cabin.

Figure 85B:
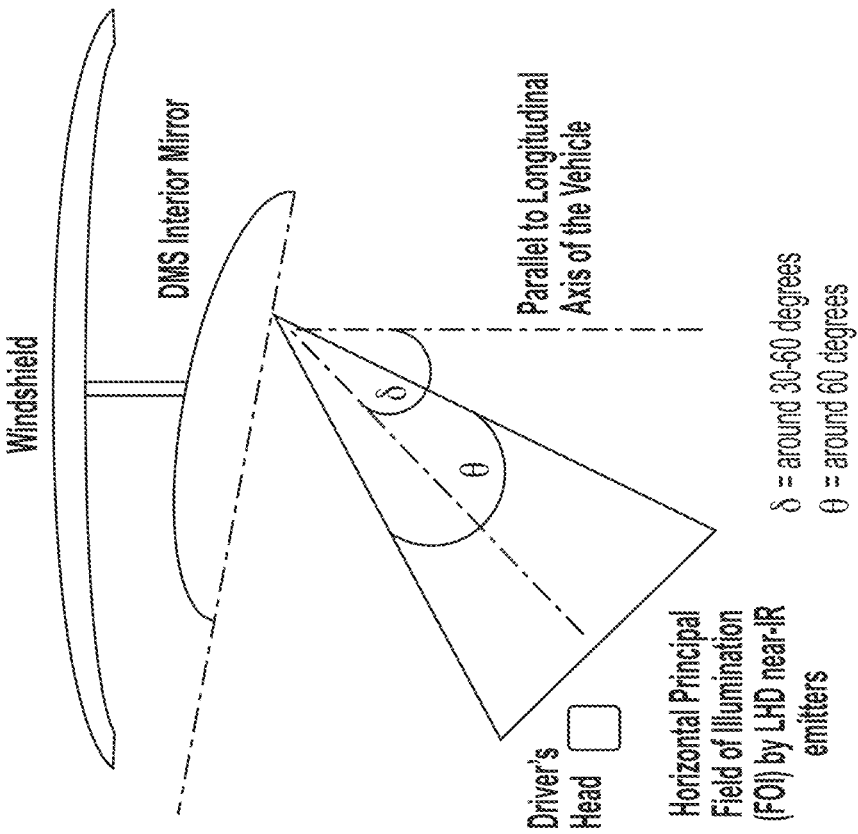
FIGS. 85A and 85B are plan views from above of the One-Box Interior DMS Mirror Assembly as mounted in a LHD vehicle.
Figure 85A:
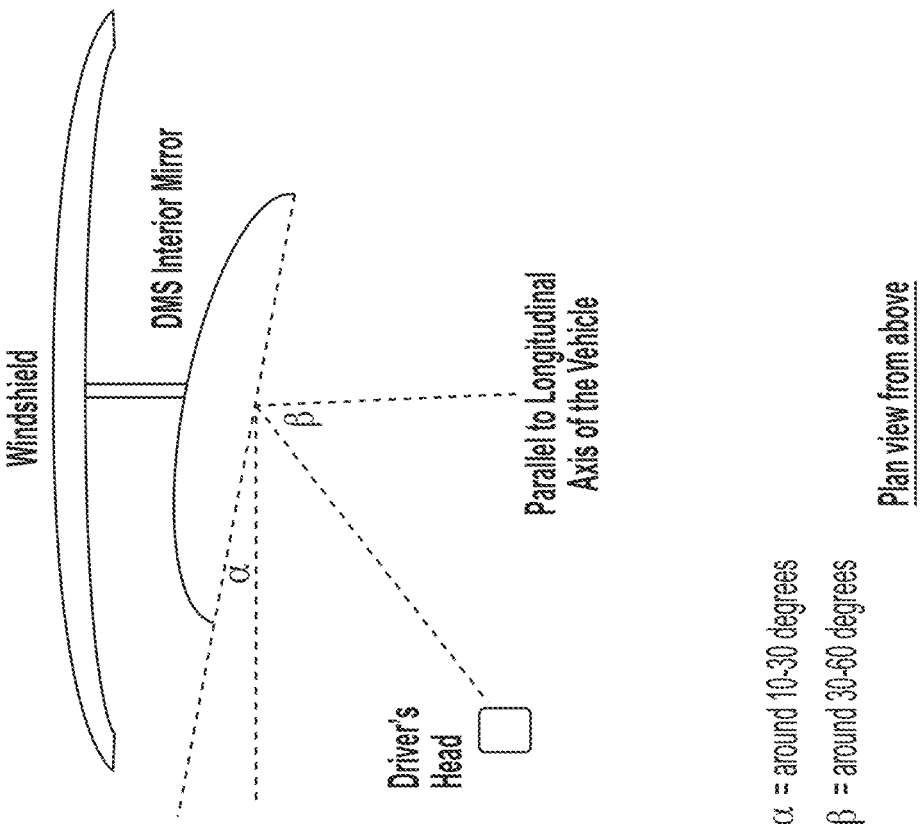
Figure 87B:
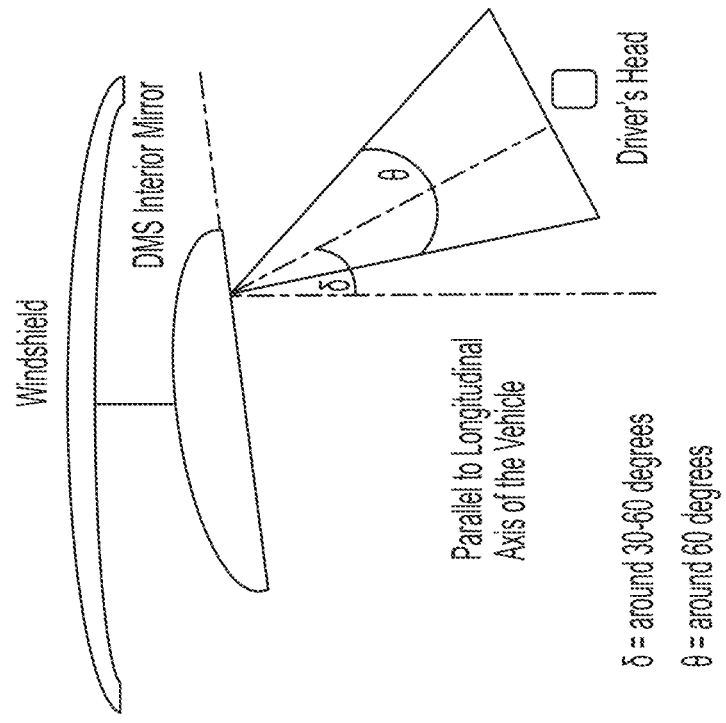
FIGS. 87A and 87B are plan views from above of the One-Box Interior DMS Mirror Assembly as mounted in a RHD vehicle.
Figure 87A:
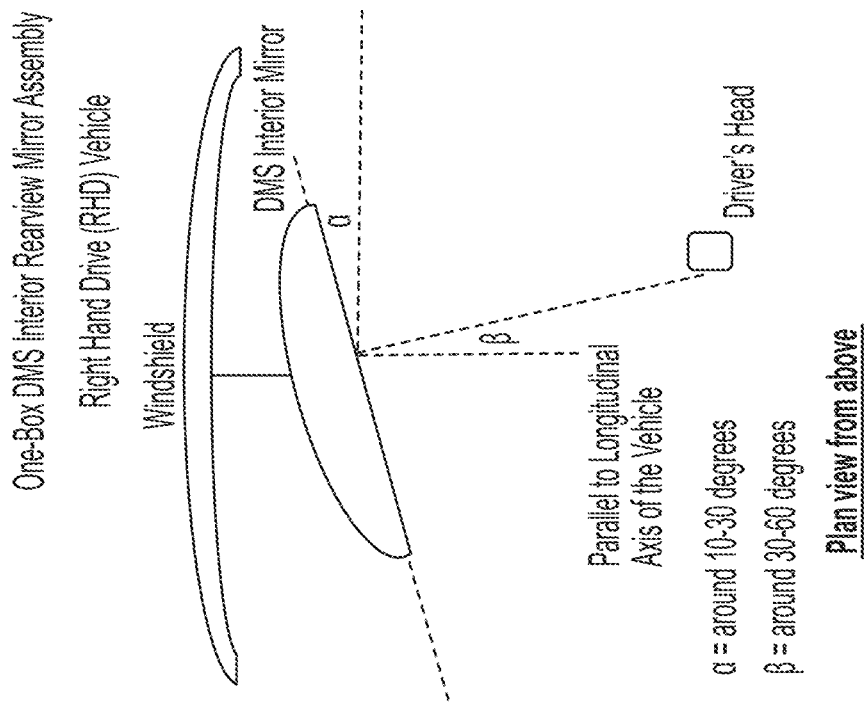

As shown in FIG. 85A, with the One-Box Interior DMS Mirror Assembly mounted at the windshield and angled toward the driver (shown for a left hand drive vehicle in FIG. 85A), the mirror head is angled or canted at about 10-30 degrees relative to a cross axis of the vehicle that is perpendicular to the longitudinal axis of the vehicle. As shown in FIG. 85B, the n-FOV light emitters emit light to illuminate the driver's head, with the angle or width of the illumination beam being around 60 degrees, with the principal axis of the illumination beam being between 10 and 30 degrees relative to a line perpendicular to the planar front surface of the mirror reflective element, more preferably between 15 and 25 degrees relative to a line perpendicular to the planar front surface of the mirror reflective element, such as around 20 degrees relative to the a line perpendicular to the planar front surface of the mirror reflective element (i.e., the circuit board on which the nFOV light emitter is disposed is at an angle of about 10-30 degrees relative to the planar front surface of the mirror reflective element, more preferably at an angle between 15 and 25 degrees relative to the planar front surface of the mirror reflective element, such as around 20 degrees relative to the planar front surface of the mirror reflective element). FIGS. 86A and 86B show the dimensions and angles and configuration of the One-Box Interior DMS Mirror Assembly mounted at a LHD vehicle. FIG. 86C shows geometry and equations that may be used to determine the angles of the LHD nFOV LEDs.

in FIG. 87A, with the One-Box Interior DMS Mirror Assembly mounted at the windshield and angled toward the driver (shown for a right hand drive vehicle in FIG. 87A), the mirror head is angled or canted at about 10-30 degrees relative to a cross axis of the vehicle that is perpendicular to the longitudinal axis of the vehicle. As shown in FIG. 87B, the n-FOV light emitters emit light to illuminate the driver's head, with the angle or width of the illumination beam being around 60 degrees, with the principal axis of the illumination beam being between 0 and 20 degrees relative to a line perpendicular to the planar front surface of the mirror reflective element, more preferably between 5 and 15 degrees relative to a line perpendicular to the planar front surface of the mirror reflective element, such as around 10 degrees relative to a line perpendicular to the planar front surface of the mirror reflective element (i.e., the circuit board on which the nFOV light emitter is disposed is at a non-zero angle up to about 20 degrees relative to the planar front surface of the mirror reflective element, more preferably at an angle between 5 and 15 degrees relative to the planar front surface of the mirror reflective element, such as around 10 degrees relative to the planar front surface of the mirror reflective element). FIG. 88A shows the angles and configuration of the One-Box Interior DMS Mirror Assembly mounted at a RHD vehicle. FIG. 88B shows geometry and equations that may be used to determine the angles of the LHD nFOV LEDs.

The angle of the LHD nFOV near-IR illumination source (relative to the planar surface of the mirror reflective element) thus may be different than the angle of the RHD wFOV near-IR illumination source (relative to the planar surface of the mirror reflective element), and in opposite directions (i.e., the principal emission axis of the LHD nFOV near-IR illumination sources is angled toward the left side of the mirror head (and vehicle) and the principal emission axis of the RHD nFOV near-IR illumination sources is angled toward the right side of the mirror head (and vehicle)). Optionally, the angle of the LHD nFOV near-IR illumination source (relative to the planar surface of the mirror reflective element) may be the same as the angle of the RHD wFOV near-IR illumination source (relative to the planar surface of the mirror reflective element), but in a laterally opposite direction than the angle of the RHD wFOV near-IR illumination source. For example, the nFOV near-IR illumination sources may be at an angle relative to the planar surface of the mirror reflective element of between 5 degrees and 25 degrees, such as between 10 degrees and 20 degrees, such as, for example, 15 degrees, with principal emission axis of the LHD nFOV near-IR illumination sources angled toward the left side of the mirror head (and vehicle) and the principal emission axis of the RHD nFOV near-IR illumination sources angled toward the right side of the mirror head (and vehicle). In other words, the LHD nFOV near-IR illumination source may be at, for example, −15 degrees and the RHD nFOV near-IR illumination source may be at, for example, +15 degrees relative to the planar surface of the mirror reflective element.

The principal line of sight of the DMS camera passes perpendicularly through the planar front surface of the mirror reflective element disposed at the mirror head of the One-Box DMS Interior Rearview Mirror Assembly. The field of view of the centrally-located DMS camera includes the head/eyellipse driver's eyes region when the mirror head is adjusted by the driver when the One-Box DMS Interior Rearview Mirror Assembly is installed at either a LHD vehicle or a RHD vehicle. For a variety of reasons, including that the central region of the cavity of the mirror head is crowded by the likes of the DMS camera and the ball-and-socket pivot joint about which the mirror head moves when the driver adjusts the mirror in the equipped vehicle, the nFOV near-IR emitting light source intended to illuminate the head/eyellipse driver's eyes region is located within the mirror head at a distance d mm from a centerline that bisects the center of the length dimension of the mirror reflective element. As shown in FIGS. 85A, 85B, 86A and 86B, the LHD nFOV near-IR emitting light source is angled relative to the planar front side/surface of the mirror reflective element so that, with the One-Box DMS Interior Rearview Mirror Assembly installed at a LHD vehicle and with the mirror head adjusted by the driver, the principal emission axis of the LHD nFOV near-IR emitting light source is canted toward the driver. Similarly, and such as shown in FIGS. 87A, 87B and 88A, the RHD nFOV near-IR emitting light source is angled relative to the planar front side/surface of the mirror reflective element so that, with the One-Box DMS Interior Rearview Mirror Assembly installed at a RHD vehicle and with the mirror head adjusted by the driver, the principal emission axis of the RHD nFOV near-IR emitting light source is canted toward the driver.

For an LHD application of the One-Box DMS Interior Rearview Mirror Assembly, as the dimension d increases (i.e., as the LHD nFOV near-IR emitting light source is located further away from the centerline of the mirror reflective element), the greater the angle that the principal emission axis of the LHD nFOV near-IR emitting light source must subtend relative to the plane of the planar front side/surface of the mirror reflective element in order to provide the line of illumination toward the driver of the LHD vehicle. However, for a RHD application of the One-Box DMS Interior Rearview Mirror Assembly, as the dimension d increases (i.e., as the RHD nFOV near-IR emitting light source is located further away from the centerline of the mirror reflective element), the lower the angle that the principal emission axis of the RHD nFOV near-IR emitting light source must subtend relative to the plane of the planar front side/surface of the mirror reflective element in order to provide the line of illumination toward the driver of the RHD vehicle. Thus, for applications where the One-Box DMS Interior Rearview Mirror Assembly is installed in a LHD vehicle, the LHD nFOV near-IR emitting light source is angled at, for example, about 20 degrees relative to the planar front side/surface of the mirror reflective element, with a distance d (between the mirror centerline and the LHD nFOV near-IR emitting light source) of about 50 mm. For applications where the One-Box DMS Interior Rearview Mirror Assembly is installed in a RHD vehicle, the RHD nFOV near-IR emitting light source is angled at, for example, about 10 degrees relative to the planar front side/surface of the mirror reflective element, with a distance d (between the mirror centerline and the RHD nFOV near-IR emitting light source) of about 89 mm.

Thus, as the distance d increases, the respective angle of the LHD nFOV near-IR emitting light source (relative to the planar front side/surface of the mirror reflective element) increases, and the respective angle of the RHD nFOV near-IR emitting light source (relative to the planar front side/surface of the mirror reflective element) decreases.

Figure 90:
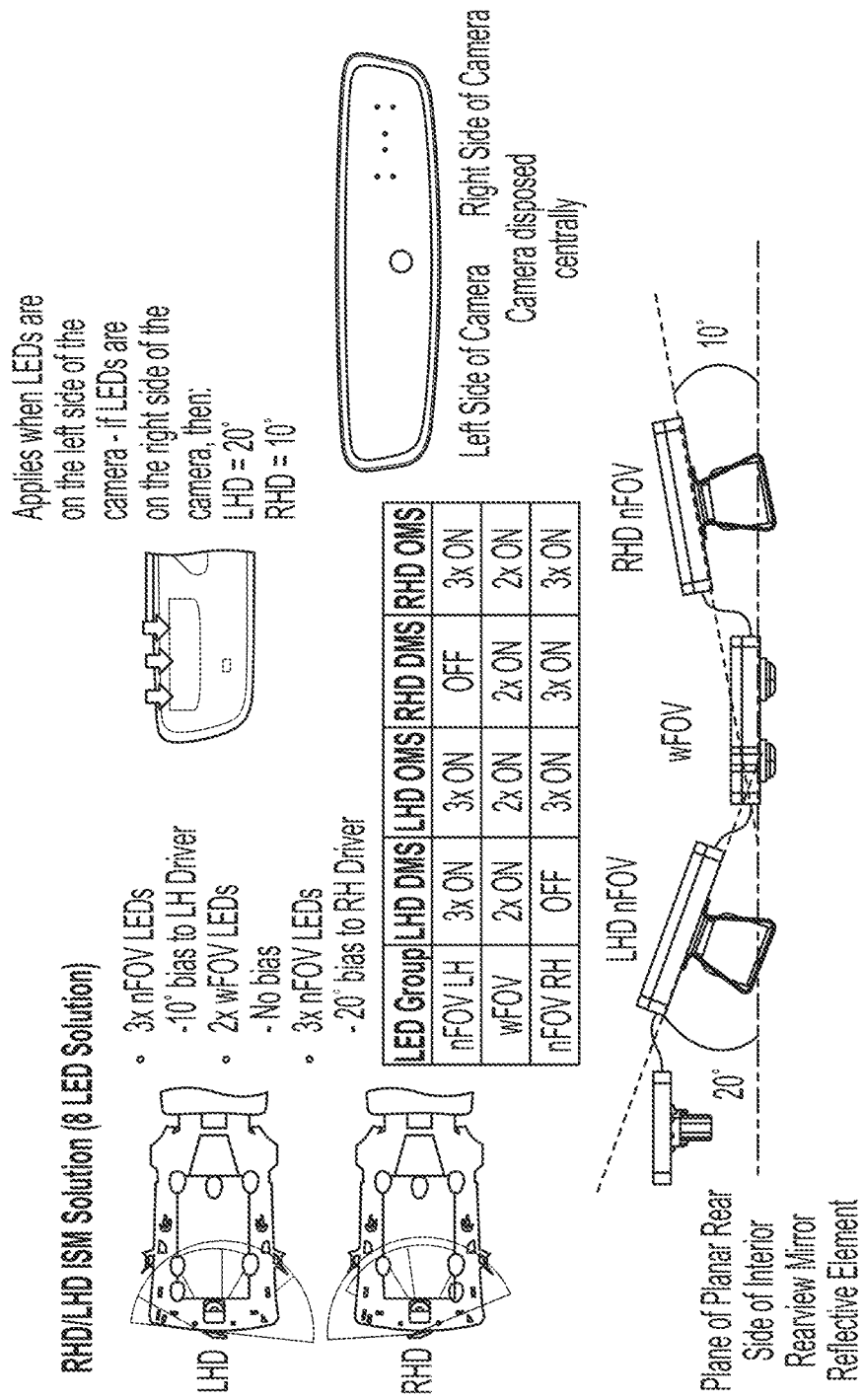
FIG. 90 shows the One-Box Interior DMS Mirror Assembly suitable for use on both a RHD vehicle and a LHD vehicle.

As shown in FIG. 90, the One-Box Interior DMS Mirror Assembly is suitable for use on a LHD vehicle or a RHD vehicle (such as by utilizing aspects of the systems described in U.S. provisional applications, Ser. No. 63/267,316, filed Jan. 31, 2022, Ser. No. 63/262,642, filed Oct. 18, 2021, and Ser. No. 63/201,757, filed May 12, 2021, which are all hereby incorporated herein by reference in their entireties). When the One-Box Interior DMS Mirror Assembly is mounted in a LHD vehicle (see FIGS. 85A, 85B, 86A, 86B), the camera views and the light emitter(s) illuminate LHD Driver's eyes position when the driver is seated in the driver's seat and is viewing the Interior Mirror Reflective Element.

Thus, FIGS. 85A and 85B show (in a left hand drive vehicle) how a driver adjusts the mirror of a One-Box DMS Interior Rearview Mirror Assembly so that the driver can use the mirror reflective element to see rearward via a rear window of the equipped vehicle. Depending on the seating position and size of a particular driver, the front (outermost) side of the planar interior mirror reflective element subtends (in plan-view from above) an acute angle relative to the transverse axis of the vehicle in a range from about 10 degrees to about 30 degrees. As can also be seen in FIG. 85A, nFOV LEDs are located a distance to the right from the center of the mirror head (where the DMS camera is located). FIGS. 87A and 87B show the situation in a RHD vehicle. As can be seen in FIG. 84C, the Principal Emission Axis of the LHD nFOV near-IR Emitting Light Source is at an angle θ relative to the line vertically passing though the planar front glass substrate of the mirror reflective element of the mirror head of the One-Box DMS Infinity™ Electrochromic Interior Rearview Mirror Assembly shown (for an RHD vehicle, the corresponding angle is δ). Angle Θ typically ranges from around −10 degrees to around −35 degrees (e.g., −20 degrees). Angle δ typically ranges from around 0 degrees to around 25 degrees (e.g., 10 degrees).

Figure 86E:
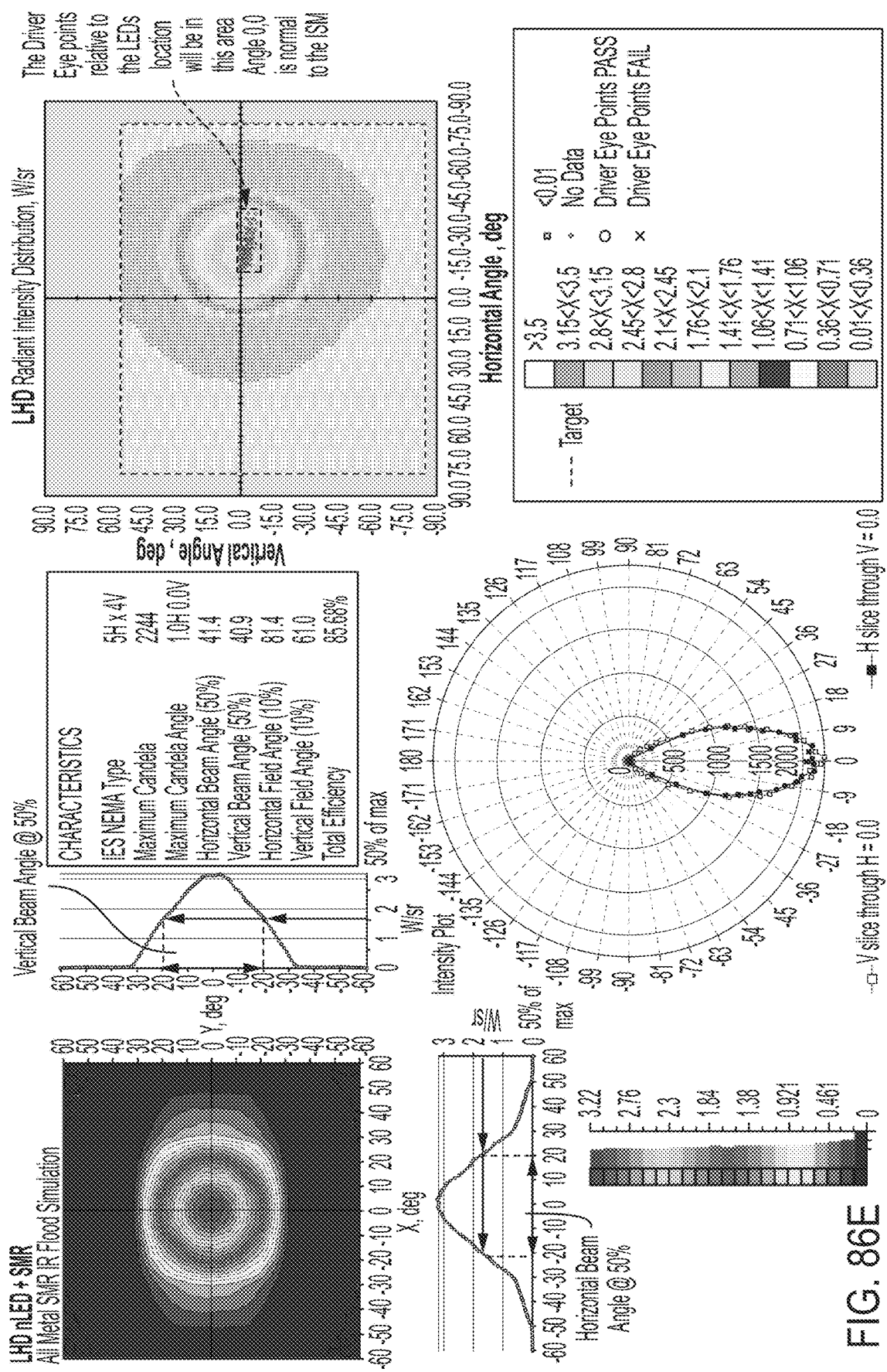
FIG. 86E shows the illumination in the cabin of the LHD vehicle when the LHD nFOV LEDs are powered.
Figure 88D:
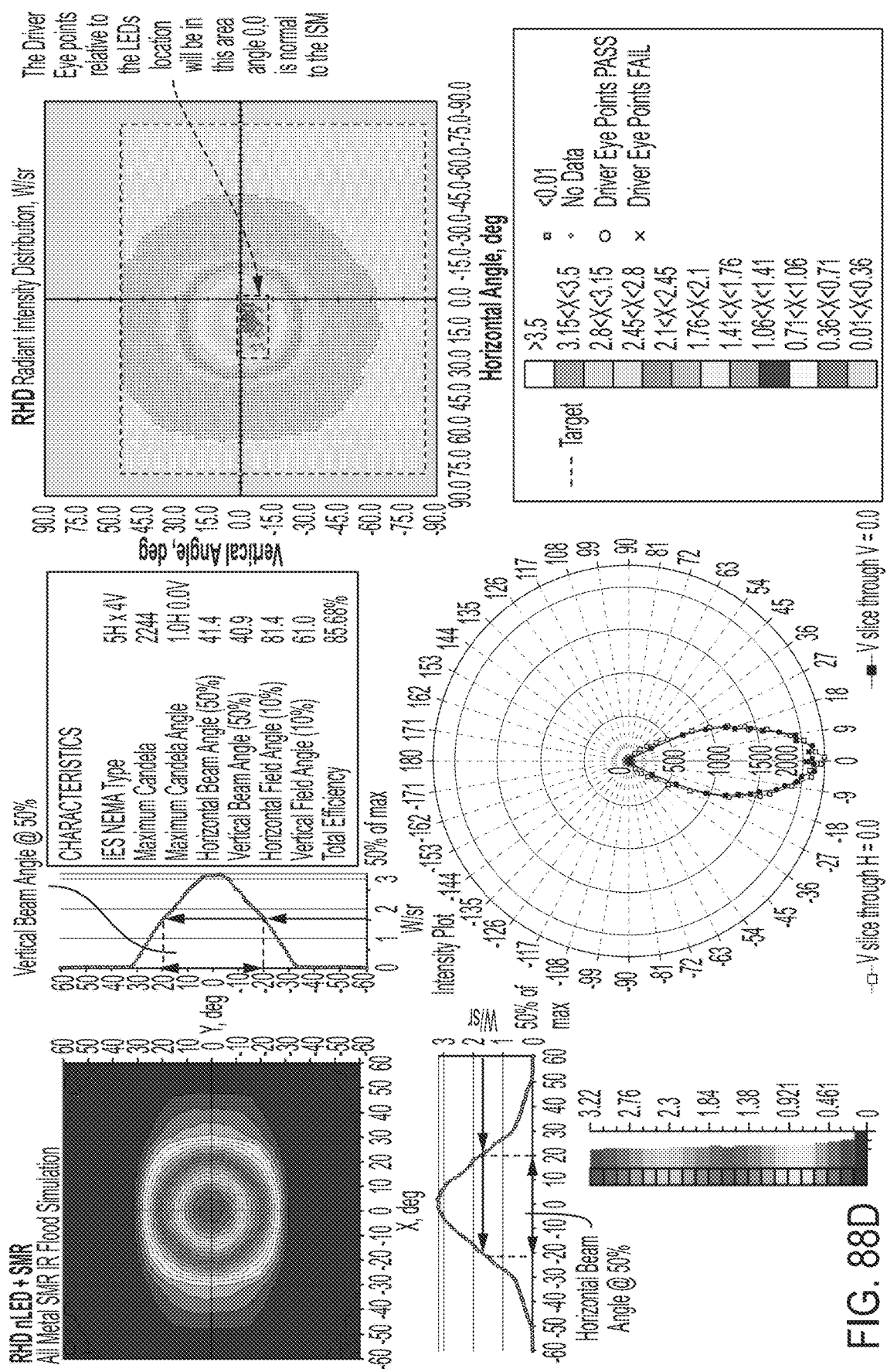
FIG. 88D shows the illumination in the cabin of the RHD vehicle when the RHD nFOV LEDs are powered.

FIG. 86D-1 shows plots in a horizontal plane (i.e., as viewed from above) and a vertical plane (i.e., as viewed from the windshield looking rearward) of different driver eye points as illuminated by the LHD nFOV LEDs in a LHD vehicle. As shown in FIGS. 86D-1 and 86D-2, any head/eye within the outline A will have near-IR irradiance of at least 2.5 W/m$^2$. FIG. 86E shows the illumination in the cabin of the LHD vehicle when the LHD nFOV LEDs (with the surface mounted reflectors) are powered. As shown in FIG. 86E, the horizontal half beam angle of the LHD nFOV LEDs is 41.4 degrees and the vertical half beam angle of the LHD nFOV LEDs is 40.9 degrees. FIG. 88C-1 shows plots in a horizontal plane (i.e., as viewed from above) and a vertical plane (i.e., as viewed from the windshield looking rearward) of different driver eye points as illuminated by the RHD nFOV LEDs in a RHD vehicle. As shown in FIGS. 88C-1 and 88C-2, any head/eye within the outline B will have near-IR irradiance of at least 2.5 W/m$^2$. FIG. 88D shows the illumination in the cabin of the RHD vehicle when the RHD nFOV LEDs (with the surface mounted reflectors) are powered. As shown in FIG. 88D, the horizontal half beam angle of the RHD nFOV LEDs is 41.4 degrees and the vertical half beam angle of the LHD nFOV LEDs is 40.9 degrees. FIG. 89 shows the illumination in the cabin of the vehicle when the wFOV LEDs are powered. As shown in FIG. 89, the horizontal half beam angle of the wFOV LEDs is 155 degrees and the vertical half beam angle of the wFOV LEDs is 130 degrees.

As can be seen in FIG. 90, the LHD nFOV is angled (relative the plane of the planar rear side of the Interior Rearview Mirror Reflective Element), and the RHD nFOV also is angled (relative the plane of the planar rear side of the Interior Rearview Mirror Reflective Element). The principal emission axis of the RHD nFOV however is in a direction that is different than and is opposite to the direction of the principal emission axis of the LHD nFOV.

The illumination provided by the light sources meets the automotive safety requirements, including the Safety Goal 2 (ASIL B). The system shall be classified as exempt according to IEC 62471:2006. The system operates in a safe state, whereby the system shall emit no IR radiation.

As can be seen in FIGS. 84A-90, the driver monitoring camera is centrally located in the mirror head. The nFOV near-IR LEDs that, in a RHD vehicle, monitor the driver's head, are positioned towards one lateral side of the mirror head and are angled [relative to the plane of the rear side of the rear glass surface of the EC Cell (its fourth surface)] at an acute angle around 10 degrees and view in a direction away from the lateral side of the mirror head. The nFOV near-IR LEDs that, in a LHD vehicle, illuminate the driver's head, are positioned closer to the central region of the mirror head (where the driver-monitoring camera is disposed) and are angled [relative to the plane of the rear side of the rear glass surface of the EC Cell (its fourth surface)] at an acute angle around 20 degrees and view in a direction opposite to that of the other nFOV LEDs. The wFOV near-IR LEDs that provide general cabin/occupant illumination are disposed in the mirror head between where the nFOV LEDs are located—and have their principal axis of view perpendicular to the plane of the rear side of the rear glass planar surface of the EC Cell.

Thus, upon ignition-on and/or at start-up of the propulsion system (such as an engine in an internal combustion engine vehicle or an electric drive in an electric vehicle) of the equipped vehicle, the One-Box Interior DMS Rearview Mirror Assembly is powered. When powered, the DMS camera captures frames of image data at a frame capture rate of at least 15 fps, preferably at least 30 fps, more preferably at least 60 fps. During driving, the ECU of the One-Box Interior DMS Rearview Mirror Assembly is aware of whether the vehicle is being driven in left hand drive (LHD) country or in a right hand drive (RHD) country. This can be based on data provided by the equipped vehicle based on likes of the current geographic location of the equipped vehicle as determined by the like of a GPS system. Also, when the vehicle first leaves its vehicle assembly plant, the automaker involved will have the steering column at the left side of the front cabin region for a LHD vehicle and will have the steering column at the right side of the front cabin region for a RHD vehicle. When set for a left hand drive vehicle or a right hand drive vehicle/knowing where the vehicle is being driven, the image processing of the image data captured by the DMS camera is set to process image data representative of the driver region (e.g., the left hand front seat region for a left hand drive vehicle or the right hand front seat region for a right hand drive vehicle) for DMS frame capture, and the light sources are controlled or powered to provide enhanced illumination of the driver region for the DMS frame capture. The light sources of the One-Box Interior DMS Rearview Mirror Assembly in a preferred embodiment include a first set of light sources (the wFOV light source) disposed between a second set of light sources (e.g., the left hand (LH) light source) and a third set of light sources (e.g., the right hand (RH) light source).

For a left hand drive vehicle equipped with the One-Box Interior DMS Rearview Mirror Assembly, during capture of a DMS set of captured frames of image data (for a driver monitoring function), the LHD nFOV light source (preferably a plurality of near-IR emitting LEDs comprising at least two LEDs and more preferably comprising four or less LEDs) and the wFOV light source (preferably a plurality of near-IR emitting LEDs comprising at least two LEDs and more preferably comprising four or less LEDs) are energized. The illumination provided by the LHD nFOV light source and the wFOV light source combine to illuminate the head region of the driver (who is seated at the left side of the vehicle) with an irradiance of at least 1.25 W/m$^2$, more preferably at least 1.8 W/m$^2$ and most preferably at least 2.3 W/m$^2$. The LHD nFOV near-IR light source has a narrow field of illumination cone/zone that encompasses/illuminates the driver's head-box region (and thus provides enhanced irradiance at the driver's face. The wFOV near IR light source is also energized during this capture of the DMS set of captured frames of image data for the driver monitoring function, but the LHD nFOV near-IR light source is not energized. This selective energizing of one but not the other of the LHD and RHD light sources (taking a LHD drive as illustrative where the LHD light source is energized but the RHD light source is not energized) avoids wastefully generating heat within the mirror head by energizing the RHD light source that contributes scant illumination of the driver sitting in the left-hand driver's seat. The wFOV light source however adds some level of irradiance to the driver's head box region and also illuminates the area where the driver's hands would be (the steering wheel, center console, etc.) and thus regardless of whether in a LHD or a RHD vehicle, the wFOV light source is energized all the time the vehicle is powered and operated. Thus, for DMS frame capture in a left hand drive vehicle, the One-Box Interior DMS Rearview Mirror Assembly will only power the LHD nFOV light source and the wFOV light source since these are the light sources that will illuminate the driver of the left hand drive vehicle. Light emitted by the RHD nFOV light source, when powered, does not cover in any significance any part of the LH driver so the RHD nFOV light source is not powered during DMS frame capture in a LHD vehicle. Of course in a RHD vehicle, this reverses. For DMS frame capture in a right hand drive vehicle, the One-Box Interior DMS Rearview Mirror Assembly will only power the RHD nFOV light source and the wFOV light source since these are the light sources that will illuminate the driver of the right hand drive vehicle.

For either a left hand drive vehicle or a right hand drive equipped with the One-Box Interior DMS Rearview Mirror Assembly, during capture of an OMS set of captured frames of image data (for an occupant monitoring function), all three sets of near-IR light sources (LHD nFOV and wFOV and RHD nFOV) are energized so that near-IR floodlighting within the vehicle cabin is maximized, and especially to illuminate likes of a second row of rear seats or even a third row of rear seats).

For the left hand drive vehicle equipped with the One-Box Interior DMS Rearview Mirror Assembly, during capture of an OMS set of captured frames of image data (for an occupant monitoring or occupant detection function), the LHD nFOV light source, the wFOV light source and the RHD nFOV light source (preferably a plurality of near-IR emitting LEDs comprising at least two LEDs and more preferably comprising four or less LEDs) are all energized. The illumination provided by the LHD nFOV light source, the wFOV light source and the RHD nFOV light source combine to illuminate the second row or rear seats and the passenger seat region with an irradiance of at least 0.1 W/m$^2$, of preferably at least 0.15 W/m$^2$, and more preferably at least 0.2 W/m$^2$, and the illumination provided by the wFOV light source and the RHD nFOV light source combine to illuminate the front passenger seat region with an irradiance of at least 0.15 W/m$^2$, of preferably at least 0.25 W/m$^2$, and more preferably at least 0.4 W/m$^2$.

Thus, for DMS frame capture in a left hand drive vehicle, the One-Box Interior DMS Rearview Mirror Assembly will only power the LHD nFOV light source and the wFOV light source since these are the light sources that will illuminate the driver of the left hand drive vehicle, and for OMS frame capture in the left hand drive vehicle, the One-Box Interior DMS Rearview Mirror Assembly will power the LHD nFOV light source, the wFOV light source and the RHD nFOV light source.

Similarly, for a right hand drive vehicle equipped with the One-Box Interior DMS Rearview Mirror Assembly, during capture of a DMS set of captured frames of image data (for a driver monitoring function), the RHD nFOV light source (preferably a plurality of near-IR emitting LEDs comprising at least two LEDs and more preferably comprising four or less LEDs) and the wFOV light source (preferably a plurality of near-IR emitting LEDs comprising at least two LEDs and more preferably comprising four or less LEDs) are energized. The illumination provided by the RHD nFOV light source and the wFOV light source combine to illuminate the head region of the driver (at the right side of the vehicle) with an irradiance of at least 1.25 W/m$^2$, more preferably at least 1.8 W/m$^2$ and most preferably at least 2.3 W/m$^2$. The RHD nFOV light source has a narrow field of illumination cone that covers the driver's head box region (and thus provides enhanced irradiance at the driver's face without increasing the input power to the RHD nFOV light source, while also providing reduced heat generation in the system and reducing the number of LEDs needed), while the wFOV light source adds some level of irradiance to the driver's head box region but also illuminates the area where the driver's hands would be (the steering wheel, center console, etc.). Thus, for DMS frame capture in a right hand drive vehicle, the One-Box Interior DMS Rearview Mirror Assembly will only power the RHD nFOV light source and the wFOV light source since these are the light sources that will illuminate the driver of the right hand drive vehicle. Light emitted by the LHD nFOV light source, when powered, does not cover any part of the RH driver so the LHD nFOV light source is not powered during DMS frame capture.

For the right hand drive vehicle equipped with the One-Box Interior DMS Rearview Mirror Assembly, during capture of an OMS set of captured frames of image data (for an occupant monitoring or occupant detection function), the RHD nFOV light source, the wFOV light source and the LHD nFOV light source (preferably a plurality of near-IR emitting LEDs comprising at least two LEDs and more preferably comprising four or less LEDs) are all energized. The illumination provided by the RHD nFOV light source, the wFOV light source and the LHD nFOV light source combine to illuminate the second row or rear seats and the passenger seat region with an irradiance of at least 0.1 W/m$^2$, of preferably at least 0.15 W/m$^2$, and more preferably at least 0.2 W/m$^2$, and the illumination provided by the wFOV light source and the LHD nFOV light source combine to illuminate the front passenger seat region with an irradiance of at least 0.15 W/m², of preferably at least 0.25 W/m², and more preferably at least 0.4 W/m².

Thus, for DMS frame capture in a right hand drive vehicle, the One-Box Interior DMS Rearview Mirror Assembly will only power the RHD nFOV light source and the wFOV light source since these are the light sources that will illuminate the driver of the right hand drive vehicle, and for OMS frame capture in the right hand drive vehicle, the One-Box Interior DMS Rearview Mirror Assembly will power the RHD nFOV light source, the wFOV light source and the LHD nFOV light source.

The illumination protocols/scenarios described herein can be dynamic in that they can adjust to a current driving situation. For example, the illumination protocols can adjust for daytime/nighttime (by time of day or time of night) driving conditions; the illumination protocols can adjust responsive to a level of ambient cabin lighting, such as can occur on a sunny day vs cloudy day or at dawn or dusk; or the illumination protocols can adjust (such as for thermal management) to temporarily de-rate in-cabin illumination for a temporary limited period of time after ignition-on or start-up occurs when the vehicle has been parked out in the sun on a hot sunny day.

Whether the One-Box Interior DMS Rearview Mirror Assembly is disposed in a LHD vehicle or a RHD vehicle, the DMS camera, for purposes of occupancy detection, preferably has a field of illumination that covers the seating positions (front and rear) of occupants of the vehicle. Similarly, to provide near-IR floodlighting of such passengers seated in the interior cabin of the vehicle, the field of illumination by the wFOV near-IR illuminator, whether the One-Box Interior DMS Rearview Mirror Assembly is used in a LHD or a RHD vehicle, covers the seating positions (front and rear) of occupants of the vehicle. However, for DMS functionality, it is desirable that the driver's face/head/body is near-IR illuminated as intensely as possible. Thus, for a LHD vehicle, it is desirable to have the LHD nFOV near-IR illuminator directed toward the driver of the LHD vehicle, while for a RHD vehicle, it is desirable to have the RHD nFOV near-IR illuminator directed toward the driver of the RHD vehicle. Given that the central area of the DMS mirror head has limited space to accommodate the camera, a wFOV near-IR illuminator, an nFOV near-IR illuminator and the mirror pivot joint and similar/associated hardware, the nFOV near-IR illuminators, for practical reasons, are disposed to the left side of the camera or to the right side of the camera.

Thus, and such as shown in FIGS. 84C, 86B, 86C, 88A, 88B and 90 (and discussed above), the LHD nFOV near-IR illuminator is tilted or angled toward the left hand side of the vehicle, with the angle of tilt increasing the further the LHD nFOV near-IR illuminator is positioned distance from the center of the mirror head, and the RHD nFOV near-IR illuminator needs to be tilted or angled toward the right hand side of the vehicle, with the angle of tilt decreasing the further the RHD nFOV near-IR illuminator is positioned distance from the center of the mirror head.

Optionally, for practical reasons, such as manufacturing and packaging and cost reasons, it can be desirable to have the nFOV near-IR illuminators on one side (e.g., the left side) or the other side (e.g., the right side) of the camera centrally disposed in the mirror head or to have the LHD nFOV near-IR illuminator on one side (e.g., the left side) and the RHD nFOV near-IR illuminator on the other side (e.g., the right side). For example, and such as shown in FIG. 113A, a One-Box Interior DMS Rearview Mirror Assembly may have the camera and the wFOV near-IR illuminator centrally disposed at the mirror head (with the camera centrally located above or below the wFOV near-IR illuminator), with one of the nFOV near-IR illuminators (e.g., the LHD nFOV near-IR illuminator that is for illuminating the driver of a LHD vehicle) disposed at the left side of the mirror head (at the left side of the camera) and the other of the nFOV near-IR illuminators (e.g., the RHD nFOV near-IR illuminator that is for illuminating the driver of a RHD vehicle) disposed at the right side of the mirror head (at the right side of the camera). Alternatively, it is contemplated that the LHD nFOV near-IR illuminator may be disposed at the right side of the mirror head and the RHD nFOV near-IR illuminator may be disposed at the left side of the mirror head.

Optionally, the nFOV near-IR illuminators may be more centrally disposed in the mirror head (such as above or below the centrally located wFOV near-IR illuminator). For example, and such as shown in FIG. 113B, the wFOV near-IR illuminator may be centrally located (e.g., above or below the centrally located camera), and the nFOV near-IR illuminators may be disposed at or above (or below) the wFOV near-IR illuminator. As shown in FIG. 113B, one of the nFOV near-IR illuminators (e.g., the LHD nFOV near-IR illuminator that is for illuminating the driver of a LHD vehicle) is disposed at the left side of the centerline of the mirror head (at the left side of the camera) and the other of the nFOV near-IR illuminators (e.g., the RHD nFOV near-IR illuminator that is for illuminating the driver of a RHD vehicle) is disposed at the right side of the centerline of the mirror head (at the right side of the camera). Alternatively, it is contemplated that the LHD nFOV near-IR illuminator may be disposed at the right side of the centerline of the mirror head and the RHD nFOV near-IR illuminator may be disposed at the left side of the centerline of the mirror head. It is further contemplated that the LHD nFOV near-IR illuminator and the RHD nFOV near-IR illuminator may be vertically arranged at the centerline of the mirror head, with one above the other.

Optionally, the wFOV near-IR illuminator may be centrally disposed (e.g., above or below the centrally disposed camera), and both nFOV near-IR illuminators may be disposed at one side or the other of the mirror head. For example, and such as shown in FIG. 113C, the wFOV near-IR illuminator is centrally disposed (e.g., above or below the centrally disposed camera), and the LHD and RHD nFOV near-IR illuminators are disposed at the right side of the mirror head, with the LHD nFOV near-IR illuminator disposed closer to the center of the mirror head than the RHD nFOV near-IR illuminator. Alternatively, and such as shown in FIG. 113D, the wFOV near-IR illuminator is centrally disposed (e.g., above or below the centrally disposed camera), and the LHD and RHD nFOV near-IR illuminators are disposed at the left side of the mirror head, with the RHD nFOV near-IR illuminator disposed closer to the center of the mirror head than the LHD nFOV near-IR illuminator. Optionally, the wFOV near-IR illuminator and/or the nFOV near-IR illuminators may be disposed at a lower region of the mirror head (see FIGS. 113C and 113D) or may be disposed at an upper region of the mirror head (see FIG. 113E). Thus, and such as shown in FIG. 113E, one or both of the nFOV near-IR illuminators may be higher up toward the upper region of the mirror head, and/or the wFOV near-IR illuminator may be higher up toward the upper region of the mirror head.

In a vehicle (whether LHD or RHD), the driver grasps the mirror head to adjust what the interior mirror reflective element views so that the driver sees out the rear window of the equipped vehicle. The camera moves in tandem with movement of the mirror head by the driver. In so doing, the driver moves the mirror head to a position/orientation where the driver-monitoring camera within the mirror head is viewing the head of the driver.

Figure 91:
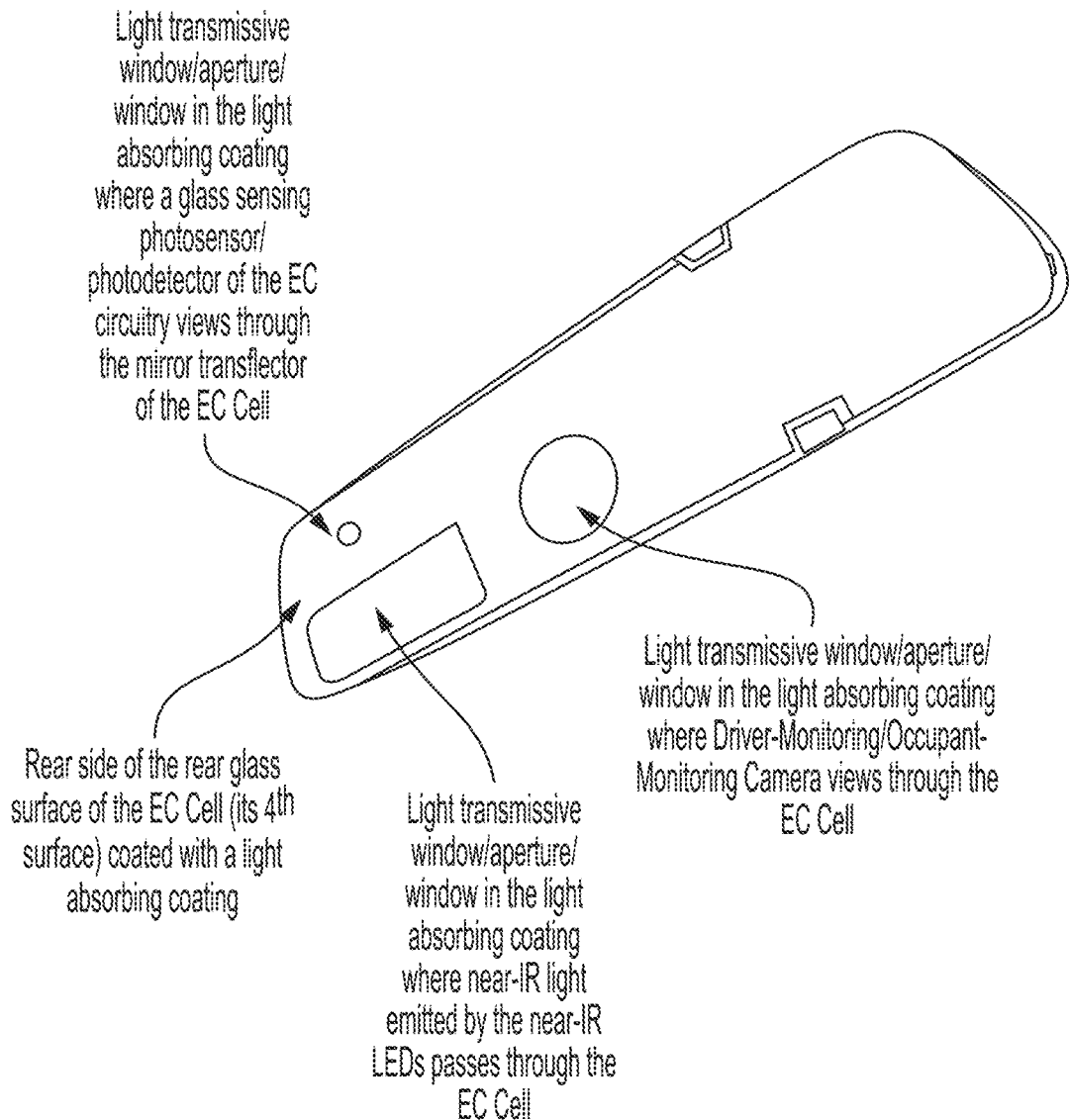
FIG. 91 shows the rear side of an exemplary EC Cell for the One-Box Electrochromic Interior DMS Mirror Assembly.

FIG. 91 shows the rear side of an exemplary EC Cell for a One-Box Electrochromic Interior DMS Mirror Assembly. FIG. 91A-C shows how the exemplary EC Cell shown in FIG. 91 is orientated when the One-Box Electrochromic Interior DMS Mirror Assembly attached at a windshield of an equipped vehicle. OEM automakers (such as GM, BMW, Ford, Toyota, Honda, etc.) make vehicles for use in left-hand drive countries (such as the USA, France, China and Germany) and for for use in right-hand drive countries (such as the UK, Ireland, India and Japan). Taking the BMW X5 SUV as an example, BMW X5 SUVs are assembled in a BMW assembly plant in Spartanburg, SC USA. A One-Box Electrochromic Interior DMS Mirror Assembly in accordance with the present invention can be mounted at the windshield of all X5 SUV vehicles being assembled by BMW in South Carolina, USA irrespective of whether any given USA-assembled X5 SUV is used in the USA (a LHD country) or is exported to and used in the UK (a RHD country).

Figure 92:
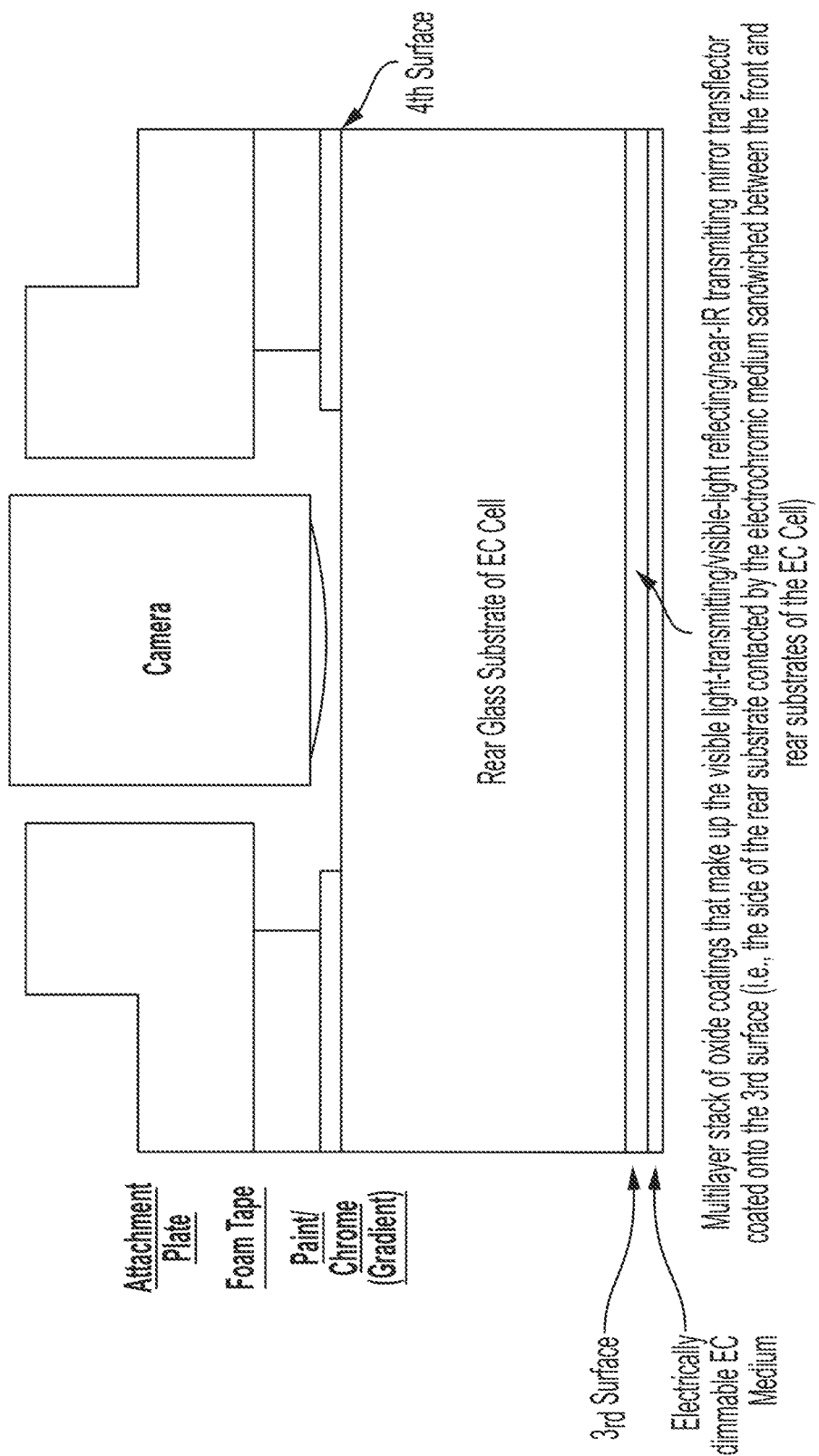
FIG. 92 shows covertness-enhancing measures where the outermost surface of the lens of the driver-monitoring camera is stood-off from the bare glass surface of the backside of the rear glass substrate of the EC Cell where the camera views through the EC Cell.
Figure 93:
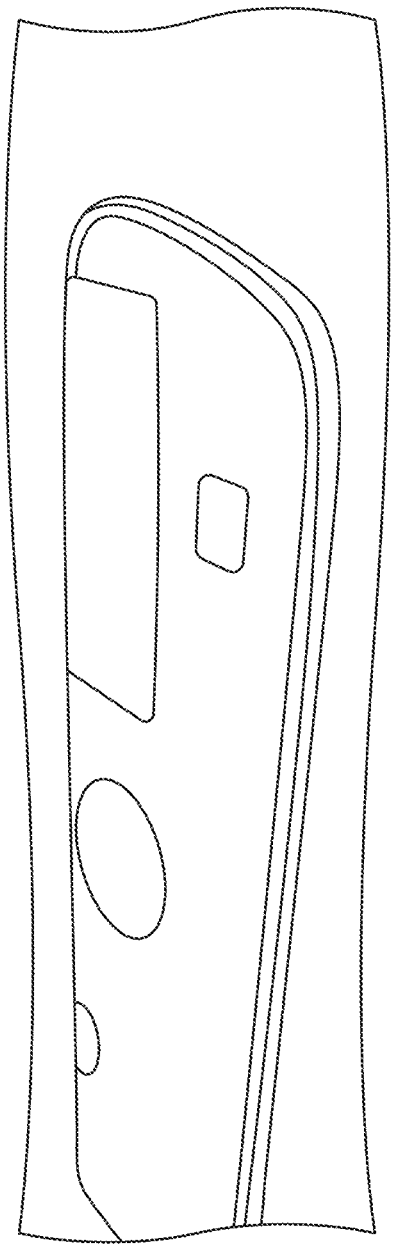
FIG. 93 is a perspective view of the mirror reflective element with dimensioned standoff of the glare sensor and/or the near-IR illumination to enhance covertness.

Covertness-enhancing measures (that enhance covertness of the camera and near-IR illuminators disposed in the mirror head and behind the mirror reflective element) include such as those shown in FIG. 92 where the outermost surface of the lens of the driver-monitoring camera is stood-off from the bare glass surface of the backside of the rear glass substrate of the EC Cell where the camera views through the EC Cell (i.e., a dimensioned air-gap exists). The dimension of this stand-off is preferably at least 0.5 mm, more preferably at least 1 mm and more preferably at least 2 mm, but preferably not greater than 4 mm. Similarly, such dimensioned standoff of the glare sensor or the near-IR illumination (such as shown in FIG. AJ) can be used to enhance covertness. Shown in FIG. 93 are double-adhesive tape stand-offs (still with release film attached).

Such covertness-enhancing measures include minimizing the size of the reflectors used in conjunction with the nFOV near-IR LEDs, and removing (or dark coating) where possible any surfaces that reflect light, and locating these within the mirror head at a location that is distant from the lateral edge of the mirror assembly so as to be as far away as possible from side windows of the vehicle through which sunlight could stream into the cabin of the vehicle. Also, and as illustrated in FIGS. 84A-C, the IR filter box can be configured/structured with a degree, preferably minor, of FOV obstruction, and with minimized horizontal clearance.

Such covertness-enhancing measures include use of a small, non-reflecting glare sensor such as a TI OPT4001 High Speed, High Precision, Digital Ambient Light Sensor commercially available from Texas Instruments Incorporated of Dallas, TX. The TI OPT4001 High Speed, High Precision, Digital Ambient Light Sensor includes precision optical filtering to closely match human eye with excellent near infrared (IR) rejection.

Such covertness-enhancing measures/elements/means include use within the cavity of the mirror head (and for and/or on hardware/structure accommodated by the mirror head) of coatings or the like that absorb light that might enter the mirror head. Thus, the likes of dark coatings or finishes, light-trapping elements or surfaces, flocking surfaces involving applying short monofilament fibers (usually nylon, rayon or polyester) directly onto a substrate that has been previously coated with adhesive, and the like, can be used within the cavity of the mirror head to absorb/trap extraneous ambient light that enters the mirror head and that deleteriously impacts covertness.

Such covertness-enhancing measures include coating the fourth surface of the rear substrate of the EC cell with a non-light transmitting thin film coating of Chromium metal (preferably with coating physical thickness at least 50 nm) to form a fourth surface specularly-reflective metallic mirror first reflectivity per SAE J964a off such a coating being around 60% R to around 68% R if sputter deposited via sputtering vacuum deposition). This fourth surface chromium (or other metallic mirror reflector coating such as of Titanium or Hastelloy or Ruthenium or a thin-Ru/thick-Cr bilayer) augments/enhances overall visible light reflectivity of the EC Cell at those regions of the EC Cell mirror reflective element other than where light-transmitting windows are created (preferably via laser ablation/etching of the metal thin film mirror reflector on the fourth surface). Where the fourth surface metal reflector has been ablated away to form a light transmitting window using laser ablation, the metal coating layer may be only partially locally ablated to form a local partially light reflecting/light transmitting region for the DMS camera to view through or for the near-IR LEDs to illuminate through. As an alternate, deposition of the metal mirror reflector onto the fourth surface of the rear substrate may employ gradient masking to mitigate having an abrupt/sharp transition at the local window regions from being highly light reflecting to being highly light transmitting.

Such covertness-enhancing measures include use of 3M™ Light Control Films or uses of 3M Light Redirecting Film available from 3M Company of Saint Paul, MN USA) 3M microlouver film controls the distribution of light perpendicular to its louver structure (viewing angle). ALCF-A and LCF are louver films with low birefringent polycarbonate substrates. ALCF-A has a 60 degree viewing angle. ALCF-A+ is a louver film combined with a reflective polarizer (DBEF). 3M ALCF-P is a louver film with a 60 degree viewing angle and is available with a matte hardcoat.

The DMS camera, as well as monitoring alertness, can be used for in-vehicle video conferencing and for likes of the driver taking selfies. Where the likes of video conferencing is desired, a high resolution camera (preferably a color camera using a CMOS imaging array having at least one million photosensor elements arranged in rows and columns) is preferred. For example, use of at least a 2.3 megapixel camera is preferred for the DMS camera; use of at least a 5.0 megapixel camera is more preferred, and use of at least a 5.5 megapixel cameras is most preferred, and especially for detecting fine details/characteristics/biometrics of the eyes of the driver being monitored.

Figure 94:
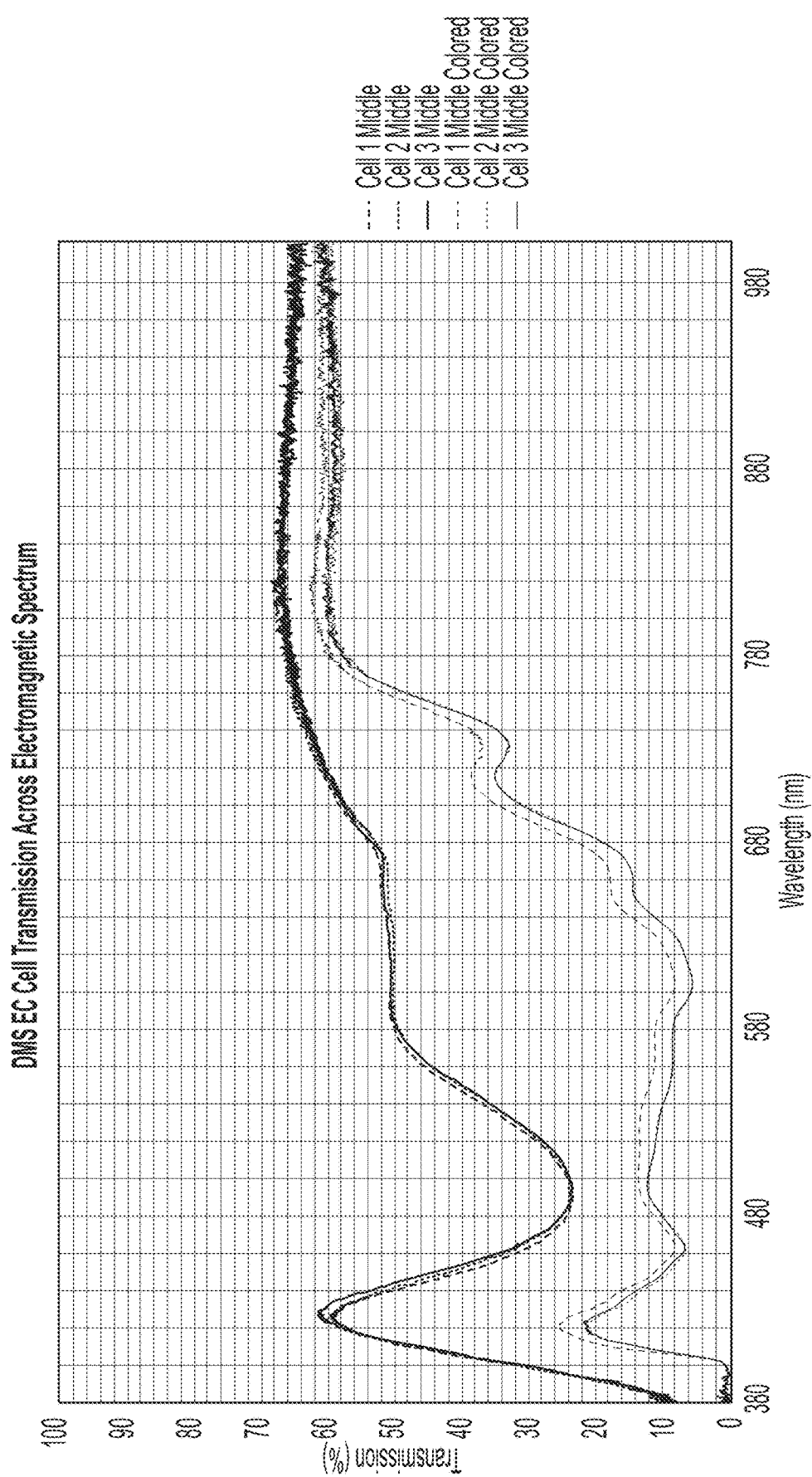
FIG. 94 shows the spectral characteristics across the visible and near-IR spectral regions of a DMS EC Cell in both its undimmed (bleached) state and in its fully electrically-dimmed (colored) state.

FIG. 94 shows the spectral character across the visible and near-IR spectral regions of a DMS EC Cell in both its undimmed (bleached) state and in its fully electrically-dimmed (colored) state. Balancing the desire for the EC Cell to have (i) sufficient visible % T to suit the DMS need and also be suitable for video conferencing; (ii) have a non-tinted spectral reflectivity (in its bleached state) that to a driver appears "silvery" and "normal" compared to as conventionally viewed by a driver viewing an interior electrochromic rearview mirror assemblies supplied to OEM automakers by likes of Magna Mirrors of America, Inc. of Holland, MI; (iii) have photopic reflectivity (as measured in accordance with SAE J964a, which is hereby incorporated herein by reference in its entirety) of at least 40% R; (iv) transmit highly in the near-IR and especially at the peak emission wavelength of the near-IR illumination used (such as for example, 940 nm) and (v) render covert to the driver sitting in the driver's seat that the mirror head accommodates the camera, the near-IR illuminators, the DMS processor, the associated mechanical hardware such as PCBs, an exemplary EC cell suitable for use in a One-Box Electrochromic Interior DMS Mirror Assembly has:

Visible light transmission in the 380-750 nm region in the 20% T-30% T range in the EC Cell's bleached state (preferably for covertness, around 22% T to around 25% T);

Visible light transmission in the 380-750 nm region in the 10% T-20% T range in the EC Cell's fully dimmed state (preferably to balance other factors, around 16% T);

Visible light reflectivity (measure per SAE J946a) in the 40% R to 65% R range (preferably to balance other factors, in the around 43% to around 55% R range);

Near-IR transmission around 940 nm of at least 50% T preferred (at least 60% T more preferred, and at least 70% most preferred) in both the bleached (fully visible light reflective) and fully dimmed (EC colored) states; and Non-tinted, achromatic silvery appearance as viewed and judged by a driver viewing from the driver's seat in an equipped vehicle.

Color may be characterized via the CIELAB color space (also referred to as L*a*b*) that is a color space defined by the International Commission on Illumination (abbreviated CIE) in 1976. CIELAB expresses color as three values: L* for perceptual lightness, and a* and b* for the four unique colors of human vision: red, green, blue, and yellow. Color values used herein are based on the CIE Standard D65 illuminant and the 10-degree observer, L* represents the brightness of the object, a* defines the green and red color (positive) components, and b* defines blue and yellow color (positive) components.

For the multi-layer mirror transflector used in the DMS mirrors described herein, first surface reflectance (i.e. reflectance with the incoming radiation directly impinging the multi-layer mirror transflector without passing through the rear glass substrate that the multi-layer mirror transflector is deposited on), peaks at a multi-layer stack design wavelength of about 550 nm. The color of the reflected light shifts towards blue (which is indicated by lower values of b*) when the design wavelength drops below approximately 450 nm, and towards yellow/red for design wavelengths of about 500 nm and above (which is indicated by increase of b* and a*). Adjustment of optical thicknesses, refractive indices, and/or the number of the layers in the multi-layer stack that constitutes the mirror transflector stack provides a particular spectral distribution of reflectance, as may be required by a specific application of a DMS EC Cell (or of a DMS prismatic substrate). For example, a given reflectance with more or less of a slight yellow hue may be obtained or a different reflectance with more or less of a slight blue or red hue may be obtained by the appropriate tuning of the layer thicknesses used for the multi-layer transflector.

Conventional vehicular interior rearview mirrors for their mirror reflectors use a high-reflecting metallic thin film coating of silver metal (or of likes of an Ag/Au or Ag/Pd alloy, for example 90% Ag/10% Au).

Drivers viewing and using interior mirrors when driving are accustomed to seeing a mirror reflectance that is achromatic/color neutral/non-tinted, such as when viewed in accordance with the CIELAB color space (see FIG. 95) and using the CIE Standard D65 illuminant and the 10-degree observer (D65 represents white light and has XYZ tristimulus values of X=94.811; Y=100; Z=107.304). For a prismatic interior mirror reflective element (such as used in prismatic interior rearview mirror assemblies supplied by Magna Mirrors of America, Inc. of Holland, MI USA), the driver sees a metallic silver "color" having (in the CIELAB color space), L*=96.28; a*=−2.81; and b*=2.46 [using Illuminant D65; C*=3.58 (chroma)]. For an electrochromic interior mirror reflective element (such as used in automatic dimming electrochromic interior rearview mirror assemblies supplied by Magna Mirrors of America, Inc. of Holland, MI USA), the driver sees a metallic silver "color" having (in the CIELAB color space), L*=83.1; a*=−4.03; and b*=3.58 [using Illuminant D65; C*=4.34 (chroma)], and for an electrochromic interior mirror transflective element, the driver sees a metallic silver "color" having (in the CIELAB color space), L*=89.39; a*=−3.84; and b*=4.92 [using Illuminant D65; C*=4.96 (chroma)].

Also, when the driver views such an interior mirror reflective element at an angle, color neutrality (as seen/gauged by the driver normally driving the equipped vehicle while seated in the driver-side front seat) is maintained/preserved by the multi-layer stack of thin films used for the mirror transflector. The HL-stack of coatings that makes up the mirror transflector of the mirror reflective element is designed/chosen so that the absolute value of a* is less than 5 at normal incidence and the absolute value of b* is also less than 5 at normal incidence.

The multi-layer stack of thin films for the mirror transflector of the mirror reflective elements of the One-Box DMS Interior Rearview Mirrors of the present invention maintain/preserve the achromatic/color neutral/non-tinted reflectance that drivers expect and are used to seeing when driving, and the mirror transflective element of the One-Box DMS Interior Rearview Mirrors have a neutral reflected color with |a*|, |b*|<12 for up to at least a 45 degree viewing angle. Should there be any color shift with viewing angle, the multi-layer stack of thin films used for the mirror transflector minimize such a shift.

Given two colors in CIELAB color space, $(L_1^*,a_1^*,b_1^*)$ and $(L_2^*,a_2^*,b_2^*)$, the color difference formula is:

$$\Delta E_{ab} = \sqrt{(L_2 - L_1)^2 + (a_2 - a_1)^2 + (b_2 - b_1)^2}$$

C* (chroma, relative saturation) of a color with CIELAB color space coordinates is (L*,a*,b*) is:

$$C^* = \sqrt{a^{*2} + b^{*2}}$$

Hue h° (hue angle, angle of the hue in the CIELAB color wheel) of a color with CIELAB color space coordinates (L*,a*,b*) is:

$$h° = \mathrm{atan}(b^*/a^*)$$

The multi-layer stack of thin films for the mirror transflector of the mirror reflective elements of the One-Box DMS Interior Rearview Mirrors of the present invention preferably maintains/preserves any color difference (at any viewing angle by the driver up to 45 degrees) to be between 2.3 and 3.2 preferably; between 2.3 and 2.8 more preferably; and between 2.3 and 2.5 most preferably.

The Tristimulus System visually matches a color under standardized conditions against the three primary colors-red, green, and blue; the three results being expressed as X, Y, and Z, respectively, and are called tristimulus values and can be graphically represented on a standard chromaticity diagram. Standardized by the Commission Internationale d'Éclairage (CIE) in 1931, the chromaticity diagram is based on the values x, y, and z, where x=X/(X+Y+Z), y=Y/(X+Y+Z), and z=Z/(X+Y+Z). Since x+y+z=1, if two values are known, the third can always be calculated and the z value is usually omitted. The Y value under the Tristimulus System is representative of the mirror reflectance experienced/seen by a driver (during daytime) viewing and using the interior mirror while driving a vehicle equipped with a One-Box Electrochromic Interior DMS Mirror Assembly (with its EC Cell in its non-dimmed/bleached state) or while driving a vehicle equipped with a One-Box Prismatic Interior DMS. The mirror reflective elements of the One-Box Interior DMS Rearview Mirror Assemblies preferably have a Y value (using CIE Standard Illuminant D65 and at normal incidence) of at least 41; more preferably of at least 50 and most preferably of at least 55. Y as used herein represents the overall visible light reflectivity of the DMS EC Cell or the DMS prismatic reflective element.

Figure 96:
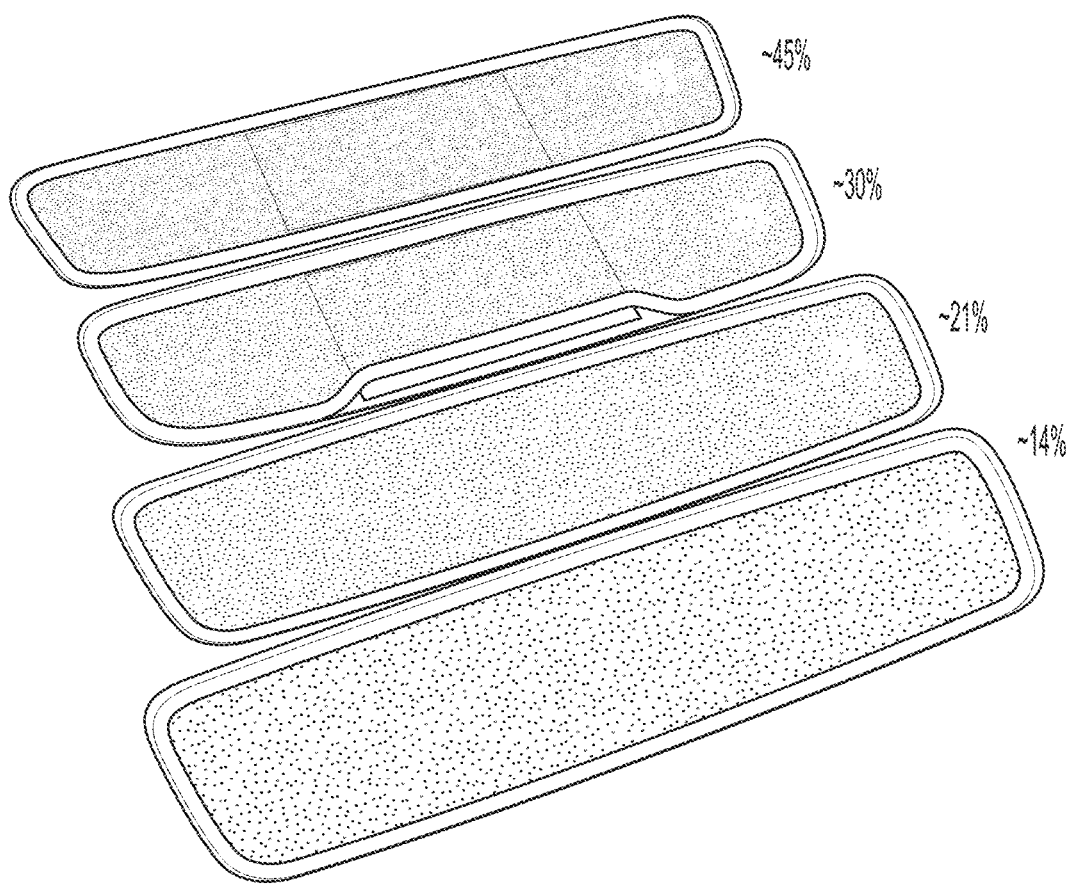
FIG. 96 shows four exemplary EC Cells where the stacks of multi-layers of oxide coatings forming the mirror transflector have been adjusted to have visible light transmission through the EC Cell be around 45% T, around 30% T, around 21% T and around 14% T.
Figure 97:
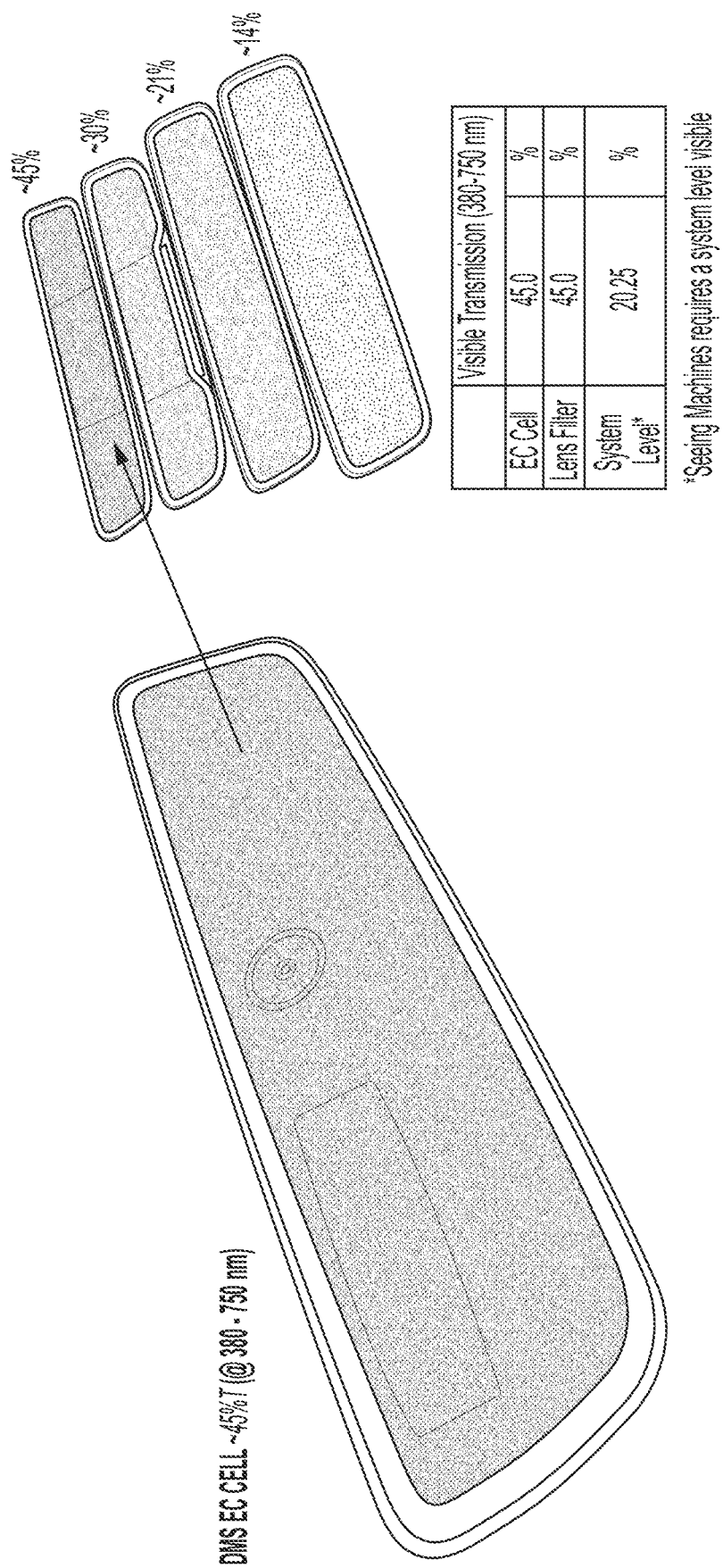
FIG. 97 shows the overall system output of a camera viewing through a 45% T visible-light lens filter combined with the 45% T EC Cell is 20.25%.
Figure 98:
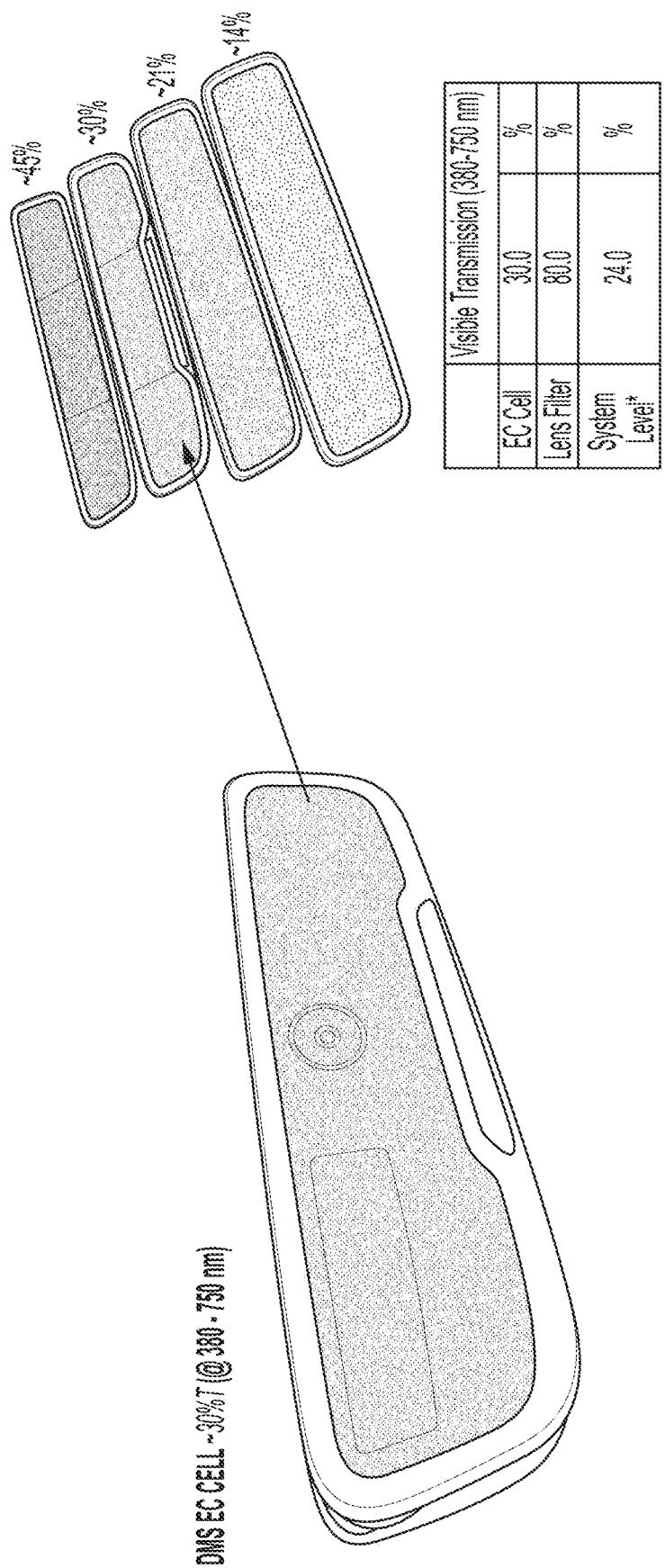
FIG. 98 shows the overall system output of a camera viewing through an 80% T visible-light lens filter combined with the 30% T EC Cell is 24%.
Figure 99:
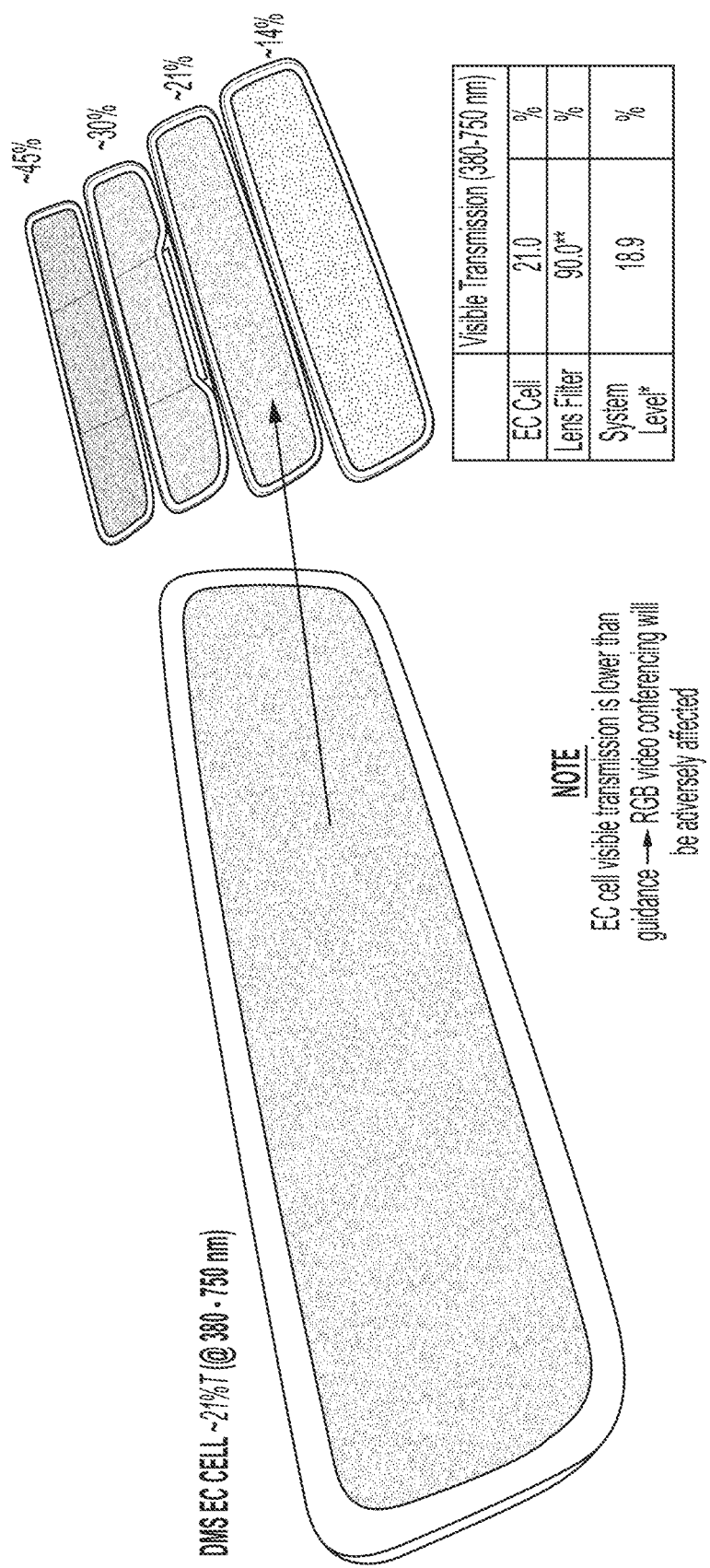
FIG. 99 shows the overall system output of a camera viewing through a 90% T visible-light lens filter combined with the 21% T EC Cell is 18.9%.
Figure 100:
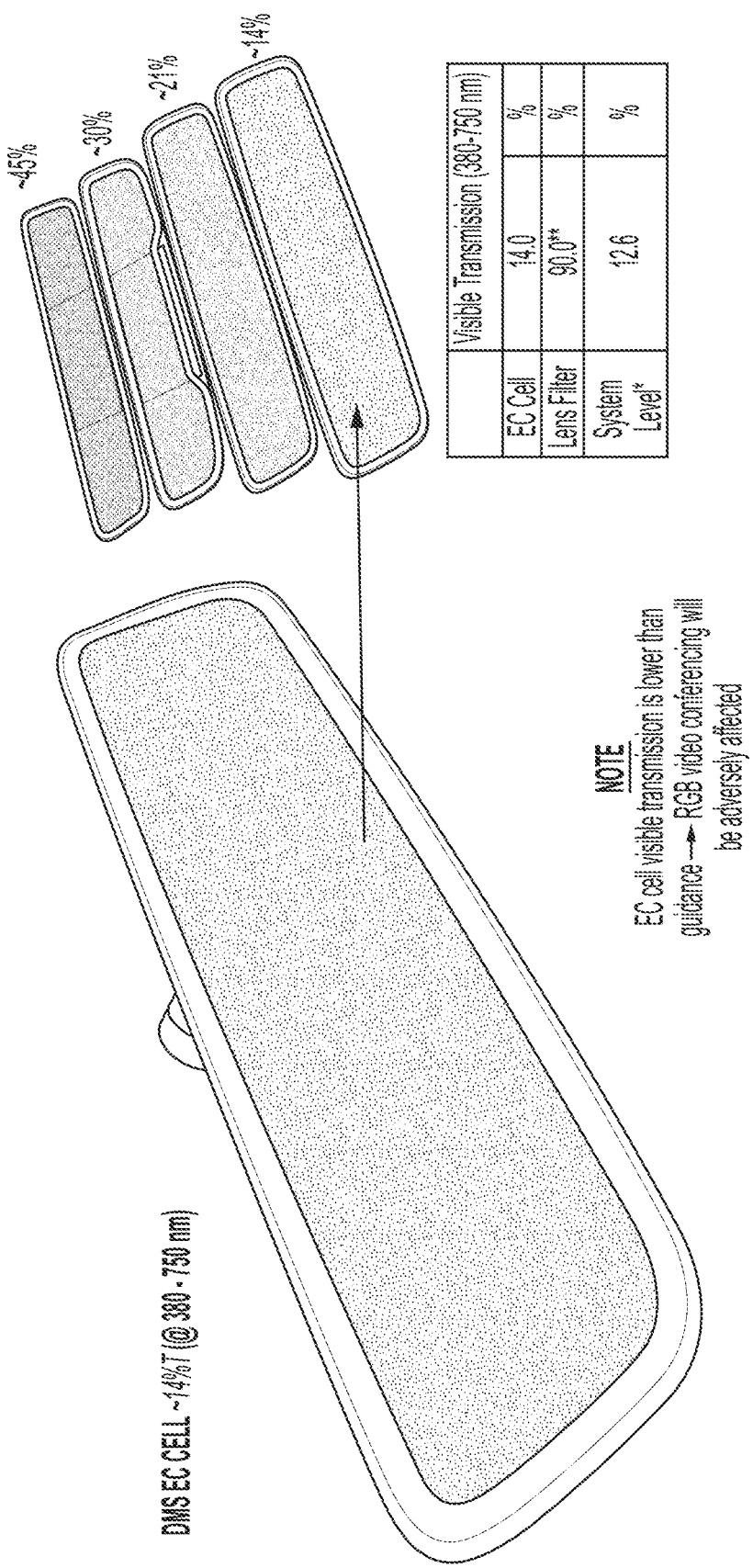
FIG. 100 shows the overall system output of a camera viewing through a 90% T visible-light lens filter combined with the 14% T EC Cell is 12.6%.

FIG. 96 shows four exemplary EC Cells where the stacks of multi-layers of oxide coatings forming the mirror transflector have been adjusted to have visible light transmission through the EC Cell be around 45% T; around 30% T; around 21% T and around 14% T. As can be seen in FIG. 97, the overall system output of a camera viewing through a 45% T visible-light lens filter combined with the 45% T EC Cell is 20.25%. As can be seen in FIG. 98, the overall system output of a camera viewing through an 80% T visible-light lens filter combined with the 30% T EC Cell is 24%. As can be seen in FIG. 99, the overall system output of a camera viewing through a 90% T visible-light lens filter combined with the 21% T EC Cell is 18.9%. As can be seen in FIG. 100, the overall system output of a camera viewing through a 90% T visible-light lens filter combined with the 14% T EC Cell is 12.6%. The lower the visible-light % T transmissivity through the EC Cell, the higher is the visible-light reflectivity of the EC Cell. A system visible-light transmissivity through the EC Cell of around 18% T to around 28% T (around 20% T to around 25% T more preferred, and around 22% to 24% most preferred) balances the desire to facilitate video conferencing using a color DMS camera in the mirror head that views through the mirror transflector of the EC Cell while allowing the desired intensity of illumination of the driver and other occupants with near-IR illumination for DMS/OMS and while covertly accommodating the various One-Box DMS hardware within the mirror head and while providing to the driver a non-tinted, "silvery" mirror reflective element to view with sufficiently high reflectivity for driving by day or by night.

Figure 101A:
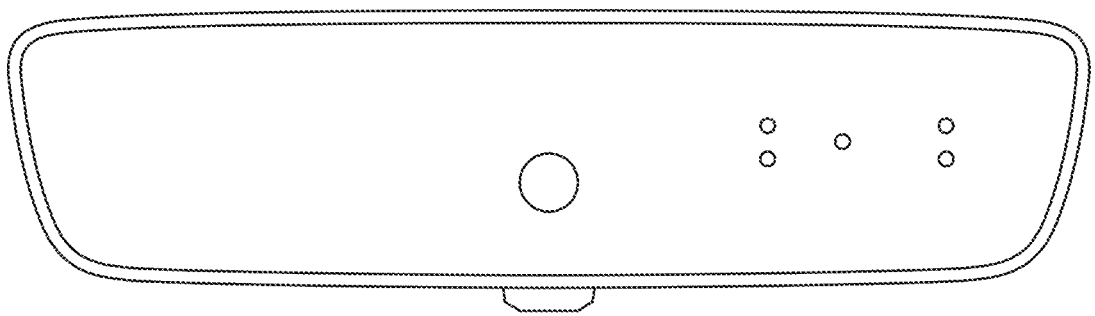
FIG. 101A shows a One-Box Infinity™ Prismatic Interior DMS Mirror Assembly.
Figure 101B:
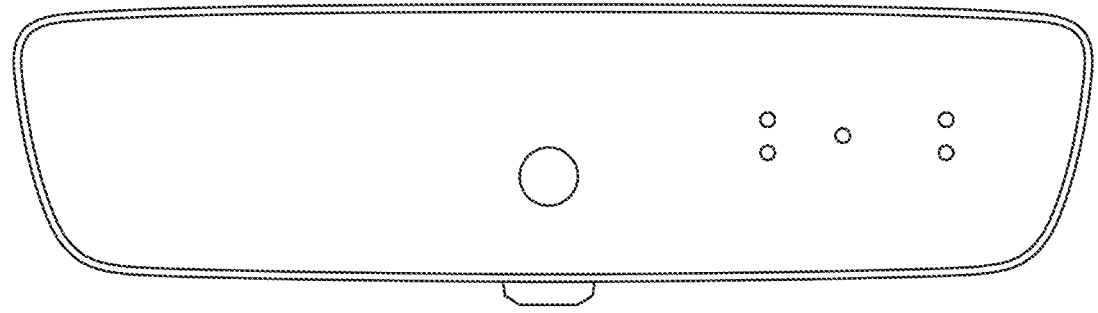
FIG. 101B shows a One-Box EVO™ Prismatic Interior DMS Mirror Assembly.

FIG. 101A shows a One-Box Infinity™ Prismatic Interior DMS Mirror Assembly and FIG. 101B shows a One-Box EVO™ Prismatic Interior DMS Mirror Assembly. FIG. 102 shows construction of a One-Box Infinity™ Prismatic Interior DMS Mirror Assembly.

Thus, the One-Box Interior DMS Mirror Assembly provides a One-Box DMS solution with electrical/electronic/mechanical/mirror components (camera, near-IR illuminator, vision processing ECU and mirror reflective element) integrated in a vehicular interior rearview mirror assembly. For an automatic dimming interior mirror, the electronics and photosensors used (under glaring condition during night driving) to dim reflectivity of the interior mirror reflective element (and of any electrically-dimmable exterior mirror elements present on the equipped vehicle) are accommodated within the mirror head. The camera, near-IR light sources (such as near-IR LEDs) and ECU preferably are disposed behind the mirror reflective element in the mirror head. The camera uses an RGB/IR CMOS image sensor to support DMS/OMS, Selfie as well as Video Streaming features. Supported features include Driver Monitoring, Video Streaming, Facial recognition, Interior Monitoring, Selfie, Presence Detection, Child Seat Detection, Child Presence Detection. A 100 Mbps Ethernet interface for video transmission preferably is included.

Figure 106:
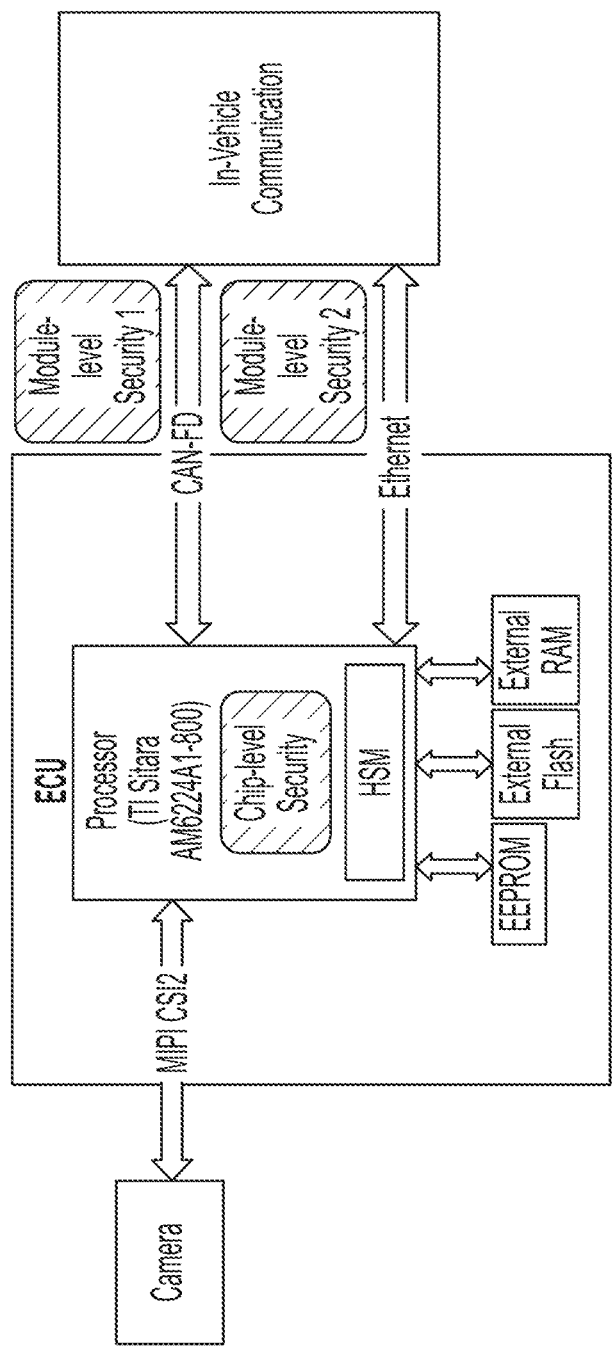
FIG. 106 is a Security Architecture Diagram MIK Module for the One-Box Interior DMS Mirror Assembly.

Optionally, the One-Box Interior DMS Rearview Mirror Assembly may include security architecture, such as shown in FIG. 106. The processor of the ECU may communicate with a vehicle system via CAN—full duplex communication (module-level security 1) and via Ethernet (module-level security 2). Optionally, such communication may be via a coaxial cable or other communication means. The Camera Serial Interface is a specification of the Mobile Industry Processor Interface Alliance. It defines an interface between a camera and a host processor. The CSI-2 protocol contains transport and application layers and natively supports C-PHY, D-PHY, or combo C/D-PHY. MIPI C-PHY provides high throughput, a minimized number of interconnect signals and superior power efficiency to connect displays and cameras to an application processor. This is due to efficient three-phase coding that is unique to C-PHY. D-PHY is a serial interface technology using differential signaling for band limited channels with scalable data lanes and a source synchronous clock to support power efficient interfaces for streaming applications such as displays and cameras. It offers half-duplex behavior for applications that benefit from bidirectional communication at transmission rates up to 2.5 Gigabit per lane. C-PHY requires few conductors, does not require a separate clock lane, and provides flexibility to assign individual lanes in any combination to any port on the application processor via software control. Due to similarities in basic electrical specifications, C-PHY and D-PHY can be implemented on the same device pins. 3-phase symbol encoding technology delivers approximately 2.28 bits per symbol over a three-wire group of conductors per lane. This enables higher data rates at a lower toggling frequency, further reducing power.

Figure 32C:
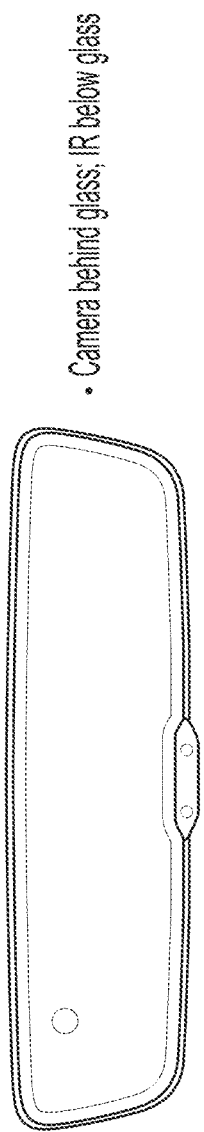
Figure 32D:
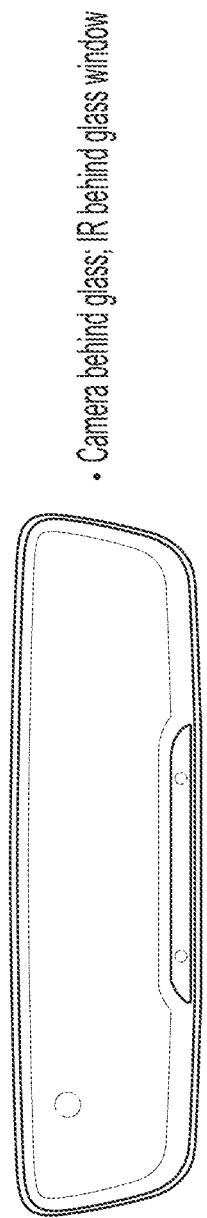
Figure 32E:
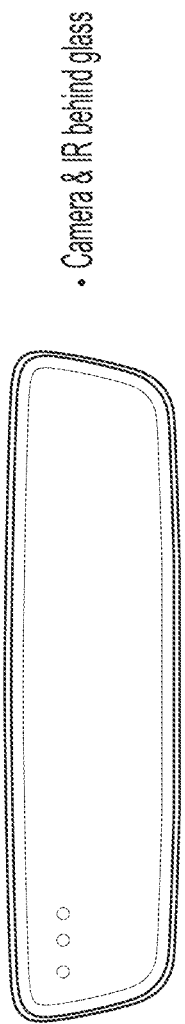
Figure 34:
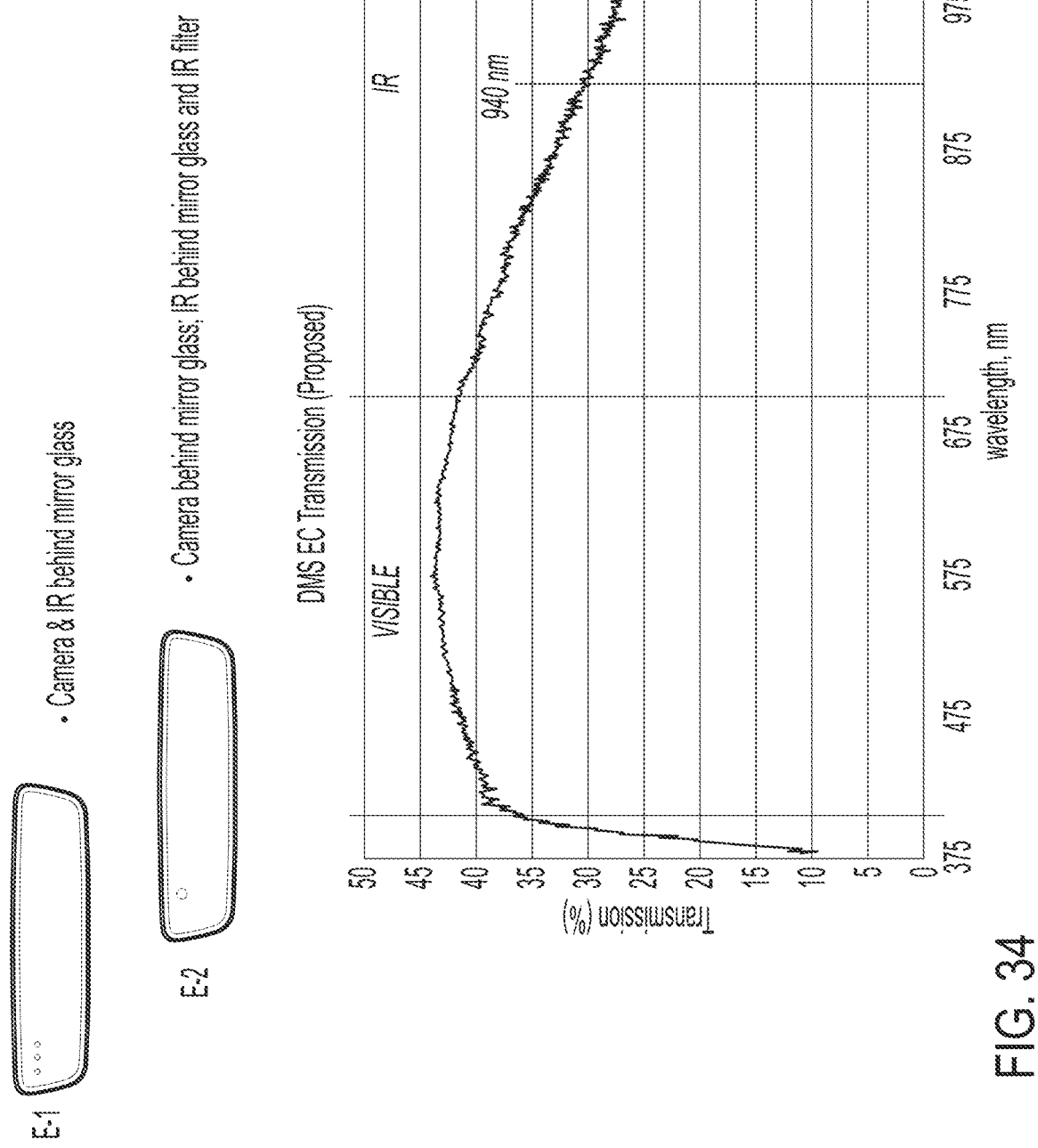
FIG. 34 is a diagram showing performance of the driver monitoring system when the camera and IR LED(s) are disposed behind the mirror reflective element.

As shown in FIGS. 32B-32E, the mirror assembly may include the IR light emitter(s) behind the mirror reflective element (FIGS. 32B and 32E) and/or the camera behind the mirror reflective element (FIGS. 32C-E). By positioning the camera and IR light emitter behind the mirror reflective element, the camera is hidden or covert and not visible to the driver or occupant of the vehicle and does not require a lower region or chin region of the mirror head to be expanded to provide room for the camera and/or light emitter. The camera may be angled or biased to provide optimal viewing of the driver or occupant. FIGS. 33 and 34 show embodiments with the camera and IR light emitter disposed below the mirror reflective element (FIG. 33), showing the transmission properties of the lens or cover, or disposed behind and viewing/emitting through the mirror reflective element (FIG. 34), showing transmission properties of the transflector or transflective mirror reflector.

Figure 35:
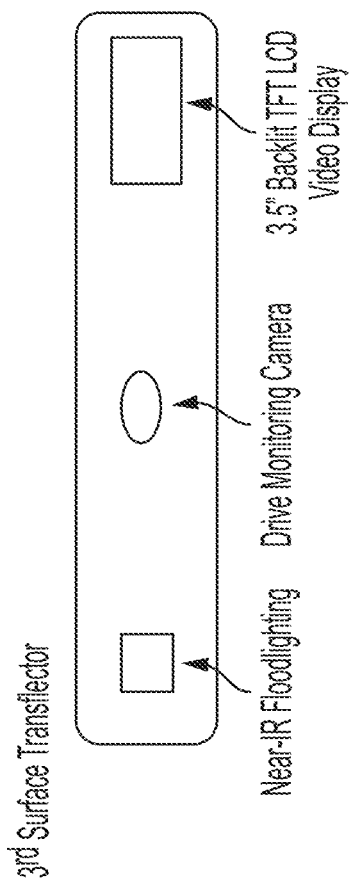
FIGS. 35 and 36 are views of an interior rearview mirror assembly, with the camera and IR emitter(s) disposed behind the mirror reflective element.
Figure 36:
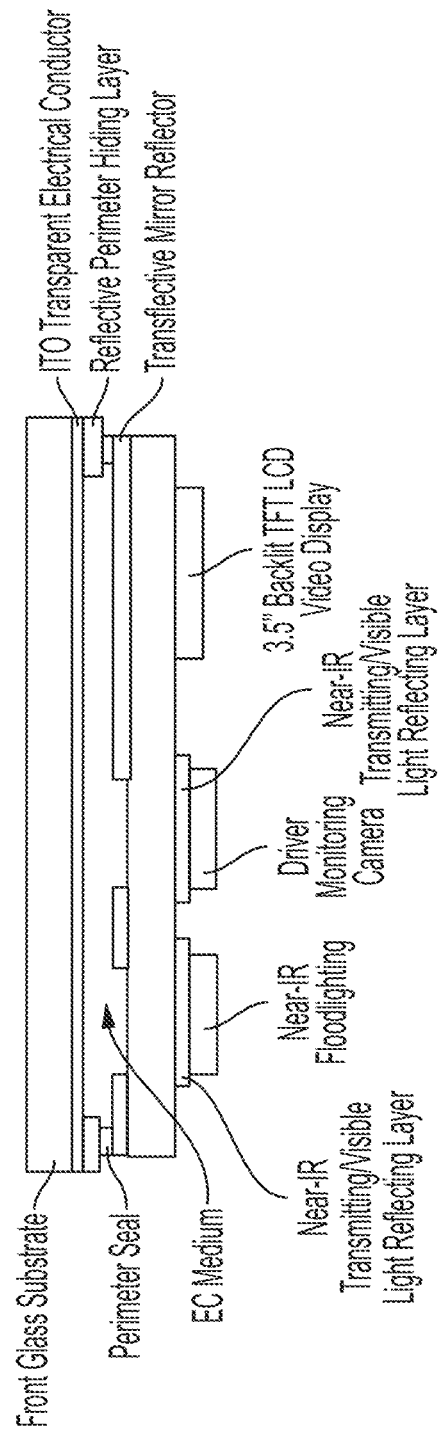

As shown in FIGS. 35 and 36, the mirror head may include the driver monitoring camera and a near-IR emitter or floodlighting element disposed behind the mirror reflective element. Optionally, the mirror reflective element may include a backlit thin film transistor (TFT) video display screen or element disposed behind the mirror reflective element and viewable through the mirror reflective element. The mirror assembly of FIGS. 35 and 36 has a transflector or transflective mirror reflector disposed at the third surface of the rear glass substrate that opposes and contacts the electrochromic medium that also contacts the transparent electrical conductor or conductive coating at the second surface of the front glass substrate. The transflective mirror reflector may have apertures or windows established (such as via laser ablating) therethrough, with the DMS camera and near-IR floodlighting being disposed behind and viewing/emitting through the respective windows. A near-IR transmitting/visible light reflecting layer is disposed at the fourth surface of the rear glass substrate at least where the near-IR floodlighting is disposed and optionally where the DMS camera is disposed.

The windows or apertures formed through the mirror reflector may comprise a region devoid of the mirror reflector coating, or may comprise a plurality of bars or dots of the mirror reflector coating at the regions where the camera and near-IR floodlighting is disposed. For example, and such as described in U.S. Pat. Nos. 8,743,203; 8,727,547 and 7,636,188 (which are hereby incorporated herein by reference in their entireties), locally removing (such as by laser etching or ablating) the metallic highly specular reflective layer or coating, such as a silver alloy reflective layer, allows (where the metallic layer is absent/fully removed) light incident at the front of an interior mirror reflective element (EC or prismatic) to reach an imager disposed behind the reflective element and behind the mirror reflector unimpeded and unabsorbed by the metallic layer. Likewise, near-IR radiation emitted by a bank or banks of near-IR emitting LEDs (disposed behind and emitting through the mirror reflective element) is unimpeded and unabsorbed by the metallic layer. However, elements of metallic reflective mirror layer are jail-bar like stripes remaining where the mirror reflective coating has been laser ablated, render presence of the camera and the IR floodlighting behind the mirror reflective element partially covert/not readily viewed by the driver or occupant in the vehicle. The degree of light transmission through the laser-ablated local area is proportional to the ratio of the ablated metallic mirror coating material to the local area (where the remaining metallic mirror coating material and the ablated regions are located).

Instead of using a silver or silver alloy-based reflector coating, the mirror transflector may optionally use a series of visible light reflecting and IR transmissive stacks (such as by utilizing aspects of the mirror reflective elements described in U.S. Pat. No. 7,274,501, which is hereby incorporated herein by reference in its entirety). Optionally, the mirror reflective element may have the glass substrate coated with a silver-based transflector, with one or more windows laser etched at the third surface reflector, and at the fourth surface, a thin piece of glass with special IR transmitting coatings (such as the types described in U.S. Pat. No. 7,274,501, incorporated above) established thereat.

Figure 37:
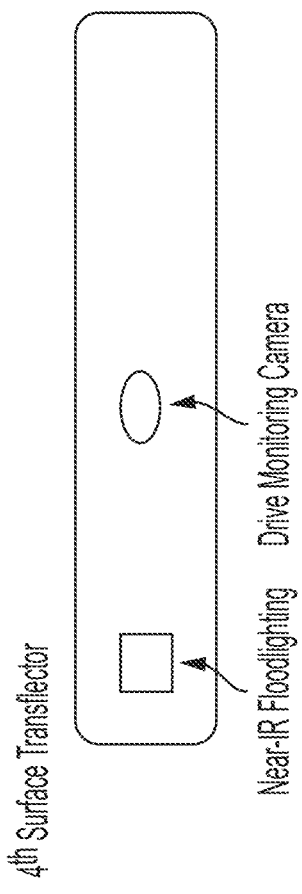
FIGS. 37 and 38 are views of another interior rearview mirror assembly, with the camera and IR emitter(s) disposed behind the mirror reflective element.
Figure 38:
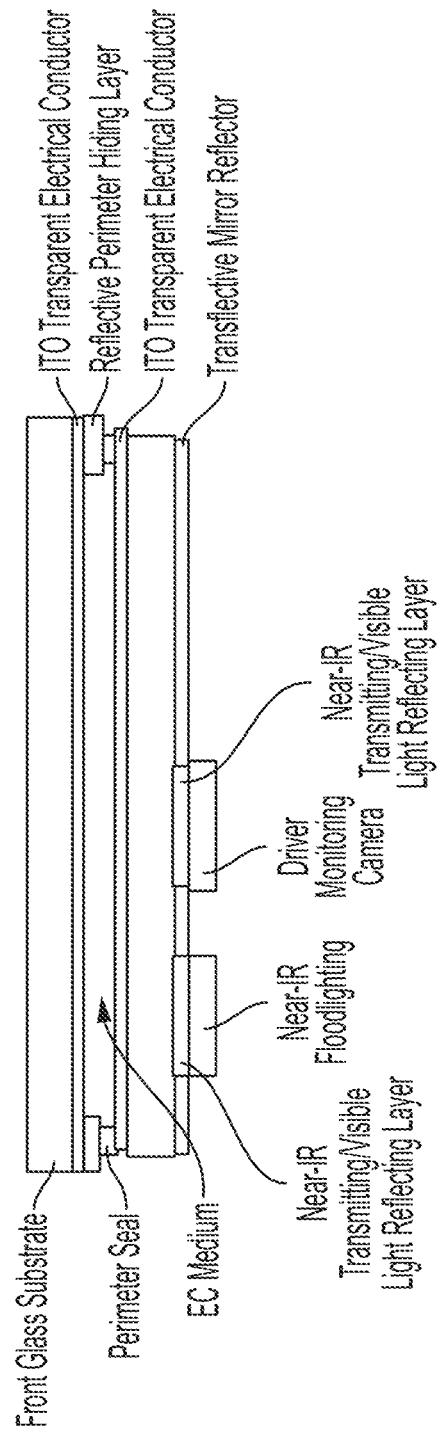

As shown in FIGS. 37 and 38, the mirror assembly has a transflective mirror reflector disposed at the fourth surface of the rear glass substrate, with the third surface of the rear glass substrate having a transparent electrical conductor that opposes and contacts the electrochromic medium that also contacts the transparent electrical conductor or conductive coating at the second surface of the front glass substrate. The fourth surface transflective mirror reflector may have apertures or windows established (such as via laser ablating) therethrough, with the DMS camera and near-IR floodlighting being disposed behind and viewing/emitting through the respective windows. A near-IR transmitting/visible light reflecting layer is disposed at the fourth surface of the rear glass substrate at least where the near-IR floodlighting is disposed and optionally where the DMS camera is disposed.

Figure 39:
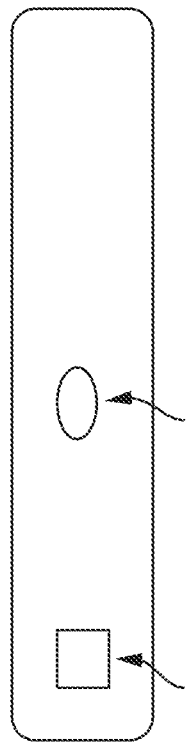
FIGS. 39 and 40 are views of an interior rearview mirror assembly, with the camera and IR emitter(s) disposed behind the mirror reflective element.
Figure 40:
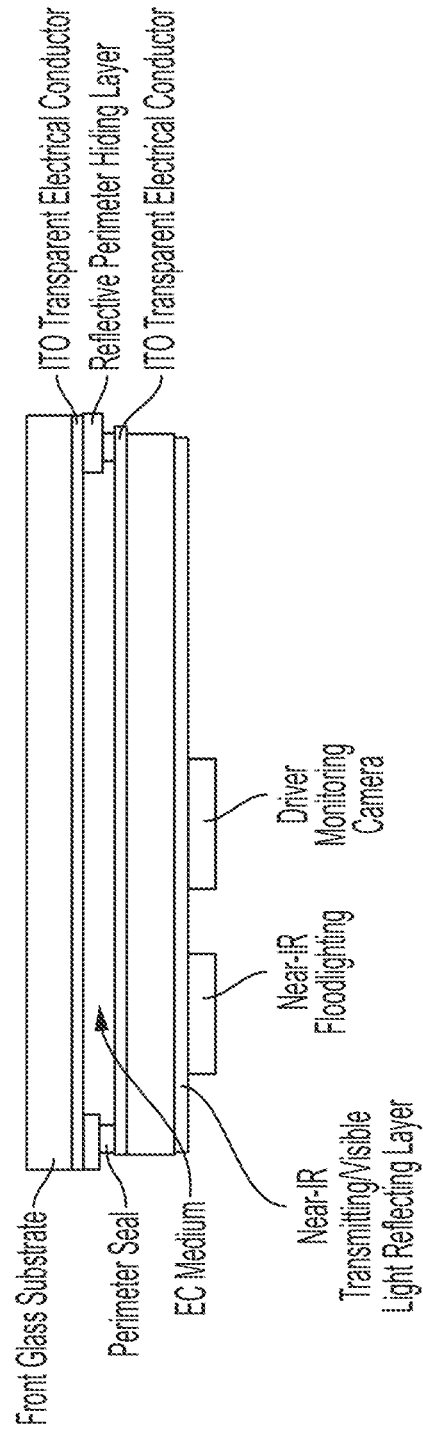

Optionally, and such as shown in FIGS. 39 and 40, the fourth surface may have a near-IR transmitting/visible light reflecting layer that provides the mirror transflector across the entirety of the fourth surface of the rear glass substrate, with the DMS camera and near-IR floodlighting being disposed behind and viewing/emitting through the near-IR transmitting/visible light reflecting layer.

Figure 41:
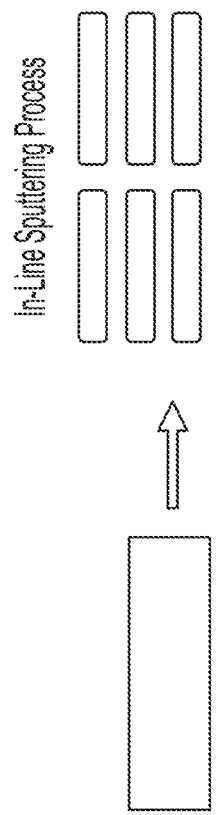
FIG. 41 is a diagram showing rear glass substrates that are cut or formed from a larger glass sheet (preferably by laser cutting)
Figure 42:
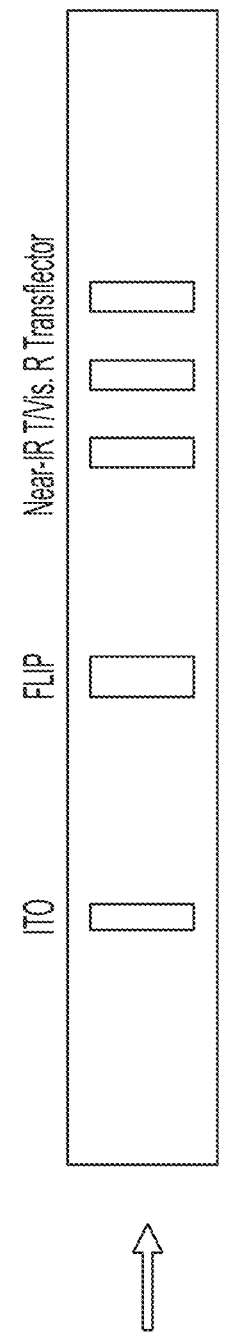
FIG. 42 is a diagram showing the in-line sputtering process for coating the glass substrates with a transparent electrical conductor on one side and a near-IR transmitting, visible light reflecting and transmitting coating(s) on the other side.

The rear glass substrate of the mirror reflective element of FIGS. 39 and 40 is thus coated on one side (the third surface) with a transparent electrical conductor and is coated on the other side (the fourth surface) with a near-IR transmitting, visible light reflecting/transmitting coating. With reference to FIGS. 41 and 42, a plurality of rear glass substrates may be cut (such as by laser cutting) or formed from a larger glass sheet, and the individual glass substrates are coated on both sides. As shown in FIG. 42, the formed glass substrate is placed on a conveyor and is coated on one side (the eventual third surface of the mirror reflective element) with a transparent electrical conductor (e.g., an ITO layer or coating), and then is flipped over so that the other side (the eventual fourth surface of the mirror reflective element) can be coated with a plurality of layers to establish a near-IR transmitting, visible light reflecting transflector coating at the fourth surface (such as by utilizing aspects of the mirror reflective elements and coating processes described in U.S. Pat. No. 7,274,501, which is hereby incorporated herein by reference in its entirety).

Figure 43:
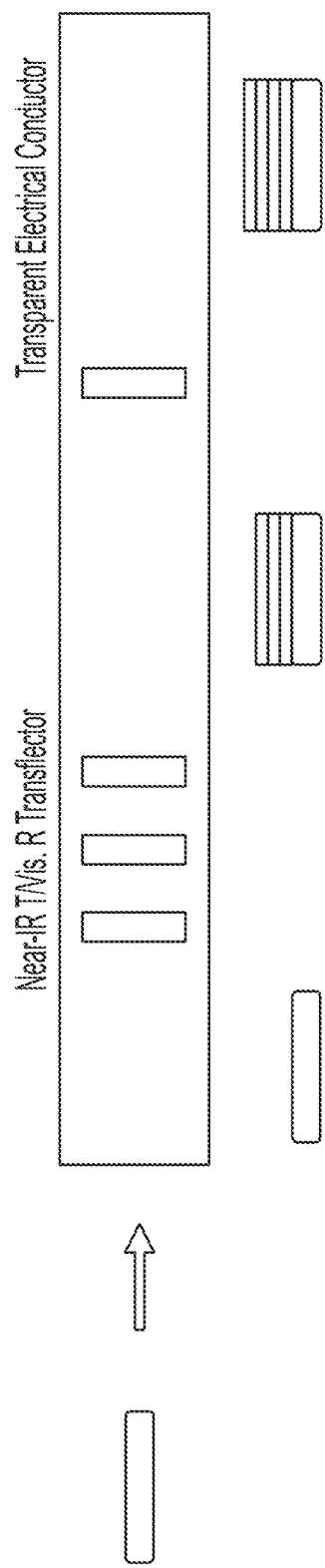
FIG. 43 is a diagram showing the in-line sputtering process for coating the glass substrates with a near-IR transmitting, visible light reflecting and transmitting coating(s) on one side, with a transparent electrical conductor coated or applied over the near-IR transmitting, visible light reflecting/transmitting coating(s)

Optionally, the formed glass substrate is placed on a conveyor and is coated on only one side (the eventual third surface of the electrochromic mirror reflective element) to provide a third surface transflective reflector mirror element. For example, and such as shown in FIG. 43, the formed glass substrate is placed on a conveyor and is coated on only one side (the eventual third surface of the mirror reflective element) with a plurality of layers to establish a near-IR transmitting, visible light reflecting transflector coating at the third surface (such as by utilizing aspects of the mirror reflective elements and coating processes described in U.S. Pat. No. 7,274,501, incorporated above). The coated substrate may then be further coated with a transparent electrical conductor (e.g., an ITO layer or coating), which contacts the electrochromic medium of the mirror reflective element.

The glass substrate may comprise a glass substrate for a prismatic mirror reflective element (usually formed by grinding/polishing a 6 mm or thereabouts thick glass substrate to have a prismatic/wedge-shaped cross-section) or may comprise a flat/planar rear glass substrate for an interior electrochromic mirror reflective element (where the visible light reflecting, near-IR light transmitting coating of layers may be disposed or coated at the third surface or the fourth surface, depending on the particular application). For example, and in accordance with U.S. Pat. No. 7,274,501, incorporated above, a fourth surface stack of layers may comprise alternating layers of low index material, such as silicon oxide or silicon dioxide and a high index material, such as titanium dioxide or the like. The number of alternating layers and respective thicknesses of the layers are selected to spectrally tune the stack of layers to provide the desired transmissivity of light or radiation with a particular spectral band (e.g., near-IR light), while reflecting light within another spectral band (e.g., visible light).

The manufacturing or coating process includes providing sheets of glass, cutting the mirror shapes or glass substrates from the sheets, and coating a surface of the glass substrates with, for example, a half wave ITO (preferably having a sheet resistance of less than 20 ohms per square, such as around 10-15 ohms per square), or a full wave ITO (having a sheet resistance of less than 10 ohms per square, such as around 8 ohms per square). The coated glass substrate is placed in the sputter deposition chamber with the coated side up for further coating of the alternating layers.

Figure 44:
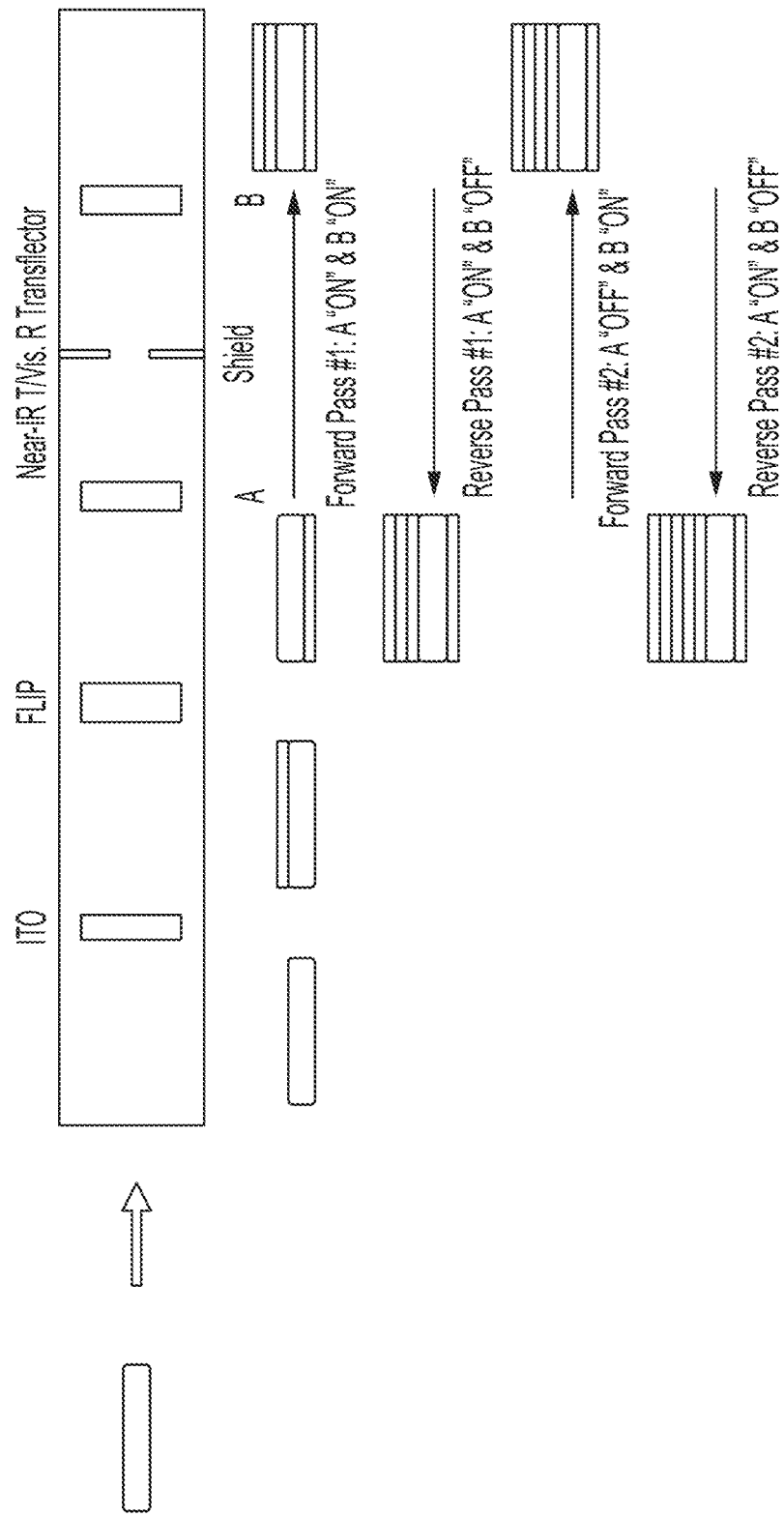
FIG. 44 is a diagram showing another in-line sputtering process for coating the glass substrate with a near-IR transmitting, visible light reflecting/transmitting coating or stack of coatings on one side, using a conveyor the moves the substrate back and forth between two targets.

The reactive sputtering vacuum deposition chamber may have two chamber sections or isolated regions, each with a respective bank of cathodes (either planar magnetron or rotary magnetron sputter deposition cathodes, as known in the vacuum arts). For example, and such as shown in FIG. 44, one bank of cathodes/targets (see "A" in FIG. 44) may be disposed in one chamber section and another bank of cathodes/targets (see "B" in FIG. 44) may be disposed in another chamber section that is adjacent to and in-line with the first chamber section with a wall or barrier or shield between the chambers having an aperture that the conveyor conveying the substrates passes through such the conveyor extends through both chamber sections, and with the wall or barrier or shield mitigating cross-deposition from one chamber section into the other adjacent chamber section.

The glass substrate (or optionally a large flat/planar glass sheet if the large glass sheet is coated with the multi-layer transflector stack before cutting the individual mirror shaped substrates from the by then transflector-coated large glass sheet) is placed on a carriage or onto a conveyor mechanism or onto a palette and moved to the first chamber section. In the illustrated process of FIG. 44, the glass substrate is first coated on one side with a transparent electrically conductive coating or layer (such as ITO), and then flipped over, so the uncoated side of the glass substrate is facing up. The substrate is then conveyed to the A chamber or coating location, where the A target is activated and then conveyed to the B chamber where the B target is on, so that the upward side of the substrate is coated with the layers or coatings. The A target in the first chamber or coating location may comprise, for example, a titanium target and the target in the second chamber may comprise, for example, a silicon target. When the glass substrate is positioned at the first coating location (under the A target), the A bank/target is powered or activated to coat the upward or exposed surface of the glass substrate with titanium dioxide (via oxygen reacted sputter deposition). Once the desired thickness of the layer of titanium dioxide is sputter coated onto the glass substrate, the target may be deactivated and/or the conveyor moves the substrate to the second location for coating of the next layer.

The second chamber may be spaced from and isolated from the first chamber (such as via a barrier or shield). The carriage or tray at which the substrate is placed moves under the barrier between the coating locations. When the glass substrate is positioned in the second location, the B bank/target is powered or activated to coat the upward or exposed surface (that is already coated with the A material) of the glass substrate with the second material, such as silicon dioxide (via oxygen reacted sputter deposition). Once the desired thickness of the layer of silicon dioxide is sputter coated onto the glass substrate, the target may be deactivated and/or the conveyor may move the glass substrate.

The conveyor may then move the substrate from the B target/location back to the A target/location for coating of the next layer of titanium oxide. The conveyor thus reverses direction, and moves the glass substrate back to the A bank/target, which then starts sputter depositing or coating the third layer (e.g., the second layer of titanium dioxide) onto the glass substrate. After the desired thickness of the third layer is established, the A bank/target is stopped and the conveyor reverses direction again (back to the "forward direction") to move the glass substrate back to the second chamber and the bank/target in the second chamber is activated to sputter deposit or coat the fourth layer (e.g., the second layer of silicon dioxide) onto the glass substrate.

The process of activating/deactivating the banks/targets and shuttling or moving the conveyor back and forth repeats until the desired or selected number of alternating layers (at the desired or selected respective thicknesses) are coated onto the glass substrate to provide the desired or selected spectrally tuned alternating layers. The alternating layers thus are provided via a single chamber and conveyor, with a barrier/shield between regions of the chamber that the palette/conveyor supporting the being-coated glass substrate(s) passes through. Optionally, by activating and deactivating the DC magnetron targets (that can be planar magnetron or can be rotary magnetron targets; rotary targets are suitable for reactive DC sputtering in an oxygen-rich vacuum chamber from a silicon target to deposit silicon dioxide), the vacuum chamber may not need the barrier and the computer-control of the system may instead position the substrate under the appropriate bank or target and activate only that bank/target for depositing that layer. The alternating layers may be coated onto the surface of the rear glass substrate that eventually becomes the third surface of the EC mirror reflective element or onto the surface of the rear glass substrate that eventually becomes the fourth surface of the EC mirror reflective element.

In the illustrated embodiment of FIG. 44, the glass substrate is first coated on one side (the side that eventually is the third surface of the reflective element) with ITO, and then flipped so that the other side (the side that eventually is the fourth surface of the reflective element) is coated with the alternating layers that form the visible light reflecting, near-IR light transmitting coating.

Figure 45:
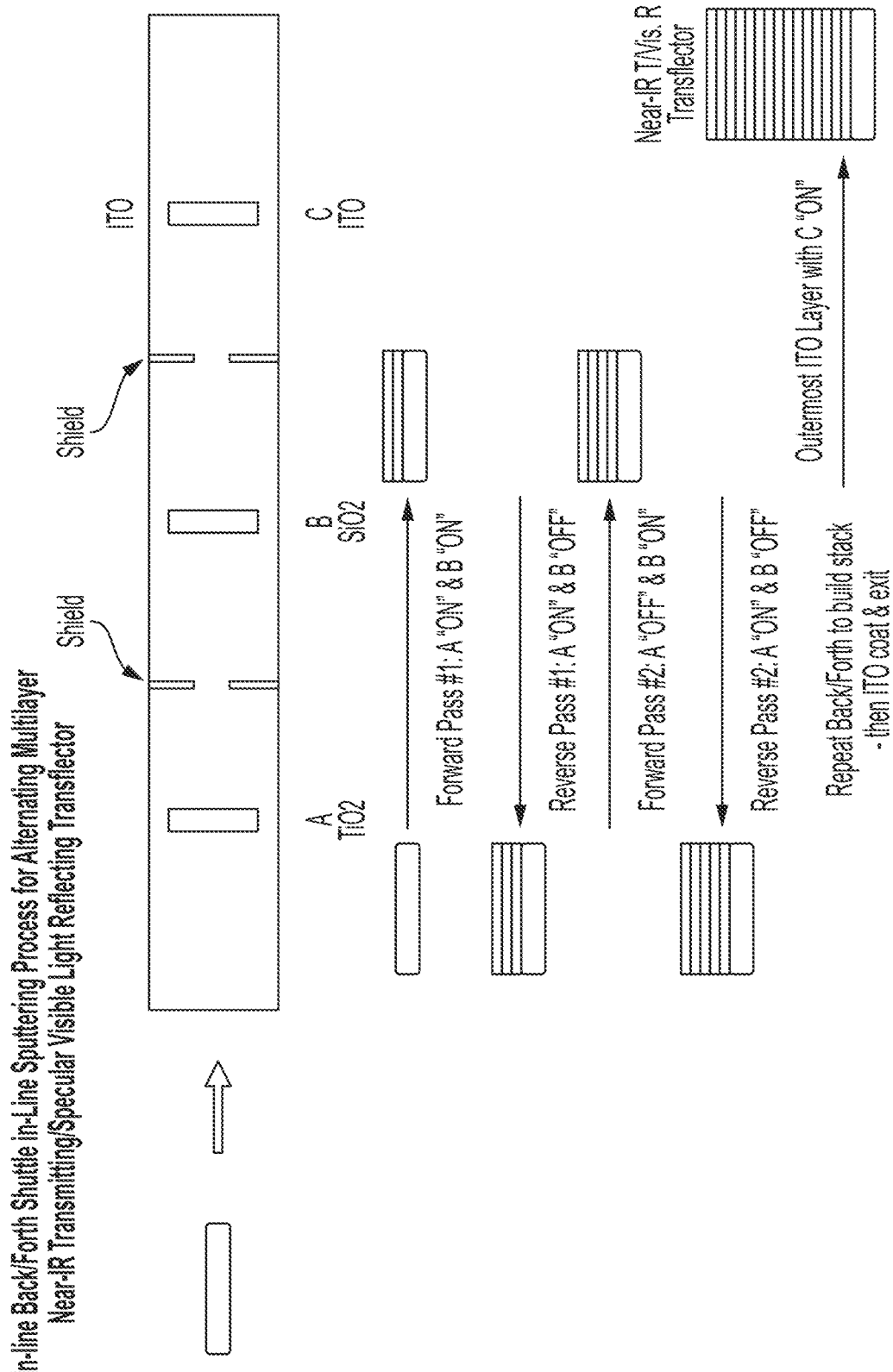
FIG. 45 is a diagram showing another in-line sputtering process for coating the glass substrate with a near-IR transmitting, visible light reflecting/transmitting coating or stack of coatings on one side, using a conveyor the moves the substrate back and forth between two targets.

Optionally, and such as shown in FIG. 45, the glass substrate may be loaded into the vacuum chamber and coated on one side (the side that eventually is the third surface of the reflective element) with the alternating layers of $TiO_2$, $SiO_2$, $TiO_2$, $SiO_2$, etc. (such as via the back and forth movement of the conveyor and glass substrate between the A bank/target/location and the B bank/target/location. After the desired stack of alternating layers is completed, the coated glass substrate is moved to a third (C) bank or target for over-coating the stack with a transparent electrically conductive layer, such as ITO or the like.

Optionally, the conveyor may shuttle back and forth between the targets/locations, with the conveyor line and sputter chamber/system comprising a conveyor line that has two load locks. The glass substrate(s) may be loaded in at a load lock at one end, coated with ITO, then coated with the A, B materials (via shuttling back and forth between the A and B targets, and then removed via another load lock at the opposite end of the conveyor. Optionally, the ITO coating can be done as the last coating, depending on the particular application of the coated rear glass substrate. Also, preferably the ITO is coated onto a substrate heated to at least 200 degrees Celsius; more preferably onto a substrate heated to at least 275 degrees Celsius; and most preferably onto a substrate heated to at least 350 degrees Celsius.

Optionally, the cathodes may be turned on and off as the substrate is moved to and from the locations. The targets may comprise rotary sputter targets and rotate during use. In the illustrated processes, the targets comprise metal titanium and silicon targets, which provide reactive sputter deposition in an oxygen rich environment to deposit $TiO_2$ and $SiO_2$ onto the glass substrate. Optionally, the glass substrate may be heated (such as to a temperature greater than 150 degrees C., or greater than 250 degrees C., or greater than 350 degrees C.) during the reactive sputter deposition (in an oxygen-rich vacuum chamber environment) of the coatings in alternating layers.

Control of the sputtering process provides the alternating layers having varying thicknesses. The varying thicknesses may be achieved by one or both of adjusting the speed of the conveyor as it moves the glass substrate beneath the respective target and/or increasing/decreasing electrical power to the DC magnetron sputtering target to increase/decrease the sputtering from/deposition rate of the respective target. The process may include selection of particular metal and dielectric materials for sputtering (and determining the appropriate or desired thickness of each layer) and then selecting the conveyor speed and/or sputtering device power to achieve the desired or selected or determined thicknesses of each layer of the stack of layers. The system could provide the alternating layers via a conveyor and sputtering system with multiple alternating targets along the conveyor (with barriers between adjacent targets) so that the conveyor may move the substrate through the multiple coating locations. Optionally, the conveyor may operate at a constant speed (with multiple glass substrates placed on the conveyor and sequentially moved through the multiple coating locations), each sputtering target may operate at a selected power level to provide the selected or determined degree of sputtering/deposition rate for the respective target to provide the desired or determined thickness of that particular layer at the glass substrate.

Figure 46:
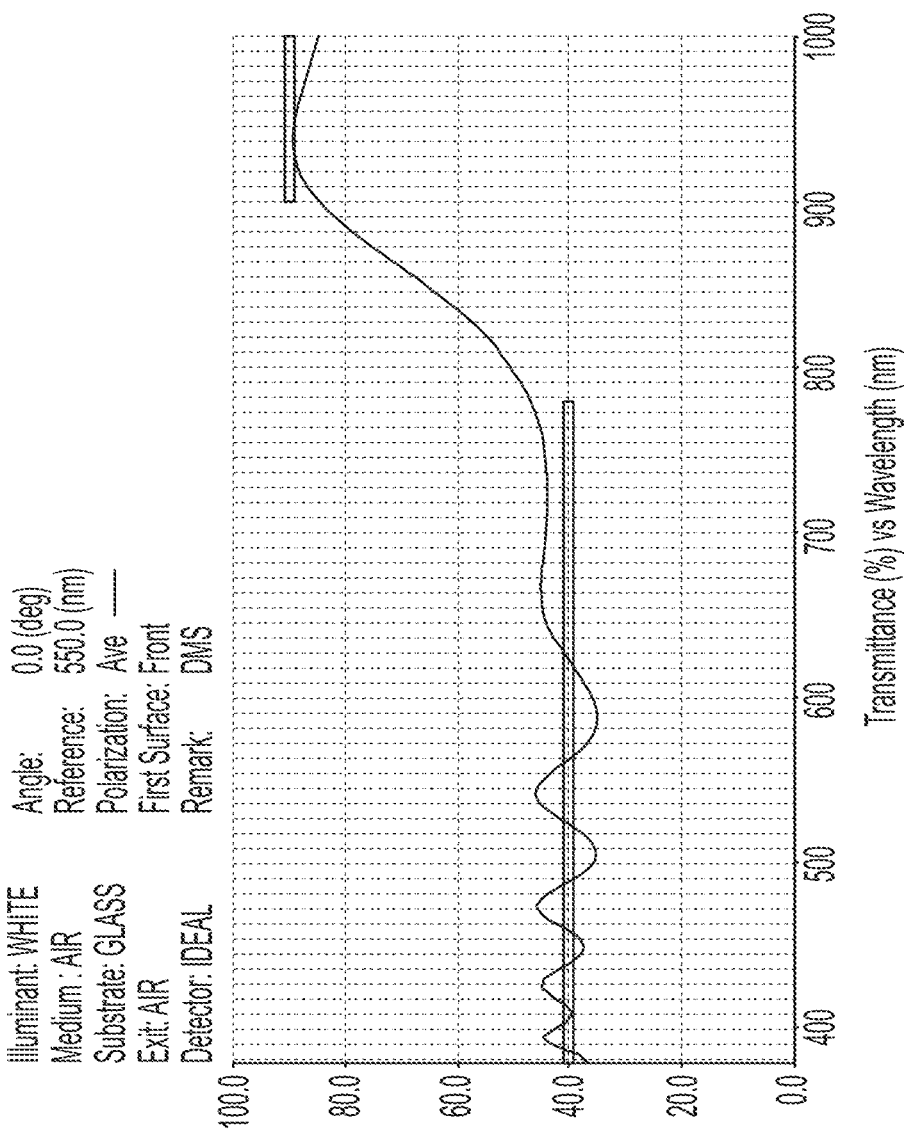
FIG. 46 is a diagram showing an example of the alternating/repeating layers of the near-IR transmitting, visible light reflecting mirror transflector, and showing the transmittance vs. wavelength properties of the near-IR transmitting, visible light reflecting/transmitting multi-layer stack of coatings.

Thus, the coating process can alternatingly coat a side or surface of the glass substrate (or multiple glass substrates or a glass sheet that has not yet been cut into individual mirror glass shapes or substrates) with a plurality of layers (e.g., alternating layers of $TiO_2$ and $SiO_2$. An example of such a stack of layers (with an ITO layer) is shown in FIG. 46, which also shows the transmittance vs. wavelength for the coated glass substrate. The computer control of the vacuum deposition chamber selectively controls the individual DC magnetron sputter targets and controls the pallet/conveyor travel speed and travel direction to layer-by-layer coat the interior mirror-shaped glass substrate with the prescribed multilayer stack of alternating High RI (such as titanium dioxide or niobium oxide)/Low IR (such as silicon dioxide) that, for a third surface transflector of a two-substrate laminate-type EC mirror reflective element, is capped with an final layer of ITO.

Figure 47:
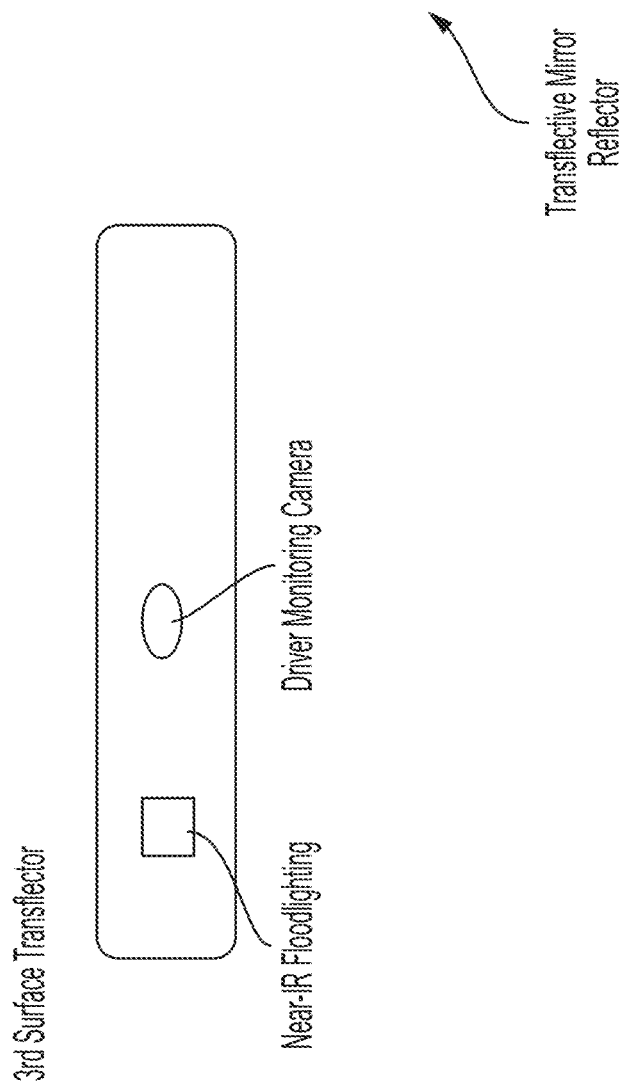

FIGS. 47 and 48 show an electrochromic mirror reflective element with the third surface transflector or transflective mirror reflector comprising the stack of layers shown in FIG. 46. The near-IR floodlighting and the driver monitoring camera are disposed behind the mirror reflective element.

Figure 49:
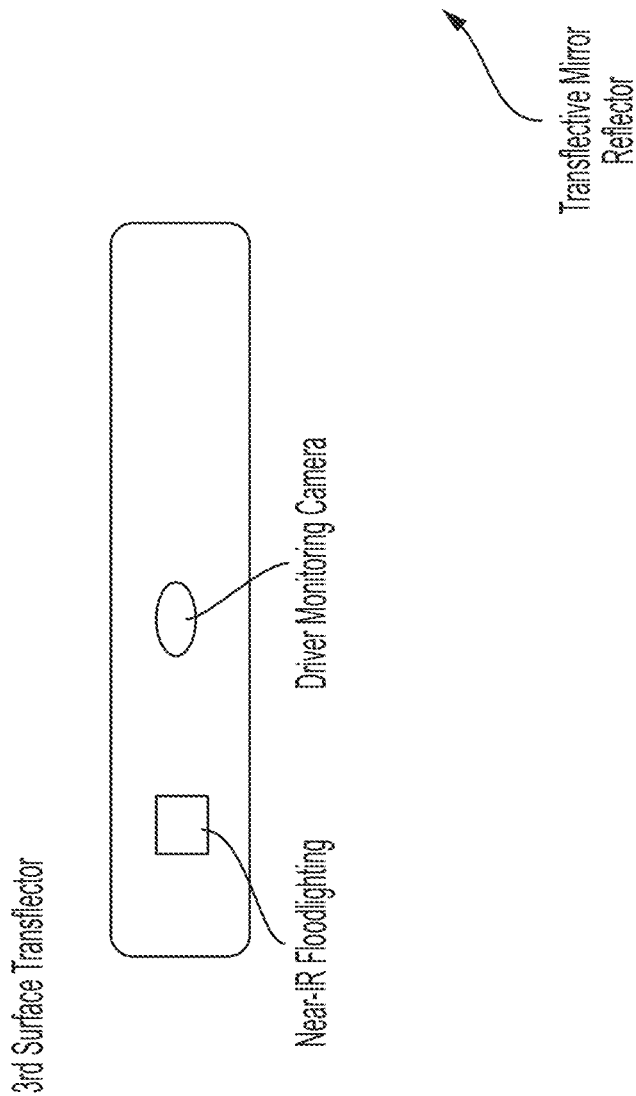
Figure 51:
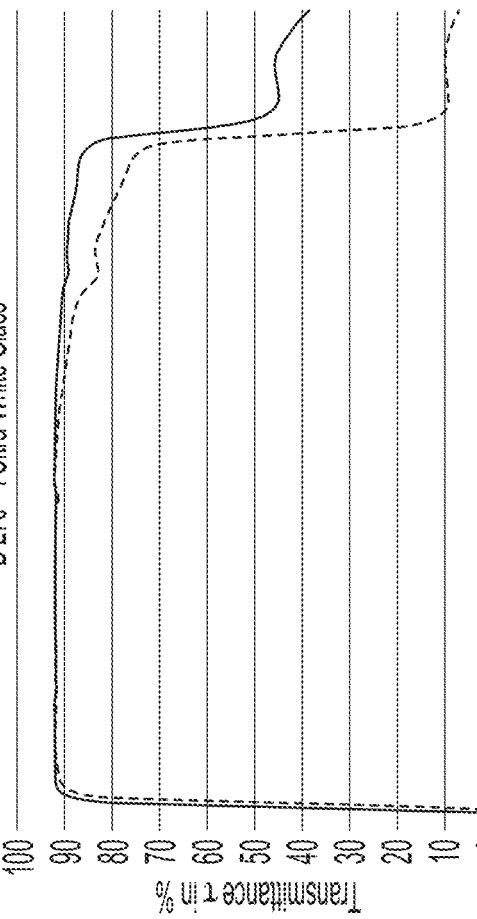
FIG. 51 shows properties of B 270 ® Ultra-White Glass.

FIGS. 49 and 50 show another electrochromic mirror reflective element with the third surface transflector or transflective mirror reflector comprising the stack of layers shown in FIG. 46. The mirror reflective element includes a broadband (including near-IR at 940 nm) anti-reflection layer/stack at the first surface (the front or outer surface of the front glass substrate) and/or at the fourth surface (the rear surface of the rear glass substrate). Such anti-reflection coatings reflect visible light and near-IR light. The anti-reflective coating may be disposed or established at the rear (fourth) surface and/or at the front (first) surface of the mirror reflective element. The near-IR floodlighting and the driver monitoring camera are disposed behind the mirror reflective element. In the illustrated embodiment of FIGS. 49 and 50, the glass substrates comprise Schott B 270 ® Ultra-White Glass (see FIG. 51), which, as discussed below, provides consistent transmittance of light across a range of wavelengths, from ultraviolet to near-infrared.

Figure 52:
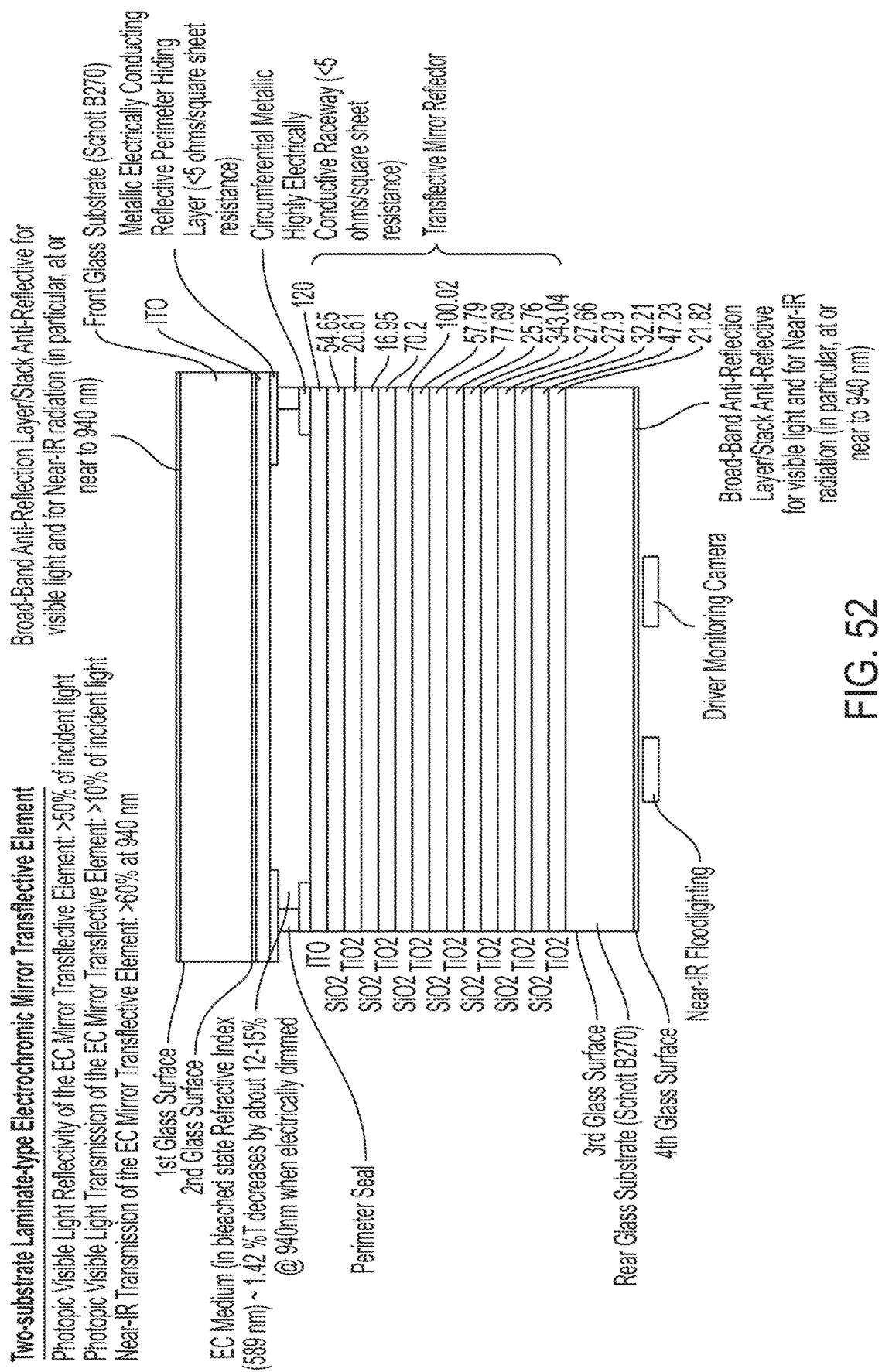
FIG. 52 is a diagram of another mirror reflective element having the near-IR transmitting, visible light reflecting/transmitting coatings of FIG. 46, with a circumferential electrically conductive raceway disposed at the ITO coating at the third surface of the rear glass substrate.

Referring now to FIG. 52, the interior two-substrate laminate-type electrochromic mirror transflective element includes a metallic electrically conducting reflective perimeter hiding layer at the ITO coating at the second surface of the front glass substrate, and includes a circumferential metallic highly electrically conductive raceway at the ITO coating on top of the alternating stack of layers at the third surface of the rear glass substrate. Such a metallic conductive raceway at the second surface ITO coating allows for reduced thickness of the ITO coating. For purpose of increasing overall near-IR transmission through the EC mirror reflective element, the ITO layer deposited at the second glass surface of the front substrate can have a sheet resistance greater than 20 ohms per square, such as greater than 25 ohms per square, or greater than 30 ohms per square, and preferably less than 70 ohms per square, more preferably less than 50 ohms per square, and more preferably less than 35 ohms per square. By having the metallic electrically conductive reflective perimeter hiding layer with a sheet resistance of less than 5 ohms per square (preferably less than 3 ohms per square, and more preferably less than 1 ohms per square), and the concomitant decreased physical thickness of the ITO layer, a concomitant increased near-IR transmissivity can be achieved. Choice of metallic material (e.g., silver or silver alloy as compared to chromium) and/or increased physical coating thickness (e.g., 150 nm as compared to 15 nm) and/or width of the hiding layer (e.g., 12 mm as compared to 8 mm) can render the perimeter hiding layer more electrically conductive and hence facilitate use of a thinner second surface ITO layer.

Similarly, the circumferential metallic highly electrically conductive raceway at the coated rear glass substrate may provide similar advantages. As can be seen in FIG. 52, the rear perimeter band is circumferentially disposed at the ITO layer that is deposited over the alternating stack of $TiO_2$ and $SiO_2$ layers and allows for a decreased thickness of the ITO layer while still achieving the desired dimming performance.

For in-cabin floodlighting (such as to illuminate with near-IR illumination the head and/or eyes of the driver for driver monitoring such as in an SAE Level 3 advanced driving assistance system (ADAS)), the interior rearview mirror assembly provides copious area to place a plurality (e.g., at least two, preferably at least six, and more preferably at least ten) near-IR LEDs that emit near-IR radiation through the mirror reflective element. The principal axis of the near-IR radiation emitted by such a plurality of near-IR LEDs can be angled one to another so as to preferentially direct emitted near-IR radiation towards the region of the interior cabin where, with the mirror head of the interior rearview mirror assembly having been adjusted by the driver of the vehicle so the driver can view rearward via the rear window of the vehicle, the driver's head is to be found. Use of such a multitude of preferably differently angled near-IR LEDs has the advantage of avoiding local hot spots behind the reflective element when the near-IR LEDs are maximally electrically powered.

As shown in FIGS. 53-55, the interior rearview mirror assembly may have the visible/near-IR driver monitoring camera disposed behind (and viewing through) the electrochromic mirror reflective element, with some (or all) of the near-IR LEDs disposed at the mirror head and not emitting light through the mirror reflective element. The mirror head may comprise a mirror casing that receives the mirror reflective element therein, such as an EVO™ mirror assembly (such as described in U.S. Pat. Nos. 8,277,059; 8,049,640 and/or 7,289,037, which are hereby incorporated herein by reference in their entireties) and/or an INFINITY™ mirror assembly (such as described in U.S. Pat. Nos. 9,827,913; 9,174,578; 8,508,831; 8,730,553; 9,598,016 and/or 9,346,403, which are hereby incorporated herein by reference in their entireties).

Currently, at least three constructions of EC interior rearview mirror assemblies are commercially available and used in vehicles worldwide. One category of mirror construction is a base/added feature EC interior rearview mirror assembly, another category of mirror construction is a video mirror utilizing an around 3.5 inch video display screen disposed behind and located toward/at the passenger side (as the interior rearview mirror assembly is used in the vehicle), and the third category of mirror construction is a full display mirror, such as FDM™ mirror assemblies commercially available from Gentex Corporation and CLEARVIEW™ mirror assemblies commercially available from Magna Mirrors of America, Inc., that are operable in two modes (such as by utilizing aspects described in U.S. Pat. Nos. 11,214,199; 10,442,360; 10,421,404; 10,166,924 and/or 10,046,706, and/or U.S. Publication Nos. US-2021-0162926; US-2021-0155167; US-2019-0258131; US-2019-0146297; US-2019-0118717 and/or US-2017-0355312, which are hereby incorporated herein by reference in their entireties).

In the base/added content and the video mirror EC mirror constructions, it is possible to have only part of the mirror reflective element be transflective (partially light transmissive and partially light reflective). In any of such three constructions or categories of mirrors, having the camera and near-IR LEDs (used for DMS and for other interior purpose) behind the EC mirror reflective element is desirable from a driver/consumer appreciation viewpoint because presence of such hardware is largely covert to the driver. Optionally, however, some or all of the near-IR LEDs can be located (such as shown in FIGS. 53-55) at a lower gondola part of the mirror casing or at an upper eyebrow portion of the mirror casing or at left and/or right side portions of the mirror casing, so that near-IR radiation emitted by such located near-IR LEDs does not pass through and get attenuated by the interior rearview mirror reflective element. Because the size/diameter of such near-IR LEDs is significantly smaller than the size/diameter of the camera used for the driver monitoring system, having the camera covert behind the reflective element, but with at least some or all of the near-IR LEDs located in the mirror assembly non-covert, can be an economically attractive alternative between DMS performance and styling/consumer appreciation.

Prismatic and electrochromic interior mirrors in commercial production by the likes of Gentex Corporation (Zeeland, MI USA) and Magna Mirrors of America, Inc. (Holland, MI USA) use soda-lime glass substrates that have a ferric oxide (iron) content of close to 0.1%. Though such usage works well for most automotive rear vision applications, the mirror reflective elements preferably use low-iron (a.k.a. low-Fe) glass substrates where the ferric oxide levels are down to just 0.01% or even lower. Ultra-clear low-iron glass (with as little as 10% of the iron content that is in regular soda lime glass) is "water white" with up to at least 8% better visible light transmission than conventional soda-lime glass. Reducing the iron content also reduces absorption in the near-IR region (such as at or around 940 nm), and so use of such low-iron glass for the front and rear substrates in a two-substrate laminate-type EC mirror construction allows more near-IR light emitted by a behind-the-glass near-IR bank or banks of near-IR emitting LEDs to pass through the EC mirror reflective element in an EC interior mirror assembly mounted at the in-cabin side of a windshield of an equipped vehicle to illuminate objects present within the interior cabin, such as the head/eyes of a driver. Likewise, use of such low-iron glass for the front and rear substrates in a two-substrate laminate-type EC mirror construction allows more near-IR light reflected off the driver's head/face to pass back through the EC mirror reflective element in an EC interior mirror assembly to be detected by the behind-the-glass camera of the DMS. Glass suitable to use for the EC mirror reflective elements for use in an EC interior mirror assembly includes crown glass B 270® that is designed to deliver consistent transmittance of light across a range of wavelengths, from ultraviolet to near-infrared, and that is available from SCHOTT North America, Inc. of Rye Brook, NY 10573 USA (https://www.schott.com/en-us/products/b-270). Spectral and product characteristics of Schott B270 glass are given in FIG. 51.

Conventional soda lime glass has around 80% transmission and absorbs about 9% whereas a low iron glass has around 90% transmission and absorbs around 2%.

Another glass with high near-IR transmissivity is Corning 9754 (https://www.corning.com/microsites/coc/oem/documents/aerospace-defense/Infrared-Transmitting-Glass-9754.pdf) that is a clear germanate glass composition that is highly transmitting in both the visible light region and in the near-IR region of the electromagnetic spectrum, and is available from Corning France, Bagneaux-sur-Loing, France.

Another glass with high near-IR transmissivity is Guardian ULTRACLEAR® low-iron glass (https://www.guardianglass.com/eu/en/products/glass-type/low-iron-glass) available from Guardian Industries' Glass Group of Bertrange, Luxembourg.

In a two-substrate laminate-type EC mirror construction, both visible and near-IR transmission through the EC mirror reflective element can be increased by (i) coating the rearmost glass surface (i.e., the rear glass surface of the rear glass substrate, known in the EC art as the fourth surface) with a broad band anti-refection coating/stack of coatings (as known in the optical anti-reflection art) that reduce reflectivity of both incident visible and incident near infrared radiation from the typical around 4% R level to around 0.5% (or even lower) and/or (ii) coating the frontmost glass surface (i.e. the front glass surface of the front glass substrate, known in the EC art as the first surface) with a broad band anti-refection coating/stack of coatings (as known in the optical anti-reflection art) that reduce reflectivity of both incident visible and incident near infrared radiation from the typical around 4% R level to around 0.5% (or even lower). For example, the anti-reflection coatings, stacks of coatings and techniques/processes disclosed in U.S. Pat. No. 5,076,674, filed on Mar. 9, 1990 as U.S. patent application Ser. No. 07/491,447 by Niall R. Lynam and titled "Reduced first surface reflectivity electrochromic/electrochemichromic rearview mirror assembly" (which is hereby incorporated herein by reference in its entirety) can be used. Broadband antireflection coatings for visible and infrared ranges are disclosed by F. Lemarquis et al., "Broadband antireflection coatings for visible and infrared ranges"; DOI: 10.1117/12.2536066; International Conference on Space Optics—ICSO 2018 (July 2019) (https://www.researchgate.net/publication/334640999_Broadband_antireflection_coatings_ for_visible_and_infrared_ranges), which is hereby incorporated herein by reference in its entirety. AR coatings suitable for use in the mirror assembly are disclosed in "Multilayer antireflection coatings for the visible and near-infrared regions"; H. Ganesha Shanbhogue, C. L. Nagendra, M. N. Annapurna, S. Ajith Kumar, and G. K. M. Thutupalli, "Multilayer antireflection coatings for the visible and near-infrared regions," Appl. Opt. 36, 6339-6351 (1997) (https://www.osapublishing.org/ao/abstract.cfm?URI=ao-36-25-6339), which is hereby incorporated herein by reference in its entirety.

When an EC medium in the likes of a two-substrate laminate-type EC mirror construction dims/darkens to reduce glare to the driver due to rear-approaching glaring headlight of other vehicles, both visible light and near-IR transmission through the two-substrate laminate-type EC mirror construction reduces, typically by 10-20% depending on the degree of glare from rear approaching other vehicles. To compensate for this, when the EC medium dims/darkens, the gain of the camera located behind (and viewing into the vehicle cabin through) the EC medium can be correspondingly increased to maintain the overall viewing sensitivity of the camera into the interior cabin of the equipped vehicle. Likewise, to compensate for when the EC medium dims/darkens, electrical power to the near-IR LEDs behind (and emitting light through) the EC medium can be increased to increase the intensity of near-IR light emitted by the near-IR LEDs (typically emitting at or around 940 nm) so as to maintain a desired level of near-IR floodlighting/illumination within the interior cabin of the equipped vehicle even when the EC medium dims/darkens.

Also, to increase the signal to noise ratio for detection/distinguishing by the camera of a desired DMS signal in the presence of background noise (such as due to ambient/in-cabin near-IR radiation from solar insolation or from interior lighting of the equipped vehicle or from lighting from other road traffic or from street lighting, etc.), the near-IR light emitted by the near-IR LEDs can be modulated (amplitude modulated or frequency modulated or phase modulated, or a combination thereof) and the signal captured by the camera can be filtered/demodulated/digitally analyzed to enhance true signal detection and reduce noise. In this regard, phase lock loop synchronization/detection (a.k.a. phase-locked loop) as known in the detection arts can be used. A phase-locked loop or phase lock loop (PLL) is a control system that generates an output signal whose phase is related to the phase of an input signal. There are several different types; the simplest is an electronic circuit consisting of a variable frequency oscillator and a phase detector in a feedback loop. The oscillator generates a periodic signal, and the phase detector compares the phase of that signal with the phase of the input periodic signal, adjusting the oscillator to keep the phases matched. Suitable or applicable PLL circuitry and techniques can be such as disclosed in "Introduction to phase-locked loop system modeling" by Wen Li, Senior System Engineer, Advanced Analog Product Group and Jason Meiners, Design Manager, Mixed-Signal Product Group; Analog Applications Journal (SLYT015—May 2000 Analog and Mixed-Signal Products) (https://www.ti.com/lit/an/slyt169/slyt169.pdf?ts=1615122679096&ref_url=https%253A%252F%252Fwww.google.com%252F), which is hereby incorporated herein by reference in its entirety. For example, light intensity emitted by the in-mirror near-IR LEDs can be amplitude and/or frequency and/or phase modulated, and PLL can be used to lock into the signal (that is based on receipt at the camera of near-IR light/radiation) that is output by the in-mirror camera in order to distinguish (i) the desired near-IR component that is in-phase with and has the modulated characteristic(s) of the emitted modulated near-IR radiation from (ii) signal noise (due to ambient in-cabin near-IR levels and/or other extraneous near-IR sources such as solar insolation) that will not be in-phase with the near-IR component of the camera's output signal that is of interest and that represents near-IR radiation being reflected back to the in-mirror camera from likes of the driver's head or driver's eyes.

Keeping the input and output phase in lock step also implies keeping the input and output frequencies the same. Consequently, in addition to synchronizing signals, a phase-locked loop can track an input frequency, or it can generate a frequency that is a multiple of the input frequency. These properties are used for computer clock synchronization, demodulation, and frequency synthesis.

For example, and as disclosed in U.S. Publication No. US-2020-0327323 titled "SYSTEM AND METHOD FOR IMPROVING SIGNAL TO NOISE RATIO IN OBJECT TRACKING UNDER POOR LIGHT CONDITIONS" filed by John Noble as U.S. patent application Ser. No. 16/759,951 based on PCT/AU2018/050776 (Jul. 27, 2018), with a 371 date of Apr. 28, 2020 and published on Oct. 15, 2020 (which is hereby incorporated herein by reference in its entirety), a microprocessor-based controller of circuitry housed within the mirror head of an interior rearview mirror assembly can process at least a subset of images captured by the camera disposed behind the mirror reflective element and generate LED control signals to control the plurality of near-IR LEDs located also within the mirror head behind (and emitting near-IR light through) the mirror reflective element to control their drive current amplitude and pulse time so as to vary the intensity of near-IR radiation emitted by the LEDs. The controller can selectively adjust the drive current amplitude and/or pulse time of the near-IR LEDs based on the determined illumination characteristics of a previous captured image or images captured by the cabin-viewing camera located in the mirror head that views through the mirror reflective element. When the EC medium dims and/or when the near-IR reflection off an in-cabin object (such as the driver's head or eyes) back to the mirror head is weak or washed out by high ambient or other extraneous in-cabin near-IR radiation, then the controller can increase the gain of the camera and/or the intensity of near-IR radiation emitted by the LEDs. Thus, in situations where the signal to noise ratio of an image becomes too low to accurately distinguish/track the driver's eye from surrounding objects in the image (such as when the driver is wearing tinted spectacles or sunglasses or when in-cabin insolation due to incoming solar radiation is high such as in a convertible or when a sunroof, and in particular a panoramic sunroof, is open), having the near-IR radiation floodlighting the cabin be coded/tagged by frequency/amplitude/phase modulation (and distinguishing the coded/tagged signal from non-coded noise using likes of digital filtering and phase locking techniques as known in the signal processing art) in combination with selectively adjusting the drive current amplitude and/or pulse time of the near-IR LEDs based on the determined illumination characteristics of a previous captured image or images captured by the cabin-viewing camera not only helps achieve good DMS performance but allows and enables less complex and more economical optical multilayer stack design for the transflector of the interior mirror reflective element and facilitates achieving higher visible light reflectivity for the interior mirror reflective element.

The outermost layer of the third surface multi-layer mirror reflector/transflector directly makes contact with the EC medium and must be electrically conductive to dim the EC medium. It also must be transmissive both to visible light and to near-IR radiation to meet the needs of DMS when the camera and/or the near-IR LEDs (located behind the mirror reflective element) view/emit radiation/receive radiation through the EC medium. This outermost layer of the third surface multi-layer mirror reflector/transflector can be a transparent electrical conductor layer, with indium tin oxide (ITO) being preferred. To meet the commercial expectations of fast and uniform dimming of an interior EC mirror reflective element, the sheet resistance of the ITO outermost layer of the third surface multi-layer mirror reflector/transflector preferably is less than about 30 ohms per square, more preferably is less than about 20 ohms per square, and more preferable is less than about 15 ohms per square. Since ITO is a near-IR absorber (up to 10% or thereabouts, depending on the physical thickness of the ITO coating), it is preferable that this ITO outermost layer of the third surface multi-layer mirror reflector/transflector be thin, and that it is in optical balance with the alternating High RI/Low RI layers of the multi-layer stack. Thus, having the sheet resistance of this ITO layer be at or even higher than 20 ohms per square helps achievement of overall higher near-IR transmission through the EC mirror reflective element.

In this regard, use of a metallic highly electrically conductive raceway coating/stack of coatings (such as shown in FIG. 52) that circumscribes the perimeter border of the ITO outermost layer of the third surface multi-layer mirror reflector/transflector (dimensioned not to encroach into the region of the EC reflective element visible to the driver) allows use of a thinner (and hence higher sheet resistance) ITO outermost layer of the third surface multi-layer mirror reflector/transflector. The circumferential metallic highly electrically conductive raceway can (for example) be a layer of chromium metal or of silver or of silver alloy (such as a 93% Ag/7% Au alloy) of coating physical thickness greater than 30 nm, more preferably greater than 50 nm, and more preferably thicker than 100 nm, and with a width extending inward from the outer edge of the rear glass substrate preferably of around 3 mm to 15 mm, more preferably of around 5 mm to 12 mm, and more preferably of around 7 mm to 9 mm, and having a sheet resistance preferably of less than about 5 ohms per square, more preferably less than about 3 ohms per square, and more preferably less than about 1 ohms per square.

Also, since the ITO transparent electronic conductor on the second glass surface at the rear of the front glass substrate is itself circumscribed by a Metallic Electrically Conducting Reflective Perimeter Hiding Layer (less than 5 ohms per square sheet resistance), this second surface ITO coating can be made thinner to further enhance near-IR transmission through the EC mirror reflective element. Impact on the likes of speed or uniformity of EC dimming can be addressed such as by adjusting the interpane spacing between front and rear substrates, adjusting the concentration of EC components of the EC medium, utilizing leakage current inhibitors and the like, as known in the EC arts.

Thus, the mirror assembly includes the DMS camera and the near-IR light emitter behind the reflective element and viewing/emitting through the mirror reflective element. During daylight or higher ambient lighting conditions, the near-IR floodlighting may not be necessary or required, since the driver region may be sufficiently illuminated via ambient light in the vehicle. However, at dusk through to dawn, when lighting conditions are lower, such near-IR illumination may be necessary or helpful. Also, during such lower lighting conditions, the degree of backlighting required by the video display screen (such as for full mirror display video mirrors or for video mirrors with smaller video display screens disposed behind and viewable through the mirror reflective element) is reduced (so that the intensity of the displayed video images is reduced at night). Thus, the heat load generated by the video display backlighting is lower at night.

For a video mirror having a full mirror display, the larger video display screen is disposed at and behind the entire reflecting area. With a backlit TFT display screen, the display screen is backlit by an array of light emitting diodes. For larger full mirror displays, the backlighting LEDs, when operating at higher intensity during daytime lighting conditions to display video images, generate heat. However, at lower light conditions (such as dusk to dawn conditions), the backlighting LEDs operate at a reduced intensity and thus generate less heat as compared to the daytime operation.

Thus, the near-IR LEDs for the DMS camera may be part of the backlighting array of LEDs, whereby, at night, the near-IR LEDs may be operated at higher intensity but will not generate as much heat as the entire backlighting array would generate during daytime video mirror operation. The backlighting array thus may be populated with some near-IR LEDs (such as a nested or group of near-IR LEDs, or a ring of near-IR LEDs or the like), which are powered at low ambient lighting conditions for use with the DMS camera and the driver monitoring system. The near-IR LEDs of the backlighting array of LEDs may be selectively addressed separately from the visible light-emitting LEDs of the backlighting array for backlighting the video display screen, and can be powered at a higher level at night since the visible light-emitting LEDs of the backlighting array are not powered at a higher level in such lower level lighting conditions.

The area available behind an interior mirror reflective where near-IR LEDs can be placed is large, such as 120 cm$^2$ to 150 cm$^2$ or thereabouts. And because a transflective mirror reflector renders their presence in the mirror head behind the mirror reflective element covert to the driver viewing the mirror reflective element when driving the equipped vehicle, a large number of near-IR LEDs (for example 10 or 20 or 50 or more) can be placed behind (and rendered covert by) the transflective reflector of the interior mirror reflective element. Thus, by using a large numerical quantity of near-IR diodes so placed behind and emitting radiation (when powered) through the interior mirror reflective element, adequate in-cabin floodlighting (to illuminate, for example the driver's eye) can be achieved even when near-IR transmission through the interior mirror reflective element is low (for example, greater than 10% T but less than 20% T; or greater than 20% T but less than 30% T; or greater than 30% T but less than 40% T; or greater than 40% T but less than 50% T). Also, not all of the plurality of near-IR LEDs need be powered at all times [each though typically operable by pulse width modulation (PWM) so that emitted near-IR intensity can be varied by PWM]. Some of the set of near-IR LEDs need not be powered at all times but are powered when appropriate/needed. For example, when the EC medium dims/darkens (thus reducing near-IR transmission through the EC interior mirror reflective element), near-IR LEDs that are unpowered when the EC medium is in its non-dimmed/bleached state become powered to compensate for near-IR transmission loss caused by the dimmed/darkened EC medium. Moreover, use of anamorphic lenses for the behind-the-mirror element camera (rather than spherical lenses which project a circular image onto the camera sensor) to project an oval-shaped image onto the camera sensor via optical elements that squeeze more horizontal information from the scene being image can help enhance S/N by funneling reflected visible light gathering/reflected near-IR gathering by the camera into a more restricted/smaller region of in-cabin interest (such as the region of interest where the driver's head/eyes are expected to be located).

Also, there is copious space within the cavity (formed and enveloped by the mirror housing/casing) behind the interior mirror reflective element (the interior mirror reflective element is typically is around 20 cm to 22 cm or thereabouts long and around 6 cm to 9 cm wide and has a surface area in the range of around 120 $cm^2$ to 198 $cm^2$ or thereabouts) to accommodate (i) multiple cameras and/or (ii) cameras with physically large light gathering/condensing/concentrating optics and/or (iii) cameras with physically large imaging arrays. And because such a camera(s) and such physically large cameras/camera optics are covert behind the transflective mirror reflective element in the interior (EC or prismatic) mirror assembly, the presence of such camera(s) and such physically large cameras/optics/imaging arrays is not objectionable from an automotive styling or driver/consumer acceptance viewpoint. For example, two separate 3 cm diameter lenses/optics could be accommodated within an interior mirror assembly, covert behind the transflective mirror reflector thereof. Use of multiple cameras (and especially ones with high dynamic range and high gain opportunity) and/or large optics and/or large imaging arrays can allow use for DMS of transflective interior mirror elements where the visible and near-IR transmission through the interior mirror element may be lowish (for example, the interior mirror element can have less than 15% T of visible light but greater than 5% T of visible light, with less than 50% T near-IR and greater than 15% T near-IR; or the interior mirror element can have less than 15% T of visible light but greater than 7% T of visible light, with less than 50% T near-IR and greater than 20% T near-IR; or the interior mirror element can have less than 15% T of visible light and greater than 10% T of visible light, with less than 50% T near-IR and greater than 30% T near-IR).

The system may determine the low lighting conditions based on image processing of image data captured by the DMS camera or by another camera of the vehicle (or optionally via an ambient light sensor at the vehicle), and may activate the near-IR emitter when the system determines that the ambient light level is below a threshold level. Optionally, the system may adjust the threshold levels at which the near-IR emitter is operated based on whether the vehicle's sunroof or moonroof is opened or whether the vehicle's convertible top is down, which may impact the amount of light in the cabin of the vehicle. Optionally, the system may determine the low lighting conditions responsive to a global positioning of the vehicle. For example, the global positioning system determines whether it is daytime or nighttime (and thus roughly determines the ambient light level) at the location of the vehicle based on the location and current time.

The interior rearview mirror thus has an embedded camera, IR illuminators and the processor for processing captured image data for the driver monitoring application. The DMS camera and IR illuminators are fixed within the mirror head, and thus both components are coupled with the mirror body. Hence, the camera's field of view is subject to change from driver to driver as the mirror head is adjusted to set the driver's preferred rearward view.

The processor may be disposed within the mirror head and processes the captured image data to detect and inform the driver of distractions or other valuable information. For example, the processor may determine driver attentiveness and/or driver gaze direction (via processing of image data captured by the driver monitoring camera) and may, responsive to determination of a hazard ahead of the vehicle (via processing of image data captured by a forward viewing camera) and at a region not being viewed by the driver at that time, the system may generate an alert to the driver to inform the driver of the potential hazard that requires his or her attention. The alert may comprise an audible alert or haptic alert or visual alert (such as a warning indicator or display of the detected hazard at a video display screen or heads up display of the vehicle).

The electro-optic (such as electrochromic (EC)) mirror reflective element sub-assembly transmits near infrared light and reflects visible light. Thus, the mirror reflective element effectively allows the IR LEDs to emit light through the reflective element and allows the camera to 'view' through the mirror reflective element, while allowing the mirror reflective element to serve its intended rear viewing purpose. The IR LEDs may be activated responsive at least in part to the ambient light level within the vehicle cabin and at the driver's head region, with the light level being determined by a light sensor or by processing of image data captured by the driver monitoring camera.

Having the fixed inward facing DMS camera in a pivotable rearview mirror head poses unique challenges pertaining to the camera's perspective. In order to account for changes in the camera's view when the mirror head is adjusted, the mirror's driver monitoring processor calculates the camera's location and angle within the vehicle based on the image data captured by the camera and processed by the processor. For example, the system may process image data captured by the camera to determine where particular features are located in the field of view of the camera (such as relative to a particular area of the field of view, such as a central region), and thus the driver monitoring system determines the position of the driver's head by the determined position or positions of particular fixed vehicle features, such as the rear windows, pillars, center console or the like, in the captured image data. The system may adjust processing of the image data captured by the camera to accommodate changes in location of the known or particular vehicle features. For example, if a nominal setting of the mirror has a particular feature a predetermined distance laterally and/or vertically from a center of the image data, if it is determined that the particular feature is shifted or offset to one side or the other from the predetermined distance location, the processor shifts or adjusts processing of captured image data to accommodate the lateral and/or vertical shift of the particular feature.

In the DMS, a high resolution camera (preferably a CMOS camera having an imaging sensor comprising at least one million pixels of photosensors arranged in multiple rows and columns, and preferably at least 3 megapixels of photosensors and more preferably at least 8 megapixels of photosensors) is used so that details of the driver's eyes (such as iris dilation, blinking rate, drowsiness and/or the like) can be tracked/detected. Image data captured by the camera(s) in the mirror head that views into the interior cabin through the interior mirror reflective element undertake complex and extensive image processing/data processing to extract from the captured image data the information desired by the DMS. Thus, data/image processing chips that are capable of processing billions or trillions of operations per second are used. For example, data/image processors capable of at least 0.1 TOPS (trillions of operations per second) are preferably used, more preferably at least 0.2 TOPS, and most preferably at least 0.5 TOPS.

Figure 56:
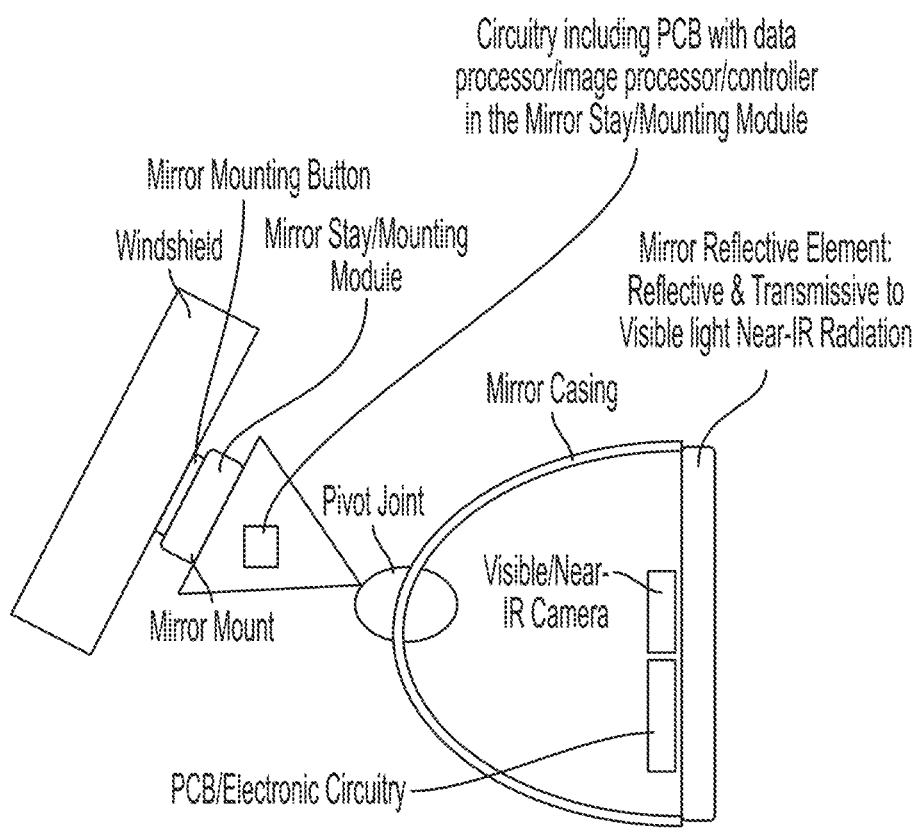
FIG. 56 is a view of another interior rearview mirror assembly, with the PCB and processor disposed in a mirror stay/mounting base at which the mirror head is pivotally attached.

The processing of DMS data at such high processing rates consumes power. For example, DMS processing can consume/dissipate at least 2 W of power, in some applications at least 5 W of power, and in other applications at least 10 W of power. Thus, and such as shown in FIG. 56, the PCB that includes circuitry and the data processor/image processor/controller used for the DMS is optionally not disposed within the mirror head, but rather may be disposed in a mirror stay/mirror mounting base of the interior rearview mirror assembly that the mirror head pivotally attaches to. Electrical/signal cabling can pass between (i) the mirror stay/mounting base located circuitry and (ii) the camera(s) and near-IR LEDs that are located within the mirror head by passing through the pivot joint that pivotally attaches the mirror head to the mirror stay/mounting base. By not mounting the data processor within the mirror head but instead mounting the processor at the mirror stay/mounting base, heat dissipation due to power consumption of the circuitry so disposed is enhanced.

For the DMS camera disposed behind and viewing through the mirror transflector of the mirror reflective element of the One-Box DMS Interior Rearview Mirror Assembly of the present invention, use of a backside Illumination (BSI) imaging sensor is preferred. As described in U.S. Pat. No. 7,741,666 (which is hereby incorporated herein by reference in its entirety), a backside illuminated imaging sensor comprises an imaging array that is fabricated on the front surface of a semiconductor Si wafer. The imaging array receives light through a back surface of the Si wafer. However, to detect visible light from the backside, the Si wafer must be extremely thin. Micro-lenses may be included on the back surface of the wafer in order to improve the sensitivity of the backside illuminated sensor to visible light. A DMS camera needs good visible light sensitivity (for the likes of in-cabin color video conferencing) but also needs high near-IR sensitivity (such as at 940 nm) in order to be able to detect eye/pupil details of a driver of an equipped vehicle (and/or to detect occupant presence at a second row rear seat region or a third row rear seat region of the equipped vehicle) based on relatively weak reflections back to the DMS camera located in the mirror head off near-IR illuminated body parts (such as eyes/head/hands of the driver) and off occupants or other objects present within the interior cabin of the vehicle that are distant from the location in the mirror head of the DMS camera. Thus, for a Vis/IR DMS camera suitable for use in a One-Box DMS Interior Rearview Mirror Assembly of the present invention, thickness of the Si semiconductor wafer used for the imaging sensor of the DMS camera is increased so that near-IR light can be more effectively collected by the Si wafer; a thicker Si layer being particularly important because near-IR penetrates deeper into silicon before being absorbed. For imaging in the near-IR (700 to 1000 nm) spectral region as compared to imaging in the visible spectral region (400-700 nm), a near-IR sensitive imaging sensor thus requires a thicker photon absorption region because infrared photons are absorbed deeper than visible photons in silicon. Increasing the epitaxial or epi layer thickness of the Si substrate used in the CMOS imaging sensor used in the DMS camera thus improves near-IR sensitivity. To mitigate degradation of the ability of the imaging sensor to resolve spatial features, the thicker Si layer can be coupled with higher pixel bias voltages and/or lower epi doping levels.

Quantum efficiency (QE) indicates the effectiveness of an imaging sensor's conversion of incident photons of light into electrons (for example, if a sensor had a QE of 100% and is exposed to 100 photons, it will produce 100 electrons of signal). For a complementary metal-oxide semiconductor (CMOS) imaging sensor (such as is used currently in vehicular cameras), sensitivity in the near-infrared spectrum is limited by the absorption length in the silicon layer where, in the imaging sensor, impinging light photons generate electrons. At around 940 nm in the near-IR spectral region, QE in such conventional imaging sensors typically is below 15% and for some, below 10%. Because infrared photons are absorbed deeper than visible photons in silicon, imaging sensors need to have a thicker photon absorption region in order to image efficiently in the near infrared (700 nm to 1,000 nm). For example, increasing the Si thickness of the epi-Si layer of the substrate used in a CMOS imaging sensor to 3.0 µm to 5.1 µm can increase QE by nearly 40% at the near-IR wavelength of 940 nm. Preferably, use of thicker epi-Si layer is accompanied by a higher pixel bias voltage and/or a lower epi-Si doping level. Use of an anti-reflecting layer and/or backside scattering technology can increase the QE of the image sensor to greater than 40% at 940 nm wavelength, which is around a 400% enhancement compared to a conventional CMOS imaging sensor.

CMOS imaging sensors with enhanced near-IR sensitivity are preferred for use in the One-Box DMS Interior Rearview Mirror Assemblies. For example, a near-IR optimized variant of a CMV4000 imaging sensor available from AMS AG of Premstaetten, Austria can be used. The CMV4000 imaging sensor is a high sensitivity, pipelined global shutter CMOS image sensor with 2048×2048 pixel resolution. Preferably, a color version of the CMV4000 imaging sensor is used with the color filters applied in a Bayer RGB pattern, and with the in-mirror camera utilizing the micro lenses to image incident light onto the CMV4000 imaging sensor. The near-IR optimized variant from the standard CMV4000 image sensor is processed on 12 µm epi Si wafers. The thicker epi-Si layer increases significantly the QE for wavelengths above 600 nm. Around 900 nm the QE is about doubled and increases from 8% to 16%. Compared to cameras using imaging sensors that are not optimized for near-IR detection, this represents a doubling of the sensitivity value at around 940 nm.

For example, an EV76C660 imaging sensor or an EV76C661 imaging sensor available from Teledyne e2v SAS of Saint-Egrève Cedex, France can be used in the One-Box DMS Interior Rearview Mirror Assemblies. The EV76C661 imaging sensor is a 1.3 million pixel (square pixels with micro-lens) CMOS image sensor with an electronic global shutter and operable to provide a high readout speed at 60 fps in full resolution. The EV76C660 and EV76C661 are members of Teledyne e2v's Ruby family of CMOS imaging sensors that provide enhanced sensitivity and performance beyond that typically available from a front side illuminated imaging sensor. Pixels are 5.3 µm×5.3 µm square with micro-lens. FIG. 111 shows the spectral response and quantum efficiency of the EV76C660 imaging sensor and of the EV76C661 imaging sensor. Quantum Efficiency in the near-infrared (NIR) spectrum is excellent (greater than 20% at 940 nm).

For example, an OX05B1S imaging sensor available from OMNIVISION of Santa Clara, CA USA can be used in the One-Box DMS Interior Rearview Mirror Assemblies. The OX05B1S imaging sensor uses OMNIVISION's NYXEL® near-infrared (NIR) technology. NYXEL® technology features QE improvements that increase sensitivity to the near-infrared spectrum, such improvements comprising utilization by the imaging sensor of thicker silicon to increases the chance of photon absorption; use by the imaging sensor of deep trench isolation to create a barrier between the pixels to eliminate crosstalk and improve modular transfer function; and use by the imaging sensor of a carefully managed optical scattering layer to prevent defects in the image's dark area and to lengthen the photon path. The OX05B1S is a 5 megapixel (MP) RGB-IR BSI global shutter imaging sensor and has a pixel size of 2.2 μm×2.2 μm, and includes integrated cybersecurity. The OX05B1S has a near-IR QE of 36%.

A CMOS imaging sensor for use in the One-Box DMS Interior Rearview Mirror Assemblies preferably has a near-IR QE at around 940 nm of at least 15%; more preferably is at least 22%; and most preferably is at least about 32%. Thickness of the epi-silicon layer of a CMOS imaging sensor for use in the One-Box DMS Interior Rearview Mirror Assemblies preferably is at least about 3.5 μm; more preferably is at least about 4.5 μm; and most preferably is at least about 5.5 μm.

Preferably, accommodation/packaging of the circuitry within the interior rearview mirror assembly other than within the mirror head is executed in a fashion where there is minimum intrusion of the mirror stay/mounting base into the forward line of sight of the driver through the vehicle windshield. The mirror stay/mounting base and mounting of or accommodating the PCB therein may utilize aspects of the modules described in U.S. Pat. Nos. 9,487,159; 8,256,821; 7,480,149; 6,824,281 and/or 6,690,268, which are hereby incorporated herein by reference in their entireties.

Thus, the system may include a DMS PCB, the IR LEDs and the DMS camera disposed inside the mirror head of the mirror assembly. The DMS PCB receives vehicle inputs from the vehicle (such as via the Local Interconnect Network (LIN) bus of the vehicle and/or the Controller Area Network (CAN) bus of the vehicle). The DMS PCB may also receive an input from an outward or forward viewing camera. The DMS PCB may also provide control signals to the cameras and the IR LEDs to activate and deactivate and to control operation of the cameras and LEDs.

The driver monitoring system, including the cameras and processor, may utilize aspects of the systems described in U.S. Pat. Nos. 10,065,574; 10,017,114; 9,405,120 and/or 7,914,187, and/or U.S. Publication Nos. US-2021-0323473; US-2021-0291739; US-2020-0202151; US-2020-0143560; US-2020-0320320; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/450,721, filed Oct. 13, 2021, now U.S. Pat. No. 11,518,401, which are all hereby incorporated herein by reference in their entireties.

Optionally, the mirror assembly may include a memory actuator that positions the mirror head at a preselected orientation responsive to determination of a particular driver of the vehicle (or responsive to a user input, such as similar to a memory seat setting and feature). When combining a memory actuator and DMS in the interior rearview mirror assembly, image processing by an image processor of circuitry of a controller disposed in the mirror head behind the mirror reflective element using machine vision object detection techniques and algorithms may physically calibrate or optimize the mirror head position (and thus the mirror reflection that the driver would see at the mirror reflective element) relative to the driver's specific eye points. By doing this, the driver monitoring camera's field of view would also be optimized by such positioning of the driver's face/head in a common zone within the camera's imager. The camera would be fixed to the mirror head (thus when the mirror angle is adjusted, so is the camera), and the processing at the image processor using object detection techniques and algorithms would detect the position of the driver's face in the image data captured by the camera and then, based on that position information, the controller or ECU could drive the memory actuator to a new position with feedback from the memory system in the actuator.

The mirror system uses image processing of image data captured by the DMS camera in the mirror head to recognize signs of distraction and/or fatigue by determining/tracking the driver's head position and eye position (e.g., pitch, roll and/or yaw of the driver's head or eyes), and may determine presence of other objects, such as a cell phone or water bottle or coffee cup or food or the like in the driver's hand. The mirror system may also use image processing of the image data captured by the DMS camera for driver identification, such as to identify the driver for associating that driver with respective memory features, such as exterior mirror memory settings and/or interior mirror memory settings. The inward facing DMS camera may locate the driver's head position and adjust the mirror head (and/or mirror reflective element) accordingly. The system may recognize the driver upon entry of the vehicle by the driver and may move the camera and mirror head to the previously recorded or stored position (which may be initially set by the driver when he or she first drives the vehicle).

The system may utilize any suitable face or eye tracking software or system, such as, for example, Face TrackNoIR or the like, which may utilize a standard camera without associated lighting. The inside mirror head includes the inward camera, the memory actuator and a driver for the EC and infrared LED, which controls or drives the EC cell and the infrared LED. The DMS PCB may be disposed outside of the mirror head (such as at the vehicle console or the like) and includes the circuitry and associated software for processing the image data captured by the camera and controlling the memory actuator accordingly. The DMS PCB may also operate responsive at least in part to vehicle data provided via a CAN bus of the vehicle.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application.

The CMS cameras and system may utilize aspects of the systems described in U.S. Pat. No. 11,242,008, U.S. Publication Nos. US-2021-0162926; US-2021-0155167; US-2018-0134217 and/or US-2014-0285666, and/or PCT Application No. PCT/US2022/070062, filed Jan. 6, 2022, which are all hereby incorporated herein by reference in their entireties. The connections between the cameras and the controller or PCB(s) and/or between the displays and the controllers or PCBs may be made via respective coaxial cables, which may provide power and control of the cameras (by the controller) and which may provide image data from the cameras to the controller, and which may provide video images from the controller to the display devices. The connections and communications may utilize aspects of the systems described in U.S. Pat. Nos. 10,264,219; 9,900,490 and/or 9,609,757, which are hereby incorporated herein by reference in their entireties.

The mirror reflective element comprises a variable reflectance electro-optic mirror reflective element, such as an electrochromic mirror reflective element or a liquid crystal mirror reflective element. For example, the mirror reflective element may comprise a laminate construction variable reflectance electro-optic (such as electrochromic) reflective element assembly having a front glass substrate and a rear glass substrate with an electro-optic medium (such as electrochromic medium) sandwiched therebetween and bounded by a perimeter seal. The front substrate has a front or first surface (the surface that generally faces the driver of a vehicle when the mirror assembly is normally mounted at the vehicle) and a rear or second surface opposite the front surface, and the rear substrate has a front or third surface and a rear or fourth surface opposite the front surface, with the electro-optic medium disposed between the second surface and the third surface and bounded by the perimeter seal of the reflective element (such as is known in the electrochromic mirror art). The second surface has a transparent conductive coating established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface has a metallic transflector coating (or multiple layers or coatings) established thereat. The front or third surface of the rear substrate may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7, 184, 190 and/or 7,255,451, which are hereby incorporated herein by reference in their entireties. The mirror transflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element).

The third surface defines the active EC area or surface of the rear substrate within the perimeter seal. The coated third surface may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190; 7,255,451; 8,508,831 and/or 8,730,553, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. No. 7,184,190 and/or 7,255,451, which are hereby incorporated herein by reference in their entireties). Optionally, other opaque or substantially opaque coatings or bands may be implemented.

The reflective element and mirror casing are adjustable relative to a base portion or mounting assembly to adjust the driver's rearward view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 6,877,709; 6,329,925; 7,289,037; 7,249,860 and/or 6,483,438, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

Optionally, the mirror casing may include a bezel portion that circumscribes a perimeter region of the front surface of the reflective element, or the perimeter region of the front surface of the reflective element may be exposed (such as by utilizing aspects of the mirror reflective elements described in U.S. Pat. Nos. 8,508,831 and/or 8,730,553, and/or U.S. Publication Nos. US-2014-0022390; US-2014-0293169 and/or US-2015-0097955, which are hereby incorporated herein by reference in their entireties).

Optionally, the mirror assembly may comprise a prismatic reflective element. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 7,420,756; 7,338,177; 7,289,037; 7,274,501; 7,255,451; 7,249,860; 6,318,870; 6,598,980; 5,327,288; 4,948,242; 4,826,289; 4,436,371 and/or 4,435,042, and/or U.S. Publication No. US-2010-0085653, which are hereby incorporated herein by reference in their entireties.

The mirror constructions and DMS embodiments described herein may utilize constructions and coating disclosed in U.S. Pat. No. 7,274,501, filed as U.S. patent application Ser. No. 10/528,269, filed on Sep. 19, 2003 by McCabe et al. and titled "Mirror Reflective Element Assembly" (which is all hereby incorporated herein by reference in its entirety). For example, a mirror reflective element, such as a third surface reflective element or mirror element or a fourth surface reflective element or a prismatic reflective element or the like, which is sufficiently and spectrally selectively transmissive or spectrally tuned to allow a particular spectral range or band of light to pass therethrough from a display at the rear surface of the mirror reflective element. The layers of the reflective element are selected or spectrally tuned to match one or more predetermined or selected spectral bands or ranges of wavelengths and to thus pass the predetermined spectral bands of light therethrough, while being substantially reflective to other spectral bands or wavelengths of light, and do not require windows or apertures formed in the reflective metallic layer of the reflective element. For example, a transflective electrochromic element or cell can be constructed to include a front substrate and a rear substrate, and a near-IR illumination source/floodlight and an imaging device at a rear or fourth surface of the rear substrate. A semi-conductive layer or coating (such as ITO, tin oxide or the like) is deposited on the forward or third surface of the rear substrate while a semi-conductive layer (such as ITO, tin oxide or the like) is deposited on the rear or second surface of the front substrate. An electrochromic medium and seal are provided or sandwiched between the semi-conductive layers, with an electrical connector positioned at least partially along at least one edge of each of the semi-conductive layers. The transflective cell further includes an infrared or near infrared transmitting (IRT) stack or layers, which is positioned or stacked on the rear surface of the rear substrate. A protective cover or glass sheet is adhered or secured to the rear surface of the IRT stack, such as via an optical matching adhesive layer, which preferably is an index matching adhesive that matches the index of the protective cover or sheet. The protective cover may comprise glass, or may comprise other transparent or substantially clear materials, such as plastic, polycarbonate, acrylic or the like. The IRT stack comprises multiple layers of dielectric layers or coatings (such as at least five layers or at least seven layers) across the rear surface of the rear substrate which function as a cold mirror stack that allows near infrared and infrared light or radiant energy to pass therethrough while substantially reflecting visible light. The IRT stack may comprise layers of titanium oxide alternating with silicon oxide layers. The titanium oxide layers provide a higher refractive index (2.385) while the silicon oxide layers provide a lower refractive index (1.455). The alternating combination of the lower and higher refracting indices of alternating layers provides enhanced near infrared transmissivity, while providing reflectivity of visible light.

In an exemplary embodiment, the IRT stack comprises nineteen such alternating layers having: a first titanium oxide layer approximately 72 nm thick on the rear surface of the rear substrate, a first silicon oxide layer approximately 32 nm thick on the first titanium oxide layer, a second titanium oxide layer approximately 94 nm thick on the first silicon oxide layer, a second silicon oxide layer approximately 110 nm thick on the second titanium oxide layer, a third titanium oxide layer approximately 64 nm thick on the second silicon oxide layer, a third silicon oxide layer approximately 85 nm thick on the third titanium oxide layer, a fourth titanium oxide layer approximately 62 nm thick on the third silicon oxide layer, a fourth silicon oxide layer approximately 128 nm thick on the fourth titanium oxide layer, a fifth titanium oxide layer approximately 60 nm thick on the fourth silicon oxide layer, a fifth silicon oxide layer approximately 98 nm thick on the fifth titanium oxide layer, a sixth titanium oxide layer approximately 57 nm thick on the fifth silicon oxide layer, a sixth silicon oxide layer approximately 94 nm thick on the sixth titanium oxide layer, a seventh titanium oxide layer approximately 54 nm thick on the sixth silicon oxide layer, a seventh silicon oxide layer approximately 77 nm thick on the seventh titanium oxide layer, an eighth titanium oxide layer approximately 36 nm thick on the seventh silicon oxide layer, an eighth silicon oxide layer approximately 83 nm thick on the eighth titanium oxide layer, a ninth titanium oxide layer approximately 58 nm thick on the eighth silicon oxide layer, a ninth silicon oxide layer approximately 97 nm thick on the ninth titanium oxide layer, and a tenth titanium oxide layer approximately 28 nm thick on the ninth silicon oxide layer. Clearly, other thicknesses and combinations of layers may be implemented to achieve the desired levels of transmissivity and reflectivity. The transflective element thus provides a fourth surface transflective mirror element, with multiple alternating layers of silicon oxide and titanium oxide to enhance the near infrared transmissivity through the ITO layers and substrates.

The titanium oxide layers provide a higher refractive index while the silicon oxides provide a lower refractive index. The combination of the lower and higher refractive indices of the alternating layers provides enhanced near infrared transmissivity, while providing high photopic reflectivity of most of the visible light, except the visible light in the desired spectral region or having the desired or selected or targeted wavelength. The transflective element thus may be used with a near infrared light emitting source, which may be used in conjunction with an imaging source or camera, and a display on demand element that may emit light at the desired or selected wavelength or color (such as, for example, blue light having a wavelength of 430 nm) so that it is viewable through the reflective element by a driver or occupant of the vehicle. IRT stacks of other dielectric material (such as alternating stacks of higher refractive niobium oxide and lower refractive oxide silicon dioxide) can be used.

The IRT stacks preferably provide NIR transmittance greater or equal to 15% T, more preferably greater than 20% T and most preferably greater than 25% T, and provide a specular, color-neutral (preferably silvery) reflectance level (as seen/available to a driver using and viewing an interior mirror reflective element in an equipped vehicle) greater or equal to 50% R, more preferably greater than 60% R and most preferably greater than 70% R, and preferably such IRT stacks are environmentally resilient/resistant to degradation due to heat/cold/weathering and the like when used in an interior mirror reflective element.

Optionally, near-IR transmittance through the transflective mirror reflector (that preferably comprises a multi-layer stack of dielectric coatings) may exceed the photopic visible light transmission through the transflective mirror reflector. Preferably, the higher or elevated near-IR transmittance is between wavelengths of 800 nm and 1,000 nm, more preferably between wavelengths of 820 nm and 980 nm, and more preferably between wavelengths of 920 nm and 960 nm.

The visible light blocking/near-IR light transmitting spectral filtering may take several forms. For example, one spectral filtering form can be no photopic visible light transmission (such as, for example, below 10% T of photopic visible light, preferably below 5% T of photopic visible light, more preferably below 2% T of photopic visible light), with at least 35 percent transmission of light having wavelength of greater than about 900 nm, more preferably at least 45 percent transmission of light having wavelength of greater than about 900 nm, and more preferably at least 55 percent transmission of light having wavelength of greater than about 900 nm. Moreover, the high near-IR region of the spectral filtering may be notch-like/banded so that infrared transmission is attenuated above around 1,000 nm using the principals described in U.S. Pat. No. 7,274,501, incorporated above.

Figure 57:
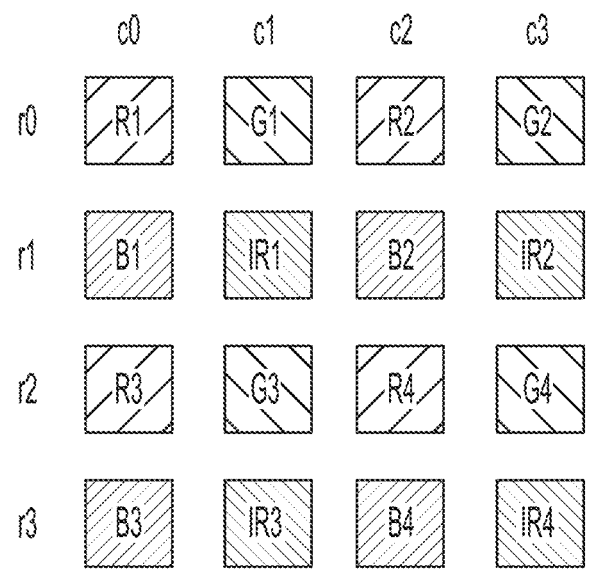

Optionally, spectral filtering may be used and overlaid over individual pixels making up the multi-pixel imaging array of the DMS camera, such that the pixels are spectrally filtered such that visible light incident at the interior review mirror assembly mounted at a windshield of an equipped vehicle is attenuated or blocked (so as to reduce saturation of the imaging array during a sunny day/in a convertible/with a sunroof open due to high ambient lighting/solar insolation present in the interior cabin). The spectral filter used has high near-IR transmission to allow near-IR light emitted by a bank/banks of near-IR LEDs behind the mirror transflector to exit the interior mirror reflective element, to be incident at a driver's head in DMS and to be reflected back to the interior mirror reflective element and again pass through the near-IR transmitting spectral element and arrive at the IR sensing pixels of the imager of the DMS camera. Alternatively, spectral filtering used for the imaging sensor array may be constructed such as described in U.S. Pat. No. 8,446,470 (which is hereby incorporated herein by reference in its entirety), where color (R, G, B) filters and IR filters are disposed at the pixels of the photosensing imaging array so that some of the photosensors or pixels are sensitive to visible light and others of the photosensors or pixels are sensitive to near infrared light (see FIG. 57). Using such a construction utilizing interspersed RGB color-sensitive pixels and near-IR mainly sensitive pixels, the mirror-mounted DMS camera captures full color video of what it views in the interior cabin of the vehicle, whereas the near-IR pixels of the DMS camera are principally responsive to near-IR light (which may be provided by the near-IR light emitter(s) when the lighting level drops below a threshold level, such as at dusk and nighttime) without being saturated by visible light. If display for viewing by the driver on a video screen located in the interior cabin of the equipped vehicle of video images captured by the in-mirror camera is not required, then the pixels of the imaging array can be spectrally filtered such that visible light is blocked (or at least blocked to be incident at the pixels below a low threshold level such as below 5% of incident visible light) whereas near-IR radiation is passed (or at least passed to arrive at the pixels above a high threshold such as above 80% of incident near-IR radiation). In this regard, step spectral filtering can be used where percentage of transmission in the visible region of the electromagnetic spectrum is low (such as, for example, less than 5%) and where transmission rises to when at the beginning of (or after the beginning) the near-IR region to a high percent transmission level (such as, for example, greater than 80%). For near-IR LEDs emitting at, for example, 940 nm, the percent transmission of the spectral filtering at or about 940 nm should be high in order to enhance performance of the DMS.

Figure 58:
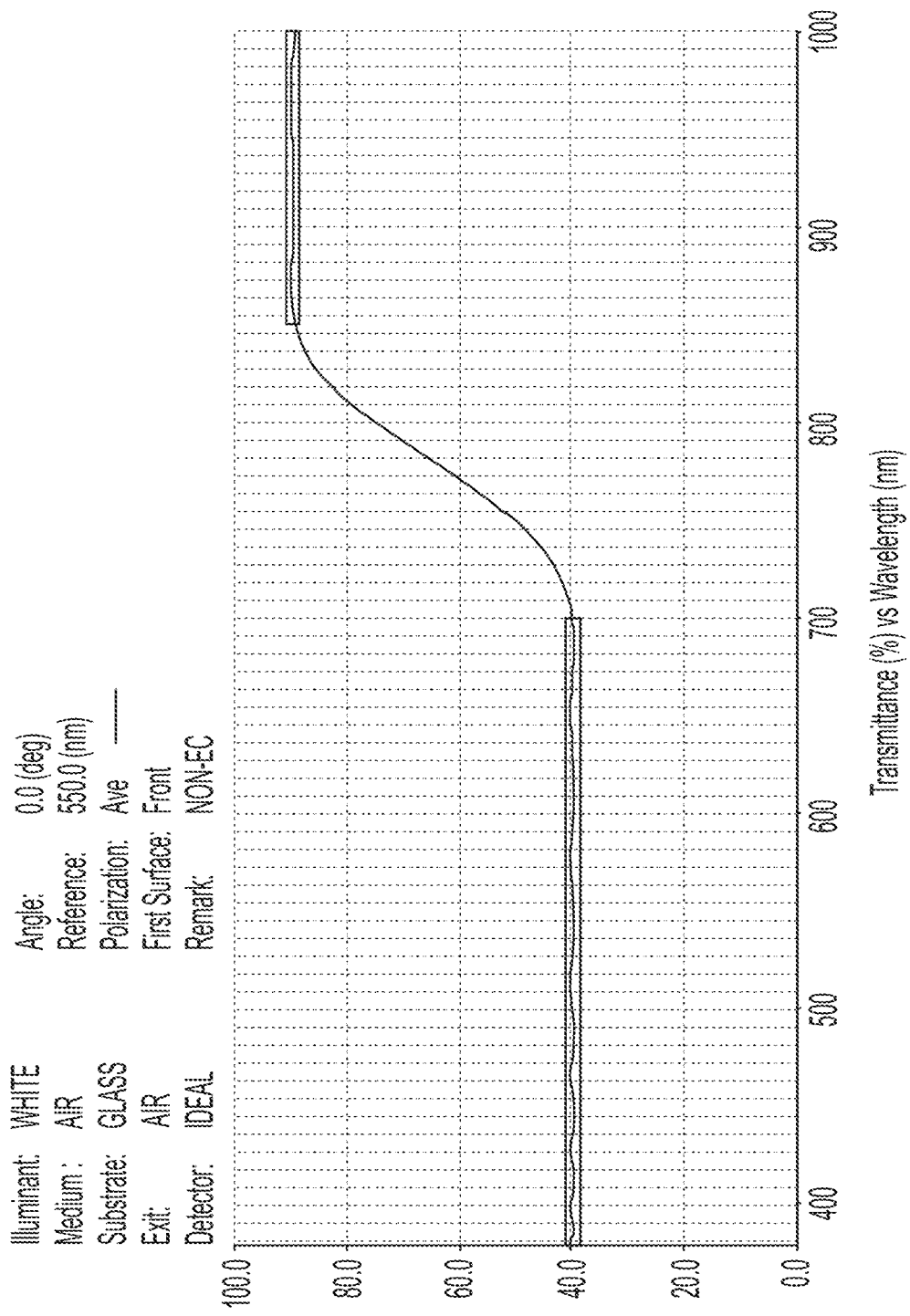
FIGS. 58 and 59 are diagrams showing an example of the alternating layers of the near-IR transmitting, visible light reflecting/transmitting mirror transflector, and showing the transmittance vs. wavelength properties of the near-IR transmitting, visible light reflecting/transmitting coatings.
Figure 59:
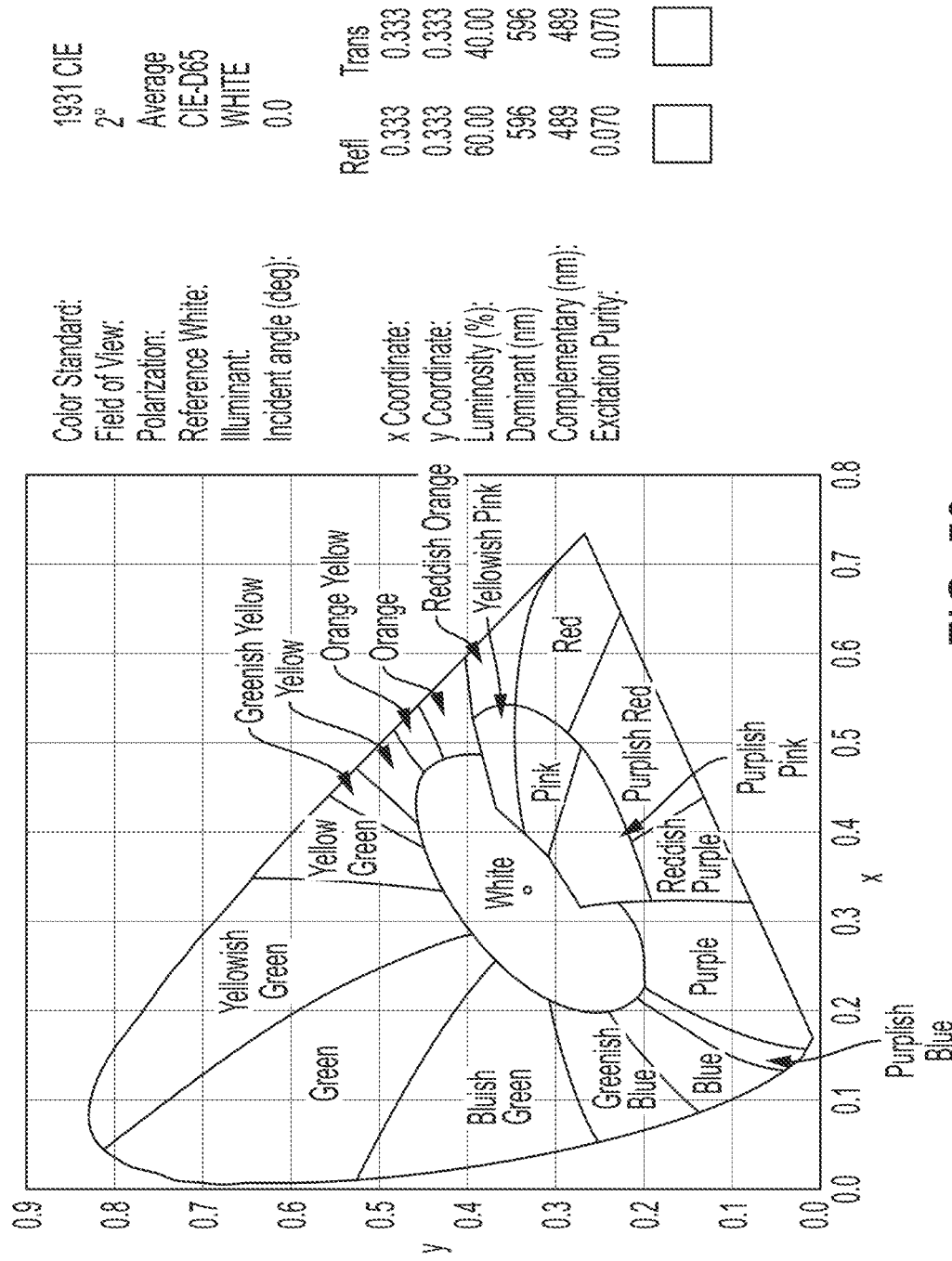

In another exemplary embodiment, a second surface (non-electrochromic) transflective mirror may be about 90% T at 940 nm. The stack uses alternating $Nb_2O_5$ and $SiO_2$ layers. The IRT stack (see FIGS. 58 and 59) comprises alternating layers having: a niobium layer ($Nb_2O_5$) approximately 13 nm thick on the rear or second surface of the glass substrate, then a silicon oxide layer approximately 36 nm thick on the niobium layer, then another niobium layer approximately 44 nm thick on the silicon oxide layer, then another silicon oxide layer approximately 22 nm thick on the niobium layer, then another niobium layer approximately 41 nm thick, then another silicon oxide layer approximately 29 nm thick, then another niobium layer approximately 131 nm thick, then another silicon oxide layer approximately 31 nm thick, then another niobium layer approximately 49 nm thick, then another silicon oxide layer approximately 23 nm thick, then another niobium layer approximately 29 nm thick, then another silicon oxide layer approximately 106 nm thick, then another niobium layer approximately 91 nm thick, then another silicon oxide layer approximately 100 nm thick, then another niobium layer approximately 28 nm thick, then another niobium layer approximately 27 nm thick, then another silicon oxide layer approximately 84 nm thick, then another niobium layer approximately 33 nm thick, and then another silicon oxide layer approximately 179 nm thick. Clearly, other thicknesses and combinations of layers may be implemented to achieve the desired levels of transmissivity and reflectivity. The transflective element thus provides a second surface transflective mirror reflective element, with multiple alternating layers of silicon oxide and niobium ($Nb_2O_5$) to enhance the near infrared transmissivity through the silicon oxide and niobium layers and the glass substrate.

Figure 60:
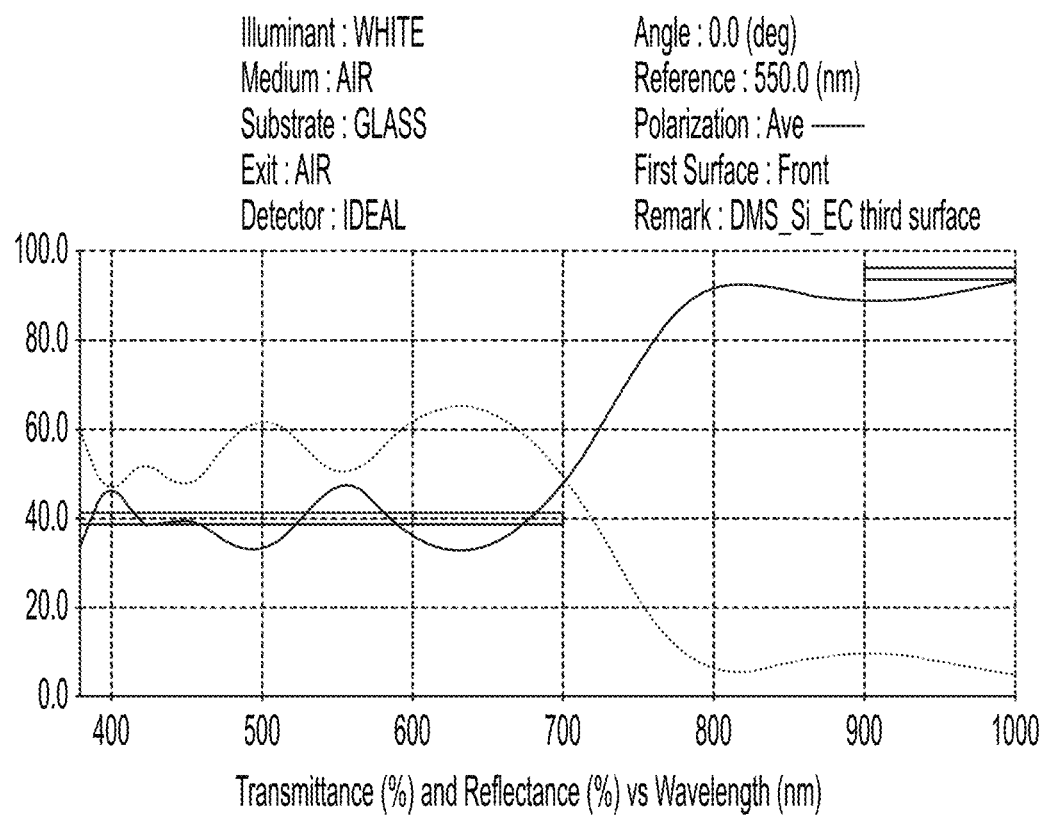
FIGS. 60 and 61 are diagrams showing an example of the alternating layers of the near-IR transmitting, visible light reflecting mirror transflector, and showing the transmittance vs. wavelength properties of the near-IR transmitting, visible light reflecting coating.
Figure 61:
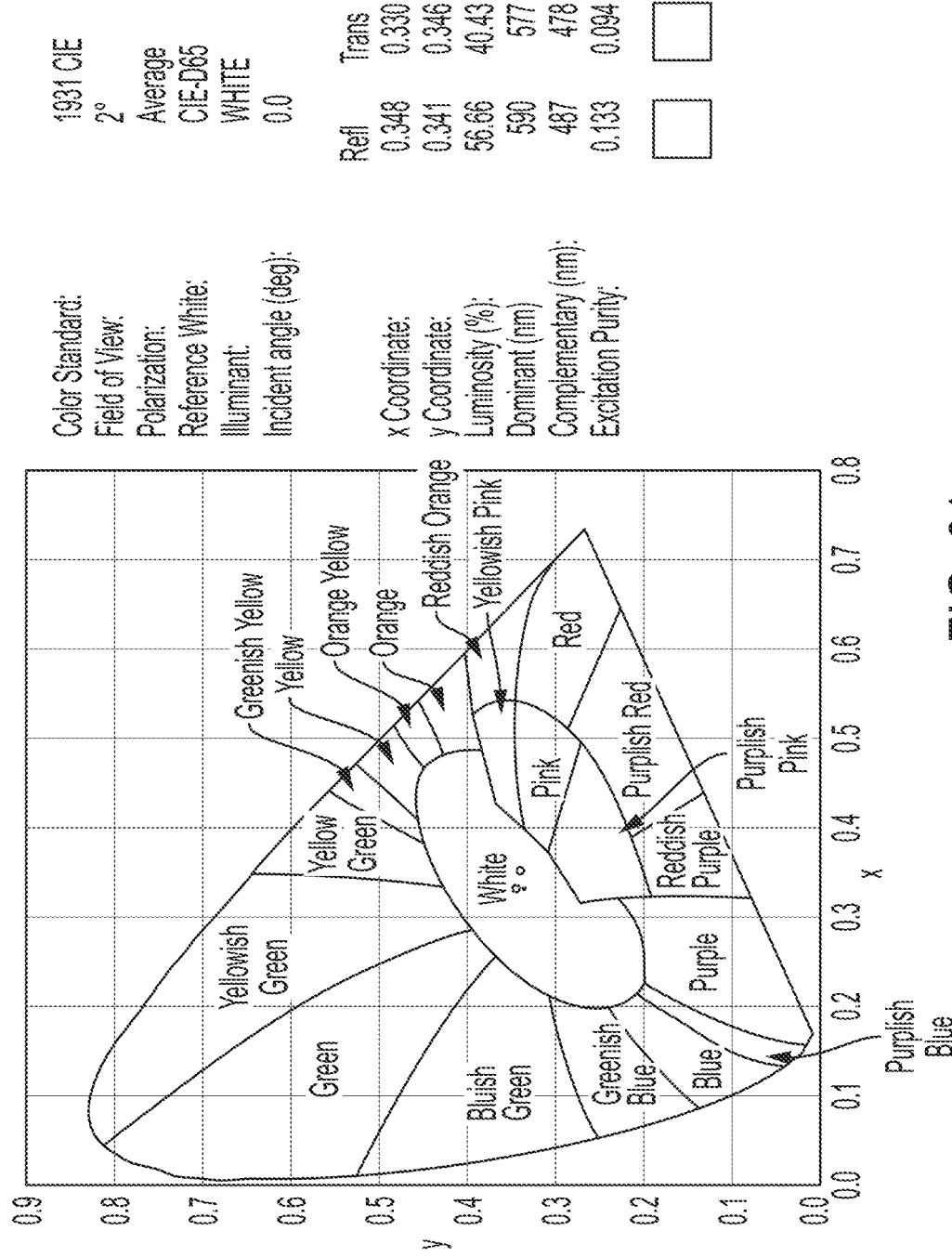

Optionally, a mirror substrate may be coated with an elemental silicon (silicon metal) layer. For example, and with reference to FIGS. 60 and 61, a third surface conductive transflector of an electrochromic (EC) driver monitoring system (DMS) mirror has a high light transmissivity T % (about 90%) at 940 nm and reflectivity of about 40% R in the visible region (in FIG. 60, the darker curve is the T % curve). In addition, the visual appearance is neutral. The stack of coatings disposed on a glass substrate (e.g., a 1.6 mm thick glass substrate) include a titanium oxide ($TiO_2$) layer approximately 164 nm thick, then a silicon oxide ($SiO_2$) layer approximately 20 nm thick, then a titanium oxide layer approximately 43 nm thick, then a silicon oxide layer approximately 128 nm thick, then a silicon metal (Si) layer approximately 20 nm thick, then a silicon oxide layer approximately 63 nm thick, and then an ITO layer approximately 120 nm thick.

Thus, the reflective element incorporates a single semi-metal layer of Silicon (Si) at layer 5 of the 7 layer stack and has a high T % (about 90%) at 940 nm and about 40% R in the visible region. The advantage of this design is that is significantly reduces the number of layers and total stack thickness. This makes the DMS stack easier and less expensive to manufacture. The overall thickness is less than 600 nm.

Advantages to utilizing an elemental silicon layer (a silicon metal layer) in the stack of coatings include the particular optical properties provided by the elemental silicon layer and the superior rate of sputtering elemental silicon (preferably via sputtering from a cylindrically formed elemental silicon target in a rotary sputtering target, preferably via DC magnetron sputtering) compared to rate of sputtering from a silicon oxide target or rate of sputtering of reactive sputtering in oxygen atmosphere to form a silicon oxide/silicon dioxide layer or coating. Alternately, and less preferably, a layer of elemental germanium (Ge) or germanium metal (Ge metal) may be used in the stack instead of the silicon metal layer.

A full display mirror (FDM), such as FDM™ mirror assemblies commercially available from Gentex Corporation and CLEARVIEW™ mirror assemblies commercially available from Magna Mirrors of America, Inc., has a video display screen [such as a backlit thin film transistor (TFT) liquid crystal (LC) display screen or an organic light emitting diode (OLED) video screen] that is disposed behind a transflective mirror reflector, with the video screen spanning the full driver-visible electrochromic-dimming area of the interior EC mirror reflective element. Such an FDM is operable in two modes (changeable from one mode to the other by the driver operating a toggle or via likes of a touch input actuating a motor that changes the mode). In one mode, the driver views rearward of the vehicle via reflection off the transflective mirror reflector, and the video display screen is not displaying any video images and is covert behind the transflective mirror reflector. In the other mode, the driver does not view rearward of the vehicle via reflection off the transflective mirror reflector, and the video display screen displays video images (typically captured by a rearward-viewing video camera mounted at the rear of the equipped vehicle) visible to the driver who is driving the equipped vehicle. In an FDM utilizing a backlit TFT LCD video screen, the cabin-monitoring camera and the cabin-illuminating near-IR LEDs in the mirror head that are disposed rearward of the interior EC mirror reflective element are located rearward of the video display screen, and the camera must view through the video display screen and the near-IR LEDs must emit through the video display screen, whether or not the video screen is displaying video images. To so achieve, high-power near-IR LEDs can be used (with suitable heat sinking/cooling provided if required, including use of forced ventilation such a via a fan). For example, high-power near-IR LEDs are available from Opto Diode Corporation of Camarillo, CA that produce up to 250 mW DC from a single chip; up to 1000 mW DC from arrays (https://www.osapublishing.org/ao/viewmedia.cfm?uri=ao-36-25-6339&seq=0). High-power near-IR LEDs are also available from Luminus, Inc. of Sunnyvale, CA that supplies Single and Dual Junction LEDs with high power density and uniform emission, offered in multiple wavelengths from 730 nm to 940 nm and in multiple viewing angles from 40 degrees to 130 degrees (lens type), with driven current density operation (up to 5 $A/mm^2$), available in multiple package configurations (3.45 mm×3.45 mm SMT or large copper-core board packages), available in Surface-Mount-Technology packages for cost-effective, compact high power near-IR LEDs, utilizing an Integrated Chip-On-Board design for ease of system integration and optimum cooling in an ultra-high radiant intensity (mW/sr) package providing a focused, long throw beam of near-IR illumination (https://www.luminus.com/products/ir). One or a plurality of such compact high power near-IR LEDs (that are SMD-mountable) can be included in the backlighting provided for a backlit TFT LCD video screen used in an FDM. Also, and at where the lens optics of the camera in the mirror head is to view through the mirror reflective element, LCD pixels at where the lens optics of the camera are to peer through the TFT LCD screen can remain unswitched in the FDM mode when the rest of the pixels of the video screen are displaying video images, and with backlighting at where the lens optics of the camera peers through the TFT LCD screen being provided by near-IR LEDs.

The camera mounted in the interior rearview mirror and the accompanying near-IR floodlighting can view/near-IR floodlight within the interior cabin of the vehicle and can be used, for example, to determine presence of the likes of a child unintentionally left behind in a parked vehicle that otherwise might be a hazard due to heat or cold or other hazardous factors. The interior cabin monitoring provided by the DMS of the vehicle can be augmented or supplemented by other sensors mounted at the interior rearview mirror assembly or elsewhere in the vehicle cabin, such as at a roof portion or a roof console portion or a seat or an interior sidewall portion of the vehicle. Such supplemental occupant sensing sensors may comprise any one of an ultrasonic sensor(s), a lidar sensor(s), a passive infrared detection (PID) sensor(s), or any combination thereof. Thus, the system can utilize and improve interior occupant detection safety systems such as the types described in U.S. Pat. Nos. 7,097,226; 6,783,167; 6,768,420; 6,621,411; 6,485,081 and/or 6,480,103, which are hereby incorporated herein by reference in their entireties. For example, and preferably, either alone or supplemented by any other occupant sensor, the systems can detect presence of, for example, a child or baby sleeping under a blanket, or crouching on the floor in the gap between the front and rear seats, or present in an open region rearward of the rear seats. Moreover, an occupant detection system may utilize the likes of a heart-beat sensor (such as by utilizing aspects of the systems described in U.S. Pat. No. 8,258,932, which is hereby incorporated herein by reference in its entirety) or similar biometric sensing.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or U.S. Publication Nos. US-2014-0022390 and/or US-2014-0293169, which are hereby incorporated herein by reference in their entireties, or such as proximity sensors of the types described in U.S. Pat. Nos. 7,224,324; 7,249,860 and/or 7,446,924, and/or U.S. Publication No. US-2006-0050018, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like.

Optionally, the user inputs or buttons may comprise user inputs for a garage door opening system, such as a vehicle based garage door opening system of the types described in U.S. Pat. Nos. 6,396,408; 6,362,771; 7,023,322 and/or 5,798,688, which are hereby incorporated herein by reference in their entireties. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255, 442; 5,632,092; 5,798,688; 5,971,552; 5,924,212; 6,243, 003; 6,278,377; 6,420,975; 6,477,464; 6,946,978; 7,308, 341; 7,167,796; 7,004,593; 7,657,052 and/or 6,678,614, and/or U.S. Pat. Pub. No. US-2006-0050018, which are all hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,734,392; 7,370,983; 7,338,177; 7,274,501; 7,255,451; 7,195,381; 7,184,190; 7,046,448; 6,902,284; 6,690,268; 6,428,172; 6,420,975; 6,329,925; 5,724,187; 5,668,663; 5,530,240; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

The video camera or sensor may utilize aspects of various cameras or sensors, such as a CMOS imaging array sensor, a CCD sensor or the like, and the system may utilize image processors or image processing techniques, such as utilizing aspects of the cameras and image processors described U.S. Pat. Nos. 5,550,677; 5,670,935; 5,760,962; 6,690,268; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606; 7,720,580; 8,446,470; 8,451,107 and/or 9,126,525, and/or U.S. Pat. Pub. Nos. US-2006-0171704; US-2009-0244361 and/or US-2010-0214791, which are all hereby incorporated herein by reference in their entireties. The imaging sensor or camera may be activated, and the display screen may be activated in response to the vehicle shifting into reverse, such that the display screen is viewable by the driver and is displaying an image of the rearward scene while the driver is reversing the vehicle. It is envisioned that the image processor or controller comprises the likes of an EYEQ™ image processing chip available from Mobileye Vision Technologies Ltd. of Jerusalem, Israel, and processes image data captured by the forward viewing camera and the driver monitoring camera (and optionally surround view cameras and/or CMS cameras of the vehicle).

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526, 103, which are all hereby incorporated herein by reference in their entireties, a rain sensor, such as the types disclosed in commonly assigned U.S. Pat. Nos. 6,353,392; 6,313,454; 6,320, 176 and/or 7,480,149, which are hereby incorporated herein by reference in their entireties, a vehicle vision system, such as a forward, sideward or rearward directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268; 7,370,983; 7,937,667 and/or 9,800,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Optionally, the accessory or accessories, such as those described above, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY™ Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links.

Figure 103A:
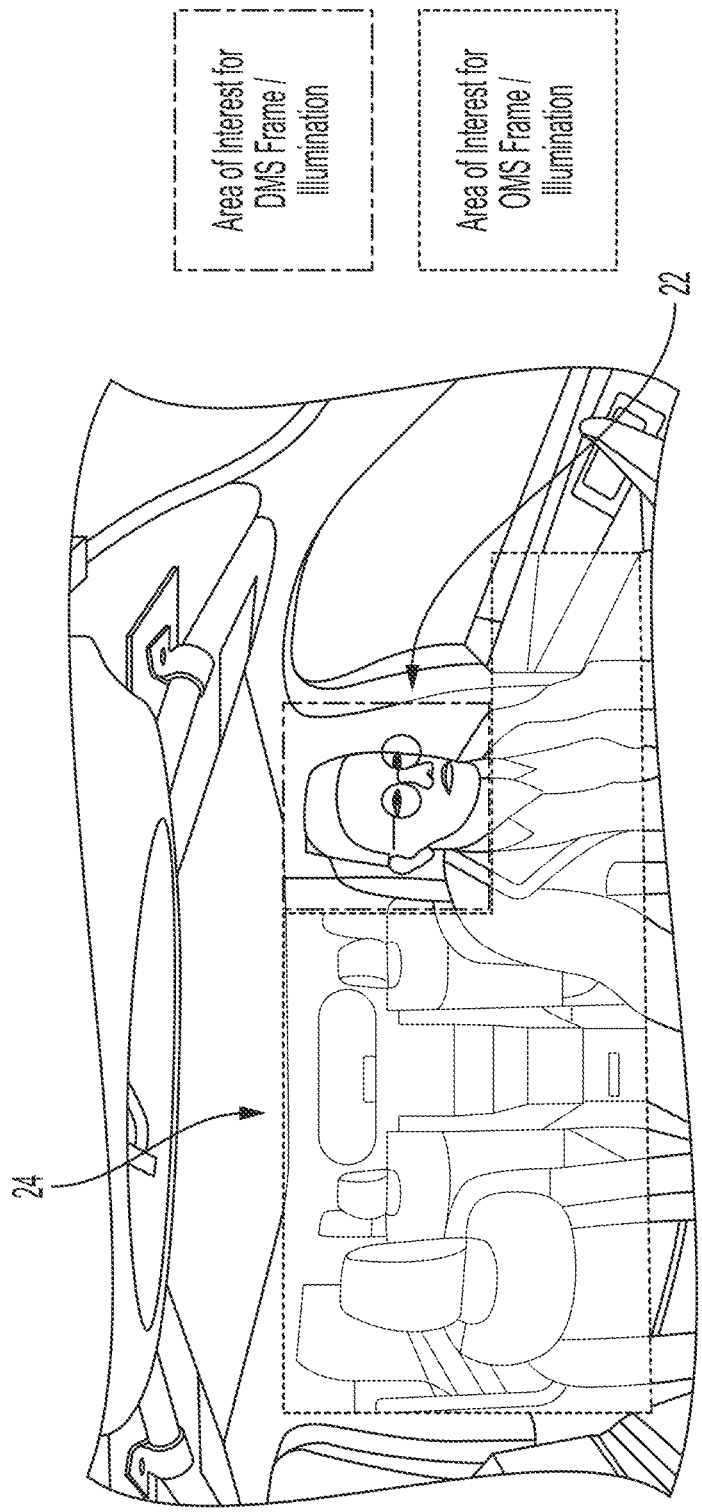
FIGS. 103A and 103B are perspective views of a field of view of an interior camera segmented into different areas of interest.
Figure 103B:
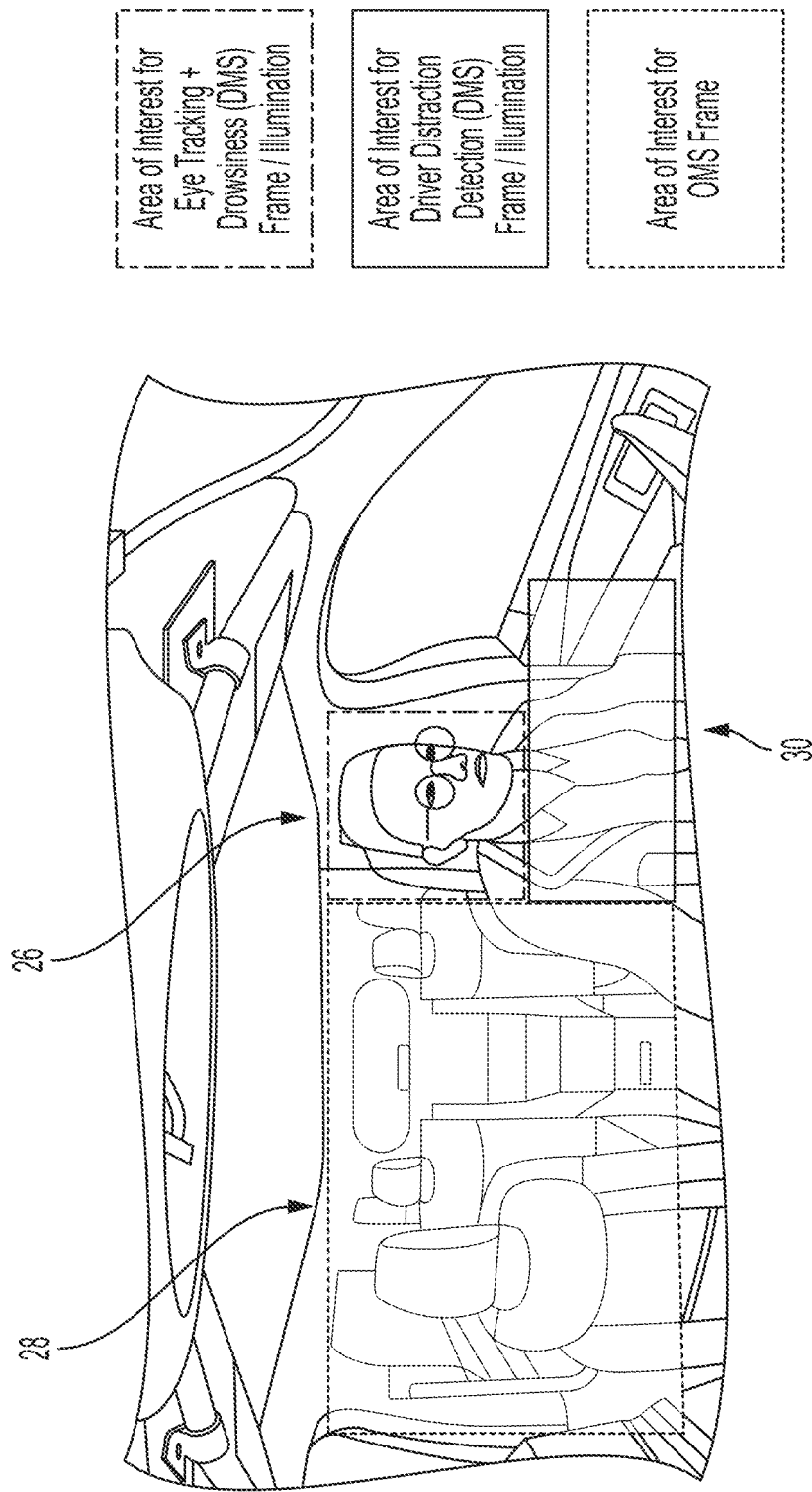

Referring now to FIGS. 103A and 103B, the DMS and OMS may implement distinguishable feature sets ranging from eye tracking to drowsiness detection and from presence detection to seat belt detection, respectively. To support these different feature sets, irradiance requirements for DMS features (e.g., eye tracking and drowsiness) may be multiple times greater than OMS features (e.g., seatbelt detection).

Thus, these distinguishable feature sets typically require varying optical requirements that drive hardware complexity. To improve thermal and optical efficiency of both the DMS and the OMS hardware, the systems may evaluate the DMS features and the OMS features in separate frames and only provide the necessary illumination to the areas of interest for a given feature and frame. For example, FIG. 103A shows two types of frames/illumination requirements for the DMS and OMS. Bounding box 22 encapsulates an area of interest for the DMS (i.e., the driver's head region). This area of interest 22 is the area that the DMS is most interested in capturing/illuminating. Bounding box 24 encapsulates an area of interest for the OMS (i.e., passenger seating areas). This area of interest 24 is the area that the OMS is most interested in capturing/illuminating. Notably, the areas 22, 24 have significant portions that do not overlap.

In another example of FIG. 103B, instead of two areas of interest, the scene is split into three separate areas of interest. Here, a first bounding box 26 encapsulates an area of interest for eye tracking and/or drowsiness tracking. Another bounding box 28 encapsulates an area of interest for the OMS (i.e., of the occupant seating area), while a third bounding box 30 encapsulates an area of interest for driver distraction detection (for a portion of the DMS). Each separate area of interest may require different levels of illumination or capturing techniques (e.g., resolution, frames per second, etc.). Capturing the entire frame of image data using the same illumination and dynamic range may consume more power and/or generate more heat than necessary to meet the illumination/dynamic range requirements for each specific area of interest.

Referring now to FIGS. 104A and 104B, the DMS/OMS may capture frames of image data at different times using different levels of illumination based on the features of the respective system. For example, the controller (e.g., an electronic control unit (ECU) of the vehicle) of the DMS and/or OMS may pulse one or more narrow field of view (n-FOV) illuminators for n consecutive frames while evaluating DMS features then pulse one or more wide field of view (w-FOV) illuminators for a frame and monitor only OMS features (e.g., a micro-level). The ECU may control the illumination/camera differently for different features of the same system (e.g., for eye tracking with the DMS and for distraction detection for the DMS as shown in FIG. 103B).

As shown in FIG. 104A, the camera may capture frames of image data at a rate of 30 frames per second (FPS) and the system may intersperse capturing DMS frames 34 with OMS frames 32. The controller may pulse a respective light source (e.g., a DMS light source and an OMS light source) or adjust an intensity, frequency, or any other characteristic of a single light source based on which system the frame of captured image data is captured for. For example, the DMS frames may require more intense or brighter illumination, so a brighter illumination may be pulsed only during frames captured for use by the DMS. Alternatively, the OMS may require comparatively less illumination than the DMS, and thus a less bright illumination may be pulsed only during frames captured for use by the OMS. As shown in FIG.

104B, the ECU may pulse the narrow FOV illuminators for a threshold period of time (e.g., a selected fraction of a second or x seconds or minutes, with the pulsing on of the narrow FOV illuminators coinciding with the frame capture of the camera) when evaluating DMS features and then pulse wide FOV illuminators for a different threshold period of time (that may be less than the threshold period of time of pulsing the narrow FOV illuminator) to monitor only OMS features (e.g., a macro-level). For example, the threshold period of time for the DMS features may be greater than the threshold period of time for the OMS features when the DMS features require more illumination. For example, and such as shown in FIG. 104B, the camera may capture frames of image data at 30 frames per second, and the DMS light source (narrow illuminator) may be pulsed on for a plurality of consecutive frames being captured (while the OMS light source is off), and then the OMS light source may be pulsed on for a plurality of consecutive frames being captured (while the DMS light source is off). Optionally, and such as shown in FIG. 105, the light emitters or narrow FOV illuminators may be pulsed for n frames while the system is evaluating DMS features and the wide FOV illuminators may be pulsed for a frame while the system monitors both DMS and OMS features.

Thus, the ECU may pulse different light sources or change an intensity/frequency/etc. of a single light source based on which features of a DMS/OMS are being evaluated for a given frame of image data. Thus, the system may tailor energy usage and heat generation to only what is necessary to support the features of the respective system. A single camera may capture image data for both a DMS and an OMS with different frames for each system interspersed with the other. Alternatively, multiple cameras may capture image data for different data. The ECU may control capture rates and other features of the camera to synchronize with the pulsing illumination sources.

With the DMS camera disposed in the mirror head, the camera may move with the mirror head (including the mirror casing and mirror reflective element that pivot at a pivot joint that pivotally mounts the mirror head at the mounting structure), such that, when the driver aligns the mirror to view rearward, the camera is aligned with the line of sight of the driver. The location of the DMS and/or OMS camera(s) and IR LED(s) at the mirror head provide an unobstructed view to the driver and/or other occupants. The DMS may be self-contained in the mirror and thus may be readily implemented in a vehicle, including existing vehicles.

The mirror assembly may comprise an auto-dimming mirror reflective element (e.g., an electrochromic mirror reflective element) or a prismatic mirror reflective element. For a prismatic mirror, when the head or housing is set to a particular orientation, a toggle moves the housing and reflective element to flip upward/downward, typically by about 4 degrees, to switch between a daytime or non-glare reducing position (where the driver views reflections at the mirror reflector of the mirror reflective element) and a nighttime or glare reducing position (where the driver views reflections at the surface of the glass substrate of the mirror reflective element). With the auto-dimming mirror, there is typically no movement once the mirror head is set for the particular driver.

Both types of mirrors may be provided with a video display screen that is disposed behind and is viewable through the mirror reflective element. The video mirrors include a backlit LCD display screen, and a particular form of video mirror is a full display mirror, where the video display screen fills the reflective region, such as is by utilizing aspects of the mirror assemblies and systems described in U.S. Pat. Nos. 10,442,360; 10,421,404; 10,166,924; 10,046,706 and/or 10,029,614, and/or U.S. Publication Nos. US-2019-0258131; US-2019-0146297; US-2019-0118717 and/or US-2017-0355312, and/or U.S. patent application Ser. No. 16/949,976, filed Nov. 23, 2020, now U.S. Pat. No. 11,498,494, and/or Ser. No. 17/247,127, filed Dec. 1, 2020, now U.S. Pat. No. 11,505,123, which are all hereby incorporated herein by reference in their entireties. In that type of a dual-mode interior rearview mirror, even the EC mirror head moves when switching from a traditional reflection mode or mirror mode to a live-video display mode.

For prismatic mirrors and full mirror display mirrors, the driver initially lines up the mirror by looking at the mirror reflector to see rearward of the vehicle. When the mirror is flipped up (such as to switch to the glare-reducing position of the prismatic mirror or to switch to the video display mode of the video mirror), the DMS camera may be flipped downward by a similar degree to maintain its principal viewing axis toward the driver. Optionally, the DMS camera may have a large enough field of view so the desired regions are not outside of the camera's view when the mirror is flipped. The ECU or processor of the system may adjust or shift processing of image data captured by the camera based on the orientation of the mirror head (i.e., when it is flipped up or down), so that the portion of the image data that is being processed for the driver monitoring system is representative of the desired monitored region in the vehicle cabin.

Thus, the mirror assembly includes the DMS/OMS camera(s) and the near-IR light emitter(s). During daylight or higher ambient lighting conditions, the near-IR floodlighting may not be necessary or required, since capture regions may be sufficiently illuminated via ambient light in the vehicle. However, at dusk through to dawn, when lighting conditions are lower, such near-IR illumination may be necessary or helpful.

For a video mirror having a full mirror display, the larger video display screen may be disposed at and behind the entire reflecting area. With a backlit TFT display screen, the display screen is backlit by an array of light emitting diodes.

The backlighting array thus may be populated with some near-IR LEDs (such as a nested or group of near-IR LEDs, or a ring of near-IR LEDs or the like), which are powered at low ambient lighting conditions for use with the DMS camera and the driver monitoring system. The near-IR LEDs of the backlighting array of LEDs may be selectively addressed separately from the visible light-emitting LEDs of the backlighting array for backlighting the video display screen, and can be powered at a higher level at night since the visible light-emitting LEDs of the backlighting array are not powered at a higher level in such lower level lighting conditions.

The system may determine the low lighting conditions based on image processing of image data captured by the DMS camera or by another camera of the vehicle (or optionally via an ambient light sensor at the vehicle), and may activate the near-IR emitter when the system determines that the ambient light level is below a threshold level. Optionally, the system may adjust the threshold levels at which the near-IR emitter is operated based on whether the vehicle's sunroof or moonroof is opened or whether the vehicle's convertible top is down, which may impact the amount of light in the cabin of the vehicle. Optionally, the system may determine the low lighting conditions responsive to a global positioning of the vehicle. For example, the global positioning system determines whether it is daytime or nighttime (and thus roughly determines the ambient light level) at the location of the vehicle based on the location and current time.

The interior rearview mirror may include one or more embedded cameras, IR illuminators and the processor for processing captured image data for the driver monitoring application. The DMS camera and IR illuminators may be fixed within the mirror head, and thus both components are coupled with the mirror body. Hence, the camera's field of view is subject to change from driver to driver as the mirror head is adjusted to set the driver's preferred rearward view.

The processor may be disposed within the mirror head and processes the captured image data to detect and inform the driver of distractions or other valuable information (e.g., occupant monitoring). For example, the processor may determine driver attentiveness and/or driver gaze direction (via processing of image data captured by the driver monitoring camera) and may, responsive to determination of a hazard ahead of the vehicle (via processing of image data captured by a forward viewing camera) and at a region not being viewed by the driver at that time, the system may generate an alert to the driver to inform the driver of the potential hazard that requires his or her attention. The alert may comprise an audible alert or haptic alert or visual alert (such as a warning indicator or display of the detected hazard at a video display screen or heads up display of the vehicle).

The electro-optic (such as electrochromic (EC)) mirror reflective element sub-assembly transmits near infrared light and reflects visible light. Thus, the mirror reflective element effectively allows the IR LEDs to emit light through the reflective element and allows the camera to 'view' through the mirror reflective element, while allowing the mirror reflective element to serve its intended rear viewing purpose. The IR LEDs may be activated responsive at least in part to the ambient light level within the vehicle cabin and at the driver's head region, with the light level being determined by a light sensor or by processing of image data captured by the driver monitoring camera.

The advantages and benefits of a One-Box DMS Interior Rearview Mirror Assembly are laid out above and herein. Should however it be desired not to include the DMS SoC chip running the DMS software/algorithms in the mirror head of an interior rearview mirror assembly, it can instead be located as part of an electronic control unit (ECU) or as part of a domain controller (DC) that is disposed in an equipped vehicle remote from, separate from and distanced from the DMS camera and near-IR illuminators that are accommodated within the mirror head of an interior rearview mirror assembly of the equipped vehicle. Preferably, image data captured by the DMS camera accommodated within the mirror head is serialized by a serializer that is part of the electronic circuitry disposed in the mirror head and is transmitted from the mirror head to the remote ECU or DC as digital serial data via a wired connection between the circuitry within the mirror head and the circuitry of the remote ECU or DC. The digital serial data sent from the DMS camera within the mirror head is deserialized upon arrival at the ECU or DC and is processed by the DMS SoC running the DMS software/algorithms that is part of the circuitry of the remote ECU or DC. The wired connection carrying the digital serial data and connecting the interior rearview mirror to the remote ECU or DC can comprises a coaxial cable and can utilize the communication protocols and other connectivity methods, protocols, networks and elements as disclosed in U.S. Pat. Nos. 11,252,376; 11,201,994; 10,922,563 and/or 10,567,705 (which are all hereby incorporated herein by reference in their entireties). As an alternative to coaxial cabling, the wired connection carrying the digital serial data and connecting the interior rearview mirror to the remote ECU or DC can comprise shielded twisted pair cabling. Bidirectional communication between the electronics of the interior rearview mirror assembly and the remote ECU or DC can comprise data transmission utilizing an Ethernet protocol/network in accordance with the disclosure of U.S. Pat. No. 10,567,633 (which is hereby incorporated herein by reference in its entirety). Low-voltage differential signaling (LVDS) can be used to reduce transmission/communication errors. Camera calibration data can be digitally communicated from the DMS camera disposed in the mirror head to the remote ECU or DC. The DMS camera disposed in the mirror head can be controlled via data/signals carried by the wired connection from the ECU or DC that connects the ECU or DC to the interior rearview mirror assembly. Electrical power for circuitry accommodated in the mirror head can be provided via power-over-cable and carried by the wired connection from the ECU or DC that connects to the interior rearview mirror assembly.

Therefore, the present application provides a vehicular interior rearview mirror assembly that comprises a mirror head adjustably disposed at a mounting base that is configured to attach the vehicular interior rearview mirror assembly at an interior portion of a vehicle equipped with the vehicular interior rearview mirror assembly, wherein the mirror head comprises an interior mirror reflective element. The interior mirror reflective element has a planar front surface and a planar rear surface opposite the planar front surface. The planar front surface is closer to a driver of the vehicle than the planar rear surface when the vehicular interior rearview mirror assembly is attached at the interior portion of the equipped vehicle. The interior mirror reflective element comprises a mirror transflector, wherein the mirror transflector transmits near-IR light incident thereon, transmits visible light incident thereon and reflects visible light incident thereon. The vehicular interior rearview mirror assembly further comprises a camera disposed within the mirror head and viewing through the mirror transflector of the interior mirror reflective element, wherein the camera moves in tandem with the mirror head when, with the vehicular interior rearview mirror assembly attached at the interior portion of the equipped vehicle, the mirror head is adjusted relative to the mounting base to adjust the driver's rearward view. The camera comprises an imaging sensor having a quantum efficiency (QE) of at least 15% for near-infrared (near-IR) light having a wavelength of 940 nm. The camera is operable to capture frames of image data. The vehicular interior rearview mirror assembly further comprises a driver monitoring system (DMS) data processor. The vehicular interior rearview mirror assembly further comprises first, second and third near-IR illumination sources disposed within the mirror head and operable to emit near-IR light that passes through the mirror transflector of the interior mirror reflective element. The first near-IR illumination source is at a first angle relative to the planar front surface of the interior mirror reflective element. The second near-IR illumination source is at a second angle relative to the planar front surface of the interior mirror reflective element. The third near-IR illumination source is at a third angle relative to the planar front surface of the interior mirror reflective element. The first angle is a different angle than the second angle and the third angle is a different angle than the first angle. With the vehicular interior rearview mirror assembly attached at the interior portion of the equipped vehicle and with the mirror head adjusted to provide the driver's rearward view, the first near-IR illumination source, when powered, illuminates a front seat region at a driver side of the equipped vehicle and a front seat region at a passenger side of the equipped vehicle. With the vehicular interior rearview mirror assembly attached at the interior portion of the equipped vehicle and with the mirror head adjusted to provide the driver's rearward view, the second near-IR illumination source, when powered, illuminates the front seat region at the driver side of the equipped vehicle. With the vehicular interior rearview mirror assembly attached at the interior portion of the equipped vehicle and with the mirror head adjusted to provide the driver's rearward view, the third near-IR illumination source, when powered, illuminates the front seat region at the passenger side of the equipped vehicle. The DMS data processor is operable to provide a driver monitoring function and an occupant detection function. When the DMS data processor is operating to provide the driver monitoring function, the camera captures driver-monitoring frames of image data and the first and second near-IR illumination sources are powered while the camera is capturing driver-monitoring frames of image data, and wherein data derived from captured driver-monitoring frames of image data is processed at the DMS data processor for driver monitoring, and wherein the third near-IR illumination source is not powered while the camera is capturing driver-monitoring frames of image data. When the DMS data processor is operating to provide the occupant detection function, the camera captures occupant-detection frames of image data and the first, second and third near-IR illumination sources are powered while the camera is capturing occupant-detection frames of image data, and wherein data derived from captured occupant-detection frames of image data is processed at the DMS data processor for occupant detection.

The first near-IR illumination source may comprise at least one near-IR emitting light emitting diode, and the second near-IR illumination source may comprise at least one near-IR emitting light emitting diode, and the third near-IR illumination source may comprise at least one near-IR emitting light emitting diode. With the vehicular interior rearview mirror assembly attached at the interior portion of the equipped vehicle, the first near-IR illumination source may comprise at least two near-IR emitting light emitting diodes arranged side-by-side one to the other. With the vehicular interior rearview mirror assembly attached at the interior portion of the equipped vehicle, the second near-IR illumination source may comprise at least two near-IR emitting light emitting diodes vertically arranged one above the other. With the vehicular interior rearview mirror assembly attached at the interior portion of the equipped vehicle, the third near-IR illumination source may comprise at least two near-IR emitting light emitting diodes vertically arranged one above the other.

The first angle may be an angle, relative to the planar front surface of the interior mirror reflective element, in the range of around 80 degrees to around 100 degrees. For example, the first angle is an angle, relative to the planar front surface of the interior mirror reflective element, of around 90 degrees. The second angle may be an angle, relative to the planar front surface of the interior mirror reflective element, in the range of around 5 degrees to around 35 degrees. For example, the second angle may an angle, relative to the planar front surface of the interior mirror reflective element, of around 20 degrees. The third angle may be an angle, relative to the planar front surface of the interior mirror reflective element, in the range of around 5 degrees to around 35 degrees. For example, the third angle may be an angle, relative to the planar front surface of the interior mirror reflective element, of around 10 degrees.

The first near-IR illumination source may comprise (i) a first circuit board and (ii) at least one near-IR emitting light emitting diode disposed at the first circuit board. The second near-IR illumination source may comprise (i) a second circuit board, (ii) at least one near-IR emitting light emitting diode disposed at the second circuit board and (iii) a reflector surface-mounted at the second circuit board and configured to concentrate near-IR light emitted by the second near-IR illumination source toward the front seat region at the driver side of the equipped vehicle. The third near-IR illumination source may comprise (i) a third circuit board, (ii) at least one near-IR emitting light emitting diode disposed at the third circuit board and (iii) a reflector surface-mounted at the third circuit board and configured to concentrate near-IR light emitted by the third near-IR illumination source toward the front seat region at the driver side of the equipped vehicle. The first circuit board may be disposed between the second and third circuit boards and electrically connected to the second and third circuit boards via respective ribbon cables. Responsive to processing at the DMS data processor of data derived at least in part from image data captured by the camera, at least two of the first, second and third near-IR illumination sources are powered to illuminate the region within an interior cabin of the equipped vehicle where the driver who is operating the equipped vehicle is seated. The vehicular interior rearview mirror assembly may comprise an illuminator driver for controlling illumination by the first, second and third near-IR illumination sources. The first, second and third circuit boards may be electrically interconnected one-to-another via a respective ribbon cable.

In accordance with an aspect of the vehicular interior rearview mirror assembly, with the vehicular interior rearview mirror assembly attached at the interior portion of the equipped vehicle, and with the equipped vehicle comprising a left hand drive vehicle, the first, second and third near-IR illumination sources are disposed at a right hand side of the mirror head as viewed by the driver of the equipped vehicle, and wherein the third near-IR illumination source is further from the camera's location within the mirror head than the second near-IR illumination source. With the vehicular interior rearview mirror assembly attached at the interior portion of the equipped vehicle, the second angle of the second near-IR illumination source is an angle between 10 degrees and 30 degrees relative to the planar front surface of the interior mirror reflective element, such as an angle between 15 degrees and 25 degrees relative to the planar front surface of the interior mirror reflective element. For example, the second angle of the second near-IR illumination source may be an angle of about 20 degrees relative to the planar front surface of the interior mirror reflective element. The third angle of the third near-IR illumination source may comprise a non-zero angle up to 20 degrees relative to the planar front surface of the interior mirror reflective element, such as an angle between 5 degrees and 15 degrees relative to the planar front surface of the interior mirror reflective element. For example, the third angle of the third near-IR illumination source may be an angle of about 10 degrees to the planar front surface of the interior mirror reflective element.

In accordance with another aspect of the vehicular interior rearview mirror assembly, with the vehicular interior rearview mirror assembly attached at the interior portion of the equipped vehicle, and with the equipped vehicle comprising a left hand drive vehicle, the first, second and third near-IR illumination sources may be disposed at a left hand side of the mirror head as viewed by the driver of the equipped vehicle, and wherein the second near-IR illumination source is further from the camera than the third near-IR illumination source. The second angle of the second near-IR illumination source may comprise a non-zero angle up to 20 degrees relative to the planar front surface of the interior mirror reflective element, such as an angle between 5 degrees and 15 degrees relative to the planar front surface of the interior mirror reflective element. For example, the second angle of the second near-IR illumination source may comprise an angle of about 10 degrees relative to the planar front surface of the interior mirror reflective element. The third angle of the third near-IR illumination source may comprise an angle between 10 degrees and 30 degrees relative to the planar front surface of the interior mirror reflective element, such as an angle between 15 degrees and 25 degrees relative to the planar front surface of the interior mirror reflective element. For example, the third angle of the third near-IR illumination source may comprise an angle of about 20 degrees relative to the planar front surface of the interior mirror reflective element.

In accordance with another aspect of the vehicular interior rearview mirror assembly, with the vehicular interior rearview mirror assembly attached at the interior portion of the equipped vehicle, and with the equipped vehicle comprising a right hand drive vehicle, the first, second and third near-IR illumination sources may be disposed at a right hand side of the mirror head as viewed by the driver of the equipped vehicle. The second angle of the second near-IR illumination source may comprise an angle between 10 degrees and 30 degrees relative to the planar front surface of the interior mirror reflective element, such as an angle between 15 degrees and 25 degrees relative to the planar front surface of the interior mirror reflective element. For example, the second angle of the second near-IR illumination source may comprise an angle of about 20 degrees relative to the planar front surface of the interior mirror reflective element. The third angle of the third near-IR illumination source comprises a non-zero angle up to 20 degrees relative to the planar front surface of the interior mirror reflective element, such as an angle between 5 degrees and 15 degrees relative to the planar front surface of the interior mirror reflective element. For example, the third angle of the third near-IR illumination source may comprise an angle of about 10 degrees relative to the planar front surface of the interior mirror reflective element.

In accordance with another aspect of the vehicular interior rearview mirror assembly, with the vehicular interior rearview mirror assembly attached at the interior portion of the equipped vehicle, and with the equipped vehicle comprising a right hand drive vehicle the first, second and third near-IR illumination sources may be disposed at a left hand side of the mirror head as viewed by the driver of the equipped vehicle. The second angle of the second near-IR illumination source may comprise a non-zero angle up to 20 degrees relative to the planar front surface of the interior mirror reflective element, such as an angle between 5 degrees and 15 degrees relative to the planar front surface of the interior mirror reflective element. For example, the second angle of the second near-IR illumination source may comprise an angle of about 10 degrees relative to the planar front surface of the interior mirror reflective element. The third angle of the third near-IR illumination source may comprise an angle between 10 degrees and 30 degrees relative to the planar front surface of the interior mirror reflective element, such as an angle between 15 degrees and 25 degrees relative to the planar front surface of the interior mirror reflective element. For example, the third angle of the third near-IR illumination source may comprise an angle of about 20 degrees relative to the planar front surface of the interior mirror reflective element.

Optionally, the mirror transflector comprises a multilayer stack formed by a plurality of thin film coating layers. The mirror transflector comprises at least one silicon layer. The plurality of thin film coating layers comprises repeating alternating layers of a higher refractive index layer and a lower refractive index layer, and wherein the higher refractive index layers have a refractive index greater than 2 and the lower refractive index layers have a refractive index less than 1.5. The lower refractive index layers comprise silicon oxide layers. The higher refractive index layers comprise titanium oxide layers. The higher refractive index layers comprise niobium oxide layers. The plurality of thin film coating layers may comprise at least five (5) layers or at least seven (7) layers. The plurality of thin film coatings of the multilayer stack forming the mirror transflector are coated onto a planar glass surface of a glass substrate of the interior mirror reflective element. The multilayer stack forming the mirror transflector comprises an innermost thin film coating that is closest to the planar glass surface of the glass substrate and comprises an outermost thin film coating that is farthest from the planar glass surface of the glass substrate. The innermost thin film coating that is closest to the planar glass surface of the glass substrate has a higher refractive index than the next closest thin film coating to the planar glass surface of the glass substrate. The outermost thin film coating that is farthest from the planar glass surface of the glass substrate comprises a transparent electrically conductive thin film having a refractive index higher than the refractive index of the layer of the multilayer stack it is coated onto. The transparent electrically conductive thin film comprises a layer of indium tin oxide (ITO). The layer of indium tin oxide (ITO) has sheet resistance less than 20 ohms/square. The glass substrate is heated to a temperature of at least 250 degrees Celsius during deposition of the layer of indium tin oxide (ITO).

The layers of the mirror transflector may be deposited onto a glass substrate of the interior mirror reflective element using mid-frequency AC sputtering. The layers of the mirror transflector may be deposited onto a glass substrate of the interior mirror reflective element using mid-frequency AC sputtering in a multi-station/multi-target in-line sputter deposition process. The layers of the mirror transflector may be deposited onto a glass substrate of the interior mirror reflective element in a batch vacuum deposition chamber.

In accordance with an aspect of the vehicular interior rearview mirror assembly, the first near-IR illumination source, when powered, emits near-IR light having a wavelength at around 940 nm, and wherein the second near-IR illumination source, when powered, emits near-IR light having a wavelength at around 940 nm, and wherein the third near-IR illumination source, when powered, emits near-IR light having a wavelength at around 940 nm.

In accordance with an aspect of the vehicular interior rearview mirror assembly, the vehicular interior rearview mirror assembly comprises a vehicular EVO™ interior rearview mirror assembly.

In accordance with an aspect of the vehicular interior rearview mirror assembly, the vehicular interior rearview mirror assembly comprises a vehicular Infinity™ interior rearview mirror assembly.

In accordance with an aspect of the vehicular interior rearview mirror assembly, the vehicular interior rearview mirror assembly comprises a frameless interior rearview mirror assembly.

In accordance with an aspect of the vehicular interior rearview mirror assembly, the interior mirror reflective element comprises an electrochromic mirror reflective element having a front glass substrate and a rear glass substrate, and wherein a planar rear surface of the front glass substrate has a transparent electrically conductive coating disposed thereat, and wherein a planar front surface of the rear glass substrate has an electrically conductive coating disposed thereat, and wherein an electrochromic medium is disposed between and contacts the transparent electrically conductive coating disposed at the planar rear surface of the front glass substrate and the electrically conductive coating disposed at the planar front surface of the rear glass substrate, and wherein the mirror transflector is disposed at the planar front surface or a planar rear surface of the rear glass substrate.

The rear glass substrate has a plate thickness of around 1.6 mm or less. The front glass substrate comprises an exposed rounded perimeter edge having a radius of curvature of at least 2.5 mm, and wherein the exposed rounded perimeter edge provides a curved transition between the planar front surface of the front glass substrate and an outer surface of a wall portion of a mirror housing of the mirror head. The front glass substrate is at least around 2 mm thick. The front glass substrate comprises low-iron (low-Fe) soda lime glass. The rear glass substrate has a plate thickness of around 1.6 mm or less.

Optionally, a housing portion of a mirror housing of the mirror head may circumscribe a perimeter edge of the front glass substrate, and wherein the housing portion has a rounded exterior surface that provides a curved transition between the planar front surface of the front glass substrate and an outer surface of a wall portion of the mirror housing of the mirror head.

Optionally, the front glass substrate may have an exposed rounded perimeter edge having a radius of curvature of at least 2.5 mm, and wherein the exposed rounded perimeter edge provides a curved transition between the planar front surface of the front glass substrate and an outer surface of a wall portion of a mirror housing of the mirror head.

The mirror transflector comprises a plurality of thin film coating layers. The mirror transflector is disposed at the planar rear surface of the rear glass substrate. The rear glass substrate has a plate thickness of around 1.6 mm or less. The mirror transflector comprises at least one silicon layer. The plurality of thin film coating layers comprises repeating alternating layers of a higher refractive index layer and a lower refractive index layer, and wherein the higher refractive index layers have a refractive index greater than 2 and the lower refractive index layers have a refractive index less than 1.5. The lower refractive index layers may comprise silicon oxide layers. The higher refractive index layers may comprise niobium oxide layers. The higher refractive index layers may comprise titanium oxide layers. The layers of the mirror transflector may be deposited onto the rear glass substrate using mid-frequency AC sputtering. The layers of the mirror transflector may be deposited onto the rear glass substrate using mid-frequency AC sputtering in a multi-station/multi-target in-line vacuum deposition process. The layers of the mirror transflector may be deposited onto the rear glass substrate in a batch vacuum deposition chamber.

The mirror transflector is coated onto the rear glass substrate. The transflector-coated rear glass substrate may have photopic visible light reflectivity of at least 45% R. The transflector-coated rear glass substrate may have photopic visible light reflectivity of at least 55% R. The transflector-coated rear glass substrate may have photopic visible light reflectivity of at least 65% R. The transflector-coated rear glass substrate may have visible light transmission of at least 15% T. The transflector-coated rear glass substrate may have visible light transmission of at least 20% T. The transflector-coated rear glass substrate may have visible light transmission of at least 25% T. The transflector-coated rear glass substrate may have visible light transmission of less than 35% T. The transflector-coated rear glass substrate may have visible light transmission of less than 30% T. The transflector-coated rear glass substrate may have near-IR light transmission of at least 60% T. The transflector-coated rear glass substrate may have near-IR light transmission of at least 70% T. The transflector-coated rear glass substrate may have near-IR light transmission of at least 80% T. The transflector-coated rear glass substrate may have visible light transmission in a range of 20% T to 35% T. The transflector-coated rear glass substrate may have visible light transmission in a range of 15% T to 35% T. The transflector-coated rear glass substrate may have visible light transmission in a range of 20% T to 30% T.

The electrochromic mirror reflective element, when in a fully bleached state, may have visible light transmission in a range of 20% T to 30% T. The electrochromic mirror reflective element, when in a fully bleached state, may have visible light transmission in a range of 22% T to 25% T. The electrochromic mirror reflective element, when in a fully dimmed state, may have visible light transmission in a range of 10% T to 20% T. The electrochromic mirror reflective element, when in a fully dimmed state, may have visible light transmission of about 16% T. The electrochromic mirror reflective element, in a fully bleached state, may have visible light reflectivity in a range of 40% R to 65% R. The electrochromic mirror reflective element, in a fully bleached state, may have visible light reflectivity in a range of 43% R to 55% R. The electrochromic mirror reflective element, when in a fully dimmed state, may have near-IR transmission around 940 nm of at least 50% T. The electrochromic mirror reflective element, when in a fully dimmed state, may have near-IR transmission around 940 nm of at least 70% T. The electrochromic mirror reflective element, when in a fully bleached state, may have near-IR transmission around 940 nm of at least 50% T. The electrochromic mirror reflective element, when in a fully bleached state, may have near-IR transmission around 940 nm of at least 70% T.

The front glass substrate may comprise a circumferential electrically conductive raceway disposed at the transparent electrically conductive coating. The transparent electrically conductive coating disposed at the planar rear surface of the front glass substrate may have a sheet resistance of less than 50 ohms/square. The transparent electrically conductive coating disposed at the planar rear surface of the front glass substrate may have a sheet resistance of greater than 20 ohms/square. The transparent electrically conductive coating disposed at the planar rear surface of the front glass substrate may have a sheet resistance of greater than 30 ohms/square.

The transparent electrically conductive coating disposed at the planar rear surface of the front glass substrate may have a sheet resistance of less than 30 ohms/square. The transparent electrically conductive coating disposed at the planar rear surface of the front glass substrate may have a sheet resistance of less than 25 ohms/square. The transparent electrically conductive coating disposed at the planar rear surface of the front glass substrate may have a sheet resistance of less than 20 ohms/square. The transparent electrically conductive coating disposed at the planar rear surface of the front glass substrate may have a sheet resistance of 10-15 ohms/square.

The rear glass substrate may comprise a circumferential electrically conductive raceway disposed at an outermost layer of the electrically conductive coating. An outermost layer of the electrically conductive coating disposed at the planar front surface of the rear glass substrate may have a sheet resistance of greater than 30 ohms/square. The outermost layer of the electrically conductive coating disposed at the planar front surface of the rear glass substrate may have a sheet resistance of less than 30 ohms/square.

An outermost layer of the electrically conductive coating disposed at the planar front surface of the rear glass substrate may have a sheet resistance of less than 25 ohms/square. The outermost layer of the electrically conductive coating disposed at the planar front surface of the rear glass substrate may have a sheet resistance of less than 20 ohms/square. The outermost layer of the electrically conductive coating disposed at the planar front surface of the rear glass substrate may have a sheet resistance of 10-15 ohms/square.

The interior mirror reflective element may have (i) visible light transmission of 20-25 percent, (ii) near-IR transmission around 940 nm of at least 60 percent and (iii) visible light reflectivity of at least 43 percent. The interior mirror reflective element may have near-IR transmission around 940 nm of at least 70 percent. The interior mirror reflective element may have near-IR transmission around 940 nm of at least 80 percent. The interior mirror reflective element may have visible light reflectivity of at least 48 percent. The interior mirror reflective element may have visible light reflectivity of at least 53 percent.

The interior mirror reflective element may comprise an electrochromic mirror reflective element having a front glass substrate and a rear glass substrate, and wherein a planar rear surface of the front glass substrate has a transparent electrically conductive coating disposed thereat, and wherein a planar front surface of the rear glass substrate has an electrically conductive coating disposed thereat, and wherein an electrochromic medium is disposed between and contacts the transparent electrically conductive coating disposed at the planar rear surface of the front glass substrate and the electrically conductive coating disposed at the planar front surface of the rear glass substrate, and wherein the mirror transflector is disposed at a planar front surface or the planar rear surface of the rear glass substrate.

The interior mirror reflective element may have (i) visible light transmission of 20-25 percent, (ii) near-IR transmission around 940 nm of at least 60 percent and (iii) visible light reflectivity of at least 43 percent, and the interior mirror reflective element may comprise a prismatic mirror reflective element, and wherein the planar front surface is not parallel to the planar rear surface, and wherein the mirror transflector is disposed at the planar rear surface of the prismatic mirror reflective element.

The interior mirror reflective element comprises a prismatic mirror reflective element, and wherein the planar front surface of the glass substrate is not parallel to the planar rear surface, and wherein the mirror transflector is disposed at the planar rear surface of the prismatic mirror reflective element. The vehicular interior rearview mirror assembly may comprise a frameless interior rearview mirror assembly. Optionally, a housing portion of a mirror housing of the mirror head may circumscribe a perimeter edge of a glass substrate of the interior mirror reflective element, wherein the housing portion has a rounded exterior surface that provides a curved transition between a planar front surface of the glass substrate and an outer surface of a wall portion of the mirror housing of the mirror head. Optionally, the glass substrate may have an exposed rounded perimeter edge having a radius of curvature of at least 2.5 mm, wherein the exposed rounded perimeter edge provides a curved transition between the planar front surface of the glass substrate and an outer surface of a wall portion of a mirror housing of the mirror head.

The mirror transflector maintains color difference at any viewing angle by the driver up to 45 degrees to be between 2.3 and 3.2. The mirror transflector may maintain color difference at any viewing angle by the driver up to 45 degrees to be between 2.3 and 2.8. The mirror transflector may maintain color difference at any viewing angle by the driver up to 45 degrees to be between 2.3 and 2.5.

The camera captures a series of frames of image data, wherein the series of captured frames of image data include a plurality of driver-monitoring frames of image data and a plurality of occupant-detection frames of image data. The driver-monitoring frames of image data and the occupant-detection frames of image data do not overlap.

The second near-IR illumination source is oriented at the mirror head so that a beam of light emitted by the second near-IR illumination source would be directed toward a driver's region of a left hand drive vehicle if the vehicular interior rearview mirror assembly were installed in the left hand drive vehicle and adjusted to provide the driver of the left hand drive vehicle a rearward view, and wherein the third near-IR illumination source is oriented at the mirror head so that a beam of light emitted by the third near-IR illumination source would be directed toward a driver's region of a right hand drive vehicle if the vehicular interior rearview mirror assembly were installed in the right hand drive vehicle and adjusted to provide the driver of the right hand drive vehicle a rearward view.

The interior mirror reflective element is attached at a mirror attachment plate, and wherein the camera and the first, second and third near-IR illumination sources are disposed behind the mirror attachment plate and are aligned with respective apertures through the mirror attachment plate. A heat dissipating element is attached at the mirror attachment plate, wherein the mirror attachment plate and the heat dissipating element encase the camera, the first, second and third near-IR illumination sources, and the DMS data processor and function to limit electromagnetic interference of the camera, the first, second and third near-IR illumination sources, and the DMS data processor.

The second near-IR illumination source comprises at least one narrow field-of-view illuminator, and the third near-IR illumination source comprises at least one narrow field-of-view illuminator.

The first near-IR illumination source comprises at least one wide field-of-view illuminator.

The DMS data processor may have a computing speed of at least 0.1 teraflops. The DMS data processor may have a computing speed of at least 0.3 teraflops. The DMS data processor may have a computing speed of at least 0.6 teraflops. The DMS data processor may have a computing speed of at least 1 teraflop. The DMS data processor may have a computing speed of at least 1.5 teraflops. The DMS data processor may operate with a power consumption of less than 5 Watts. The DMS data processor may operate with a power consumption of less than 4 Watts. The DMS data processor may operate with a power consumption of less than 3 Watts. The DMS data processor may have a computing speed of at least 0.25 teraflops with a power consumption of less than 3 Watts. The DMS data processor may have a computing speed of at least 0.1 trillion operations per second (TOPS). The DMS data processor may have a computing speed of at least 0.2 trillion operations per second (TOPS). The DMS data processor may have a computing speed of at least 0.5 trillion operations per second (TOPS).

The vehicular interior rearview mirror assembly may comprise thermal elements that maintain a touch surface of the mirror head at a temperature below 60 degrees C., such as at a temperature below 50 degrees C. The thermal elements may comprise at least one vent through a mirror housing of the mirror head. The thermal elements may comprise a heatsink that is thermally conductively connected to heat generating components of the DMS data processor. The thermal elements may comprise thermal interface material elements disposed between at least some of the heat generating components of the DMS data processor and the heatsink. The thermal interface material elements may have thermal conductivity of greater than 2 W/m-K, such as greater than 3 W/m-K, such as greater than 4 W/m-K.

The vehicular interior rearview mirror assembly may comprise filters at the first, second and third near-IR illumination sources, wherein the filters transmit near-IR light at 940 nm and attenuate visible light. The filters may have respective plate thicknesses of at least 0.8 mm, such as at least 1.4 mm, such as at least 1.9 mm. The filters may have respective plate thicknesses of less than 6 mm, such as less than 4 mm, such as less than 2 mm.

The first, second and third near-IR illumination sources may comprise first, second and third sets of light emitting diodes. Individual light emitting diodes of the first, second and third sets of light emitting diodes operate with a forward current through each light emitting diode of at least 500 milliamps, such as at least 750 milliamps, such as at least 1,000 milliamps.

With the vehicular interior rearview mirror assembly attached at the interior portion of the equipped vehicle and when the DMS data processor is operating to provide the driver monitoring function, the first and second near-IR illumination sources may be pulsed at a duty cycle of at least 8 percent. With the vehicular interior rearview mirror assembly attached at the interior portion of the equipped vehicle and when the DMS data processor is operating to provide the driver monitoring function, the first and second near-IR illumination sources may be pulsed at a duty cycle of at least 5 percent. With the vehicular interior rearview mirror assembly attached at the interior portion of the equipped vehicle and when the DMS data processor is operating to provide the driver monitoring function, the first and second near-IR illumination sources may be pulsed at a duty cycle of at least 10 percent. With the vehicular interior rearview mirror assembly attached at the interior portion of the equipped vehicle and when the DMS data processor is operating to provide the driver monitoring function, the first and second near-IR illumination sources may be pulsed at a duty cycle of less than 40 percent. With the vehicular interior rearview mirror assembly attached at the interior portion of the equipped vehicle and when the DMS data processor is operating to provide the driver monitoring function, the first and second near-IR illumination sources may be pulsed at a duty cycle of less than 30 percent. With the vehicular interior rearview mirror assembly attached at the interior portion of the equipped vehicle and when the DMS data processor is operating to provide the driver monitoring function, the first and second near-IR illumination sources may be pulsed at a duty cycle of less than 20 percent.

With the vehicular interior rearview mirror assembly attached at the interior portion of the equipped vehicle and when the DMS data processor is operating to provide the driver monitoring function, the first and second near-IR illumination sources provide near-IR irradiance at the driver's head of at least 1 $W/m^2$, such as at least 1.8 $W/m^2$, such as at least 2 $W/m^2$, such as at least 2.3 $W/m^2$, such as at least 2.5 $W/m^2$.

With the vehicular interior rearview mirror assembly attached at the interior portion of the equipped vehicle and when the DMS data processor is operating to provide the occupant detection function, the first and third near-IR illumination sources provide near-IR irradiance at a front passenger region of the equipped vehicle of at least 0.15 $W/m^2$, such as at least 0.25 $W/m^2$, such as at least 0.4 $W/m^2$.

With the vehicular interior rearview mirror assembly attached at the interior portion of the equipped vehicle and when the DMS data processor is operating to provide the occupant detection function, the first, second and third near-IR illumination sources provide near-IR irradiance at a rear seat region of the equipped vehicle of at least 0.1 $W/m^2$, such as at least 0.15 $W/m^2$, such as at least 0.2 $W/m^2$.

The second near-IR illumination source emits light toward a driver's head region. The driver's head region may comprise a head box region of at least 80 mm×80 mm, such as at least 100 mm×100 mm, such as at least 150 mm×150 mm.

The camera may comprise an imaging sensor having a quantum efficiency (QE) of at least 22% for near-infrared (near-IR) light having a wavelength of 940 nm. The camera may comprise an imaging sensor having a quantum efficiency (QE) of at least 32% for near-infrared (near-IR) light having a wavelength of 940 nm.

The camera may comprise a CMOS imaging sensor. The CMOS imaging sensor of the camera may comprise a silicon layer having a thickness of at least 3.5 µm. The CMOS imaging sensor of the camera may comprise a silicon layer having a thickness of at least 4.5 µm. The CMOS imaging sensor of the camera may comprise a silicon layer having a thickness of at least 5.5 µm.

The imaging sensor of the camera may comprise a backside Illumination (BSI) imaging sensor.

The camera may capture frames of image data at a frame capture rate of at least 15 frames per second. The camera may capture frames of image data at a frame capture rate of at least 30 frames per second. The camera may capture frames of image data at a frame capture rate of at least 60 frames per second.

The camera comprises a lens, and wherein an outermost surface of the lens of the camera may be stood-off from the rear of the interior mirror reflective element where the camera views through the mirror transflector of the interior mirror reflective element. The camera may be stood-off from the rear of the interior mirror reflective element where the camera views through the mirror transflector of the interior mirror reflective element by at least 0.5 mm. The camera may be stood-off from the rear of the interior mirror reflective element where the camera views through the mirror transflector of the interior mirror reflective element by at least 1 mm. The camera may be stood-off from the rear of the interior mirror reflective element where the camera views through the mirror transflector of the interior mirror reflective element by at least 2 mm. The camera may be stood-off from the rear of the interior mirror reflective element where the camera views through the mirror transflector of the interior mirror reflective element by less than 4 mm.

The camera may comprise at least a 2.3 megapixel imaging array. The camera may comprise at least a 5 megapixel imaging array. The camera may comprise at least a 5.5 megapixel imaging array. The imaging sensor of the camera may comprise a plurality of photosensors and spectral filtering disposed at the photosensors such that some of the photosensors are sensitive to visible light and others of the photosensors are sensitive to near infrared light.

The DMS data processor, via processing captured driver-monitoring frames of image data at the DMS data processor, may determine at least one selected from the group consisting of (i) driver attentiveness, (ii) driver drowsiness and (iii) driver gaze direction. The DMS data processor, via processing captured occupant-detection frames of image data at the DMS data processor, may determine presence of an occupant in the equipped vehicle.

The DMS data processor adjusts processing of the captured driver-monitoring frames of image data to accommodate adjustment of the mirror head when the driver adjusts the mirror head to adjust his or her rearward view.

The vehicular interior rearview mirror assembly may comprise a display screen disposed in the mirror head and viewable, when displaying images, through the interior mirror reflective element, and wherein the display screen is backlit by a backlighting array comprising a plurality of backlighting visible light-emitting light emitting diodes (LEDs). The display screen may comprise a video display screen that, when actuated, displays video images derived from image data captured by an exterior viewing camera of the vehicle. The vehicular interior rearview mirror assembly may be operable in a display mode, where the video display screen displays video images derived from image data captured by a rearward viewing camera of the equipped vehicle, and a mirror mode, where the video display screen is deactivated and the driver views rearward of the equipped vehicle via reflection at the interior mirror reflective element.

The mirror head is adjustable about the mounting base via a ball-and-socket pivot joint. The mounting base may comprise a ball pivot element and the mirror head may comprise a socket pivot element, wherein the ball-and-socket pivot joint comprises the ball pivot element of the mounting base and the socket pivot element of the mirror head. The portion of the equipped vehicle that the mounting base is configured to attach at may comprise a portion of an in-cabin side of a front windshield of the equipped vehicle. A mirror mounting button is adhesively bonded to the portion of the in-cabin side of the vehicle windshield, and wherein the mounting base comprises a mirror attachment portion configured to mount the vehicular interior rearview mirror assembly to the mirror mounting button that is bonded to the vehicle windshield.

Optionally, the mounting base may accommodate a forward-viewing camera that, with the vehicular interior rearview mirror assembly mounted at the in-cabin side of the vehicle windshield, views forward of the equipped vehicle through the vehicle windshield. The forward-viewing camera captures image data for use by a driving assistance system of the equipped vehicle. The driving assistance system of the equipped vehicle processes image data captured by the forward-viewing camera for at least one selected from the group consisting of (i) lane detection, (ii) pedestrian detection, (iii) vehicle detection, (iv) collision avoidance, (v) adaptive cruise control (ACC), (vi) traffic sign recognition, (vii) traffic light detection and (viii) automatic headlamp control.

Optionally, the mounting base may accommodate a color camera that, with the vehicular interior rearview mirror assembly mounted at the in-cabin side of the vehicle windshield, views forward of the equipped vehicle through the vehicle windshield and captures image data for at least one selected from the group consisting of (i) an event recording system of the equipped vehicle and (ii) an augmented reality video display system of the equipped vehicle.

Optionally, the mounting base may accommodate at least one sensor that, with the vehicular interior rearview mirror assembly mounted at the in-cabin side of the vehicle windshield, has a field of sensing into the interior cabin of the equipped vehicle. The at least one sensor may comprise a radar sensor. The at least one sensor may comprise a lidar sensor. The at least one sensor may comprise an ultrasonic sensor.

Optionally, the mounting base may accommodate a camera that, with the vehicular interior rearview mirror assembly mounted at the in-cabin side of the vehicle windshield, has a field of view into the interior cabin of the equipped vehicle.

The DMS data processor may comprise an integrated circuit chip. The integrated circuit chip may comprise at least one 32-bit RISC ARM processor core. The integrated circuit chip may comprise at least one 64-bit RISC ARM processor core. The integrated circuit chip may have a computing speed of at least 0.1 trillion operations per second (TOPS). The integrated circuit chip may have a computing speed of at least 0.2 trillion operations per second (TOPS). The integrated circuit chip may have a computing speed of at least 0.5 trillion operations per second (TOPS). The integrated circuit chip may operate with a power consumption of less than 5 Watts. The integrated circuit chip may operate with a power consumption of less than 4 Watts. The integrated circuit chip may operate with a power consumption of less than 3 Watts. The integrated circuit chip may have a computing speed of at least 0.25 teraflops with a power consumption of less than 3 Watts.

The vehicular interior rearview mirror assembly may comprise an electrochromic interior rearview mirror assembly, wherein the interior mirror reflective element comprises an electrochromic interior mirror reflective element, and wherein the electrochromic interior mirror reflective element, when in a fully bleached state, has visible light transmission in a range of 20% T to 25% T and near-IR transmission around 940 nm of at least 65%, and wherein the imaging sensor comprises a backside Illumination (BSI) imaging sensor having a quantum efficiency (QE) of at least 22% for near-infrared (near-IR) light having a wavelength of 940 nm, and wherein the camera comprises at least a 2.3 megapixel imaging array and captures frames of image data at a frame capture rate of at least 60 frames per second, and wherein the data processor comprises an integrated circuit chip having a computing speed of at least 0.1 trillion operations per second (TOPS) and operates with a power consumption of less than 5 Watts.

The first near-IR illumination source may comprise at least one near-IR LED having a total radiant flux when powered of at least 2,000 mW, wherein the second near-IR illumination source may comprise at least one near-IR LED having a total radiant flux when powered of at least 2,000 mW, and the third near-IR illumination source may comprise at least one near-IR LED having a total radiant flux when powered of at least 2,000 mW. The first near-IR illumination source may comprise at least one near-IR LED having a total radiant flux when powered of at least 3,500 mW, wherein the second near-IR illumination source may comprise at least one near-IR LED having a total radiant flux when powered of at least 3,500 mW, and the third near-IR illumination source may comprise at least one near-IR LED having a total radiant flux when powered of at least 3,500 mW. The first near-IR illumination source may comprise at least two near-IR LEDs each having a total radiant flux when powered of at least 3,000 mW, wherein the second near-IR illumination source may comprise at least two near-IR LEDs each having a total radiant flux when powered of at least 3,000 mW, and the third near-IR illumination source may comprise at least two near-IR LEDs each having a total radiant flux when powered of at least 3,000 mW.

The first near-IR illumination source may comprise at least one near-IR emitting vertical-cavity surface-emitting lasers (VCSEL), and the second near-IR illumination source may comprise at least one near-IR emitting vertical-cavity surface-emitting lasers (VCSEL), and the third near-IR illumination source may comprise at least one near-IR emitting vertical-cavity surface-emitting lasers (VCSEL).

The electrochromic interior rearview mirror assembly may comprise a frameless electrochromic interior rearview mirror assembly. The frameless electrochromic interior rearview mirror assembly may comprise an Infinity™ electrochromic interior rearview mirror assembly. The frameless electrochromic interior rearview mirror assembly may comprise an EVO™ electrochromic interior rearview mirror assembly.

The vehicular interior rearview mirror assembly may comprise a prismatic interior rearview mirror assembly, wherein the interior mirror reflective element comprises an prismatic interior mirror reflective element, and wherein the prismatic interior mirror reflective element has visible light transmission in a range of 20% T to 25% T and near-IR transmission around 940 nm of at least 65%, and wherein the imaging sensor comprises a backside Illumination (BSI) imaging sensor having a quantum efficiency (QE) of at least 22% for near-infrared (near-IR) light having a wavelength of 940 nm, and wherein the camera comprises at least a 2.3 megapixel imaging array and captures frames of image data at a frame capture rate of at least 60 frames per second, and wherein the data processor comprises an integrated circuit chip having a computing speed of at least 0.1 trillion operations per second (TOPS) and operates with a power consumption of less than 5 Watts. The first near-IR illumination source may comprise at least one near-IR LED having a total radiant flux when powered of at least 2,000 mW, and the second near-IR illumination source may comprise at least one near-IR LED having a total radiant flux when powered of at least 2,000 mW, and the third near-IR illumination source may comprise at least one near-IR LED having a total radiant flux when powered of at least 2,000 mW. The first near-IR illumination source may comprise at least one near-IR LED having a total radiant flux when powered of at least 3,500 mW, and the second near-IR illumination source may comprise at least one near-IR LED having a total radiant flux when powered of at least 3,500 mW, and the third near-IR illumination source may comprise at least one near-IR LED having a total radiant flux when powered of at least 3,500 mW. The first near-IR illumination source may comprise at least two near-IR LEDs each having a total radiant flux when powered of at least 3,000 mW, and the second near-IR illumination source may comprise at least two near-IR LEDs each having a total radiant flux when powered of at least 3,000 mW, and the third near-IR illumination source may comprise at least two near-IR LEDs each having a total radiant flux when powered of at least 3,000 mW.

The first near-IR illumination source may comprise at least one near-IR emitting vertical-cavity surface-emitting lasers (VCSEL), and the second near-IR illumination source may comprise at least one near-IR emitting vertical-cavity surface-emitting lasers (VCSEL), and the third near-IR illumination source may comprise at least one near-IR emitting vertical-cavity surface-emitting lasers (VCSEL).

The prismatic interior rearview mirror assembly may comprise a frameless prismatic interior rearview mirror assembly. The frameless prismatic interior rearview mirror assembly may comprise an Infinity™ prismatic interior rearview mirror assembly. The frameless prismatic interior rearview mirror assembly may comprise an EVO™ prismatic interior rearview mirror assembly.

With the vehicular interior rearview mirror assembly mounted in a left hand drive (LHD) vehicle, the second near-IR illumination source may comprise (i) a circuit board and (ii) a reflector surface-mounted at the circuit board and configured to concentrate near-IR light emitted by the second near-IR illumination source toward the front seat region at the left-hand side of the equipped LHD vehicle. When the first near-IR illumination source and the second near-IR illumination source are powered and with the third near-IR illumination source not powered, the first and second near-IR illumination sources may provide near-IR irradiance of at least 1 W/m$^2$ at the eyes of the driver seated in the front seat region at the left-hand side of the equipped LHD vehicle. When the first near-IR illumination source and the second near-IR illumination source are powered and with the third near-IR illumination source not powered, the first and second near-IR illumination sources may provide near-IR irradiance of at least 1.8 W/m$^2$ at the eyes of the driver seated in the front seat region at the left-hand side of the equipped LHD vehicle. When the first near-IR illumination source and the second near-IR illumination source are powered and with the third near-IR illumination source not powered, the first and second near-IR illumination sources may provide near-IR irradiance of at least 2 W/m$^2$ at the eyes of the driver seated in the front seat region at the left-hand side of the equipped LHD vehicle. When the first near-IR illumination source and the second near-IR illumination source are powered and with the third near-IR illumination source not powered, the first and second near-IR illumination sources may provide near-IR irradiance of at least 2.3 W/m$^2$ at the eyes of the driver seated in the front seat region at the left-hand side of the equipped LHD vehicle. When the first near-IR illumination source and the second near-IR illumination source are powered and with the third near-IR illumination source not powered, the first and second near-IR illumination sources may provide near-IR irradiance of at least 2.5 W/m$^2$ at the eyes of the driver seated in the front seat region at the left-hand side of the equipped LHD vehicle.

With the vehicular interior rearview mirror assembly mounted in a right hand drive (RHD) vehicle, the third near-IR illumination source may comprise (i) a circuit board and (ii) a reflector surface-mounted at the circuit board and configured to concentrate near-IR light emitted by the third near-IR illumination source toward the front seat region at the right-hand side of the equipped RHD vehicle. When the first near-IR illumination source and the third near-IR illumination source are powered and with the second near-IR illumination source not powered, the first and third near-IR illumination sources may provide near-IR irradiance of at least 1 W/m$^2$ at the eyes of the driver seated in the front seat region at the right-hand side of the equipped RHD vehicle. When the first near-IR illumination source and the third near-IR illumination source are powered and with the second near-IR illumination source not powered, the first and third near-IR illumination sources may provide near-IR irradiance of at least 1.8 W/m² at the eyes of the driver seated in the front seat region at the right-hand side of the equipped RHD vehicle. When the first near-IR illumination source and the third near-IR illumination source are powered and with the second near-IR illumination source not powered, the first and third near-IR illumination sources may provide near-IR irradiance of at least 2 W/m² at the eyes of the driver seated in the front seat region at the right-hand side of the equipped RHD vehicle. When the first near-IR illumination source and the third near-IR illumination source are powered and with the second near-IR illumination source not powered, the first and third near-IR illumination sources may provide near-IR irradiance of at least 2.3 W/m² at the eyes of the driver seated in the front seat region at the right-hand side of the equipped RHD vehicle. When the first near-IR illumination source and the third near-IR illumination source are powered and with the second near-IR illumination source not powered, the first and third near-IR illumination sources may provide near-IR irradiance of at least 2.5 W/m² at the eyes of the driver seated in the front seat region at the right-hand side of the equipped RHD vehicle.

With the vehicular interior rearview mirror assembly attached at the interior portion of the equipped vehicle and when the DMS data processor is operating to provide the occupant detection function, the first, second and third near-IR illumination sources are powered and may provide near-IR irradiance at a front seating region of the equipped vehicle of at least 0.15 W/m². With the vehicular interior rearview mirror assembly attached at the interior portion of the equipped vehicle and when the DMS data processor is operating to provide the occupant detection function, the first, second and third near-IR illumination sources are powered and may provide near-IR irradiance at a front seating region of the equipped vehicle of at least 0.25 W/m². With the vehicular interior rearview mirror assembly attached at the interior portion of the equipped vehicle and when the DMS data processor is operating to provide the occupant detection function, the first, second and third near-IR illumination sources are powered and may provide near-IR irradiance at a front seating region of the equipped vehicle of at least 0.4 W/m².

With the vehicular interior rearview mirror assembly attached at the interior portion of the equipped vehicle and when the DMS data processor is operating to provide the occupant detection function, the first, second and third near-IR illumination sources are powered and may provide near-IR irradiance at a rear seating region of the equipped vehicle of at least 0.1 W/m². With the vehicular interior rearview mirror assembly attached at the interior portion of the equipped vehicle and when the DMS data processor is operating to provide the occupant detection function, the first, second and third near-IR illumination sources are powered and may provide near-IR irradiance at a rear seating region of the equipped vehicle of at least 0.1 W/m². With the vehicular interior rearview mirror assembly attached at the interior portion of the equipped vehicle and when the DMS data processor is operating to provide the occupant detection function, the first, second and third near-IR illumination sources are powered and may provide near-IR irradiance at a rear seating region of the equipped vehicle of at least 0.2 W/m².

The mirror transflector comprises a multilayer stack formed by a plurality of thin film coating layers coated onto a planar glass surface of a glass substrate of the interior mirror reflective element, wherein the plurality of thin film coating layers comprises repeating alternating layers of a higher refractive index layer having a first refractive index and a lower refractive index layer having a second refractive index, wherein the first refractive index may be bigger than the second refractive index by at least 0.5. The first refractive index may be bigger than the second refractive index by at least 0.7. The first refractive index may be greater than 2. The first refractive index may be less than 1.5.

The higher refractive index layer may comprise a metal oxide thin film coating. The higher refractive index layer may comprise a metal oxide of niobium thin film coating. The higher refractive index layer may comprise a metal oxide of titanium thin film coating. The higher refractive index layer may comprise a semiconductor metal thin film coating. The semiconductor metal may have a refractive index of at least 2.4. The semiconductor metal may be silicon. The semiconductor metal may be germanium.

The lower refractive index layer may comprise a metal oxide thin film coating. The lower refractive index layer may comprise a metal oxide thin film coating. The lower refractive index layer may comprise a metal oxide of silicon thin film coating. The mirror transflector may comprise at least one silicon thin film coating layer. The plurality of thin film coating layers may comprise at least five (5) thin film coating layers. The plurality of thin film coating layers may comprise at least seven (7) thin film coating layers. The plurality of thin film coating layers may comprise at least ten (10) thin film coating layers.

The multilayer stack forming the mirror transflector comprises an innermost thin film coating that is closest to the planar glass surface of the glass substrate and comprises an outermost thin film coating that is farthest from the planar glass surface of the glass substrate. The innermost thin film coating that is closest to the planar glass surface of the glass substrate may comprise a metal oxide thin film coating having the first refractive index. The innermost thin film coating that is closest to the planar glass surface of the glass substrate may comprise an oxide of niobium thin film coating. The innermost thin film coating that is closest to the planar glass surface of the glass substrate may comprise an oxide of titanium thin film coating. The innermost thin film coating that is closest to the planar glass surface of the glass substrate may have a higher refractive index than the next closest thin film coating to the planar glass surface of the glass substrate. The next closest thin film coating thin film may comprise a metal oxide thin film coating having the second refractive index. The next thin film coating may comprise an oxide of silicon thin film coating.

The outermost thin film coating that is farthest from the planar glass surface of the glass substrate may comprise a thin film coating having a third refractive index higher than the first refractive index. The third refractive index may be higher than the first refractive index by at least 0.15. The third refractive index may be higher than the first refractive index by at least 0.2.

The outermost thin film coating that is farthest from the planar glass surface of the glass substrate may comprise a transparent electrically conductive thin film coating having the refractive index higher than the refractive index of the layer of the multilayer stack it is coated onto. The transparent electrically conductive thin film coating may comprise a layer of indium tin oxide (ITO). The layer of indium tin oxide (ITO) may have sheet resistance less than 20 ohms/ square. The glass substrate may be heated to a temperature of at least 250 degrees Celsius during deposition of the layer of indium tin oxide (ITO).

The interior mirror reflective element may comprise an electrochromic interior mirror reflective element having a front glass substrate and a rear glass substrate, wherein the rear glass substrate comprises the glass substrate coated with the mirror transflector, and wherein a planar rear surface of the front glass substrate has a transparent electrically conductive coating disposed thereat, and wherein a planar front surface of the rear glass substrate has the mirror transflector disposed thereat, and wherein an electrochromic medium is disposed between and contacts the transparent electrically conductive coating disposed at the planar rear surface of the front glass substrate and the mirror transflector disposed at the planar front surface of the rear glass substrate. The vehicular interior rearview mirror assembly may comprise a vehicular EVO™ interior rearview mirror assembly. The rear glass substrate may have a plate thickness of around 1.6 mm or less. A housing portion of a mirror housing of the mirror head circumscribes a perimeter edge of the front glass substrate, wherein the housing portion has a rounded exterior surface that provides a curved transition between the planar front surface of the front glass substrate and an outer surface of a wall portion of the mirror housing of the mirror head.

The vehicular interior rearview mirror assembly may comprise a frameless interior rearview mirror assembly. The rear glass substrate may have a plate thickness of around 1.6 mm or less.

The vehicular interior rearview mirror assembly may comprise a vehicular Infinity™ interior rearview mirror assembly. The front glass substrate comprises an exposed rounded perimeter edge having a radius of curvature of at least 2.5 mm, wherein the exposed rounded perimeter edge provides a curved transition between the planar front surface of the front glass substrate and an outer surface of a wall portion of a mirror housing of the mirror head. The front glass substrate may be at least around 2 mm thick. The front glass substrate may have an exposed rounded perimeter edge having a radius of curvature of at least 2.5 mm. The exposed rounded perimeter edge provides a curved transition between the planar front surface of the front glass substrate and an outer surface of a wall portion of a mirror housing of the mirror head. The front glass substrate may comprise low-iron (low-Fe) soda lime glass.

The layers of the mirror transflector may be deposited onto the glass substrate using mid-frequency AC sputtering. The thin film coating layers of the mirror transflector may be deposited onto the glass substrate using mid-frequency AC sputtering in a multi-station/multi-target in-line sputter deposition process. The layers of the mirror transflector may be deposited onto the glass substrate in a batch vacuum deposition chamber.

The vehicular interior rearview mirror assembly may comprise a vehicular electrochromic interior rearview mirror assembly, wherein the interior mirror reflective element comprises an electrochromic interior mirror reflective element having a front planar glass substrate and a rear planar glass substrate, and wherein the front planar glass substrate comprises a first planar glass surface separated from a second planar glass surface by a plate thickness dimension of the front planar glass substrate, and wherein the rear planar glass substrate comprises a third planar glass surface separated from a fourth planar glass surface by a plate thickness dimension of the rear planar glass substrate, and wherein the second planar glass surface of the front planar glass substrate has a transparent electrically conductive coating disposed thereat, and wherein the third planar glass surface of the rear planar glass substrate has a transparent electrically conductive coating disposed thereat, and wherein an electrochromic medium is disposed between and contacts the transparent electrically conductive coating disposed at the second planar glass surface of the front planar glass substrate and the transparent electrically conductive coating disposed at the third planar glass surface of the rear planar glass substrate, and wherein the mirror transflector is disposed at the fourth planar glass surface of the rear glass substrate.

The transparent electrically conductive thin film coating disposed at the second planar glass surface of the front planar glass substrate may comprise a layer of indium tin oxide (ITO), and the transparent electrically conductive thin film coating disposed at the third planar glass surface of the rear planar glass substrate may comprise a layer of indium tin oxide (ITO). The layer of indium tin oxide (ITO) disposed at the second planar glass surface of the front planar glass substrate may have sheet resistance less than 20 ohms/square and wherein the layer of indium tin oxide (ITO) disposed at the third planar glass surface of the rear planar glass substrate may have sheet resistance less than 20 ohms/square. The mirror transflector disposed at the fourth planar glass surface of the rear planar glass substrate may comprise a multilayer stack formed by a plurality of thin film coating layers. The mirror transflector may comprise at least one silicon layer. The plurality of thin film coating layers may comprise repeating alternating layers of a higher refractive index layer and a lower refractive index layer, wherein the higher refractive index layers may have a refractive index greater than 2 and the lower refractive index layers may have a refractive index less than 1.5. The lower refractive index layers may comprise silicon oxide layers. The higher refractive index layers may comprise titanium oxide layers. The higher refractive index layers may comprise niobium oxide layers. The plurality of thin film coating layers may comprise at least five (5) layers. The plurality of thin film coating layers may comprise at least seven (7) layers.

The vehicular electrochromic interior rearview mirror assembly may comprise a frameless vehicular electrochromic interior rearview mirror assembly. The frameless vehicular electrochromic interior rearview mirror assembly may comprise an Infinity™ frameless vehicular electrochromic interior rearview mirror assembly. The electrochromic interior mirror reflective element of the Infinity™ vehicular electrochromic interior rearview mirror assembly comprises a front planar substrate having a plate thickness at least around 2 mm and a rear planar substrate having a plate thickness around 1.6 mm or less. The electrochromic interior mirror reflective element of the Infinity™ vehicular electrochromic interior rearview mirror assembly may comprise a front planar substrate formed of low-iron (low-Fe) glass.

The frameless vehicular electrochromic interior rearview mirror assembly may comprise an EVO™ frameless vehicular electrochromic interior rearview mirror assembly. The electrochromic interior mirror reflective element of the EVO™ vehicular electrochromic interior rearview mirror assembly comprises a front planar substrate having a plate thickness around 1.6 mm or less and a rear planar substrate having a plate thickness around 1.6 mm or less.

The vehicular interior rearview mirror assembly may comprise a vehicular prismatic interior rearview mirror assembly, wherein the interior mirror reflective element comprises a prismatic interior mirror reflective element, and wherein the prismatic interior mirror reflective element comprises a glass substrate, and wherein the glass substrate has a wedge-shaped cross-section having a first planar glass surface separated from a second planar glass surface, and wherein the plane of first planar glass surface slopes at an angle relative to the plane of the second planar glass surface, and wherein the second planar glass surface is an uncoated glass surface, and wherein the mirror transflector is disposed at the second planar glass surface of the glass substrate of the prismatic interior mirror reflective element.

The mirror transflector disposed at the second planar glass surface of the glass substrate may comprise a multilayer stack formed by a plurality of thin film coating layers. The mirror transflector may comprise at least one silicon layer. The plurality of thin film coating layers may comprise repeating alternating layers of a higher refractive index layer and a lower refractive index layer, wherein the higher refractive index layers may have a refractive index greater than 2 and the lower refractive index layers may have a refractive index less than 1.5. The lower refractive index layers may comprise silicon oxide layers. The higher refractive index layers may comprise titanium oxide layers. The higher refractive index layers may comprise niobium oxide layers. The plurality of thin film coating layers may comprise at least seven (7) layers.

The plurality of thin film coating layers may comprise at least five (5) layers, wherein the vehicular prismatic interior rearview mirror assembly comprises a frameless vehicular prismatic interior rearview mirror assembly. The frameless vehicular prismatic interior rearview mirror assembly may comprise an Infinity™ frameless vehicular prismatic interior rearview mirror assembly, and the glass substrate of the prismatic interior mirror reflective element of the Infinity™ vehicular prismatic interior rearview mirror assembly may be formed of low-iron (low-Fe) glass. The frameless vehicular prismatic interior rearview mirror assembly may comprise an EVO™ frameless vehicular prismatic interior rearview mirror assembly, and the glass substrate of the prismatic interior mirror reflective element of the EVO™ vehicular prismatic interior rearview mirror assembly may be formed of low-iron (low-Fe) glass.

The third angle (of the third near-IR illumination source relative to the planar front surface of the interior mirror reflective element) may be a different angle than the second angle (of the second near-IR illumination source relative to the planar front surface of the interior mirror reflective element). The third angle (of the third near-IR illumination source relative to the planar front surface of the interior mirror reflective element) may be the same angle as the second angle (of the second near-IR illumination source relative to the planar front surface of the interior mirror reflective element) but in a laterally opposite direction from the second angle.

The mirror transflector comprises a multi-layer stack of thin film coatings, and wherein total physical stack thickness of the mirror transflector may be less than 1,500 nm, such as less than 1,000 nm. For example, the multi-layer stack of thin film coatings of the mirror transflector may have total physical stack thickness of less than 750 nm.

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:
   an interior rearview mirror head adjustably disposed at a mounting base that is configured to attach the vehicular interior rearview mirror assembly at an interior portion of a vehicle equipped with the vehicular interior rearview mirror assembly;
   wherein the interior rearview mirror head accommodates an interior rearview mirror reflective element;
   wherein the interior rearview mirror reflective element comprises a planar transparent glass substrate having a planar first glass surface and an opposing planar second glass surface that is separated from the planar first glass surface of the planar transparent glass substrate by a thickness dimension of the planar transparent glass substrate;
   a mirror transflector disposed at one selected from the group consisting of (i) the planar first glass surface of the planar transparent glass substrate and (ii) the planar second glass surface of the planar transparent glass substrate;
   wherein the mirror transflector transmits near infrared (near-IR) light incident thereon, transmits visible light incident thereon and reflects visible light incident thereon;
   wherein near-IR light transmission at 940 nm of the interior rearview mirror reflective element is at least 50% of near-IR light at 940 nm incident thereon;
   wherein visible light transmission in the 380-750 nm spectral region of the interior rearview mirror reflective element is at least 15% of visible light in the 380-750 nm spectral region incident thereon;
   wherein visible light transmission in the 380-750 nm spectral region of the interior rearview mirror reflective element is less than 35% of visible light in the 380-750 nm spectral region incident thereon;
   wherein visible light reflectivity of the interior rearview mirror reflective element (as measured in accordance with SAE J964a) is at least 40% of visible light incident thereon;
   wherein the mirror transflector comprises a multilayer stack formed by a plurality of thin film coating layers;
   wherein the multilayer stack comprises repeating alternating layers of a higher refractive index layer and a lower refractive index layer;
   wherein the higher refractive index layer has a refractive index greater than 2 and the lower refractive index layer has a refractive index less than 1.5;
   wherein the refractive index of the higher refractive index layer is bigger than the refractive index of the lower refractive index layer by at least 0.5;
   wherein the plurality of thin film coating layers comprises at least five thin film coating layers;
   wherein the plurality of thin film coating layers of the mirror transflector comprises an innermost thin film coating layer that is closest to the planar glass surface of the planar transparent glass substrate at which the mirror transflector is disposed;
   wherein the multilayer stack forming the mirror transflector comprises an outermost thin film coating layer that is farthest from the planar glass surface of the planar transparent glass substrate at which the mirror transflector is disposed;
   wherein the innermost thin film coating layer of the plurality of thin film coating layers of the mirror transflector that is closest to the planar glass surface of the planar transparent glass substrate at which the mirror transflector is disposed comprises the higher refractive index layer;

wherein the next closest thin film coating layer to the planar glass surface of the planar transparent glass substrate at which the mirror transflector is disposed comprises the lower refractive index layer;

a megapixel camera disposed within the interior rearview mirror head behind the interior rearview mirror reflective element;

wherein the megapixel camera comprises an imaging sensor, the imaging sensor comprising a CMOS imaging array having at least one million photosensor elements arranged in rows and columns;

wherein the megapixel camera views through the mirror transflector of the interior rearview mirror reflective element;

wherein the megapixel camera is operable to capture frames of image data at a frame capture rate of at least 60 frames per second;

electronic circuitry disposed within the interior rearview mirror head behind the interior rearview mirror reflective element;

wherein the electronic circuitry comprises a data processor;

wherein the data processor comprises an integrated circuit chip operable to process image data captured by the megapixel camera;

wherein a near infrared illumination source is disposed within the interior rearview mirror head behind the interior rearview mirror reflective element;

wherein the near infrared illumination source, when powered, emits near infrared light that passes through the mirror transflector of the interior rearview mirror reflective element;

wherein the interior rearview mirror reflective element and the megapixel camera and the near infrared illumination source and the electronic circuitry move in tandem with the interior rearview mirror head when, with the vehicular interior rearview mirror assembly attached at the interior portion of the equipped vehicle, the interior rearview mirror head is adjusted by a driver of the equipped vehicle to set a rearward view of the interior rearview mirror reflective element for the driver;

wherein, with the vehicular interior rearview mirror assembly attached at the interior portion of the equipped vehicle and with the interior rearview mirror head adjusted by the driver to set the rearward view of the interior rearview mirror reflective element for the driver, (i) the megapixel camera views at least the eyes of the driver of the equipped vehicle when the driver is seated at a front driver seat region of the equipped vehicle and (ii) the near infrared illumination source, when powered to emit near infrared light, illuminates at least the eyes of the driver of the equipped vehicle when the driver is seated at the front driver seat region of the equipped vehicle;

wherein, with the vehicular interior rearview mirror assembly attached at the interior portion of the equipped vehicle and responsive at least in part to the data processor processing captured image data, at least one selected from the group consisting of (i) driver attentiveness is monitored, (ii) driver drowsiness is monitored and (iii) driver gaze direction is monitored;

wherein a heatsink is thermally conductively connected to heat generating components of the electronic circuitry disposed within the interior rearview mirror head behind the interior rearview mirror reflective element; and wherein, with the vehicular interior rearview mirror assembly attached at the interior portion of the equipped vehicle and with the data processor processing captured image data, any surface of the interior rearview mirror head touchable by the driver of the equipped vehicle is at a temperature below 60 degrees Celsius.

2. The vehicular interior rearview mirror assembly of claim 1, wherein thermal interface material is disposed between the heatsink and the integrated circuit chip of the data processor.

3. The vehicular interior rearview mirror assembly of claim 2, wherein the thermal interface material has thermal conductivity of greater than 2 W/m-K.

4. The vehicular interior rearview mirror assembly of claim 3, wherein the thermal interface material has thermal conductivity of greater than 4 W/m-K.

5. The vehicular interior rearview mirror assembly of claim 1, wherein the near infrared illumination source comprises at least one near-IR light emitting diode (LED).

6. The vehicular interior rearview mirror assembly of claim 5, wherein the at least one near-IR LED comprises a near-IR LED operable to emit a total radiant flux of at least 2,000 mW when electrically powered.

7. The vehicular interior rearview mirror assembly of claim 1, wherein the mirror transflector is disposed at the planar first glass surface of the planar transparent glass substrate, and wherein the interior rearview mirror reflective element comprises an interior rearview mirror electrochromic reflective element having a front transparent glass substrate and a rear transparent glass substrate, and wherein the rear transparent glass substrate of the interior rearview mirror electrochromic reflective element comprises the planar transparent glass substrate having the mirror transflector disposed at the planar first glass surface thereof, and wherein a planar rear surface of the front transparent glass substrate of the interior rearview mirror electrochromic reflective element has a transparent electrically conductive thin film coating layer disposed thereat, and wherein an electrochromic medium is disposed in a space between the front and rear transparent glass substrates of the interior rearview mirror electrochromic reflective element and contacts the transparent electrically conductive thin film coating layer disposed at the planar rear surface of the front transparent glass substrate and contacts the mirror transflector disposed at the planar first glass surface of the planar transparent glass substrate.

8. The vehicular interior rearview mirror assembly of claim 7, wherein the plurality of thin film coating layers forming the multilayer stack comprises at least seven thin film coating layers, and wherein the outermost thin film coating layer that is farthest from the planar first glass surface of the planar transparent glass substrate comprises a transparent electrically conductive thin film coating layer having a refractive index higher than the refractive index of the layer of the multilayer stack it is coated onto.

9. The vehicular interior rearview mirror assembly of claim 8, wherein the sheet resistance of the transparent electrically conductive thin film coating layer comprising the outermost layer of the multilayer stack is less than 20 ohms per square.

10. The vehicular interior rearview mirror assembly of claim 8, wherein the sheet resistance of the transparent electrically conductive thin film coating layer comprising the outermost layer of the multilayer stack is less than 30 ohms per square.

11. The vehicular interior rearview mirror assembly of claim 10, wherein the transparent electrically conductive thin film coating layer that is farthest from the planar first glass surface of the planar transparent glass substrate comprises a layer of indium tin oxide (ITO).

12. The vehicular interior rearview mirror assembly of claim 11, wherein the innermost thin film coating layer that is closest to the planar first glass surface of the planar transparent glass substrate and that has a higher refractive index than the next closest thin film coating layer to the planar first glass surface of the planar transparent glass substrate comprises an oxide of niobium, and wherein the next closest thin film coating layer to the planar first glass surface of the planar transparent glass substrate comprises an oxide of silicon.

13. The vehicular interior rearview mirror assembly of claim 10, wherein the interior rearview mirror electrochromic reflective element, when in its non-dimmed bleached state, has a visible light transmission in the 380-750 nm spectral region of at least 20% T.

14. The vehicular interior rearview mirror assembly of claim 13, wherein the interior rearview mirror electrochromic reflective element, when in its non-dimmed bleached state, has a visible light transmission in the 380-750 nm spectral region not exceeding 30% T.

15. The vehicular interior rearview mirror assembly of claim 14, wherein the interior rearview mirror electrochromic reflective element, when in its non-dimmed bleached state, has a visible light reflectivity (measured per SAE J964a) of at least 43% R.

16. The vehicular interior rearview mirror assembly of claim 15, wherein the interior rearview mirror electrochromic reflective element, when in its non-dimmed bleached state, has a visible light reflectivity (measured per SAE J964a) of at least 55% R.

17. The vehicular interior rearview mirror assembly of claim 15, wherein the interior rearview mirror electrochromic reflective element, when in its non-dimmed bleached state, has near infrared transmission at 940 nm of at least 60% T.

18. The vehicular interior rearview mirror assembly of claim 15, wherein the interior rearview mirror electrochromic reflective element, when in its fully dimmed state, has near infrared transmission at 940 nm of at least 50% T.

19. The vehicular interior rearview mirror assembly of claim 15, wherein the interior rearview mirror electrochromic reflective element, when in its non-dimmed bleached state, has near infrared transmission at 940 nm of at least 50% T.

20. The vehicular interior rearview mirror assembly of claim 19, wherein the vehicular interior rearview mirror assembly comprises a frameless interior rearview mirror assembly.

21. The vehicular interior rearview mirror assembly of claim 20, wherein the vehicular mirror assembly.

22. The vehicular interior rearview mirror assembly of claim 20, wherein the vehicular interior rearview mirror assembly comprises a frameless EVO™ interior rearview mirror assembly.

23. The vehicular interior rearview mirror assembly of claim 20, wherein, with the vehicular interior rearview mirror assembly attached at the interior portion of the equipped vehicle and with the data processor processing captured image data, any surface of the interior rearview mirror head touchable by the driver of the equipped vehicle is at a temperature below 50 degrees Celsius.

24. The vehicular interior rearview mirror assembly of claim 1, comprising a reflector configured to concentrate near infrared light emitted by the near infrared illumination source toward the front driver seat region when the vehicular interior rearview mirror assembly is attached at the interior portion of the equipped vehicle.

25. The vehicular interior rearview mirror assembly of claim 1, wherein the thin film coating layers of the plurality of thin film coating layers of the mirror transflector are deposited onto the planar transparent glass substrate of the interior rearview mirror reflective element using mid-frequency AC sputtering in a multi-station/multi-target in-line sputter deposition process.

26. The vehicular interior rearview mirror assembly of claim 1, wherein the plurality of thin film coating layers comprises at least five layers of an oxide of niobium alternating with at least five layers of an oxide of silicon.

27. The vehicular interior rearview mirror assembly of claim 1, comprising at least one filter at the near infrared illumination source that transmits near infrared light at 940 nm and attenuates visible light in the 380-750 nm spectral region.

28. The vehicular interior rearview mirror assembly of claim 1, wherein the imaging sensor comprises a backside Illumination (BSI) imaging sensor.

29. The vehicular interior rearview mirror assembly of claim 28, wherein the CMOS imaging array having at least one million photosensor elements arranged in rows and columns has at least 3 million photosensor elements.

30. The vehicular interior rearview mirror assembly of claim 28, wherein the CMOS imaging array having at least one million photosensor elements arranged in rows and columns has at least 5 million photosensor elements.

31. The vehicular interior rearview mirror assembly of claim 1, wherein the interior portion of the equipped vehicle at which the mounting base of the vehicular interior rearview mirror assembly is configured to attach comprises a portion of an in-cabin side of a windshield of the equipped vehicle.

32. The vehicular interior rearview mirror assembly of claim 1, wherein the interior rearview mirror reflective element comprises an interior rearview mirror prismatic reflective element, and wherein the interior rearview mirror prismatic reflective element comprises the planar transparent glass substrate having the planar first glass surface and the opposing planar second glass surface, and wherein the planar transparent glass substrate has a wedge-shaped cross-section, and wherein the plane of the planar first glass surface slopes at an angle relative to the plane of the planar second glass surface, and wherein the planar first glass surface is an uncoated glass surface, and wherein the mirror transflector is disposed at the planar second glass surface of the planar transparent glass substrate of the interior rearview mirror prismatic reflective element.

33. The vehicular interior rearview mirror assembly of claim 32, wherein the interior rearview mirror prismatic reflective element has a near infrared transmission at 940 nm of at least 65% T.

34. The vehicular interior rearview mirror assembly of claim 33, wherein the vehicular interior rearview mirror assembly comprises a frameless interior rearview mirror assembly.

35. The vehicular interior rearview mirror assembly of claim 34, wherein the vehicular interior rearview mirror assembly comprises a frameless INFINITY™ interior rearview mirror assembly.

36. The vehicular interior rearview mirror assembly of claim 34, wherein the vehicular interior rearview mirror assembly comprises a frameless EVO™ interior rearview mirror assembly.

37. The vehicular interior rearview mirror assembly of claim 1, wherein a heat dissipating element disposed within the interior rearview mirror head functions to limit electromagnetic radiation interference with (i) the megapixel camera, (ii) the near infrared illumination source and (iii) the data processor.

38. The vehicular interior rearview mirror assembly of claim 37, wherein the interior rearview mirror reflective element comprises a mirror attachment plate, and wherein the interior rearview mirror reflective element is attached at the mirror attachment plate.

39. The vehicular interior rearview mirror assembly of claim 38, wherein the heat dissipating element is attached at the mirror attachment plate.

40. A vehicular interior rearview mirror assembly, the vehicular interior rearview mirror assembly comprising:
   an interior rearview mirror head adjustably disposed at a mounting base that is configured to attach the vehicular interior rearview mirror assembly at an interior portion of a vehicle equipped with the vehicular interior rearview mirror assembly;
   wherein the interior rearview mirror head accommodates an interior rearview mirror electrochromic reflective element;
   wherein the interior rearview mirror electrochromic reflective element comprises a front transparent glass substrate having a planar first glass surface and an opposing planar second glass surface that is separated from the planar first glass surface of the front transparent glass substrate by a thickness dimension of the front transparent glass substrate;
   wherein the interior rearview mirror electrochromic reflective element comprises a rear transparent glass substrate having a planar third glass surface and an opposing planar fourth glass surface that is separated from the planar third glass surface of the rear transparent glass substrate by a thickness dimension of the rear transparent glass substrate;
   a transparent electrically conductive thin film coating layer disposed at the planar second glass surface of the front transparent glass substrate;
   a mirror transflector disposed at the planar third glass surface of the rear transparent glass substrate;
   wherein the mirror transflector transmits near infrared (near-IR) light incident thereon, transmits visible light incident thereon and reflects visible light incident thereon;
   an electrochromic medium disposed in a space between the front and rear transparent glass substrates of the interior rearview mirror electrochromic reflective element;
   wherein the electrochromic medium contacts the transparent electrically conductive thin film coating layer disposed at the planar second glass surface of the front transparent glass substrate;
   wherein the electrochromic medium contacts the mirror transflector disposed at the planar third glass surface of the rear transparent glass substrate;
   wherein, when in its non-dimmed bleached state, near-IR light transmission at 940 nm of the interior rearview mirror electrochromic reflective element is at least 50% of near-IR light at 940 nm incident thereon;
   wherein, when in its non-dimmed bleached state, visible light transmission in the 380-750 nm spectral region of the interior rearview mirror electrochromic reflective element is at least 15% of visible light in the 380-750 nm spectral region incident thereon;
   wherein, when in its non-dimmed bleached state, visible light transmission in the 380-750 nm spectral region of the interior rearview mirror electrochromic reflective element is less than 35% of visible light in the 380-750 nm spectral region incident thereon;
   wherein, when in its non-dimmed bleached state, visible light reflectivity of the interior rearview mirror electrochromic reflective element (as measured in accordance with SAE J964a) is at least 40% of visible light incident thereon;
   wherein the mirror transflector comprises a multilayer stack formed by a plurality of thin film coating layers;
   wherein the multilayer stack comprises repeating alternating layers of a higher refractive index layer and a lower refractive index layer;
   wherein the plurality of thin film coating layers comprises at least seven thin film coating layers;
   wherein the plurality of thin film coating layers of the mirror transflector comprises an innermost thin film coating layer that is closest to the planar third glass surface of the rear transparent glass substrate at which the mirror transflector is disposed;
   wherein the innermost thin film coating layer of the plurality of thin film coating layers of the mirror transflector that is closest to the planar third glass surface of the rear transparent glass substrate at which the mirror transflector is disposed comprises the higher refractive index layer;
   wherein the next closest thin film coating layer to the planar third glass surface of the rear transparent glass substrate at which the mirror transflector is disposed comprises the lower refractive index layer;
   wherein the multilayer stack forming the mirror transflector comprises an outermost thin film coating layer that is farthest from the planar third glass surface of the rear transparent glass substrate at which the mirror transflector is disposed;
   wherein the outermost thin film coating layer that is farthest from the planar third glass surface of the rear transparent glass substrate at which the mirror transflector is disposed comprises a transparent electrically conductive thin film coating layer having a refractive index higher than the refractive index of the layer of the multilayer stack it is coated onto;
   wherein the sheet resistance of the transparent electrically conductive thin film coating layer comprising the outermost layer of the multilayer stack is less than 30 ohms per square;
   a megapixel camera disposed within the interior rearview mirror head behind the interior rearview mirror electrochromic reflective element;
   wherein the megapixel camera comprises an imaging sensor, the imaging sensor comprising a CMOS imaging array having at least one million photosensor elements arranged in rows and columns;
   wherein the megapixel camera views through the mirror transflector of the interior rearview mirror electrochromic reflective element;

wherein the megapixel camera is operable to capture frames of image data at a frame capture rate of at least 60 frames per second;

electronic circuitry disposed within the interior rearview mirror head behind the interior rearview mirror electrochromic reflective element;

wherein the electronic circuitry comprises a data processor;

wherein the data processor comprises an integrated circuit chip operable to process image data captured by the megapixel camera;

wherein the electronic circuitry comprises circuitry operable to electrically dim the interior rearview mirror electrochromic reflective element from its non-dimmed bleached high reflectivity state to a dimmed lower reflectivity state;

wherein a near infrared illumination source is disposed within the interior rearview mirror head behind the interior rearview mirror electrochromic reflective element;

wherein the near infrared illumination source, when powered, emits near infrared light that passes through the mirror transflector of the interior rearview mirror electrochromic reflective element;

wherein the interior rearview mirror electrochromic reflective element and the megapixel camera and the near infrared illumination source and the electronic circuitry move in tandem with the interior rearview mirror head when, with the vehicular interior rearview mirror assembly attached at the interior portion of the equipped vehicle, the interior rearview mirror head is adjusted by a driver of the equipped vehicle to set a rearward view of the interior rearview mirror electrochromic reflective element for the driver;

wherein, with the vehicular interior rearview mirror assembly attached at the interior portion of the equipped vehicle and with the interior rearview mirror head adjusted by the driver to set the rearward view of the interior rearview mirror electrochromic reflective element for the driver, (i) the megapixel camera views at least the eyes of the driver of the equipped vehicle when the driver is seated at a front driver seat region of the equipped vehicle and (ii) the near infrared illumination source, when powered to emit near infrared light, illuminates at least the eyes of the driver of the equipped vehicle when the driver is seated at the front driver seat region of the equipped vehicle; and wherein, with the vehicular interior rearview mirror assembly attached at the interior portion of the equipped vehicle and responsive at least in part to the data processor processing captured image data, at least one selected from the group consisting of (i) driver attentiveness is monitored, (ii) driver drowsiness is monitored and (iii) driver gaze direction is monitored.

41. The vehicular interior rearview mirror assembly of claim 40, wherein the sheet resistance of the transparent electrically conductive thin film coating layer comprising the outermost layer of the multilayer stack is less than 30 ohms per square.

42. The vehicular interior rearview mirror assembly of claim 41, wherein the sheet resistance of the transparent electrically conductive thin film coating layer comprising the outermost layer of the multilayer stack is less than 20 ohms per square.

43. The vehicular interior rearview mirror assembly of claim 41, wherein the transparent electrically conductive thin film coating layer that is farthest from the planar third glass surface of the rear transparent glass substrate comprises a layer of indium tin oxide (ITO).

44. The vehicular interior rearview mirror assembly of claim 41, wherein the innermost thin film coating layer that is closest to the planar third glass surface of the rear transparent glass substrate and that has a higher refractive index than the next closest thin film coating layer to the planar third glass surface of the rear transparent glass substrate comprises an oxide of niobium, and wherein the next closest thin film coating layer to the planar third glass surface of the rear transparent glass substrate comprises an oxide of silicon.

45. The vehicular interior rearview mirror assembly of claim 41, wherein the transparent electrically conductive thin film coating layer is coated onto a thin film coating layer that comprises an oxide of silicon.

46. The vehicular interior rearview mirror assembly of claim 40, wherein the interior rearview mirror electrochromic reflective element, when in its non-dimmed bleached state, has a visible light transmission in the 380-750 nm spectral region of at least 20% T.

47. The vehicular interior rearview mirror assembly of claim 46, wherein the interior rearview mirror electrochromic reflective element, when in its non-dimmed bleached state, has a visible light transmission in the 380-750 nm spectral region not exceeding 30% T.

48. The vehicular interior rearview mirror assembly of claim 47, wherein the interior rearview mirror electrochromic reflective element, when in its non-dimmed bleached state, has a visible light reflectivity (measured per SAE J964a) of at least 43% R.

49. The vehicular interior rearview mirror assembly of claim 47, wherein the interior rearview mirror electrochromic reflective element, when in its non-dimmed bleached state, has a visible light reflectivity (measured per SAE J964a) of at least 55% R.

50. The vehicular interior rearview mirror assembly of claim 40, wherein the interior rearview mirror electrochromic reflective element, when in its non-dimmed bleached state, has near infrared transmission at 940 nm of at least 50% T.

51. The vehicular interior rearview mirror assembly of claim 40, wherein the interior rearview mirror electrochromic reflective element, when in its non-dimmed bleached state, has near infrared transmission at 940 nm of at least 60% T.

52. The vehicular interior rearview mirror assembly of claim 40, wherein the interior rearview mirror electrochromic reflective element, when in its fully dimmed state, has near infrared transmission at 940 nm of at least 50% T.

53. The vehicular interior rearview mirror assembly of claim 40, wherein the vehicular interior rearview mirror assembly comprises a frameless interior rearview mirror assembly.

54. The vehicular interior rearview mirror assembly of claim 53, wherein the vehicular mirror assembly.

55. The vehicular interior rearview mirror assembly of claim 53, wherein the vehicular interior rearview mirror assembly comprises a frameless EVO™ interior rearview mirror assembly.

56. The vehicular interior rearview mirror assembly of claim 53, wherein the near infrared illumination source comprises at least one near-IR light emitting diode (LED).

57. The vehicular interior rearview mirror assembly of claim 56, wherein the at least one near-IR LED comprises a near-IR LED operable to emit a total radiant flux of at least 2,000 mW when electrically powered.

58. The vehicular interior rearview mirror assembly of claim 56, wherein the imaging sensor comprises a backside Illumination (BSI) imaging sensor.

59. The vehicular interior rearview mirror assembly of claim 58, wherein the CMOS imaging array having at least one million photosensor elements arranged in rows and columns has at least 3 million photosensor elements.

60. The vehicular interior rearview mirror assembly of claim 58, wherein the CMOS imaging array having at least one million photosensor elements arranged in rows and columns has at least 5 million photosensor elements.

61. The vehicular interior rearview mirror assembly of claim 58, wherein the higher refractive index layer has a refractive index greater than 2 and the lower refractive index layer has a refractive index less than 1.5, and wherein the refractive index of the higher refractive index layer is bigger than the refractive index of the lower refractive index layer by at least 0.5.

62. The vehicular interior rearview mirror assembly of claim 40, wherein the interior rearview mirror electrochromic reflective element, when in its non-dimmed bleached state, has visible light transmission in a range of 20% T to 25% T and near-IR light transmission at 940 nm of at least 65%, and wherein the imaging sensor comprises a backside Illumination (BSI) imaging sensor, and wherein the CMOS imaging array having at least one million photosensor elements arranged in rows and columns has at least 2.3 million photosensor elements.

63. A vehicular interior rearview mirror assembly, the vehicular interior rearview mirror assembly comprising:
  an interior rearview mirror head adjustably disposed at a mounting base that is configured to attach the vehicular interior rearview mirror assembly at an interior portion of a vehicle equipped with the vehicular interior rearview mirror assembly;
  wherein the interior rearview mirror head accommodates an interior rearview mirror prismatic reflective element;
  wherein the interior rearview mirror prismatic reflective element comprises a planar transparent glass substrate having a planar first glass surface and an opposing planar second glass surface that is separated from the planar first glass surface of the planar transparent glass substrate by a thickness dimension of the planar transparent glass substrate;
  wherein the planar transparent glass substrate has a wedge-shaped cross-section;
  wherein the plane of the planar first glass surface slopes at an angle relative to the plane of the planar second glass surface;
  wherein the planar first glass surface is an uncoated glass surface;
  wherein a mirror transflector is disposed at the planar second glass surface of the planar transparent glass substrate of the interior rearview mirror prismatic reflective element;
  wherein the mirror transflector comprises a multilayer stack formed by a plurality of thin film coating layers;
  wherein the multilayer stack comprises repeating alternating layers of a higher refractive index layer and a lower refractive index layer;
  wherein the plurality of thin film coating layers comprises at least five thin film coating layers;
  wherein the plurality of thin film coating layers of the mirror transflector comprises an innermost thin film coating layer that is closest to the planar second glass surface of the planar transparent glass substrate at which the mirror transflector is disposed;
  wherein the innermost thin film coating layer of the plurality of thin film coating layers of the mirror transflector that is closest to the planar second glass surface of the planar transparent glass substrate at which the mirror transflector is disposed comprises the higher refractive index layer;
  wherein the next closest thin film coating layer to the planar second glass surface of the planar transparent glass substrate at which the mirror transflector is disposed comprises the lower refractive index layer;
  wherein the multilayer stack forming the mirror transflector comprises an outermost thin film coating layer that is farthest from the planar second glass surface of the planar transparent glass substrate at which the mirror transflector is disposed;
  a megapixel camera disposed within the interior rearview mirror head behind the interior rearview mirror prismatic reflective element;
  wherein the megapixel camera comprises an imaging sensor, the imaging sensor comprising a CMOS imaging array having at least one million photosensor elements arranged in rows and columns;
  wherein the megapixel camera views through the mirror transflector of the interior rearview mirror prismatic reflective element;
  wherein the megapixel camera is operable to capture frames of image data at a frame capture rate of at least 60 frames per second;
  electronic circuitry disposed within the interior rearview mirror head behind the interior rearview mirror prismatic reflective element;
  wherein the electronic circuitry comprises a data processor;
  wherein the data processor comprises an integrated circuit chip operable to process image data captured by the megapixel camera;
  wherein a near infrared illumination source is disposed within the interior rearview mirror head behind the interior rearview mirror prismatic reflective element;
  wherein the near infrared illumination source, when powered, emits near infrared light that passes through the mirror transflector of the interior rearview mirror prismatic reflective element;
  wherein the interior rearview mirror prismatic reflective element and the megapixel camera and the near infrared illumination source and the electronic circuitry move in tandem with the interior rearview mirror head when, with the vehicular interior rearview mirror assembly attached at the interior portion of the equipped vehicle, the interior rearview mirror head is adjusted by a driver of the equipped vehicle to set a rearward view of the interior rearview mirror prismatic reflective element for the driver;
  wherein, with the vehicular interior rearview mirror assembly attached at the interior portion of the equipped vehicle and with the interior rearview mirror head adjusted by the driver to set the rearward view of the interior rearview mirror prismatic reflective element for the driver, (i) the megapixel camera views at least the eyes of the driver of the equipped vehicle when the driver is seated at a front driver seat region of the equipped vehicle and (ii) the near infrared illumination source, when powered to emit near infrared light, illuminates at least the eyes of the driver of the equipped vehicle when the driver is seated at the front driver seat region of the equipped vehicle; and wherein, with the vehicular interior rearview mirror assembly attached at the interior portion of the equipped vehicle and responsive at least in part to the data processor processing captured image data, at least one selected from the group consisting of (i) driver attentiveness is monitored, (ii) driver drowsiness is monitored and (iii) driver gaze direction is monitored.

64. The vehicular interior rearview mirror assembly of claim 63, wherein the interior rearview mirror prismatic reflective element has a near infrared transmission at 940 nm of at least 65% T.

65. The vehicular interior rearview mirror assembly of claim 64, wherein the vehicular interior rearview mirror assembly comprises a frameless interior rearview mirror assembly.

66. The vehicular interior rearview mirror assembly of claim 65, wherein the vehicular mirror assembly.

67. The vehicular interior rearview mirror assembly of claim 65, wherein the vehicular interior rearview mirror assembly comprises a frameless EVO™ interior rearview mirror assembly.

68. The vehicular interior rearview mirror assembly of claim 63, wherein the interior rearview mirror prismatic reflective element comprises a mirror attachment plate, and wherein the interior rearview mirror prismatic reflective element is attached at the mirror attachment plate.

69. The vehicular interior rearview mirror assembly of claim 68, wherein a heat dissipating element disposed within the interior rearview mirror head functions to limit electromagnetic radiation interference with (i) the megapixel camera, (ii) the near infrared illumination source and (iii) the data processor.

70. The vehicular interior rearview mirror assembly of claim 69, wherein the heat dissipating element is attached at the mirror attachment plate.

71. The vehicular interior rearview mirror assembly of claim 63, wherein the near infrared illumination source comprises at least one near-IR light emitting diode (LED), and wherein the at least one near-IR LED comprises a near-IR LED operable to emit a total radiant flux of at least 2,000 mW when electrically powered.

72. The vehicular interior rearview mirror assembly of claim 63, wherein the imaging sensor comprises a backside Illumination (BSI) imaging sensor.

73. The vehicular interior rearview mirror assembly of claim 72, wherein the CMOS imaging array having at least one million photosensor elements arranged in rows and columns has at least 3 million photosensor elements.

74. The vehicular interior rearview mirror assembly of claim 72, wherein the CMOS imaging array having at least one million photosensor elements arranged in rows and columns has at least 5 million photosensor elements.

75. The vehicular interior rearview mirror assembly of claim 72, wherein the higher refractive index layer has a refractive index greater than 2 and the lower refractive index layer has a refractive index less than 1.5, and wherein the refractive index of the higher refractive index layer is bigger than the refractive index of the lower refractive index layer by at least 0.5.

76. The vehicular interior rearview mirror assembly of claim 72, wherein the higher refractive index layer comprises a thin film coating layer comprising an oxide of niobium, and wherein the lower refractive index layer comprises a thin film coating layer comprising an oxide of silicon.

77. The vehicular interior rearview mirror assembly of claim 72, wherein the higher refractive index layer comprises a thin film coating layer comprising an oxide of titanium, and wherein the lower refractive index layer comprises a thin film coating layer comprising an oxide of silicon.

* * * * *

UNITED STATES PATENT AND TRADEMARK OFFICE
CERTIFICATE OF CORRECTION

PATENT NO. : 12,128,827 B2
APPLICATION NO. : 18/432366
DATED : October 29, 2024
INVENTOR(S) : Gregory A. Huizen et al.

It is certified that error appears in the above-identified patent and that said Letters Patent is hereby corrected as shown below:

In the Claims

Column 111
Line 58, Claim 21, "wherein the vehicular mirror assembly." should be --wherein the vehicular interior rearview mirror assembly comprises a frameless INFINITY™ interior rearview mirror assembly.--

Column 116
Line 56, Claim 54, "wherein the vehicular mirror assembly." should be --wherein the vehicular interior rearview mirror assembly comprises a frameless INFINITY™ interior rearview mirror assembly.--

Column 119
Line 19, Claim 66, "wherein the vehicular mirror assembly." should be --wherein the vehicular interior rearview mirror assembly comprises a frameless INFINITY™ interior rearview mirror assembly.--

Signed and Sealed this
Twenty-sixth Day of November, 2024

Katherine Kelly Vidal
*Director of the United States Patent and Trademark Office*